(12) United States Patent
Scott et al.

(10) Patent No.: US 12,534,538 B2
(45) Date of Patent: Jan. 27, 2026

(54) ANTI-HER2 BINDING MOLECULES

(71) Applicant: Certis Therapeutics PTY LTD, Kew East (AU)

(72) Inventors: Andrew Mark Scott, Kew East (AU); Hui Kong Gan, Kew East (AU); Zhanqi Liu, Kew East (AU); Sagun Parakh, Kew East (AU)

(73) Assignee: Certis Therapeutics Pty Ltd, Kew East (AU)

( * ) Notice: Subject to any disclaimer, the term of this patent is extended or adjusted under 35 U.S.C. 154(b) by 1157 days.

(21) Appl. No.: 17/442,072

(22) PCT Filed: Mar. 20, 2020

(86) PCT No.: PCT/AU2020/050274
§ 371 (c)(1),
(2) Date: Sep. 22, 2021

(87) PCT Pub. No.: WO2020/191434
PCT Pub. Date: Oct. 1, 2020

(65) Prior Publication Data
US 2022/0169747 A1    Jun. 2, 2022

(30) Foreign Application Priority Data
Mar. 22, 2019    (AU) .............................. 2019900973

(51) Int. Cl.
*C07K 16/32*    (2006.01)
*A61P 35/00*    (2006.01)
*G01N 33/574*    (2006.01)
*A61K 39/00*    (2006.01)

(52) U.S. Cl.
CPC ....... *C07K 16/32* (2013.01); *G01N 33/57484* (2013.01); *A61K 2039/505* (2013.01); *A61P 35/00* (2018.01); *C07K 2317/34* (2013.01); *C07K 2317/73* (2013.01); *C07K 2317/92* (2013.01)

(58) Field of Classification Search
CPC ........ A61K 2039/505; A61K 2039/507; A61P 35/00; G01N 33/57484; G01N 33/566; C07K 16/32; C07K 2317/34
See application file for complete search history.

(56) References Cited

U.S. PATENT DOCUMENTS 7,371,376 B1    5/2008  Fendly
2009/0280503 A1 *  11/2009  Fiore .................. C07K 16/2863
424/1.49

FOREIGN PATENT DOCUMENTS

| AU | 2000057632 B2 | 1/2001 |
| EP | 3 115 377 A1 | 1/2017 |
| WO | 9817797 A1 | 4/1998 |

(Continued)

OTHER PUBLICATIONS

Janeway Jr et al. (Immunology, 3rd Edition, Garland Publishing Inc., pp. 3:1-3:11) (Year: 1997).*

(Continued)

*Primary Examiner* — Gary B Nickol
(74) *Attorney, Agent, or Firm* — McNeill PLLC

(57) ABSTRACT

The present disclosure is directed to binding proteins to the extracellular domain (ECD) of HER2/ErbB2. More particularly, the binding proteins bind to a conformational epitope which is exposed in cells in response to HER2 amplification or activation.

16 Claims, 53 Drawing Sheets

Specification includes a Sequence Listing.

(56) References Cited

FOREIGN PATENT DOCUMENTS

| WO | 2005081852 A2 | 9/2005 |
|---|---|---|
| WO | 2005081854 A2 | 9/2005 |
| WO | 2006138675 A2 | 12/2006 |
| WO | 2008033495 A2 | 3/2008 |
| WO | 2009023266 A1 | 2/2009 |
| WO | 2009123894 A2 | 10/2009 |
| WO | 2011107957 A1 | 9/2011 |
| WO | 2014131019 A2 | 8/2014 |
| WO | 2017191327 A2 | 11/2017 |

OTHER PUBLICATIONS

Briney et al. (Commonality despite exceptional diversity in baseline human antibody repertoire. Nature. 566:393-399) (Year: 2019).*

Amiri Mohammad Mehdi et al, "Hersintuzumab: A Novel Humanized anit-HER2 monoclonal antibody induces potent tumor growth inhibition", Investigational New Drugs (2018), vol. 36(2):Oct. 6, 2017, 16 pages (171-186).

Tohid Kazemi et al., "Characterization of Novel Murine Monoclonal Antibodies Directed Against the Extracellular Domain of Human HER2 Tyrosine Kinase Receptor", Hybridoma, vol. 30(4): June 128, 2020, 9 pages (347-353).

Ko B-K et al., "Combination of novel HER2-targeting antibody 1E11 with trastuzumab shows synergistic antitumor activity in HER2-positive gastric cancer", Molecular Oncology 9 (2015) ScienceDirect, Sep. 28, 2014, 11 pages (398-408).

Adams CW et al., "Humanization of a recombinant monoclonal antibody to produce a therapeutic HER dimerization inhibitor, pertuxumab", Cancer Immunol Immunother (2006) 55(6), Apr. 28, 2005, 11 pages (717-727).

Franklin et al., "Insights into ErbB signaling from the structure of the ErbB2-pertuzumab complex", Cancer Cell, vol. 5:317, Apr. 2004, 12 pages.

Parakh S et a., "Evolution of anti-HER2 therapies for cancer treatment", Cancer Treatment Reviews 59 (2017) 1-21, Jun. 23, 2017, 21 pages.

Hu S et al., "Molecular architecture of the ErbB2 extracellular domain homodimer", www.impactjournals.com/Oncotarget, vol. 6(3):1695, Jan. 30, 2015, 12 pages.

Shepard M et al., "Monoclonal Antibody Therapy of Human Cancer: Taking the HER2 Protooncogene to the Clinic", Journal of Clinical Immunology, vol. 11, No. 3, 1991, Jan. 22, 1991, 11 pages.

Burgess A et al., "An Open-and-Shut Case? Recent Insights into the Activation of EFG/ErbB Receptors", Molecular Cell, vol. 12:541-552, Sep. 2003, 12 pages.

* cited by examiner

ErbB2 Protein Sequence Full length receptor tyrosine-protein kinase erbB-2 isoform a precursor ORIGIN
```
   1 melaalcrwg lllallppga astqvctgtd mklrlpaspe thldmlrhly qgcqvvqgnl
  61 eltylptnas lsflqdiqev qgyvliahnq vrqvplqrlr ivrgtqlfed nyalavldng
 121 dplnnttpvt gaspgglrel qlrsleik ggvlqmpy lcyqdtilwk dithkngla
 181 lhdmrsr achpcspmck gsrcwgese deqsltrtvc aggcarckgp lptdccheqc
 241 aagctgpkhs delacthfnh sgicelhcpa lvtydtife smpnpegryt fgascvtacp
 301 ynylstdvgs citvcplhnq evtaedgtqr cekcskpcar vcyglgmehl revravtsan
 361 iqefagckki fgslafipes fdgdpasnta plqpeqlqvf etleeitgyl yisawpdslp
 421 dlsvfqnlqv irgrnlnga ysltlqglgi swlghslre lgsglalihh nthlcfvhtv
 481 pwdqlfrnph qallhraump qallhraump edecvgegia clyjearhc wgpgptqcvn csqflrgqec
 541 veecrvlqgl preyvnarhc lpchpecqpq ngsvtcfgpe adqcvacahy kdppfcvarc
 601 psgvkpdisy mpiwkfpdee gacqpcpinc thscvdlddk gcpaeqrasp ltsiisavvg
 661 ilhvvlgvv fgilikrrqi kirkytmrrl lqetelvepl tpsgamprga qmilkerel
 721 rkvklgsga fgtvykgiwi pdgenvkipv aikvlrents pkankeilde aymagvgsp
 781 yvstlgicl tstvqlvtql mpygcllhv rengrglqsq dlinwcmqia kgmsyledvr
 841 lvhrdlaarn vlvkspnhvk itdfglarll dideteyhad ggkvpikwma lesilrrrft
 901 hqsdvwsygv tvwelmtfga kpydgipare ipdllekger lpqpictidy yminvkcwm
 961 idsecrprfr elvsefsrma rdpqrfvviq nedlgpaspl dstfyrsle dddmgdlvda
1021 eeylvpqqgf fcpdpapgag gmvhhrhrss strsggsgdlt lglepseeea prsplapseg
1081 agsdvfdgdl emgaakglqs lpthdpsplq rysedptvpl psetdgyvap ltcspqpeyv
1141 nqpdvrpqpp spregplpaa rpagatlerp krlspgkngv vkdvfafgga venpeyltpq
1201 ggaapqphpp pafspafdnl yywdqdpper gappstfkgt ptaenpeylg ldvpv
```

FIG. 1 mAb104 Heavy Chain Variable Region Protein Sequence:

EVQLQQSGPELVKPGASVKISCKASGYSFTGYFMHWVRQSHVRSLEWIGRINPYNGDIRYNQNFKDKASLTVD
KSSSTAYMELHRLTSEDSAVFYCASLNFAYWGQGTPVTVSA (SEQ ID NO:2)

mAb104 Light Chain Variable Region Protein Sequence:

DIVITQSPLTLSVTFGQPASISCKSSQSLLDSDGKTFLNWLLQRPGQSPKRLIYLVSKLDSGVPDRFTGSGSGTDFT
LKISRVEAEDLGVYYCWQGTHFPWTFGGGTKLEIKR (SEQ ID NO:3)

mAb106 Heavy Chain Variable Region Protein Sequence:

QIQLVQSGPELKKPGETVKISCKASGYTFTDYGMNWVKQAPGKGLKWMGWINTYTGKPTYDD
DFKGRFAFSLETSASTAYLQINNLKNEDMATYFCARRFLNTVAGRSVYFDYWGQGTTLTVSS (SEQ ID NO:4)

mAb106 Light Chain Variable Region Protein Sequence:

QIVLTQSPALMSVSPGEKVTMTCSVSSSVGSMYWYQQKPRSSPKPWIYLTSNLASGVPPRFSGSG
SGTSYSLTISSMEGEDAATYYCQQWSSNPPTFGAGTKLELKR (SEQ ID NO:5)

FIG. 4

* mAb014, pertuzumab and isotype control antibody have no anti-proliferative effect and overlap each other

SK-BR-3

BT-474

* mAb014 and isotype control antibody have no anti-proliferative effect and overlap each other

SK-BR-3

BT-474 mAb104, pertuzumab and isotype control antibody have no anti-proliferative effect and overlap each other

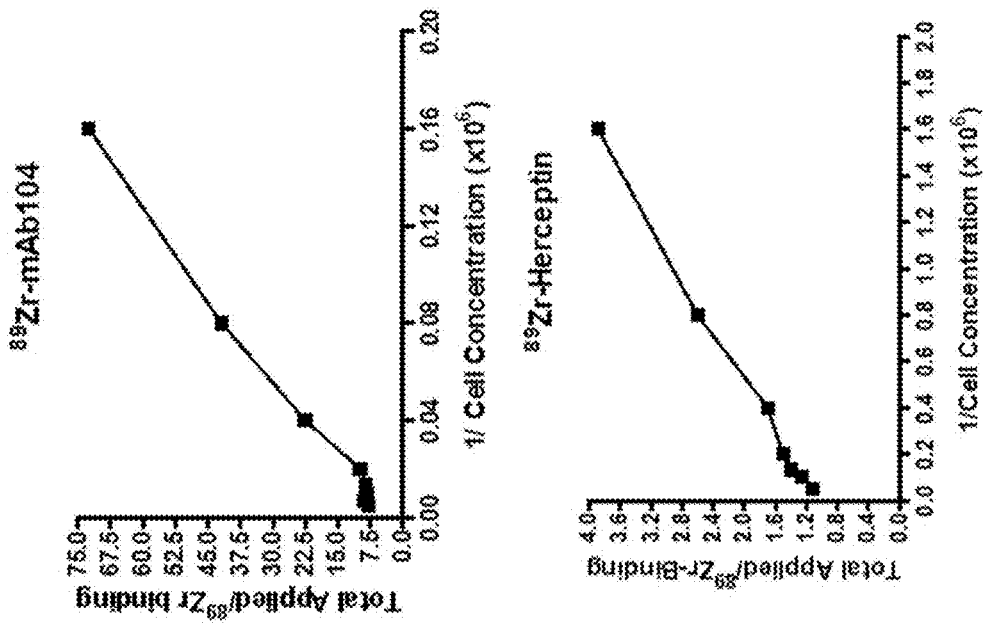
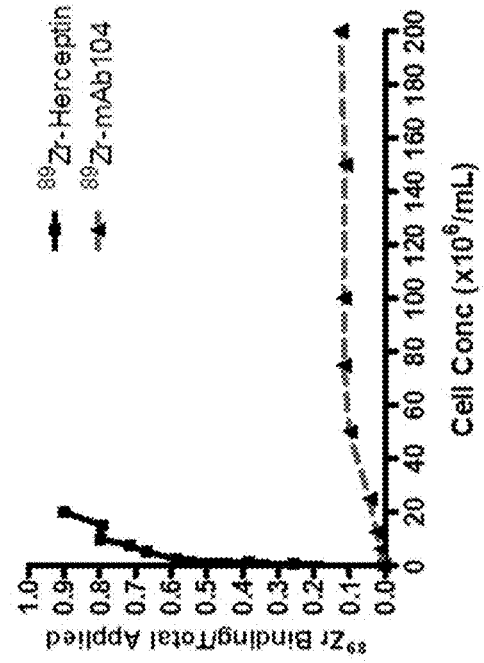
FIG 32B
FIG. 32C
FIG 32A

SEQUENCE LISTING

```
<160> NUMBER OF SEQ ID NOS: 57

<210> SEQ ID NO 1
<211> LENGTH: 17
<212> TYPE: PRT
<213> ORGANISM: Homo sapiens

<400> SEQUENCE: 1

Cys Pro Leu His Asn Gln Glu Val Thr Ala Glu Asp Gly Thr Gln Arg
1               5                   10                  15

Cys

<210> SEQ ID NO 2
<211> LENGTH: 114
<212> TYPE: PRT
<213> ORGANISM: Artificial Sequence
<220> FEATURE:
<223> OTHER INFORMATION: VH sequence mAb104

<400> SEQUENCE: 2

Glu Val Gln Leu Gln Gln Ser Gly Pro Glu Leu Val Lys Pro Gly Ala
1               5                   10                  15

Ser Val Lys Ile Ser Cys Lys Ala Ser Gly Tyr Ser Phe Thr Gly Tyr
                20                  25                  30

Phe Met His Trp Val Arg Gln Ser His Val Arg Ser Leu Glu Trp Ile
            35                  40                  45

Gly Arg Ile Asn Pro Tyr Asn Gly Asp Ile Arg Tyr Asn Gln Asn Phe
        50                  55                  60

Lys Asp Lys Ala Ser Leu Thr Val Asp Lys Ser Ser Ser Thr Ala Tyr
65                  70                  75                  80

Met Glu Leu His Arg Leu Thr Ser Glu Asp Ser Ala Val Phe Tyr Cys
```

```
                         85                  90                  95
Ala Ser Leu Asn Phe Ala Tyr Trp Gly Gln Gly Thr Pro Val Thr Val
                100                 105                 110
Ser Ala

<210> SEQ ID NO 3
<211> LENGTH: 113
<212> TYPE: PRT
<213> ORGANISM: Artificial Sequence
<220> FEATURE:
<223> OTHER INFORMATION: VL sequence of mAb104

<400> SEQUENCE: 3

Asp Ile Val Ile Thr Gln Ser Pro Leu Thr Leu Ser Val Thr Phe Gly
1               5                   10                  15

Gln Pro Ala Ser Ile Ser Cys Lys Ser Ser Gln Ser Leu Leu Asp Ser
            20                  25                  30

Asp Gly Lys Thr Phe Leu Asn Trp Leu Leu Gln Arg Pro Gly Gln Ser
        35                  40                  45

Pro Lys Arg Leu Ile Tyr Leu Val Ser Lys Leu Asp Ser Gly Val Pro
    50                  55                  60

Asp Arg Phe Thr Gly Ser Gly Ser Gly Thr Asp Phe Thr Leu Lys Ile
65                  70                  75                  80

Ser Arg Val Glu Ala Glu Asp Leu Gly Val Tyr Tyr Cys Trp Gln Gly
                85                  90                  95

Thr His Phe Pro Trp Thr Phe Gly Gly Gly Thr Lys Leu Glu Ile Lys
                100                 105                 110

Arg

<210> SEQ ID NO 4
<211> LENGTH: 124
<212> TYPE: PRT
<213> ORGANISM: Artificial Sequence
<220> FEATURE:
<223> OTHER INFORMATION: VH sequence of mAb106

<400> SEQUENCE: 4

Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Asp Tyr
            20                  25                  30

Gly Met Asn Trp Val Lys Gln Ala Pro Gly Lys Gly Leu Lys Trp Met
        35                  40                  45

Gly Trp Ile Asn Thr Tyr Thr Gly Lys Pro Thr Tyr Asp Asp Asp Phe
    50                  55                  60

Lys Gly Arg Phe Ala Phe Ser Leu Glu Thr Ser Ala Ser Thr Ala Tyr
65                  70                  75                  80

Leu Gln Ile Asn Asn Leu Lys Asn Glu Asp Met Ala Thr Tyr Phe Cys
                85                  90                  95

Ala Arg Arg Phe Leu Asn Thr Val Ala Gly Arg Ser Val Tyr Phe Asp
                100                 105                 110

Tyr Trp Gly Gln Gly Thr Thr Leu Thr Val Ser Ser
            115                 120

<210> SEQ ID NO 5
<211> LENGTH: 107
<212> TYPE: PRT
<213> ORGANISM: Artificial Sequence
```

<220> FEATURE:
<223> OTHER INFORMATION: VL sequence of mAb106

<400> SEQUENCE: 5

Gln Ile Val Leu Thr Gln Ser Pro Ala Leu Met Ser Val Ser Pro Gly
1               5                   10                  15

Glu Lys Val Thr Met Thr Cys Ser Val Ser Ser Ser Val Gly Ser Met
            20                  25                  30

Tyr Trp Tyr Gln Gln Lys Pro Arg Ser Ser Pro Lys Pro Trp Ile Tyr
        35                  40                  45

Leu Thr Ser Asn Leu Ala Ser Gly Val Pro Pro Arg Phe Ser Gly Ser
    50                  55                  60

Gly Ser Gly Thr Ser Tyr Ser Leu Thr Ile Ser Ser Met Glu Gly Glu
65                  70                  75                  80

Asp Ala Ala Thr Tyr Tyr Cys Gln Gln Trp Ser Ser Asn Pro Pro Thr
                85                  90                  95

Phe Gly Ala Gly Thr Lys Leu Glu Leu Lys Arg
            100                 105

<210> SEQ ID NO 6
<211> LENGTH: 10
<212> TYPE: PRT
<213> ORGANISM: Artificial Sequence
<220> FEATURE:
<223> OTHER INFORMATION: VH CDR1 sequence
<220> FEATURE:
<221> NAME/KEY: MISC_FEATURE
<222> LOCATION: (3)..(3)
<223> OTHER INFORMATION: X is S or T
<220> FEATURE:
<221> NAME/KEY: MISC_FEATURE
<222> LOCATION: (6)..(6)
<223> OTHER INFORMATION: X is G or D
<220> FEATURE:
<221> NAME/KEY: MISC_FEATURE
<222> LOCATION: (8)..(8)
<223> OTHER INFORMATION: X is F or G
<220> FEATURE:
<221> NAME/KEY: MISC_FEATURE
<222> LOCATION: (10)..(10)
<223> OTHER INFORMATION: X is H or N

<400> SEQUENCE: 6

Gly Tyr Xaa Phe Thr Xaa Tyr Xaa Met Xaa
1               5                   10

<210> SEQ ID NO 7
<211> LENGTH: 17
<212> TYPE: PRT
<213> ORGANISM: Artificial Sequence
<220> FEATURE:
<223> OTHER INFORMATION: VH CDR2
<220> FEATURE:
<221> NAME/KEY: MISC_FEATURE
<222> LOCATION: (1)..(1)
<223> OTHER INFORMATION: X= R or W
<220> FEATURE:
<221> NAME/KEY: MISC_FEATURE
<222> LOCATION: (4)..(4)
<223> OTHER INFORMATION: X= P or T
<220> FEATURE:
<221> NAME/KEY: MISC_FEATURE
<222> LOCATION: (6)..(6)
<223> OTHER INFORMATION: X= N or T
<220> FEATURE:
<221> NAME/KEY: MISC_FEATURE
<222> LOCATION: (8)..(8)
<223> OTHER INFORMATION: X= D or K
<220> FEATURE:

```
<221> NAME/KEY: MISC_FEATURE
<222> LOCATION: (9)..(9)
<223> OTHER INFORMATION: X= I or P
<220> FEATURE:
<221> NAME/KEY: MISC_FEATURE
<222> LOCATION: (10)..(10)
<223> OTHER INFORMATION: X= R or T
<220> FEATURE:
<221> NAME/KEY: MISC_FEATURE
<222> LOCATION: (12)..(12)
<223> OTHER INFORMATION: X= N or D
<220> FEATURE:
<221> NAME/KEY: MISC_FEATURE
<222> LOCATION: (13)..(13)
<223> OTHER INFORMATION: X= Q or D
<220> FEATURE:
<221> NAME/KEY: MISC_FEATURE
<222> LOCATION: (14)..(14)
<223> OTHER INFORMATION: X= N or D
<220> FEATURE:
<221> NAME/KEY: MISC_FEATURE
<222> LOCATION: (17)..(17)
<223> OTHER INFORMATION: X= D or G

<400> SEQUENCE: 7

Xaa Ile Asn Xaa Tyr Xaa Gly Xaa Xaa Xaa Tyr Xaa Xaa Xaa Phe Lys
1               5                   10                  15

Xaa

<210> SEQ ID NO 8
<211> LENGTH: 15
<212> TYPE: PRT
<213> ORGANISM: Artificial Sequence
<220> FEATURE:
<223> OTHER INFORMATION: VH CDR3
<220> FEATURE:
<221> NAME/KEY: MISC_FEATURE
<222> LOCATION: (1)..(1)
<223> OTHER INFORMATION: X= absent or R
<220> FEATURE:
<221> NAME/KEY: MISC_FEATURE
<222> LOCATION: (2)..(2)
<223> OTHER INFORMATION: X= absent or F
<220> FEATURE:
<221> NAME/KEY: MISC_FEATURE
<222> LOCATION: (3)..(3)
<223> OTHER INFORMATION: X= absent or L
<220> FEATURE:
<221> NAME/KEY: MISC_FEATURE
<222> LOCATION: (4)..(4)
<223> OTHER INFORMATION: X= absent or N
<220> FEATURE:
<221> NAME/KEY: MISC_FEATURE
<222> LOCATION: (5)..(5)
<223> OTHER INFORMATION: X= absent or T
<220> FEATURE:
<221> NAME/KEY: MISC_FEATURE
<222> LOCATION: (6)..(6)
<223> OTHER INFORMATION: X= absent or V
<220> FEATURE:
<221> NAME/KEY: MISC_FEATURE
<222> LOCATION: (7)..(7)
<223> OTHER INFORMATION: X= absent or A
<220> FEATURE:
<221> NAME/KEY: MISC_FEATURE
<222> LOCATION: (8)..(8)
<223> OTHER INFORMATION: X= absent or g
<220> FEATURE:
<221> NAME/KEY: MISC_FEATURE
<222> LOCATION: (8)..(8)
<223> OTHER INFORMATION: X= absent or G
<220> FEATURE:
<221> NAME/KEY: MISC_FEATURE
<222> LOCATION: (9)..(9)
<223> OTHER INFORMATION: X= absent or R
<220> FEATURE:
```

<221> NAME/KEY: MISC_FEATURE
<222> LOCATION: (10)..(10)
<223> OTHER INFORMATION: X= absent or S
<220> FEATURE:
<221> NAME/KEY: MISC_FEATURE
<222> LOCATION: (11)..(11)
<223> OTHER INFORMATION: X= L or V
<220> FEATURE:
<221> NAME/KEY: MISC_FEATURE
<222> LOCATION: (12)..(12)
<223> OTHER INFORMATION: X= N or Y
<220> FEATURE:
<221> NAME/KEY: MISC_FEATURE
<222> LOCATION: (14)..(14)
<223> OTHER INFORMATION: X= A or D

<400> SEQUENCE: 8

Xaa Xaa Xaa Xaa Xaa Xaa Xaa Xaa Xaa Xaa Xaa Xaa Phe Xaa Tyr
1               5                   10                  15

<210> SEQ ID NO 9
<211> LENGTH: 16
<212> TYPE: PRT
<213> ORGANISM: Artificial Sequence
<220> FEATURE:
<223> OTHER INFORMATION: VL CDR1
<220> FEATURE:
<221> NAME/KEY: MISC_FEATURE
<222> LOCATION: (1)..(1)
<223> OTHER INFORMATION: X= K or S
<220> FEATURE:
<221> NAME/KEY: MISC_FEATURE
<222> LOCATION: (2)..(2)
<223> OTHER INFORMATION: X= S or V
<220> FEATURE:
<221> NAME/KEY: MISC_FEATURE
<222> LOCATION: (4)..(4)
<223> OTHER INFORMATION: X= Q or S
<220> FEATURE:
<221> NAME/KEY: MISC_FEATURE
<222> LOCATION: (6)..(6)
<223> OTHER INFORMATION: X= L or absent
<220> FEATURE:
<221> NAME/KEY: MISC_FEATURE
<222> LOCATION: (7)..(7)
<223> OTHER INFORMATION: X= L or absent
<220> FEATURE:
<221> NAME/KEY: MISC_FEATURE
<222> LOCATION: (8)..(8)
<223> OTHER INFORMATION: X= D or absent
<220> FEATURE:
<221> NAME/KEY: MISC_FEATURE
<222> LOCATION: (9)..(9)
<223> OTHER INFORMATION: X= S or absent
<220> FEATURE:
<221> NAME/KEY: MISC_FEATURE
<222> LOCATION: (10)..(10)
<223> OTHER INFORMATION: X= D or absent
<220> FEATURE:
<221> NAME/KEY: MISC_FEATURE
<222> LOCATION: (11)..(11)
<223> OTHER INFORMATION: X= G or absent
<220> FEATURE:
<221> NAME/KEY: MISC_FEATURE
<222> LOCATION: (12)..(12)
<223> OTHER INFORMATION: X= K or V
<220> FEATURE:
<221> NAME/KEY: MISC_FEATURE
<222> LOCATION: (13)..(13)
<223> OTHER INFORMATION: X= T or G
<220> FEATURE:
<221> NAME/KEY: MISC_FEATURE
<222> LOCATION: (14)..(14)
<223> OTHER INFORMATION: X= F or S
<220> FEATURE:
<221> NAME/KEY: MISC_FEATURE
<222> LOCATION: (15)..(15)

```
<223> OTHER INFORMATION: X= L or M
<220> FEATURE:
<221> NAME/KEY: MISC_FEATURE
<222> LOCATION: (16)..(16)
<223> OTHER INFORMATION: X= N or Y

<400> SEQUENCE: 9

Xaa Xaa Ser Xaa Ser Xaa Xaa Xaa Xaa Xaa Xaa Xaa Xaa Xaa Xaa Xaa
1               5                   10                  15

<210> SEQ ID NO 10
<211> LENGTH: 7
<212> TYPE: PRT
<213> ORGANISM: Artificial Sequence
<220> FEATURE:
<223> OTHER INFORMATION: VL CDR2
<220> FEATURE:
<221> NAME/KEY: MISC_FEATURE
<222> LOCATION: (2)..(2)
<223> OTHER INFORMATION: X= D or E
<220> FEATURE:
<221> NAME/KEY: MISC_FEATURE
<222> LOCATION: (4)..(4)
<223> OTHER INFORMATION: X= K or T
<220> FEATURE:
<221> NAME/KEY: MISC_FEATURE
<222> LOCATION: (6)..(6)
<223> OTHER INFORMATION: X= S or A

<400> SEQUENCE: 10

Leu Xaa Ser Xaa Leu Xaa Ser
1               5

<210> SEQ ID NO 11
<211> LENGTH: 9
<212> TYPE: PRT
<213> ORGANISM: Artificial Sequence
<220> FEATURE:
<223> OTHER INFORMATION: VL CDR3
<220> FEATURE:
<221> NAME/KEY: MISC_FEATURE
<222> LOCATION: (1)..(1)
<223> OTHER INFORMATION: X= W or Q
<220> FEATURE:
<221> NAME/KEY: MISC_FEATURE
<222> LOCATION: (3)..(3)
<223> OTHER INFORMATION: X= G or W
<220> FEATURE:
<221> NAME/KEY: MISC_FEATURE
<222> LOCATION: (4)..(4)
<223> OTHER INFORMATION: X= T or S
<220> FEATURE:
<221> NAME/KEY: MISC_FEATURE
<222> LOCATION: (5)..(5)
<223> OTHER INFORMATION: X= H or S
<220> FEATURE:
<221> NAME/KEY: MISC_FEATURE
<222> LOCATION: (6)..(6)
<223> OTHER INFORMATION: X= F or N
<220> FEATURE:
<221> NAME/KEY: MISC_FEATURE
<222> LOCATION: (8)..(8)
<223> OTHER INFORMATION: X= W or P

<400> SEQUENCE: 11

Xaa Gln Xaa Xaa Xaa Xaa Pro Xaa Thr
1               5

<210> SEQ ID NO 12
<211> LENGTH: 124
<212> TYPE: PRT
<213> ORGANISM: Artificial Sequence
<220> FEATURE:
```

```
<223> OTHER INFORMATION: VH sequence
<220> FEATURE:
<221> NAME/KEY: MISC_FEATURE
<222> LOCATION: (1)..(1)
<223> OTHER INFORMATION: X=E or Q
<220> FEATURE:
<221> NAME/KEY: MISC_FEATURE
<222> LOCATION: (2)..(2)
<223> OTHER INFORMATION: X= V or I
<220> FEATURE:
<221> NAME/KEY: MISC_FEATURE
<222> LOCATION: (5)..(5)
<223> OTHER INFORMATION: X= Q or V
<220> FEATURE:
<221> NAME/KEY: MISC_FEATURE
<222> LOCATION: (12)..(12)
<223> OTHER INFORMATION: X= V or K
<220> FEATURE:
<221> NAME/KEY: MISC_FEATURE
<222> LOCATION: (16)..(16)
<223> OTHER INFORMATION: X= A or E
<220> FEATURE:
<221> NAME/KEY: MISC_FEATURE
<222> LOCATION: (17)..(17)
<223> OTHER INFORMATION: X= S or T
<220> FEATURE:
<221> NAME/KEY: MISC_FEATURE
<222> LOCATION: (28)..(28)
<223> OTHER INFORMATION: X= S or T
<220> FEATURE:
<221> NAME/KEY: MISC_FEATURE
<222> LOCATION: (31)..(31)
<223> OTHER INFORMATION: X= G or D
<220> FEATURE:
<221> NAME/KEY: MISC_FEATURE
<222> LOCATION: (33)..(33)
<223> OTHER INFORMATION: X= F or G
<220> FEATURE:
<221> NAME/KEY: MISC_FEATURE
<222> LOCATION: (35)..(35)
<223> OTHER INFORMATION: X= H or N
<220> FEATURE:
<221> NAME/KEY: MISC_FEATURE
<222> LOCATION: (38)..(35)
<223> OTHER INFORMATION: X= R or K
<220> FEATURE:
<221> NAME/KEY: misc_feature
<222> LOCATION: (38)..(38)
<223> OTHER INFORMATION: Xaa can be any naturally occurring amino acid
<220> FEATURE:
<221> NAME/KEY: MISC_FEATURE
<222> LOCATION: (40)..(40)
<223> OTHER INFORMATION: X= S or A
<220> FEATURE:
<221> NAME/KEY: MISC_FEATURE
<222> LOCATION: (41)..(41)
<223> OTHER INFORMATION: X= H or P
<220> FEATURE:
<221> NAME/KEY: MISC_FEATURE
<222> LOCATION: (42)..(42)
<223> OTHER INFORMATION: X= V or G
<220> FEATURE:
<221> NAME/KEY: MISC_FEATURE
<222> LOCATION: (43)..(43)
<223> OTHER INFORMATION: X= R or K
<220> FEATURE:
<221> NAME/KEY: MISC_FEATURE
<222> LOCATION: (44)..(44)
<223> OTHER INFORMATION: X= S or G
<220> FEATURE:
<221> NAME/KEY: MISC_FEATURE
<222> LOCATION: (46)..(46)
<223> OTHER INFORMATION: X= E or K
<220> FEATURE:
<221> NAME/KEY: misc_feature
<222> LOCATION: (48)..(48)
<223> OTHER INFORMATION: Xaa can be any naturally occurring amino acid
<220> FEATURE:
<221> NAME/KEY: MISC_FEATURE
```

```
<222> LOCATION: (50)..(50)
<223> OTHER INFORMATION: X= R or W
<220> FEATURE:
<221> NAME/KEY: MISC_FEATURE
<222> LOCATION: (53)..(53)
<223> OTHER INFORMATION: X= P or T
<220> FEATURE:
<221> NAME/KEY: MISC_FEATURE
<222> LOCATION: (55)..(55)
<223> OTHER INFORMATION: X= N or T
<220> FEATURE:
<221> NAME/KEY: MISC_FEATURE
<222> LOCATION: (57)..(57)
<223> OTHER INFORMATION: X= D or K
<220> FEATURE:
<221> NAME/KEY: MISC_FEATURE
<222> LOCATION: (58)..(58)
<223> OTHER INFORMATION: X= I or P
<220> FEATURE:
<221> NAME/KEY: MISC_FEATURE
<222> LOCATION: (59)..(59)
<223> OTHER INFORMATION: X= R or T
<220> FEATURE:
<221> NAME/KEY: MISC_FEATURE
<222> LOCATION: (61)..(61)
<223> OTHER INFORMATION: X= N or D
<220> FEATURE:
<221> NAME/KEY: MISC_FEATURE
<222> LOCATION: (62)..(62)
<223> OTHER INFORMATION: X= Q or D
<220> FEATURE:
<221> NAME/KEY: MISC_FEATURE
<222> LOCATION: (63)..(63)
<223> OTHER INFORMATION: X= N or D
<220> FEATURE:
<221> NAME/KEY: MISC_FEATURE
<222> LOCATION: (66)..(66)
<223> OTHER INFORMATION: X= D or G
<220> FEATURE:
<221> NAME/KEY: MISC_FEATURE
<222> LOCATION: (67)..(67)
<223> OTHER INFORMATION: X= K or R
<220> FEATURE:
<221> NAME/KEY: MISC_FEATURE
<222> LOCATION: (68)..(68)
<223> OTHER INFORMATION: X= A or F
<220> FEATURE:
<221> NAME/KEY: MISC_FEATURE
<222> LOCATION: (69)..(69)
<223> OTHER INFORMATION: X= S or A
<220> FEATURE:
<221> NAME/KEY: MISC_FEATURE
<222> LOCATION: (70)..(70)
<223> OTHER INFORMATION: X= L or F
<220> FEATURE:
<221> NAME/KEY: MISC_FEATURE
<222> LOCATION: (71)..(71)
<223> OTHER INFORMATION: X= T or S
<220> FEATURE:
<221> NAME/KEY: MISC_FEATURE
<222> LOCATION: (72)..(72)
<223> OTHER INFORMATION: X= V or L
<220> FEATURE:
<221> NAME/KEY: MISC_FEATURE
<222> LOCATION: (73)..(73)
<223> OTHER INFORMATION: X= D or E
<220> FEATURE:
<221> NAME/KEY: MISC_FEATURE
<222> LOCATION: (74)..(74)
<223> OTHER INFORMATION: X= K or T
<220> FEATURE:
<221> NAME/KEY: MISC_FEATURE
<222> LOCATION: (76)..(76)
<223> OTHER INFORMATION: X= S or A
<220> FEATURE:
<221> NAME/KEY: MISC_FEATURE
<222> LOCATION: (81)..(81)
<223> OTHER INFORMATION: X= M or L
<220> FEATURE:
```

-continued

```
<221> NAME/KEY: MISC_FEATURE
<222> LOCATION: (82)..(82)
<223> OTHER INFORMATION: X= E or Q
<220> FEATURE:
<221> NAME/KEY: MISC_FEATURE
<222> LOCATION: (83)..(83)
<223> OTHER INFORMATION: X= L or I
<220> FEATURE:
<221> NAME/KEY: MISC_FEATURE
<222> LOCATION: (84)..(84)
<223> OTHER INFORMATION: X= H or N
<220> FEATURE:
<221> NAME/KEY: MISC_FEATURE
<222> LOCATION: (85)..(85)
<223> OTHER INFORMATION: X= R or N
<220> FEATURE:
<221> NAME/KEY: MISC_FEATURE
<222> LOCATION: (87)..(87)
<223> OTHER INFORMATION: X= T or K
<220> FEATURE:
<221> NAME/KEY: MISC_FEATURE
<222> LOCATION: (88)..(88)
<223> OTHER INFORMATION: X= S or N
<220> FEATURE:
<221> NAME/KEY: MISC_FEATURE
<222> LOCATION: (91)..(91)
<223> OTHER INFORMATION: X= S or M
<220> FEATURE:
<221> NAME/KEY: MISC_FEATURE
<222> LOCATION: (93)..(93)
<223> OTHER INFORMATION: X= V or T
<220> FEATURE:
<221> NAME/KEY: MISC_FEATURE
<222> LOCATION: (94)..(94)
<223> OTHER INFORMATION: X= F or Y
<220> FEATURE:
<221> NAME/KEY: MISC_FEATURE
<222> LOCATION: (95)..(95)
<223> OTHER INFORMATION: X= F or Y
<220> FEATURE:
<221> NAME/KEY: MISC_FEATURE
<222> LOCATION: (98)..(98)
<223> OTHER INFORMATION: X= S or R
<220> FEATURE:
<221> NAME/KEY: MISC_FEATURE
<222> LOCATION: (99)..(99)
<223> OTHER INFORMATION: X= absent or R
<220> FEATURE:
<221> NAME/KEY: MISC_FEATURE
<222> LOCATION: (100)..(100)
<223> OTHER INFORMATION: X= absent or F
<220> FEATURE:
<221> NAME/KEY: MISC_FEATURE
<222> LOCATION: (101)..(101)
<223> OTHER INFORMATION: X= absent or L
<220> FEATURE:
<221> NAME/KEY: MISC_FEATURE
<222> LOCATION: (102)..(102)
<223> OTHER INFORMATION: X= absent or N
<220> FEATURE:
<221> NAME/KEY: MISC_FEATURE
<222> LOCATION: (103)..(103)
<223> OTHER INFORMATION: X= absent or T
<220> FEATURE:
<221> NAME/KEY: MISC_FEATURE
<222> LOCATION: (104)..(104)
<223> OTHER INFORMATION: X= absent or N
<220> FEATURE:
<221> NAME/KEY: MISC_FEATURE
<222> LOCATION: (105)..(105)
<223> OTHER INFORMATION: X= absent or A
<220> FEATURE:
<221> NAME/KEY: MISC_FEATURE
<222> LOCATION: (106)..(106)
<223> OTHER INFORMATION: X= absent or G
<220> FEATURE:
<221> NAME/KEY: MISC_FEATURE
<222> LOCATION: (107)..(107)
<223> OTHER INFORMATION: X= absent or R
```

-continued

```
<220> FEATURE:
<221> NAME/KEY: MISC_FEATURE
<222> LOCATION: (108)..(108)
<223> OTHER INFORMATION: X= absent or S
<220> FEATURE:
<221> NAME/KEY: MISC_FEATURE
<222> LOCATION: (109)..(109)
<223> OTHER INFORMATION: X= L or V
<220> FEATURE:
<221> NAME/KEY: MISC_FEATURE
<222> LOCATION: (110)..(110)
<223> OTHER INFORMATION: X= N or Y
<220> FEATURE:
<221> NAME/KEY: MISC_FEATURE
<222> LOCATION: (112)..(112)
<223> OTHER INFORMATION: X= A or D
<220> FEATURE:
<221> NAME/KEY: misc_feature
<222> LOCATION: (119)..(119)
<223> OTHER INFORMATION: Xaa can be any naturally occurring amino acid
<220> FEATURE:
<221> NAME/KEY: MISC_FEATURE
<222> LOCATION: (120)..(120)
<223> OTHER INFORMATION: X= V or L
<220> FEATURE:
<221> NAME/KEY: MISC_FEATURE
<222> LOCATION: (124)..(124)
<223> OTHER INFORMATION: X= A or S

<400> SEQUENCE: 12

Xaa Xaa Gln Leu Xaa Gln Ser Gly Pro Glu Leu Xaa Lys Pro Gly Xaa
1               5                   10                  15

Xaa Val Lys Ile Ser Cys Lys Ala Ser Gly Tyr Xaa Phe Thr Xaa Tyr
            20                  25                  30

Xaa Met Xaa Trp Val Xaa Gln Xaa Xaa Xaa Xaa Leu Xaa Trp Xaa
        35                  40                  45

Gly Xaa Ile Asn Xaa Tyr Xaa Gly Xaa Xaa Xaa Tyr Xaa Xaa Xaa Phe
    50                  55                  60

Lys Xaa Xaa Xaa Xaa Xaa Xaa Xaa Xaa Ser Xaa Ser Thr Ala Tyr
65                  70                  75                  80

Xaa Xaa Xaa Xaa Xaa Leu Xaa Xaa Glu Asp Xaa Ala Xaa Xaa Xaa Cys
                    85                  90                  95

Ala Xaa Xaa Xaa Xaa Xaa Xaa Xaa Xaa Xaa Xaa Xaa Xaa Phe Xaa
            100                 105                 110

Tyr Trp Gly Gln Gly Thr Xaa Xaa Thr Val Ser Xaa
        115                 120

<210> SEQ ID NO 13
<211> LENGTH: 113
<212> TYPE: PRT
<213> ORGANISM: Artificial Sequence
<220> FEATURE:
<223> OTHER INFORMATION: VL sequence
<220> FEATURE:
<221> NAME/KEY: MISC_FEATURE
<222> LOCATION: (1)..(1)
<223> OTHER INFORMATION: X= D or Q
<220> FEATURE:
<221> NAME/KEY: MISC_FEATURE
<222> LOCATION: (4)..(4)
<223> OTHER INFORMATION: X= I or L
<220> FEATURE:
<221> NAME/KEY: MISC_FEATURE
<222> LOCATION: (9)..(9)
<223> OTHER INFORMATION: X= L or A
<220> FEATURE:
<221> NAME/KEY: MISC_FEATURE
<222> LOCATION: (10)..(10)
<223> OTHER INFORMATION: X= T or L
<220> FEATURE:
```

```
<221> NAME/KEY: MISC_FEATURE
<222> LOCATION: (11)..(11)
<223> OTHER INFORMATION: X= L or M
<220> FEATURE:
<221> NAME/KEY: MISC_FEATURE
<222> LOCATION: (14)..(14)
<223> OTHER INFORMATION: X= T or S
<220> FEATURE:
<221> NAME/KEY: MISC_FEATURE
<222> LOCATION: (15)..(15)
<223> OTHER INFORMATION: X= F or P
<220> FEATURE:
<221> NAME/KEY: MISC_FEATURE
<222> LOCATION: (17)..(17)
<223> OTHER INFORMATION: X= T or S
<220> FEATURE:
<221> NAME/KEY: MISC_FEATURE
<222> LOCATION: (18)..(18)
<223> OTHER INFORMATION: X= P or K
<220> FEATURE:
<221> NAME/KEY: MISC_FEATURE
<222> LOCATION: (19)..(19)
<223> OTHER INFORMATION: X= P or K
<220> FEATURE:
<221> NAME/KEY: MISC_FEATURE
<222> LOCATION: (20)..(20)
<223> OTHER INFORMATION: X= A or V
<220> FEATURE:
<221> NAME/KEY: MISC_FEATURE
<222> LOCATION: (21)..(21)
<223> OTHER INFORMATION: X= S or T
<220> FEATURE:
<221> NAME/KEY: MISC_FEATURE
<222> LOCATION: (22)..(22)
<223> OTHER INFORMATION: X= I or M
<220> FEATURE:
<221> NAME/KEY: MISC_FEATURE
<222> LOCATION: (24)..(24)
<223> OTHER INFORMATION: X= S or T
<220> FEATURE:
<221> NAME/KEY: MISC_FEATURE
<222> LOCATION: (25)..(25)
<223> OTHER INFORMATION: X= K or S
<220> FEATURE:
<221> NAME/KEY: MISC_FEATURE
<222> LOCATION: (27)..(27)
<223> OTHER INFORMATION: X= S or V
<220> FEATURE:
<221> NAME/KEY: MISC_FEATURE
<222> LOCATION: (29)..(29)
<223> OTHER INFORMATION: X= Q or S
<220> FEATURE:
<221> NAME/KEY: MISC_FEATURE
<222> LOCATION: (30)..(30)
<223> OTHER INFORMATION: X= L or absent
<220> FEATURE:
<221> NAME/KEY: MISC_FEATURE
<222> LOCATION: (31)..(31)
<223> OTHER INFORMATION: X= L or absent
<220> FEATURE:
<221> NAME/KEY: MISC_FEATURE
<222> LOCATION: (32)..(32)
<223> OTHER INFORMATION: X= D or absent
<220> FEATURE:
<221> NAME/KEY: MISC_FEATURE
<222> LOCATION: (33)..(33)
<223> OTHER INFORMATION: X= S or absent
<220> FEATURE:
<221> NAME/KEY: MISC_FEATURE
<222> LOCATION: (34)..(34)
<223> OTHER INFORMATION: X= D or absent
<220> FEATURE:
<221> NAME/KEY: MISC_FEATURE
<222> LOCATION: (35)..(35)
<223> OTHER INFORMATION: X=G or absent
<220> FEATURE:
<221> NAME/KEY: MISC_FEATURE
<222> LOCATION: (36)..(36)
<223> OTHER INFORMATION: X= K or V
```

-continued

```
<220> FEATURE:
<221> NAME/KEY: MISC_FEATURE
<222> LOCATION: (37)..(37)
<223> OTHER INFORMATION: X= T or G
<220> FEATURE:
<221> NAME/KEY: MISC_FEATURE
<222> LOCATION: (38)..(38)
<223> OTHER INFORMATION: X= F or S
<220> FEATURE:
<221> NAME/KEY: MISC_FEATURE
<222> LOCATION: (39)..(39)
<223> OTHER INFORMATION: X= L or M
<220> FEATURE:
<221> NAME/KEY: MISC_FEATURE
<222> LOCATION: (39)..(39)
<223> OTHER INFORMATION: X= N or Y
<220> FEATURE:
<221> NAME/KEY: MISC_FEATURE
<222> LOCATION: (41)..(41)
<223> OTHER INFORMATION: X= L or Y
<220> FEATURE:
<221> NAME/KEY: MISC_FEATURE
<222> LOCATION: (42)..(42)
<223> OTHER INFORMATION: X= L or Q
<220> FEATURE:
<221> NAME/KEY: MISC_FEATURE
<222> LOCATION: (44)..(44)
<223> OTHER INFORMATION: X= R or K
<220> FEATURE:
<221> NAME/KEY: MISC_FEATURE
<222> LOCATION: (46)..(46)
<223> OTHER INFORMATION: X= G or R
<220> FEATURE:
<221> NAME/KEY: MISC_FEATURE
<222> LOCATION: (47)..(47)
<223> OTHER INFORMATION: X= Q or S
<220> FEATURE:
<221> NAME/KEY: MISC_FEATURE
<222> LOCATION: (51)..(51)
<223> OTHER INFORMATION: X= R or P
<220> FEATURE:
<221> NAME/KEY: MISC_FEATURE
<222> LOCATION: (52)..(52)
<223> OTHER INFORMATION: X= L or W
<220> FEATURE:
<221> NAME/KEY: MISC_FEATURE
<222> LOCATION: (56)..(56)
<223> OTHER INFORMATION: X= V or T
<220> FEATURE:
<221> NAME/KEY: MISC_FEATURE
<222> LOCATION: (58)..(58)
<223> OTHER INFORMATION: X= K or N
<220> FEATURE:
<221> NAME/KEY: MISC_FEATURE
<222> LOCATION: (60)..(60)
<223> OTHER INFORMATION: X= D or A
<220> FEATURE:
<221> NAME/KEY: MISC_FEATURE
<222> LOCATION: (65)..(65)
<223> OTHER INFORMATION: X= D or P
<220> FEATURE:
<221> NAME/KEY: MISC_FEATURE
<222> LOCATION: (68)..(68)
<223> OTHER INFORMATION: X= T or S
<220> FEATURE:
<221> NAME/KEY: MISC_FEATURE
<222> LOCATION: (75)..(75)
<223> OTHER INFORMATION: X= D or S
<220> FEATURE:
<221> NAME/KEY: MISC_FEATURE
<222> LOCATION: (76)..(76)
<223> OTHER INFORMATION: X= T or S
<220> FEATURE:
<221> NAME/KEY: MISC_FEATURE
<222> LOCATION: (77)..(77)
<223> OTHER INFORMATION: X= T or S
<220> FEATURE:
<221> NAME/KEY: MISC_FEATURE
<222> LOCATION: (79)..(79)
```

```
<223> OTHER INFORMATION: X= K or T
<220> FEATURE:
<221> NAME/KEY: MISC_FEATURE
<222> LOCATION: (82)..(82)
<223> OTHER INFORMATION: X= R or S
<220> FEATURE:
<221> NAME/KEY: MISC_FEATURE
<222> LOCATION: (83)..(83)
<223> OTHER INFORMATION: X= V or M
<220> FEATURE:
<221> NAME/KEY: MISC_FEATURE
<222> LOCATION: (88)..(88)
<223> OTHER INFORMATION: X= L or A
<220> FEATURE:
<221> NAME/KEY: MISC_FEATURE
<222> LOCATION: (89)..(89)
<223> OTHER INFORMATION: X= G or A
<220> FEATURE:
<221> NAME/KEY: MISC_FEATURE
<222> LOCATION: (90)..(90)
<223> OTHER INFORMATION: X= V or T
<220> FEATURE:
<221> NAME/KEY: MISC_FEATURE
<222> LOCATION: (94)..(94)
<223> OTHER INFORMATION: X= W or Q
<220> FEATURE:
<221> NAME/KEY: MISC_FEATURE
<222> LOCATION: (96)..(96)
<223> OTHER INFORMATION: X= G or W
<220> FEATURE:
<221> NAME/KEY: MISC_FEATURE
<222> LOCATION: (97)..(97)
<223> OTHER INFORMATION: X= T or S
<220> FEATURE:
<221> NAME/KEY: MISC_FEATURE
<222> LOCATION: (98)..(98)
<223> OTHER INFORMATION: X= H or S
<220> FEATURE:
<221> NAME/KEY: MISC_FEATURE
<222> LOCATION: (99)..(99)
<223> OTHER INFORMATION: X= F or N
<220> FEATURE:
<221> NAME/KEY: MISC_FEATURE
<222> LOCATION: (101)..(101)
<223> OTHER INFORMATION: X= W or P
<220> FEATURE:
<221> NAME/KEY: MISC_FEATURE
<222> LOCATION: (105)..(105)
<223> OTHER INFORMATION: X= G or A
<220> FEATURE:
<221> NAME/KEY: MISC_FEATURE
<222> LOCATION: (111)..(111)
<223> OTHER INFORMATION: X= I or L

<400> SEQUENCE: 13

Xaa Ile Val Xaa Thr Gln Ser Pro Xaa Xaa Xaa Ser Val Xaa Xaa Gly
1               5                   10                  15

Xaa Xaa Xaa Xaa Xaa Xaa Cys Xaa Xaa Ser Xaa Ser Xaa Xaa Xaa Xaa
            20                  25                  30

Xaa Xaa Xaa Xaa Xaa Xaa Xaa Trp Xaa Xaa Gln Xaa Pro Xaa Xaa Ser
        35                  40                  45

Pro Lys Xaa Xaa Ile Tyr Leu Xaa Ser Xaa Leu Xaa Ser Gly Val Pro
    50                  55                  60

Xaa Arg Phe Xaa Gly Ser Gly Ser Gly Thr Xaa Xaa Xaa Leu Xaa Ile
65                  70                  75                  80

Ser Xaa Xaa Glu Ala Glu Asp Xaa Xaa Xaa Tyr Tyr Cys Xaa Gln Xaa
                85                  90                  95

Xaa Xaa Xaa Pro Xaa Thr Phe Gly Xaa Gly Thr Lys Leu Glu Xaa Lys
            100                 105                 110

Arg
```

```
<210> SEQ ID NO 14
<211> LENGTH: 10
<212> TYPE: PRT
<213> ORGANISM: Artificial Sequence
<220> FEATURE:
<223> OTHER INFORMATION: VH CDR1

<400> SEQUENCE: 14

Gly Tyr Ser Phe Thr Gly Tyr Phe Met His
1               5                   10

<210> SEQ ID NO 15
<211> LENGTH: 10
<212> TYPE: PRT
<213> ORGANISM: Artificial Sequence
<220> FEATURE:
<223> OTHER INFORMATION: VH CDR1

<400> SEQUENCE: 15

Gly Tyr Thr Phe Thr Asp Tyr Gly Met Asn
1               5                   10

<210> SEQ ID NO 16
<211> LENGTH: 17
<212> TYPE: PRT
<213> ORGANISM: Artificial Sequence
<220> FEATURE:
<223> OTHER INFORMATION: VH CDR2

<400> SEQUENCE: 16

Arg Ile Asn Pro Tyr Asn Gly Asp Ile Arg Tyr Asn Gln Asn Phe Lys
1               5                   10                  15

Asp

<210> SEQ ID NO 17
<211> LENGTH: 17
<212> TYPE: PRT
<213> ORGANISM: Artificial Sequence
<220> FEATURE:
<223> OTHER INFORMATION: VH CDR2

<400> SEQUENCE: 17

Trp Ile Asn Thr Tyr Thr Gly Lys Pro Thr Tyr Asp Asp Asp Phe Lys
1               5                   10                  15

Gly

<210> SEQ ID NO 18
<211> LENGTH: 5
<212> TYPE: PRT
<213> ORGANISM: Artificial Sequence
<220> FEATURE:
<223> OTHER INFORMATION: VH CDR3

<400> SEQUENCE: 18

Leu Asn Phe Ala Tyr
1               5

<210> SEQ ID NO 19
<211> LENGTH: 15
<212> TYPE: PRT
<213> ORGANISM: Artificial Sequence
<220> FEATURE:
<223> OTHER INFORMATION: VH CDR3

<400> SEQUENCE: 19
```

```
Arg Phe Leu Asn Thr Val Ala Gly Arg Ser Val Tyr Phe Asp Tyr
1               5                   10                  15

<210> SEQ ID NO 20
<211> LENGTH: 16
<212> TYPE: PRT
<213> ORGANISM: Artificial Sequence
<220> FEATURE:
<223> OTHER INFORMATION: VL CDR1

<400> SEQUENCE: 20

Lys Ser Ser Gln Ser Leu Leu Asp Ser Asp Gly Lys Thr Phe Leu Asn
1               5                   10                  15

<210> SEQ ID NO 21
<211> LENGTH: 10
<212> TYPE: PRT
<213> ORGANISM: Artificial Sequence
<220> FEATURE:
<223> OTHER INFORMATION: VL CDR1

<400> SEQUENCE: 21

Ser Val Ser Ser Ser Val Gly Ser Met Tyr
1               5                   10

<210> SEQ ID NO 22
<211> LENGTH: 7
<212> TYPE: PRT
<213> ORGANISM: Artificial Sequence
<220> FEATURE:
<223> OTHER INFORMATION: VL CDR2

<400> SEQUENCE: 22

Leu Val Ser Lys Leu Asp Ser
1               5

<210> SEQ ID NO 23
<211> LENGTH: 7
<212> TYPE: PRT
<213> ORGANISM: Artificial Sequence
<220> FEATURE:
<223> OTHER INFORMATION: VL CDR2

<400> SEQUENCE: 23

Leu Thr Ser Asn Leu Ala Ser
1               5

<210> SEQ ID NO 24
<211> LENGTH: 9
<212> TYPE: PRT
<213> ORGANISM: Artificial Sequence
<220> FEATURE:
<223> OTHER INFORMATION: VL CDR3

<400> SEQUENCE: 24

Trp Gln Gly Thr His Phe Pro Trp Thr
1               5

<210> SEQ ID NO 25
<211> LENGTH: 9
<212> TYPE: PRT
<213> ORGANISM: Artificial Sequence
<220> FEATURE:
<223> OTHER INFORMATION: VL CDR3

<400> SEQUENCE: 25

Gln Gln Trp Ser Ser Asn Pro Pro Thr
```

```
<210> SEQ ID NO 26
<211> LENGTH: 18
<212> TYPE: PRT
<213> ORGANISM: Artificial Sequence
<220> FEATURE:
<223> OTHER INFORMATION: cyclised peptide used for immunisation

<400> SEQUENCE: 26

Gly Cys Pro Leu His Asn Gln Glu Val Thr Ala Glu Asp Gly Thr Gln
1               5                   10                  15

Arg Cys

<210> SEQ ID NO 27
<211> LENGTH: 1255
<212> TYPE: PRT
<213> ORGANISM: Homo sapiens

<400> SEQUENCE: 27

Met Glu Leu Ala Ala Leu Cys Arg Trp Gly Leu Leu Leu Ala Leu Leu
1               5                   10                  15

Pro Pro Gly Ala Ala Ser Thr Gln Val Cys Thr Gly Thr Asp Met Lys
                20                  25                  30

Leu Arg Leu Pro Ala Ser Pro Glu Thr His Leu Asp Met Leu Arg His
            35                  40                  45

Leu Tyr Gln Gly Cys Gln Val Val Gln Gly Asn Leu Glu Leu Thr Tyr
        50                  55                  60

Leu Pro Thr Asn Ala Ser Leu Ser Phe Leu Gln Asp Ile Gln Glu Val
65                  70                  75                  80

Gln Gly Tyr Val Leu Ile Ala His Asn Gln Val Arg Gln Val Pro Leu
                85                  90                  95

Gln Arg Leu Arg Ile Val Arg Gly Thr Gln Leu Phe Glu Asp Asn Tyr
            100                 105                 110

Ala Leu Ala Val Leu Asp Asn Gly Asp Pro Leu Asn Asn Thr Thr Pro
        115                 120                 125

Val Thr Gly Ala Ser Pro Gly Gly Leu Arg Glu Leu Gln Leu Arg Ser
    130                 135                 140

Leu Thr Glu Ile Leu Lys Gly Gly Val Leu Ile Gln Arg Asn Pro Gln
145                 150                 155                 160

Leu Cys Tyr Gln Asp Thr Ile Leu Trp Lys Asp Ile Phe His Lys Asn
                165                 170                 175

Asn Gln Leu Ala Leu Thr Leu Ile Asp Thr Asn Arg Ser Arg Ala Cys
            180                 185                 190

His Pro Cys Ser Pro Met Cys Lys Gly Ser Arg Cys Trp Gly Glu Ser
        195                 200                 205

Ser Glu Asp Cys Gln Ser Leu Thr Arg Thr Val Cys Ala Gly Gly Cys
    210                 215                 220

Ala Arg Cys Lys Gly Pro Leu Pro Thr Asp Cys Cys His Glu Gln Cys
225                 230                 235                 240

Ala Ala Gly Cys Thr Gly Pro Lys His Ser Asp Cys Leu Ala Cys Leu
                245                 250                 255

His Phe Asn His Ser Gly Ile Cys Glu Leu His Cys Pro Ala Leu Val
            260                 265                 270

Thr Tyr Asn Thr Asp Thr Phe Glu Ser Met Pro Asn Pro Glu Gly Arg
        275                 280                 285
```

-continued

```
Tyr Thr Phe Gly Ala Ser Cys Val Thr Ala Cys Pro Tyr Asn Tyr Leu
    290                 295                 300
Ser Thr Asp Val Gly Ser Cys Thr Leu Val Cys Pro Leu His Asn Gln
305                 310                 315                 320
Glu Val Thr Ala Glu Asp Gly Thr Gln Arg Cys Glu Lys Cys Ser Lys
                325                 330                 335
Pro Cys Ala Arg Val Cys Tyr Gly Leu Gly Met Glu His Leu Arg Glu
            340                 345                 350
Val Arg Ala Val Thr Ser Ala Asn Ile Gln Glu Phe Ala Gly Cys Lys
            355                 360                 365
Lys Ile Phe Gly Ser Leu Ala Phe Leu Pro Glu Ser Phe Asp Gly Asp
370                 375                 380
Pro Ala Ser Asn Thr Ala Pro Leu Gln Pro Glu Gln Leu Gln Val Phe
385                 390                 395                 400
Glu Thr Leu Glu Glu Ile Thr Gly Tyr Leu Tyr Ile Ser Ala Trp Pro
                405                 410                 415
Asp Ser Leu Pro Asp Leu Ser Val Phe Gln Asn Leu Gln Val Ile Arg
            420                 425                 430
Gly Arg Ile Leu His Asn Gly Ala Tyr Ser Leu Thr Leu Gln Gly Leu
            435                 440                 445
Gly Ile Ser Trp Leu Gly Leu Arg Ser Leu Arg Glu Leu Gly Ser Gly
450                 455                 460
Leu Ala Leu Ile His His Asn Thr His Leu Cys Phe Val His Thr Val
465                 470                 475                 480
Pro Trp Asp Gln Leu Phe Arg Asn Pro His Gln Ala Leu Leu His Thr
                485                 490                 495
Ala Asn Arg Pro Glu Asp Glu Cys Val Gly Glu Gly Leu Ala Cys His
            500                 505                 510
Gln Leu Cys Ala Arg Gly His Cys Trp Gly Pro Gly Pro Thr Gln Cys
            515                 520                 525
Val Asn Cys Ser Gln Phe Leu Arg Gly Gln Glu Cys Val Glu Glu Cys
530                 535                 540
Arg Val Leu Gln Gly Leu Pro Arg Glu Tyr Val Asn Ala Arg His Cys
545                 550                 555                 560
Leu Pro Cys His Pro Glu Cys Gln Pro Gln Asn Gly Ser Val Thr Cys
                565                 570                 575
Phe Gly Pro Glu Ala Asp Gln Cys Val Ala Cys Ala His Tyr Lys Asp
            580                 585                 590
Pro Pro Phe Cys Val Ala Arg Cys Pro Ser Gly Val Lys Pro Asp Leu
            595                 600                 605
Ser Tyr Met Pro Ile Trp Lys Phe Pro Asp Glu Glu Gly Ala Cys Gln
610                 615                 620
Pro Cys Pro Ile Asn Cys Thr His Ser Cys Val Asp Leu Asp Asp Lys
625                 630                 635                 640
Gly Cys Pro Ala Glu Gln Arg Ala Ser Pro Leu Thr Ser Ile Ile Ser
                645                 650                 655
Ala Val Val Gly Ile Leu Leu Val Val Val Leu Gly Val Val Phe Gly
            660                 665                 670
Ile Leu Ile Lys Arg Arg Gln Lys Ile Arg Lys Tyr Thr Met Arg
            675                 680                 685
Arg Leu Leu Gln Glu Thr Glu Leu Val Glu Pro Leu Thr Pro Ser Gly
690                 695                 700
Ala Met Pro Asn Gln Ala Gln Met Arg Ile Leu Lys Glu Thr Glu Leu
```

```
            705                 710                 715                 720
        Arg Lys Val Lys Val Leu Gly Ser Gly Ala Phe Gly Thr Val Tyr Lys
                        725                 730                 735
        Gly Ile Trp Ile Pro Asp Gly Glu Asn Val Lys Ile Pro Val Ala Ile
                        740                 745                 750
        Lys Val Leu Arg Glu Asn Thr Ser Pro Lys Ala Asn Lys Glu Ile Leu
                        755                 760                 765
        Asp Glu Ala Tyr Val Met Ala Gly Val Gly Ser Pro Tyr Val Ser Arg
                        770                 775                 780
        Leu Leu Gly Ile Cys Leu Thr Ser Thr Val Gln Leu Val Thr Gln Leu
        785                 790                 795                 800
        Met Pro Tyr Gly Cys Leu Leu Asp His Val Arg Glu Asn Arg Gly Arg
                        805                 810                 815
        Leu Gly Ser Gln Asp Leu Leu Asn Trp Cys Met Gln Ile Ala Lys Gly
                        820                 825                 830
        Met Ser Tyr Leu Glu Asp Val Arg Leu Val His Arg Asp Leu Ala Ala
                        835                 840                 845
        Arg Asn Val Leu Val Lys Ser Pro Asn His Val Lys Ile Thr Asp Phe
        850                 855                 860
        Gly Leu Ala Arg Leu Leu Asp Ile Asp Glu Thr Glu Tyr His Ala Asp
        865                 870                 875                 880
        Gly Gly Lys Val Pro Ile Lys Trp Met Ala Leu Glu Ser Ile Leu Arg
                        885                 890                 895
        Arg Arg Phe Thr His Gln Ser Asp Val Trp Ser Tyr Gly Val Thr Val
                        900                 905                 910
        Trp Glu Leu Met Thr Phe Gly Ala Lys Pro Tyr Asp Gly Ile Pro Ala
                        915                 920                 925
        Arg Glu Ile Pro Asp Leu Leu Glu Lys Gly Glu Arg Leu Pro Gln Pro
                        930                 935                 940
        Pro Ile Cys Thr Ile Asp Val Tyr Met Ile Met Val Lys Cys Trp Met
        945                 950                 955                 960
        Ile Asp Ser Glu Cys Arg Pro Arg Phe Arg Glu Leu Val Ser Glu Phe
                        965                 970                 975
        Ser Arg Met Ala Arg Asp Pro Gln Arg Phe Val Val Ile Gln Asn Glu
                        980                 985                 990
        Asp Leu Gly Pro Ala Ser Pro Leu  Asp Ser Thr Phe Tyr Arg Ser Leu
                        995                 1000                1005
        Leu Glu Asp Asp Asp Met Gly  Asp Leu Val Asp Ala  Glu Glu Tyr
            1010                1015                1020
        Leu Val Pro Gln Gln Gly Phe  Phe Cys Pro Asp  Pro Ala Pro Gly
            1025                1030                1035
        Ala Gly Gly Met Val His  His Arg His Arg Ser Ser  Ser Thr Arg
            1040                1045                1050
        Ser Gly Gly Gly Asp Leu Thr  Leu Gly Leu Glu Pro  Ser Glu Glu
            1055                1060                1065
        Glu Ala  Pro Arg Ser Pro Leu  Ala Pro Ser Glu Gly  Ala Gly Ser
            1070                1075                1080
        Asp Val  Phe Asp Gly Asp Leu  Gly Met Gly Ala Ala  Lys Gly Leu
            1085                1090                1095
        Gln Ser  Leu Pro Thr His Asp  Pro Ser Pro Leu Gln  Arg Tyr Ser
            1100                1105                1110
        Glu Asp  Pro Thr Val Pro Leu  Pro Ser Glu Thr Asp  Gly Tyr Val
            1115                1120                1125
```

```
Ala Pro Leu Thr Cys Ser Pro Gln Pro Glu Tyr Val Asn Gln Pro
    1130                1135                1140

Asp Val Arg Pro Gln Pro Pro Ser Pro Arg Glu Gly Pro Leu Pro
    1145                1150                1155

Ala Ala Arg Pro Ala Gly Ala Thr Leu Glu Arg Pro Lys Thr Leu
    1160                1165                1170

Ser Pro Gly Lys Asn Gly Val Val Lys Asp Val Phe Ala Phe Gly
    1175                1180                1185

Gly Ala Val Glu Asn Pro Glu Tyr Leu Thr Pro Gln Gly Gly Ala
    1190                1195                1200

Ala Pro Gln Pro His Pro Pro Ala Phe Ser Pro Ala Phe Asp
    1205                1210                1215

Asn Leu Tyr Tyr Trp Asp Gln Asp Pro Pro Glu Arg Gly Ala Pro
    1220                1225                1230

Pro Ser Thr Phe Lys Gly Thr Pro Thr Ala Glu Asn Pro Glu Tyr
    1235                1240                1245

Leu Gly Leu Asp Val Pro Val
    1250                1255

<210> SEQ ID NO 28
<211> LENGTH: 30
<212> TYPE: DNA
<213> ORGANISM: Artificial Sequence
<220> FEATURE:
<223> OTHER INFORMATION: primer

<400> SEQUENCE: 28
atgaagttgc ctgttaggct gttggtgctg                             30

<210> SEQ ID NO 29
<211> LENGTH: 29
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (7)..(7)
<223> OTHER INFORMATION: n= a or t
<220> FEATURE:
<221> NAME/KEY: misc_feature
<222> LOCATION: (22)..(22)
<223> OTHER INFORMATION: n= c or t

<400> SEQUENCE: 29
atggagncag acacactcct gntatgggt                              29

<210> SEQ ID NO 30
<211> LENGTH: 30
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (26)..(26)
<223> OTHER INFORMATION: n= g or c

<400> SEQUENCE: 30
atgagtgtgc tcactcaggt cctgggngttg                            30

<210> SEQ ID NO 31
<211> LENGTH: 33
```

```
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (7)..(7)
<223> OTHER INFORMATION: n= a or g
<220> FEATURE:
<221> NAME/KEY: misc_feature
<222> LOCATION: (19)..(19)
<223> OTHER INFORMATION: n= a or t
<220> FEATURE:
<221> NAME/KEY: misc_feature
<222> LOCATION: (22)..(22)
<223> OTHER INFORMATION: n= c or t
<220> FEATURE:
<221> NAME/KEY: misc_feature
<222> LOCATION: (27)..(27)
<223> OTHER INFORMATION: n= a or c
<220> FEATURE:
<221> NAME/KEY: misc_feature
<222> LOCATION: (28)..(28)
<223> OTHER INFORMATION: n= a or t

<400> SEQUENCE: 31
atgaggnccc ctgctcagnt tnttggnntc ttg                                   33

<210> SEQ ID NO 32
<211> LENGTH: 30
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (9)..(9)
<223> OTHER INFORMATION: n= a or t
<220> FEATURE:
<221> NAME/KEY: misc_feature
<222> LOCATION: (22)..(22)
<223> OTHER INFORMATION: n= a or t

<400> SEQUENCE: 32
atggatttnc aggtgcagat tntcagcttc                                       30

<210> SEQ ID NO 33
<211> LENGTH: 27
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (8)..(8)
<223> OTHER INFORMATION: n= g or t
<220> FEATURE:
<221> NAME/KEY: misc_feature
<222> LOCATION: (10)..(11)
<223> OTHER INFORMATION: n= c or t
<220> FEATURE:
<221> NAME/KEY: misc_feature
<222> LOCATION: (14)..(14)
<223> OTHER INFORMATION: n= c or t
<220> FEATURE:
<221> NAME/KEY: misc_feature
<222> LOCATION: (16)..(16)
<223> OTHER INFORMATION: n= g or c
<220> FEATURE:
<221> NAME/KEY: misc_feature
<222> LOCATION: (19)..(19)
<223> OTHER INFORMATION: n= c or t
<220> FEATURE:
<221> NAME/KEY: misc_feature
<222> LOCATION: (21)..(21)
```

```
<223> OTHER INFORMATION: n= c or t
<220> FEATURE:
<221> NAME/KEY: misc_feature
<222> LOCATION: (25)..(25)
<223> OTHER INFORMATION: n= a or g

<400> SEQUENCE: 33
atgaggtncn ntgntnagnt nctgngg                                          27

<210> SEQ ID NO 34
<211> LENGTH: 31
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (7)..(7)
<223> OTHER INFORMATION: n= a or t
<220> FEATURE:
<221> NAME/KEY: misc_feature
<222> LOCATION: (24)..(24)
<223> OTHER INFORMATION: n= g or t
<220> FEATURE:
<221> NAME/KEY: misc_feature
<222> LOCATION: (25)..(25)
<223> OTHER INFORMATION: n= a or t
<220> FEATURE:
<221> NAME/KEY: misc_feature
<222> LOCATION: (26)..(27)
<223> OTHER INFORMATION: n= c or t
<220> FEATURE:
<221> NAME/KEY: misc_feature
<222> LOCATION: (29)..(29)
<223> OTHER INFORMATION: n= a or t

<400> SEQUENCE: 34
atgggcntca agatggagtc acannnncng g                                     31

<210> SEQ ID NO 35
<211> LENGTH: 31
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (10)..(10)
<223> OTHER INFORMATION: n= c or t
<220> FEATURE:
<221> NAME/KEY: misc_feature
<222> LOCATION: (13)..(13)
<223> OTHER INFORMATION: n= g or t
<220> FEATURE:
<221> NAME/KEY: misc_feature
<222> LOCATION: (17)..(17)
<223> OTHER INFORMATION: n= c or t
<220> FEATURE:
<221> NAME/KEY: misc_feature
<222> LOCATION: (19)..(20)
<223> OTHER INFORMATION: n= a or c

<400> SEQUENCE: 35
atgtggggan ctntttycnn tttttcaatt g                                     31

<210> SEQ ID NO 36
<211> LENGTH: 25
<212> TYPE: DNA
<213> ORGANISM: Artificial Sequence
<220> FEATURE:
<223> OTHER INFORMATION: primer
<220> FEATURE:
<221> NAME/KEY: misc_feature
```

```
<222> LOCATION: (6)..(6)
<223> OTHER INFORMATION: n= a or g
<220> FEATURE:
<221> NAME/KEY: misc_feature
<222> LOCATION: (10)..(10)
<223> OTHER INFORMATION: n= a or t
<220> FEATURE:
<221> NAME/KEY: misc_feature
<222> LOCATION: (13)..(13)
<223> OTHER INFORMATION: n= g or c

<400> SEQUENCE: 36
atggtntccn canctcagtt ccttg                                    25

<210> SEQ ID NO 37
<211> LENGTH: 27
<212> TYPE: DNA
<213> ORGANISM: Artificial Sequence
<220> FEATURE:
<223> OTHER INFORMATION: primer

<400> SEQUENCE: 37
atgtatatat gtttgttgtc tatttct                                  27

<210> SEQ ID NO 38
<211> LENGTH: 28
<212> TYPE: DNA
<213> ORGANISM: Artificial Sequence
<220> FEATURE:
<223> OTHER INFORMATION: primer

<400> SEQUENCE: 38
atggaagccc cagctcagct tctcttcc                                 28

<210> SEQ ID NO 39
<211> LENGTH: 27
<212> TYPE: DNA
<213> ORGANISM: Artificial Sequence
<220> FEATURE:
<223> OTHER INFORMATION: primer

<400> SEQUENCE: 39
atgaagtttc cttctcaact tctgctc                                  27

<210> SEQ ID NO 40
<211> LENGTH: 17
<212> TYPE: DNA
<213> ORGANISM: Artificial Sequence
<220> FEATURE:
<223> OTHER INFORMATION: primer

<400> SEQUENCE: 40
tggatggtgg gaagatg                                             17

<210> SEQ ID NO 41
<211> LENGTH: 27
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (21)..(21)
<223> OTHER INFORMATION: n= g or c

<400> SEQUENCE: 41
atgaaatgca gctgggtcat nttcttc                                  27
```

```
<210> SEQ ID NO 42
<211> LENGTH: 25
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (14)..(14)
<223> OTHER INFORMATION: n= a or g
<220> FEATURE:
<221> NAME/KEY: misc_feature
<222> LOCATION: (20)..(20)
<223> OTHER INFORMATION: n= g or c

<400> SEQUENCE: 42
atgggatgga gctratcats ytctt                                              25

<210> SEQ ID NO 43
<211> LENGTH: 27
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (7)..(7)
<223> OTHER INFORMATION: n= a or t

<400> SEQUENCE: 43
atgaagntgt ggttaaactg ggttttt                                            27

<210> SEQ ID NO 44
<211> LENGTH: 24
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (4)..(4)
<223> OTHER INFORMATION: n= a or g
<220> FEATURE:
<221> NAME/KEY: misc_feature
<222> LOCATION: (11)..(11)
<223> OTHER INFORMATION: n= a or t
<220> FEATURE:
<221> NAME/KEY: misc_feature
<222> LOCATION: (12)..(12)
<223> OTHER INFORMATION: n= c or t
<220> FEATURE:
<221> NAME/KEY: misc_feature
<222> LOCATION: (21)..(21)
<223> OTHER INFORMATION: n= a or g

<400> SEQUENCE: 44
atgnactttg nntcagcttg nttt                                               24

<210> SEQ ID NO 45
<211> LENGTH: 28
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (18)..(18)
<223> OTHER INFORMATION: n= a or c

<400> SEQUENCE: 45
atggactcca ggctcaaaag ttttcctt                                           28
```

```
<210> SEQ ID NO 46
<211> LENGTH: 27
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (10)..(10)
<223> OTHER INFORMATION: n= c or t
<220> FEATURE:
<221> NAME/KEY: misc_feature
<222> LOCATION: (12)..(12)
<223> OTHER INFORMATION: n= a or g
<220> FEATURE:
<221> NAME/KEY: misc_feature
<222> LOCATION: (14)..(14)
<223> OTHER INFORMATION: n= g or c
<220> FEATURE:
<221> NAME/KEY: misc_feature
<222> LOCATION: (18)..(18)
<223> OTHER INFORMATION: n= a or g

<400> SEQUENCE: 46
atggctgtcn tngngctnct cttctgc                                         27

<210> SEQ ID NO 47
<211> LENGTH: 26
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (5)..(5)
<223> OTHER INFORMATION: n= a or g
<220> FEATURE:
<221> NAME/KEY: misc_feature
<222> LOCATION: (13)..(13)
<223> OTHER INFORMATION: n= g or t
<220> FEATURE:
<221> NAME/KEY: misc_feature
<222> LOCATION: (16)..(16)
<223> OTHER INFORMATION: n= a or g
<220> FEATURE:
<221> NAME/KEY: misc_feature
<222> LOCATION: (22)..(22)
<223> OTHER INFORMATION: n= a or c

<400> SEQUENCE: 47
atggnatgga gcnggntctt tntctt                                          26

<210> SEQ ID NO 48
<211> LENGTH: 23
<212> TYPE: DNA
<213> ORGANISM: Artificial Sequence
<220> FEATURE:
<223> OTHER INFORMATION: primer

<400> SEQUENCE: 48
atgagagtgc tgattctttt gtg                                             23

<210> SEQ ID NO 49
<211> LENGTH: 30
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (5)..(5)
```

```
<223> OTHER INFORMATION: n= a or c
<220> FEATURE:
<221> NAME/KEY: misc_feature
<222> LOCATION: (17)..(17)
<223> OTHER INFORMATION: n= a or c

<400> SEQUENCE: 49
atggnttggg tgtgganctt gctattcctg                                      30

<210> SEQ ID NO 50
<211> LENGTH: 27
<212> TYPE: DNA
<213> ORGANISM: Artificial Sequence
<220> FEATURE:
<223> OTHER INFORMATION: primer

<400> SEQUENCE: 50
atgggcagac ttacattctc attcctg                                         27

<210> SEQ ID NO 51
<211> LENGTH: 28
<212> TYPE: DNA
<213> ORGANISM: Artificial Sequence
<220> FEATURE:
<223> OTHER INFORMATION: primer

<400> SEQUENCE: 51
atggattttg ggctgatttt ttttattg                                        28

<210> SEQ ID NO 52
<211> LENGTH: 27
<212> TYPE: DNA
<213> ORGANISM: Artificial Sequence
<220> FEATURE:
<223> OTHER INFORMATION: primer

<400> SEQUENCE: 52
atgatggtgt taagtcttct gtacctg                                         27

<210> SEQ ID NO 53
<211> LENGTH: 18
<212> TYPE: DNA
<213> ORGANISM: Artificial Sequence
<220> FEATURE:
<223> OTHER INFORMATION: primer

<400> SEQUENCE: 53
ccagtggata gacagatg                                                   18

<210> SEQ ID NO 54
<211> LENGTH: 33
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (12)..(12)
<223> OTHER INFORMATION: n= c or t
<220> FEATURE:
<221> NAME/KEY: misc_feature
<222> LOCATION: (19)..(19)
<223> OTHER INFORMATION: n= a or c
<220> FEATURE:
<221> NAME/KEY: misc_feature
<222> LOCATION: (21)..(21)
<223> OTHER INFORMATION: n= g or c
<220> FEATURE:
<221> NAME/KEY: misc_feature
```

```
<222> LOCATION: (24)..(24)
<223> OTHER INFORMATION: n= a or c
<220> FEATURE:
<221> NAME/KEY: misc_feature
<222> LOCATION: (27)..(27)
<223> OTHER INFORMATION: n= a or g
<220> FEATURE:
<221> NAME/KEY: misc_feature
<222> LOCATION: (28)..(28)
<223> OTHER INFORMATION: n= a or t
<220> FEATURE:
<221> NAME/KEY: misc_feature
<222> LOCATION: (31)..(31)
<223> OTHER INFORMATION: n= a or c

<400> SEQUENCE: 54
gccgaattcg anattgtgnt nacncannct nca                                 33

<210> SEQ ID NO 55
<211> LENGTH: 30
<212> TYPE: DNA
<213> ORGANISM: Artificial Sequence
<220> FEATURE:
<223> OTHER INFORMATION: primer

<400> SEQUENCE: 55
ccggtcgacg gatacagttg gtgcagcatc                                     30

<210> SEQ ID NO 56
<211> LENGTH: 16
<212> TYPE: PRT
<213> ORGANISM: Artificial Sequence
<220> FEATURE:
<223> OTHER INFORMATION: linear peptide sequence

<400> SEQUENCE: 56

Cys Pro Leu His Asn Gln Glu Val Thr Ala Glu Asp Gly Thr Gln Arg
1               5                   10                  15

<210> SEQ ID NO 57
<211> LENGTH: 14
<212> TYPE: PRT
<213> ORGANISM: Artificial Sequence
<220> FEATURE:
<223> OTHER INFORMATION: Control peptide sequence

<400> SEQUENCE: 57

Leu Glu Glu Lys Lys Gly Asn Tyr Val Val Thr Asp His Cys
1               5                   10
```

ANTI-HER2 BINDING MOLECULES

All documents cited or referenced herein, and all documents cited or referenced in herein cited documents, together with any manufacturer's instructions, descriptions, product specifications, and product sheets for any products mentioned herein or in any document incorporated by reference herein, are hereby incorporated herein by reference in their entirety.

SEQUENCE LISTING

The instant application contains a Sequence Listing previously submitted to WIPO in ASCII format and the entire content of the electronic submission of the sequence listing is incorporated by reference in its entirety for all purposes. The ASCII file is named "PCTAU2020050274-seql-000001-EN-20200320.txt," was last modified on Mar. 20, 2020, and is 42.492 bytes in size.

CROSS-REFERENCE TO RELATED APPLICATION(S)

This application is a U.S. National Phase Patent Application of International Application Number PCT/AU2020/050274, filed on Mar. 20, 2020, which claims priority to Australian provisional patent application number AU2019900973 filed 22 Mar. 2019. The entire contents of all of which are incorporated by reference herein.

TECHNICAL FIELD

The present disclosure is directed to binding proteins to the extracellular domain (ECD) of HER2/ErbB2. More particularly, the binding proteins bind to a conformational epitope which is exposed in cells in response to HER2 amplification or activation.

BACKGROUND

The ErbB family of receptor comprises four homologous proteins that reside on the cell surface: epidermal growth factor receptor (EGFR; also known as ERBB1; HER1); ERBB2 (also known as HER2; Neu); ERBB3 (or HER3); and ERBB4 (or HER4).

Overexpression and amplification of HER2 has been identified in a number of cancer types, including breast, biliary tract, colon, endometrial, gastric cancer and gastroesophageal junction cancer, glioblastoma multiforme, head and neck cancers, ovarian, pancreas and urothelial cancers. HER2 over-expression and amplification has been shown to be associated with poor outcomes in breast and gastric/gastroesophageal junction (GEJ) cancers (Nagaraja V et al., (2016) Eur J Surg Oncol 42(1):140-8); however, its effect on other tumour types is not well defined.

The market for HER2 antibodies was over US$10 billion in 2017, with increased sales of HER2 antibodies anticipated in the future with new clinical indications and markets emerging. The response to targeting HER2 in patients with HER2 overexpression/amplification is influenced by several clinicopathological features including tumour histology, degree of anaplasia, stage of disease and presence of underlying risk factors. Amplification or overexpression of HER2 also serves as a predictive biomarker for anti-HER treatment in a variety of tumour types including breast, gastric and gynaecological cancers (Slamon D J et al., (1987) Science 235{4785):177-82; Santin A D et al., (2005) Cancer 104(7): 1391-7; Morrison C et al., (2006) J Clin Oncol 24(15):2376-85; Liu et al., (2010) J Thoracic Oncol 5(12):1922-32). For review see, Parakh S et al., (2017) Cancer Treatment Reviews 59:1-21.

HER2 Function

The extracellular domain of HER2 is unable to bind any known natural ligand (Klapper L N et al., (1999) PNAS 96(9):4995-5000). Unlike, other members of the ErbB family, HER2 adopts a conformation that favours oligomerisation and activation of the HER2 kinase (which for other ErbB family members requires ligand activation) in the absence of ligand (Garrett T P et al., (2002) Cell 110(6): 763-73). The open confirmation of HER2 (Cho H-S et al., (2003) Nature 421(6924):756-60) makes the dimerization arm permanently available for homo or heterodimeric interactions between monomeric family members, as well as conformational change and oligomerisation of pre-existing inactive dimers (Maruyama I N et al., (2014) Cells 3(2): 304-30), leading to autophosphorylation of intracellular kinase domains and signal transduction. HER2 overexpression increases the affinity of EGF and neuregulins to their receptors and reduces the rate of ligand dissociation from active dimers. HER2 overexpression has also shown to affect the recycling and degradation rate of HER2-containing heterodimers: the EGFR-HER2 heterodimers undergo endocytic recycling rather than degradation, which results in prolonged EGFR signalling (Huang G et al., (1999) J Cell Biochem 74(1):23-30). Of the heterodimers formed upon ligand activation, the HER2-HER3 heterodimer appears to be the most potent signalling complex in HER2 amplified tumours (Tzahar E et al., (1996) Mol Cell Biol 16(10):5276-87). Signalling through the HER2-HER3 complex is mediated through HER3-dependent phosphorylation and subsequent activation of the PI3K/Akt signalling pathway (Pinkas-Kramarski R et al., (1996) EMBO J 15(10):2452). In vitro studies demonstrate HER2 overexpression leads to malignant transformation, development of anti-apoptotic properties, increased invasiveness and drug resistance. Receptor activation through HER2-hetero-oligomerisation is likely to be a key mechanism driving cell proliferation observed in HER2 overexpressing cells (Wolf-Yadlin A et al., (2006) Mol Syst Biol 2(1):54).

Anti-HER2 Directed Therapies

A number of different approaches to inhibition of HER2 have been tried and a number of these have entered clinical practise.

(i) monoclonal antibodies against domain IV of HER2: Earlier approaches to HER2 inhibition used monoclonal antibodies against the extracellular domain, of which the pre-eminent example is Trastuzumab (Albanell J et al., (1999) Drugs Today (Barc) 35(12):931-46). Other anti-HER2 antibodies have also been described, for example in Ko B-K et al., (2015) Mol Oncol 9(2):398-408; Mahdavi M et al., (2015) Monoclon Antib Immunodiagn Immunother 34(3):213-21; Ceran C et al., (2012) Cancer Cell 6(2):117-27).

(ii) antibodies against domain II of HER2: Pertuzumab, a first-in-class agent known as a HER dimerization inhibitor (Adams C W et al., (2006) 55(6):717-27), binds to the extracellular dimerization domain II of HER2 (an epitope distinct from the epitope for Trastuzumab) inhibiting dimerization between HER receptors (Adams C W supra).

(iii) Small molecule inhibitors of HER2: Small molecule inhibitors have been developed that target HER2. Many target a number of receptors including other members of the ErbB family, which may be advantageous as collateral signalling may be one mechanism of resistance to HER2 inhibitors (Ritter C A et al., (2007) Clin Cancer Res 13(16): 4909-19). There are two approved tyrosine kinase inhibitors; lapatinib is an oral small-molecule reversible inhibitor that inhibits both the EGFR and HER2 kinases (Tevaarwerk A J et al., (2009) Clin Ther 31:2332-48) and afatinib which is an irreversible inhibitor of EGFR, HER2 and HER4 tyrosine kinase activity as well as EGFR- and HER2-containing dimers (Li D et al., (2008) Oncogene 27(34):4702-11). Neratinib is an irreversible pan-tyrosine-kinase inhibitor of HER1, HER2 and HER4. It appears to affect downstream signaling in HER2-overexpressing and EGFR-amplified cells and results in apoptosis and decrease in tumour growth (Rabindran S K et al., (2004) Can Res 64(11):3958-65). Tucatinib is a selective oral HER2 inhibitor (Moulder-Thompson S et al., (2017) Clin Cancer Res clincanres 1496.2016).

(iv) Antibody drug conjugates targeting HER2: The high expression on HER2-positive cancer cells and low expression on normal tissue has made it a target for antibody drug conjugates (ADCs). Ado-Trastuzumab emtansine (T-DM1) is the first anti-HER2 ADC to be approved in solid tumours. It is composed of Trastuzumab linked to potent cytotoxic agent DM1, an inhibitor of microtubule dimerisation. The anti-tumour effects of T-DM1 are related to Trastuzumab and DM1 metabolites (Juntilla T et al., (2011) Breast Cancer Res Treat 128(2):347-56). DM1 metabolites disrupt the microtubule networks leading to cell cycle arrest and apoptotic cell death. While T-DM1 shows greatest benefit in tumours that highly express HER2, it shows efficacy across different HER2 expression subgroups (Baselga J et al., (2016) Clin Cancer Res clincanres. 2499.015). ADC MM-302 is composed of a HER2-targeted antibody linked to liposomal doxorubicin. SYD985 is another HER2-targeting Trastuzumab-based ADC linked to the toxic alkylator antibiotic duocarmycin (Dokter W et al., (2014) Mol Cancer Ther 13(11):2618-29). DS-8201a is a HER2-targeting ADC comprised of a humanised anti-HER2 antibody linked to a topoisomerase I inhibitor (Ogitani Y et al., (2016) Clin Cancer Res 22(20):5097-108). XMT-1522 is an anti-HER2 ADC comprising an anti-HER2 antibody, HT-19 linked to an auristatin-based cytotoxic payload (AF-HPA) (Bergstrom D et al., (2016) Can Res 76(4 Supplement) P4-14-28).

(v) Monoclonal antibodies: A number of newer anti-HER2 monoclonal antibodies are being developed in the clinic, these include 10H8 and 8H11 (Kim A Y et al., (2013) ASCO annual meeting proceedings), MGAH22 (margetuximab) which is an Fc-optimized chimeric anti-HER2 monoclonal antibody, Ertumaxomab which is a trifunctional antibody targeting HER2, T cell specific CD3 antigen and Fcγ type I/III receptor; and CMAB302 (cipterbin) which is a biosimilar of Trastuzumab.

(vi) Bi-specific antibodies: A bi-specific antibody MM-111, targeting the HER2/HER3 heterodimer has been developed (McDonagh C F et al., (2012) Mol Cancer Ther 11(3):582-93). A number of first in human early phase studies are evaluating MM-111 in HER2-positive solid tumours as monotherapy as well as in combination with Trastuzumab and various chemotherapy regimens or lapatinib. MM-111 is also being studied in gastrointestinal malignancies. MCLA-128 is a humanised bispecific antibody with enhanced ADCC activity targeting HER2 and Her3 (Calvo E et al., Abstract CT050 AACR 2016). MCLA-128 blocks downstream signalling through the HER2:Her3 heterodimer even under high heregulin concentrations. GBR 1302 is another bispecific antibody that targets CD3ε and HER2 which is being evaluated in an early phase clinical trial after showing potent anti-tumour activity in HER2 overexpressing and non-overexpressing tumours (Moretti P et al., (2016) the BEAT GBR 1302). ZW25 is a bispecific antibody targeting two distinct epitopes on the extracellular domain of the HER2 receptor and is currently being evaluated in HER2 expressing cancers in a phase 1 clinical trial. A further bispecific immunotoxin has been developed comprising an anti-HER2 single chain variable fragment (scFv) fused to diphtheria toxin-anti-EpCAM.

Despite the various approaches, there are still challenges. Primary resistance to single-agent Trastuzumab occurs in 70% of HER2-overexpressing breast cancers (Vogel C L et al. (2002) 20(3):719-26), with the majority of patients developing resistance during treatment. A number of mechanisms have been proposed (see Parakh S et al., supra). In contrast to Trastuzumab, mechanisms of resistance to Pertuzumab are poorly understood. Similar to other anti-HER2 therapies, primary and acquired resistance to T-DM1 has also occurred (Tan X et al., (2013) Can Res 73(8 Supplement):4629). While the resistance mechanisms to T-DM1 appears dependent on size of tumours and duration of treatment; resistance has been observed even after long latency periods (Barok M et al., (2011) Breast Cancer Res 13(2):R46).

Despite the successes of Trastuzumab (Herceptin), Pertuzumab and the T-DM1 conjugate, the toxicity of current HER2 antibodies is dose limiting, and resistance invariably develops as discussed above. New strategies to target HER2 without the associated toxicity profile are clearly needed.

SUMMARY OF THE DISCLOSURE

The present disclosure provides isolated specific binding proteins that bind to the extracellular domain (ECD) of HER2 in a conformationally flexible region of domain II. In particular, the binding proteins recognise a HER2 epitope which does not demonstrate any amino acid sequence alteration or substitution from the wild-type HER2 sequence and is exposed in cells in response to HER2 amplification or activation. The conformationally exposed epitope is only found in tumourigenic, hyperproliferative or abnormal cells and is not detectable in normal or wild-type cells. By "wild-type" it contemplates a cell that expresses endogenous HER2 but specifically excludes a cell that overexpresses the HER2 gene; the term "wild type" refers to a genotype or phenotype or other characteristic present in a normal cell rather than in an abnormal or tumourigenic cell.

Interestingly, the binding proteins of the present disclosure do not block binding of Pertuzumab or Trastuzumab/Herceptin to HER2 on a cancer cell suggesting that this epitope region of domain II, when conformationally exposed, allows the present binding molecules to bind without blocking binding of these antibodies, potentially allowing dual therapy approaches.

More particularly, the present inventors have found that while the present binding molecules bind a smaller proportion of HER2 on the cancer cell surface (when compared, for example, to Pertuzumab or Trastuzumab), it was just as potent in vivo at concentrations equivalent to Pertuzumab or Trastuzumab despite binding fewer receptors. Since the binding molecules of the present disclosure are internalised and are tumour cell specific, they are ideally suited as drug conjugates or agents in dual therapy approaches with other HER2 antibodies.

The specific binding protein of the present disclosure, which may be an antibody or a fragment thereof, such as an immunogenic fragment thereof, does not bind to or recognize normal or wild type cells containing normal or wild type HER2 epitope in the absence of aberrant expression and in the presence of normal HER2 post-translational modification. More particularly, the specific binding protein of the invention, may be an antibody or fragment thereof, which recognizes a HER2 epitope which is present in cells overexpressing HER2 (e.g., HER2 gene is amplified) particularly in the presence of aberrant post-translational modification, and that is not detectable in cells expressing HER2 under normal conditions, particularly in the presence of normal post-translational modification.

The present inventors have discovered novel monoclonal antibodies, exemplified herein by the antibody designated mAb104, which specifically recognize aberrantly expressed HER2. In particular, the antibodies of the present disclosure recognize a HER2 epitope which is found in tumourigenic, hyperproliferative or abnormal cells and is not detectable in normal or wild type cells. The antibodies of the disclosure are further exemplified by the antibodies mAb105, mAb106 and mAb107 described herein.

The present disclosure provides an HER2/ErbB binding protein comprising an antigen-binding domain, wherein the antigen-binding domain binds specifically to an epitope within domain II of HER2 which is exposed in response to HER2 amplification or activation. In one example, the HER2 binding protein binds to a region of HER2 which is conformationally exposed in tumourigenic, hyperproliferative or abnormal cells but not in normal or wild-type cells.

In another example, binding of the binding protein to its epitope does not block binding of Pertuzumab or Trastuzumab/Herceptin. In one example, the binding protein is not Pertuzumab or Trastuzumab. In one example, the binding protein binds to the region comprising residues 293 to 309 of the mature normal or wild type human HER2 sequence as shown in FIG. 1 (SEQ ID NO:27). This region forms part of domain II in the HER2 extracellualr domain (ECD). In a particular example, the epitope comprises the amino acid sequence CPLHNQEVTAEDGTQRC (SEQ ID NO:1). This epitope is shown in FIG. 1 as the bold and underlined sequence. Although this epitope includes P294, L295 and H296 which are also present in the epitope to which Pertuzumab binds, the presently described binding proteins are non-Pertuzumab blocking and allows for Pertuzumab to simultaneously bind HER2. The epitope may be determined by any conventional epitope mapping techniques known to persons skilled in the art.

In one example, the binding protein does not bind, or does not substantially bind to human EGFR (HER1) or HER3 or HER4.

In one example, the binding protein is one which has the characteristics of the antibody which the inventors have identified and characterized, in particular recognizing aberrantly expressed HER2, as found in amplified HER2. In another example, the binding protein binds to tumour cell lines expressing high levels of HER2. In one example, the HER2 overexpression is determined using immunohistochemical analysis. In a particular example, staining patterns are evaluated and scored using the American Society of Clinical Oncology and the College of American Pathologists (ASCO/CAP) recommendations for HER2 testing in breast cancer (Wolff A C et al. (2013) Journal of Clinical Oncology 31(31):3997-4013).

In another example, the binding protein binds to a cancerous cell selected from the group consisting of breast cancer, gastric cancer, squamous cell carcinoma and colon cancer. In another example, the binding protein binds to a cell line selected from the group consisting of breast (e.g. BT 474, SK-BR3, SUM 159PT, MDA-MB-453), gastric (e.g. NCI-N87, MK N7), squamous cell carcinoma (e.g. A431) and colon cancer (COLO205, LIM1215).

In another example, the binding protein binds a smaller proportion of HER2/ErbB on the cell surface of a cancer cell compared to Pertuzumab and/or Trastuzumab. In another example, the binding protein binds to HER2+ expressing cells with an order of magnitude of at least one-log below, at least two logs below, or at least three logs below the binding of Trastuzumab or Pertuzumab when assessed by flow cytometry. In certain examples, the binding protein binds to less than 30%, less than 20%, less than 10%, less than 5%, or less than 1% of total HER2/ErB2 expressed on the surface of a cancer cell. In one example, the binding protein binds to a proportion of HER2/Erb2 of between about 0.35 to 0.5% of total HER2/Erb2 expressed on the surface of a cancer cell.

In one example, the binding protein does not bind to normal gastric mucosa. In another example, the binding protein does not bind normal breast cells.

In another example, the binding protein is capable of being internalised into tumour cells. In certain examples, the binding protein has an anti-proliferative effect in vivo on tumour cells (e.g. gastric cells). In other examples, the binding proteins have anti-tumour effects in vivo which are comparable to those of Pertuzumab or Trastuzumab. In yet another example, the binding protein causes necrosis of tumour cells (for example, breast tumour cells).

An exemplary HER2 binding protein described herein having such binding characteristics comprises the variable regions and/or CDRs of an antibody designated mAb104 or mAb106.

In one example, the binding protein binds to a peptide comprising or consisting of the sequence set forth in SEQ ID NO:1 or to a sequence in the human HER2 ECD at a similar or substantially the same level, or with a similar or substantially the same affinity as the antibody designated mAb104 or mAb106. In a particular example, the binding protein binds to a contiguous sequence of amino acids comprising or consisting of residues 293 to 309 of the mature normal or wild type human HER2 sequence as shown in FIG. 1.

In another example, the HER2 binding protein competitively inhibits binding of the antibody designated mAb104 or mAb106 to human HER2. In a further example, the protein competitively inhibits binding of the antibody designated mAb104 or mAb106 to a peptide consisting of the sequence set forth in SEQ ID NO:1.

In one example, the HER2-binding protein binds to a peptide comprising or consisting of a sequence set forth in SEQ ID NO:1 in an amount within 75% of the amount of bound by an antibody comprising a VH comprising a sequence set forth in SEQ ID NO:2 or SEQ ID NO:4 and a VL comprising a sequence set forth in SEQ ID NO:3 or SEQ ID NO:5.

In one example, the amount of protein or antibody bound is assessed by contacting the HER2 binding protein to a peptide consisting of the sequence set forth in SEQ ID NO:1 and an amount of the HER2 binding protein (e.g. 10 μg/ml) brought into contact with the peptide. The amount of HER2 binding protein bound to the peptide is then determined and compared to the amount of an antibody comprising a VH comprising a sequence set forth in SEQ ID NO:2 or SEQ ID NO:4 and a VL comprising a sequence set forth in SEQ ID NO:3 or SEQ ID NO:5 respectively bound to the peptide. In one example, the amount of HER2-binding protein bound to the peptide is within about 80%, or 70% or 60% or 40% of the amount of antibody bound.

The present disclosure also provides a HER2 binding protein which competitively inhibits binding of an antibody designated:

(i) mAb104 said antibody comprising a VH comprising a sequence set forth in SEQ ID NO:2 and a VL comprising a sequence set forth in SEQ ID NO:3; or (ii) mAb106 comprising a VH comprising a sequence set forth in SEQ ID NO:4 and a VL comprising a sequence set forth in SEQ ID NO:5 to a peptide comprising, or consisting of the sequence set forth in SEQ ID NO:1 or to the ECD of human HER2 (e.g. FIG. 1).

In one example, the HER2 binding protein binds to an ECD of HER2 e.g. having a sequence as shown in FIG. 1, with an affinity dissociation constant (KD) of between 2.90 and 3.20 nM. In another example, the KD is between about 2.90 to about 3 nM. In another example, the KD is about 3 nM.

In one example, the KD is assessed by utilising surface plasmon resonance (SPR) in a biosensor equipped with a streptavidin (SA) chip and capturing biotin-coupled human HER2 peptide (e.g. peptide according to SEQ ID NO:1) on the surface of the chip and passing the HER2 binding protein thereover.

An exemplary HER2 binding protein of the disclosure has a KD of about 3 nM (e.g. +/−0.2 nM) when assessed by SA chip biotin peptide SPR. In one example, the HER2 binding protein has a KD as shown in Table 7 for mAb104 or mAb106.

In one example, a HER2-binding protein of the disclosure binds specifically to human HER2. In one example, the binding of the protein is assessed by ELISA.

The HER2 binding protein of the present disclosure may be an anti-HER2 recombinant or synthetic or monoclonal antibody or antigen-binding fragment thereof.

In one example, the HER2 binding protein is a chimeric antibody comprising human heavy and light chain constant region sequences. In another example, the HER 2-binding protein is a humanised or fully human antibody.

In one example, the HER2 binding protein comprises a heavy chain variable region sequence (VH) having at least 55% identity to the heavy chain variable region sequence of mAb104 (SEQ ID NO:2).

In one example, the HER2 binding protein comprises a light chain variable region sequence (VL) having at least 50% identity to the light chain variable region sequence of mAb104 (SEQ ID NO:3).

In one example, the binding protein comprises;

(i) a VH CDR1 having a sequence set forth as:

(SEQ ID NO: 6)
$GYX_7FTX_8YX_9MX_{10}$ wherein $X_7$ is S or T; $X_8$ is G or D; $X_9$ is F or G; $X_{10}$ is H or N;

(ii) a VH CDR2 having a sequence set forth as:

(SEQ ID NO: 7)
$X_{19}INX_{20}YX_{21}GX_{22}X_{23}X_{24}YX_{25}X_{26}X_{27}FKX_{28}$ wherein $X_{19}$ is R or W; $X_{20}$ is P or T; $X_{21}$ is N or T; $X_{22}$ is D or K; $X_{23}$ is I or P; $X_{24}$ is R or T; $X_{25}$ is N or D; $X_{26}$ is Q or D; $X_{27}$ is N or D; and $X_{28}$ is D or G;

(iii) a VH CDR3 having a sequence set forth as:

(SEQ ID NO: 8)
$X_{50}X_{51}X_{52}X_{53}X_{54}X_{55}X_{56}X_{57}X_{58}X_{59}X_{60}X_{61}FX_{62}Y$ wherein $X_{50}$ is absent or R; $X_{51}$ is absent or F; $X_{52}$ is absent or L; $X_{53}$ is absent or N; $X_{54}$ is absent or T; $X_{55}$ is absent or V; $X_{56}$ is absent or A; $X_{57}$ is absent or G; $X_{58}$ is absent or R; $X_{59}$ is absent or S; $X_{60}$ is L or V; $X_{61}$ is N or Y; and $X_{62}$ is A or D;

and/or (iv) a VL CDR1 having a sequence set forth as:

(SEQ ID NO: 9)
$X_{14}X_{15}SX_{16}SX_{17}X_{18}X_{19}X_{20}X_{21}X_{22}X_{23}X_{24}X_{25}X_{26}X_{27}$ wherein $X_{14}$ is K or S; $X_{15}$ is S or V; $X_{16}$ is Q or S; $X_{17}$ is L or absent; $X_{18}$ is L or absent; $X_{19}$ is D or absent; $X_{20}$ is S or absent; $X_{21}$ is D or absent; $X_{22}$ is G or absent; $X_{23}$ is K or V; $X_{24}$ is T or G; $X_{25}$ is F or S; $X_{26}$ is L or M; and $X_{27}$ is N or Y;

(v) a VL CDR2 having a sequence set forth as:

(SEQ ID NO: 10)
$LX_{35}SX_{36}LX_{37}S$ $X_{35}$ is D or E; $X_{36}$ is K or T; $X_{37}$ is S or A; and (vi) a VL CDR3 having a sequence set forth as:

(SEQ ID NO: 11)
$X_{49}QX_{50}X_{51}X_{52}X_{53}PX_{54}T$ wherein $X_{49}$ is W or Q; $X_{50}$ is G or W; $X_{51}$ is T or S; $X_{52}$ is H or S; $X_{53}$ is F or N; and $X_{54}$ is W or P.

In one example, the HER2 binding protein comprises a heavy chain variable region sequence (VH) set forth in:

(SEQ ID NO: 12)
$X_1X_2QLX_3QSGPELX_4KPGX_5X_6VKISCKASGYX_7FTX_8YX_9MX_{10}WVX_{11}Q$ $X_{12}X_{13}X_{14}X_{15}X_{16}LX_{17}MX_{18}GX_{19}INX_{20}YX_{21}GX_{22}X_{23}X_{24}YX_{25}X_{26}X_{27}FKX_{28}$ $X_{29}X_{30}X_{31}X_{32}X_{33}X_{34}X_{35}X_{36}SX_{37}STAYX_{38}X_{39}X_{40}X_{41}X_{42}LX_{43}X_{44}EDX_{45}A$ $X_{46}X_{47}X_{48}CAX_{49}X_{50}X_{51}X_{52}X_{53}X_{54}X_{55}X_{56}X_{57}X_{58}X_{59}X_{60}X_{61}FX_{62}YWGQGT$ $X_{63}X_{64}TVSX_{65}$ wherein
$X_1$ is E or Q; $X_2$ is V or I; $X_3$ is Q or V; $X_4$ is V or K; $X_5$ is A or E; $X_6$ is S or T; $X_7$ is S or T; $X_8$ is G or D; $X_9$ is F or G; $X_{10}$ is H or N; $X_{11}$ is R or K; $X_{12}$ is S or A; $X_{13}$ is H or P; $X_{14}$ is V or G; $X_{15}$ is R or K; $X_{16}$ is S or G; $X_{17}$ is E or K; $X_{18}$ is I or M; $X_{19}$ is R or W; $X_{20}$ is P or T; $X_{21}$ is N or T; $X_{22}$ is D or K; $X_{23}$ is I or P; $X_{24}$ is R or T; $X_{25}$ is N or D; $X_{26}$ is Q or D; $X_{27}$ is N or D; $X_{28}$ is D or G; $X_{29}$ is K or R; $X_{30}$ is A or F; $X_{31}$ is S or A; $X_{32}$ is L or F; $X_{33}$ is T or S; $X_{34}$ is V or L; $X_{35}$ is D or E; $X_{36}$ is K or T; $X_{37}$ is S or A; $X_{38}$ is M or L; $X_{39}$ is E or Q; $X_{40}$ is L or I; $X_{41}$ is H or N; $X_{42}$ is R or N; $X_{43}$ is T or K; $X_{44}$ is S or N; $X_{45}$ is S or M; $X_{46}$ is V or T; $X_{47}$ is F or Y; $X_{48}$ is Y or F; $X_{49}$ is S or R; $X_{50}$ is absent or R; $X_{51}$ is absent or F; $X_{52}$ is absent or L; $X_{53}$ is absent or N; $X_{54}$ is absent or T; $X_{55}$ is absent or V; $X_{56}$ is absent or A; $X_{57}$ is absent or G; $X_{58}$ is absent or R; $X_{59}$ is absent or S; $X_{60}$ is L or V; $X_{61}$ is N or Y; $X_{62}$ is A or D; $X_{63}$ is P or T; $X_{64}$ is V or L; and $X_{65}$ is A or S.

In one example, the HER2-binding protein further comprises a light chain variable region sequence (VL) set forth in:

(SEQ ID NO: 13)
$X_1IVX_2TQSPX_3X_4X_5SVX_6X_7GX_8X_9X_{10}X_{11}X_{12}X_{13}CX_{14}X_{15}SX_{16}SX_{17}X_{18}X_{19}$
$X_{20}X_{21}X_{22}X_{23}X_{24}YX_{25}X_{26}X_{27}WX_{28}X_{29}QX_{30}PX_{31}X_{32}SPKX_{33}X_{34}IYLX_{35}SX_{36}$
$LX_{37}SGVPX_{38}RFX_{36}GSGSGTX_{40}X_{41}X_{42}LX_{43}ISX_{44}X_{45}EAEDX_{46}X_{47}X_{48}YY$
$CX_{49}QX_{50}X_{51}X_{52}X_{53}PX_{54}TFGX_{55}GTKLEX_{56}KR$ wherein $X_1$ is D or Q; $X_2$ is I or L; $X_3$ is L or A; $X_4$ is T or L; $X_5$ is L or M; $X_6$ is T or S; $X_7$ is F or P; $X_8$ is Q or E; $X_9$ is P or K; $X_{10}$ is A or V; $X_{11}$ is S or T; $X_{12}$ is I or M; $X_{13}$ is S or T; $X_{14}$ is K or S; $X_{15}$ is S or V; $X_{16}$ is Q or S; $X_{17}$ is L or absent; $X_{18}$ is L or absent; $X_{19}$ is D or absent; $X_{20}$ is S or absent; $X_{21}$ is D or absent; $X_{22}$ is G or absent; $X_{23}$ is K or V; $X_{24}$ is T or G; $X_{25}$ is F or S; $X_{26}$ is L or M; $X_{27}$ is N or Y; $X_{28}$ is L or Y; $X_{29}$ is L or Q; $X_{30}$ is R or K; $X_{31}$ is G or R; $X_{32}$ is Q or S; $X_{33}$ is R or P; $X_{34}$ is L or W; $X_{35}$ is V or T; $X_{36}$ is K or N; $X_{37}$ is D or A; $X_{38}$ is D or P; $X_{39}$ is T or S; $X_{40}$ is D or S; $X_{41}$ is F or Y; $X_{42}$ is T or S; $X_{43}$ is K or T; $X_{44}$ is R or S; $X_{45}$ is V or M; $X_{46}$ is L or A; $X_{47}$ is G or A; $X_{48}$ is V or T; $X_{49}$ is W or Q; $X_{50}$ is G or W; $X_{51}$ is T or S; $X_{52}$ is H or S; $X_{53}$ is F or N; $X_{54}$ is W or P; $X_{55}$ is G or A; and $X_{56}$ is I or L.

In one example, the VH comprises or consists of a CDR1 sequence selected from GYSFTGYFMH (SEQ ID NO:14) or GYTFTDYGMN (SEQ ID NO:15).

In one example, the VH comprises or consists of a CDR2 sequence selected from RINPYNGDIRYNQNFKD (SEQ ID NO:16) or WINTYTGKPTYDDDFKG (SEQ ID NO:17).

In one example, the VH comprises or consists of a CDR3 sequence selected from LNFAY (SEQ ID NO:18) or RFLNTVAGRSVYFDY (SEQ ID NO:19).

In one example, the VL comprises or consists of a CDR1 sequence selected from KSSQSLLDSDGKTFLN (SEQ ID NO:20) or SVSSSVGSMY (SEQ ID NO:21).

In one example, the VL comprises or consists of a CDR2 sequence selected from LVSKLDS (SEQ ID NO:22) or LTSNLAS (SEQ ID NO:23).

In one example, the VL comprises of consists of a CDR3 sequence selected from WQGTHFPWT (SEQ ID NO:24) or QQWSSNPPT (SEQ ID NO:25).

The present disclosure also provides a HER2 binding protein comprising a heavy chain variable region sequence (VH) having a CDR1, CDR2 and CDR3 sequence comprising or consisting of respectively:
  (i) SEQ ID NO:14, SEQ ID NO:16 and SEQ ID NO:18; or
  (ii) SEQ ID NO:15, SEQ ID NO:17 and SEQ ID NO:19.

The present disclosure also provides a HER2 binding protein comprising a light chain variable region sequence (VL) having a CDR1, CDR2 and CDR3 sequence comprising or consisting of respectively:
  (i) SEQ ID NO:20, SEQ ID NO:22 and SEQ ID NO:24; or
  (ii) SEQ ID NO:21, SEQ ID NO:23 and SEQ ID NO:25.

In one example, the HER2 binding protein comprises CDRs having a sequence comprising or consisting of SEQ ID NO:14, SEQ ID NO:16, SEQ ID NO:18, and/or SEQ ID NO:20, SEQ ID NO:22 and SEQ ID NO:24.

In one example, the HER2 binding protein comprises CDRs having a sequence comprising or consisting of SEQ ID NO:15, SEQ ID NO:17 and SEQ ID NO:19, and/or SEQ ID NO:21, SEQ ID NO:23 and SEQ ID NO:25.

In one example, the HER2 binding protein comprises a VH comprising a sequence which is at least 55% identical to the sequence set forth in SEQ ID NO:2 and/or a VL comprising a sequence which is at least 50% identical to the sequence set forth in SEQ ID NO:3 or a humanized, chimeric or deimmunized version thereof.

In one example, the HER2 binding protein comprises a VH comprising a sequence which is at least 55% identical to the sequence set forth in SEQ ID NO:4 and/or a VL comprising a sequence which is at least 50% identical to the sequence set forth in SEQ ID NO:5 or a humanized, chimeric or deimmunized version thereof.

In one example, the VH comprises a sequence which is at least 60%, 65%, 70%, 75%, 80%, 85%, 90%, 95%, 97%, 98%, 99% or 99.5% identical to SEQ ID NO:2 or SEQ ID NO:4.

In one example, the VL comprises a sequence which is at least 55%, 60%, 65%, 70%, 75%, 80%, 85%, 90%, 95%, 97%, 98%, 99% or 99.5% identical to SEQ ID NO:3 or SEQ ID NO:5.

The present disclosure also provides a HER2 binding protein comprising or consisting of:
  (i) a VH set forth in SEQ ID NO:2 and a VL set forth in SEQ ID NO:3; or
  (ii) a VH set forth in SEQ ID NO:4 and a VL set forth in SEQ ID NO:5.

In one example, the HER2 binding protein is an antigen-binding fragment selected from:
  (i) a single chain Fv fragment (scFv);
  (ii) a dimeric scFv (di-scFv);
  (iii) at least one of (i) and/or (ii) linked to a heavy chain constant region or an Fc or a heavy chain constant domain (CH) 2 and/or CH3; or
  (iv) at least one of (i) and/or (ii) linked to a protein enhances antibody half-life (e.g. human serum albumin (HSA)).

In another example of the disclosure, the VL and VH are in separate polypeptide chains. For example, the HER2-binding protein is:
  (i) a diabody;
  (ii) a triabody;
  (iii) a tetrabody;
  (iv) a Fab;
  (v) a F(ab')2;
  (vi) a Fv; or
  (vii) at least one of (i) to (vi) linked to a heavy chain constant region or an Fc or a heavy chain constant domain (CH) 2 and/or CH3; or
  (viii) at least one of (i) to (vi) linked to a protein that enhances antibody half-life (e.g. HSA).

The present disclosure also provided a chimeric antibody comprising a VH and a VL as described herein wherein the VH is linked to a heavy chain constant region and the VL is linked to a light chain constant region.

The present disclosure also provides a chimeric antibody comprising a VH and a VL as described herein wherein the VH is linked to a human heavy chain constant region and the VL is linked to a human light chain constant region.

It will be apparent to the skilled person based on the disclosure herein that the HER2 binding proteins of the present disclosure encompasses human, humanized, synhumanized, chimeric and primatized proteins.

The antibodies of the present disclosure may belong to any class, including IgM, IgG, IgE, IgA, IgD, or subclass. Exemplary subclasses for IgG are IgG1, IgG2, IgG3 and IgG4.

In one example, the HER2 binding protein is recombinant. In one example the HER2 binding protein is synthetic.

The present disclosure also provides anti-idiotype antibodies or antigen-binding fragments thereof capable of binding to mAb104 or mAb106.

In one example, a HER2 binding protein or antibody of the present disclosure is conjugated to a moiety. The moiety may be a detectable or functional moiety. For example, the moiety is selected from the group consisting of a radioisotope, a detectable label, a therapeutic compound, a colloid, a toxin, a nucleic acid, a peptide, a protein, a drug, a compound that increases the half-life of the HER2 binding protein in a subject and mixtures thereof. In certain examples, the moiety may be selected from an immunoglobulin, or fragment or portion of an immunoglobulin, a therapeutic compound (e.g. chemotherapy), a drug or bioactive agent, toxin or radionuclide. Alternatively, the moiety may include an siRNA, DNAzyme or ribozyme. Combinations of any of the foregoing moieties are also included in the present disclosure. In one example, the HER2 binding protein is an antibody-drug conjugate. In another example the antibody-drug conjugate comprises a HER2 binding protein of the present disclosure linked to monoethylauristatin E (MMAE), monoethylauristatin F (MMAF), pyrrolobenzodiazepine (PBD) or emtansine (DM1). In certain examples, the linkage is achieved through linkage chemistry. In one example, the drug is conjugated to the HER2 binding protein via a cysteine or lysine residue present in the HER2 binding protein. In other examples, the linkage is via a linker (for example, G-S linker) as known in the art. In another example, the antibody-drug conjugate is able to be internalised upon binding to the HER2 receptor on a tumour cell. The present disclosure also extends to compositions comprising such conjugates as described herein.

Serum half-life of a binding protein or antibody may be increased for example by incorporating a salvage receptor binding epitope into the antibody such as those described in U.S. Pat. No. 5,739,277. As used herein, the term "salvage receptor binding epitope" refers to an epitope of the Fc region of an IgG molecule (e.g. IgG1, IgG2, IgG3 or IgG4) that is responsible for increasing the in vivo serum half-life of the IgG molecule. In another example, the half-life is increased by pegylation.

The present disclosure also provides an isolated nucleic acid encoding a HER2-binding protein or antibody of the disclosure.

The present disclosure additionally provides an expression construct comprising the nucleic acid of the disclosure operably linked to a promoter. Such an expression construct can be in a vector, e.g., a plasmid.

In examples of the disclosure directed to single polypeptide HER2 binding proteins, the expression construct may comprise a promoter linked to a nucleic acid encoding that polypeptide chain.

In examples directed to multiple polypeptides that form a HER2 binding protein, an expression construct of the disclosure comprises a nucleic acid encoding one of the polypeptides (e.g., comprising a VH) operably linked to a promoter and a nucleic acid encoding another of the polypeptides (e.g., comprising a VL) operably linked to another promoter.

In another example, the expression construct is a bi-cistronic expression construct, e.g., comprising the following operably linked components in 5' to 3' order:
  (i) a promoter
  (ii) a nucleic acid encoding a first polypeptide;
  (iii) an internal ribosome entry site; and
  (iv) a nucleic acid encoding a second polypeptide.

For example, the first polypeptide comprises a VH and the second polypeptide comprises a VL, or the first polypeptide comprises a VL and the second polypeptide comprises a VH.

The present disclosure also contemplates separate expression constructs one of which encodes a first polypeptide (e.g., comprising a VH and optionally heavy chain constant region or part thereof) and another of which encodes a second polypeptide (e.g., comprising a VL and optionally light chain constant region). For example, the present disclosure also provides a composition comprising:
  (i) a first expression construct comprising a nucleic acid encoding a polypeptide (e.g., comprising a VH operably linked to a promoter); and
  (ii) a second expression construct comprising a nucleic acid encoding a polypeptide (e.g., comprising a VL operably linked to a promoter),
    wherein the first and second polypeptides associate to form a HER2 binding protein of the present disclosure.

The present disclosure additionally provides an isolated cell expressing the HER2 binding protein or antibody of the present disclosure or a recombinant cell genetically-modified to express a HER2 binding protein or antibody of the disclosure. In one example, the cell is an isolated hybridoma. In another example, the cell comprises the nucleic acid of or the expression construct of the disclosure or:
  (i) a first expression construct comprising a nucleic acid encoding a polypeptide (e.g., comprising a VH) operably linked to a promoter; and
  (ii) a second expression construct comprising a nucleic acid encoding a polypeptide (e.g., comprising a VL) operably linked to a promoter,
    wherein the first and second polypeptides associate to form a HER2 binding protein or antibody of the present disclosure.

The present disclosure additionally provides a composition comprising the HER2 binding protein or the nucleic acid or the expression construct or the cell of the present disclosure and a suitable carrier. In one example, the composition comprises the HER2 binding protein of the present disclosure.

In one example, the carrier is pharmaceutically acceptable.

The composition of the present disclosure may be administered alone or in combination with other treatments, therapeutics or agents, either simultaneously/concurrently or sequentially. In one example, the HER2 binding protein or composition of the disclosure is administered in combination with Pertuzumab or Trastuzumab. In another example, the HER2 binding protein or composition of the disclosure is administered in combination with a tyrosine kinase inhibitor (e.g. lapatinib). It is also contemplated that the HER2 binding protein or composition as described herein is administered simultaneously or sequentially with anti-cancer therapy, for example, chemotherapy or radiotherapy. In a further example, the HER2 binding protein or composition as described herein is administered simultaneously or sequentially with an immunotherapeutic agent or immunomodulatory agent.

The HER2 binding proteins of the present disclosure may be used in treatment, diagnosis or detection. In some examples, the HER2 binding protein is linked to a chemotherapeutic agent for use as a theranostic.

The present disclosure also provides a diagnostic agent comprising a HER2 binding protein as described herein coupled to a detectable label. In one example, the diagnostic agent is used to detect HER2 expressing tumour cells in vivo or in vitro.

In one example, the diagnostic agent can be used to detect the presence of HER2 expressing tumour cells in a subject or in a biological sample obtained from a subject having a HER2 positive tumour or suspected of having a HER2 positive tumour. Examples of detectable labels include various enzymes, prosthetic groups, fluorescent materials, luminescent materials, electron dense labels, labels for MRI and radioactive materials.

The present disclosure also provides a HER2 binding protein or diagnostic agent as described herein for use in histological examination of biological samples. Methods for preparing histological samples will be familiar to persons skilled in the art.

The present disclosure additionally provides a method for treating or preventing a HER2 expressing cancer in a subject, the method comprising administering the HER2 binding protein or the nucleic acid or the expression construct or the cell or the composition of the present disclosure to the subject. In one example, the subject is one who has cancer, for example, breast cancer.

In one example, the method comprises administering an antibody to the subject comprising a VH comprising a sequence set forth in SEQ ID NO:2 and/or a VL comprising a sequence set forth in SEQ ID NO:3 or a humanized or deimmunized version thereof.

In one example, the method comprises administering an antibody to the subject comprising a VH comprising a sequence set forth in SEQ ID NO:4 and/or a VL comprising a sequence set forth in SEQ ID NO:5 or a humanized or deimmunized version thereof.

The present disclosure additionally provides a HER2 binding protein or the nucleic acid or the expression construct or the cell or the composition of the present disclosure for use in medicine.

The present disclosure additionally provides the HER2 binding protein or the nucleic acid or the expression construct or the cell or the composition of the present disclosure for use in the treatment of a HER2 expressing cell proliferative disorder.

In one example, the present disclosure provides a method of treating a HER2 expressing cell proliferative disorder, comprising administering to a subject in need thereof the HER2 binding protein or the nucleic acid or the expression construct or the cell or the composition of the present disclosure. In one example, the cancer is selected from the group consisting of breast, gastric, gastroesophageal, colon and squamous cell cancers.

In one example, the HER2 binding protein is administered to the subject in a therapeutically effective amount.

Preferably, the subject is a human.

The present disclosure additionally provides for use of the HER2 binding protein or the nucleic acid or the expression construct or the cell of the present disclosure in the manufacture of a medicament for the treatment of a HER2 expressing cancer.

The present disclosure additionally provides a method for detecting HER2 in a biological sample, the method comprising contacting a sample with the HER2 binding protein or antibody of the present disclosure such that an antigen-protein complex forms and detecting the complex, wherein detecting the complex is indicative of HER2 expression in the sample.

The present disclosure also provides a vaccine antigen comprising or consisting of the sequence according to SEQ ID NO:1, together with a pharmaceutically acceptable carrier for generating antibodies of human HER2.

The present disclosure also provides a method for generating a HER2/ErbB2 binding protein, comprising immunising a rodent with a cyclic peptide comprising the sequence H-GCPLHNQEVTAEDGTQRC-NH$_2$ (SEQ ID NO: 26); deriving a hybridoma cell line from the B cells of the immunised rodent and purifying antibody from the hybridoma cell line. In one example, the peptide is cyclised via a disulphide bond. In one example, the peptide is cyclized via a disulphide bond between the side-chain of Cys2 and Cys18. In another example, the peptide is linked to keyhole limpet hemocyanin (KLH) protein.

BRIEF DESCRIPTION OF DRAWINGS

FIG. 1: Full length protein sequence of human receptor tyrosine-protein kinase HER2 including 22 amino acid leader sequence. The peptide epitope bound by mAb104 within cysteine rich domain II is shown in underlined bold text.

FIG. 4: Designation of CDRs (indicated by bold and underlining) for heavy and light chains respectively of mAb104 (A and B) and mAb106 (C and D). CDR designation by Kabat and Chothia numbering.

FIG. 7-1 to 7-4: FACS-based competition assay. Pre-incubation with ten-fold excess mAb104 (100 μg/mL) did not affect 10 μg/mL Trastuzumab nor Pertuzumab binding cancer cell surface HER2 on BT-474 cells (A and B), SK-BR-3 cells (C and D), NCI-N87 cells (E and F) or OE-19 cells (G and H). Results are representative of two or more experiments.

FIG. 8-1: Lysates of cancer cell lines were separated on 4% SDS-PAGE and blotted with (A) mAb104, (B) anti-HER2 and (C) anti-HER3. GAPDH was used as a loading control for protein normalization. Lane 1: Molecular weight markers. Results are representative of three experiments.

FIG. 8-2. ELISA analysis. Specificity of mAb104 (3-10,000 ng/mL) binding ELISA plates coated with recombinant sEGFR ectodomain, or ECD of HER2, HER3 or HER4. Controls for pNPP substrate and secondary anti-mouse antibody-alkaline phosphatase conjugate alone included. (Data; Mean±SE; n=3).

FIG. 9-1 to 9-3: The effect of mAb104 (A and B) alone, or in combination with Trastuzumab (C and D), or Pertuzumab (E and F) on the growth of SK-BR-3 (A, C and E) or BT-474 cells (B, D and F) in vitro as measured by MTS assay. Cells were incubated with mAb104, Trastuzumab, Pertuzumab, isotype control as monotherapy or in combination with Trastuzumab+Pertuzumab, Trastuzumab+mAb104 or Pertuzumab+mAb104 in serum-depleted media for 5-7 days. The number of viable cells determined at baseline and at end of experiment. Results are presented as Mean±SD, n=3. Data is representative of two or more independent experiments. *mAb014, pertuzumab and isotype control antibody have no anti-proliferative effect and overlap each other.

FIGS. 10-1 and 10-2: mAb104 does not affect downstream signalling in the MAPK pathway and Akt in (A) SK-BR-3 and (B) BT474 cells in vitro as monotherapy (A and B) or when used in combination with Trastuzumab or Pertuzumab (C and D). Cells were incubated in serum-depleted media were treated with 100 μg/mL of mAb104, Trastuzumab, Pertuzumab alone or in combination for 24 hours prior to undergoing whole cell lysis. Equal amounts of lysates were then loaded and resolved on 4-12% gel before transfer to nitrocellulose membrane. Membranes were immunoblotted as shown. Results are representative of two experiments.

FIGS. 11-1 and 11-2: mAb104 does not affect ligand-dependent phosphorylation of MAPK pathway and Akt in (A) SK-BR-3 and (B) BT474 cells in vitro as monotherapy (A and B) or when used in combination with Trastuzumab or Pertuzumab (C and D). Cells were incubated in serum-depleted media were treated with 100 μg/mL of mAb104, Trastuzumab, and Pertuzumab alone or in combination for 24 hours followed by addition of 100 ng EGF for 10 minutes. Following whole cell lysis, equal amounts of lysates were then loaded and resolved on 4-12% gel before transfer to nitrocellulose membrane. Membranes were immunoblotted as shown. Results are representative of two experiments.

FIG. 12-1 to 12-4: Effect of treatment on breast cancer cell viability and apoptosis assessed by flow cytometry analysis of annexin-V and propidium iodide (PI) staining after 4 hours of treatment with Trastuzumab, Pertuzumab and mAb104 as monotherapy and in combination (total antibody in all groups 0.1 mg/mL) (A to H) BT474 cells and (I to P) SK-BR-3 cells.

FIG. 15-1 to 15-3: (A) Anti-tumour effects of mAb104 in HER2-positive breast PDX model. Mice (n=5/group) were treated with 0.5 mg mAb104, Trastuzumab, Pertuzumab, isotype control. Tumour volume at start of therapy was 100-120 mm³. (B) Anti-tumour effects of mAb104 in combination with Trastuzumab in BT-474 xenografts. Mice (n=5) were treated with a total dose of 0.5 mg mAb104+Trastuzumab, Trastuzumab+Pertuzumab or isotype control. Tumour volume at start of therapy was 120-150 mm³. *p<0.0001 control group versus trastuzumab/mAb104. (C) Anti-tumour effects of mAb104 in combination with Trastuzumab in HER2-positive breast PDX model. Mice (n=5) were treated with a total dose of 0.5 mg mAb104+Trastuzumab, Trastuzumab+Pertuzumab or isotype control. Tumour volume at start of therapy was 120-150 mm³. *p<0.0001, control group versus mAb104; **p<0.001, trastuzumab versus trastuzumab/mAb104. Data shown in growth curves of panels A-C) represents mean tumour volume±S.E.

FIGS. 16-1 and 16-2: BT-474 xenograft tumours were evaluated by immunohistochemistry for the effect of: anti-HER2 monotherapy (0.5 mg dose) on (A) proliferation by Ki67 (B) downstream signaling by staining for phospho-Akt (C) effect on vasculature by staining for podocalyxin; or the effect of mAb104 in combination with Trastuzumab (0.5 mg total protein dose) on (D) proliferation by Ki67 (E) downstream signalling by staining for phosphor-Akt (F) effect on vasculature by staining for podocalyxin. *p<0.001 control group versus trastuzumab.

FIGS. 19-1 and 19-2: mAb104 does not affect downstream signalling in the MAPK pathway and Akt in (A) NCI-N87 and (B) OE-19 cells in vitro as monotherapy (A and B) or when used in combination with Trastuzumab or Pertuzumab (C and D). Cells were incubated in serum-depleted media were treated with 100 µg/mL of mAb104, Trastuzumab, Pertuzumab alone or in combination with Trastuzumab or Pertuzumab for 24 hours prior to undergoing whole cell lysis. Equal amounts of lysates were then loaded and resolved on 4-12% gel before transfer to nitrocellulose membrane. Membranes were immunoblotted as shown. Results are representative of two experiments.

FIGS. 20-1 and 20-2: mAb104 does not affect ligand-dependent phosphorylation of MAPK pathway and Akt in (A) NC-N87 and (B) OE-19 cells in vitro as monotherapy (A and B) or when used in combination with Trastuzumab or Pertuzumab (C and D). Cells were incubated in serum-depleted media were treated with 100 µg/mL of mAb104, Trastuzumab, and Pertuzumab alone or in combination for 24 hours followed by addition of 100 ng EGF for 10 minutes. Following whole cell lysis, equal amounts of lysates were then loaded and resolved on 4-12% gel before transfer to nitrocellulose membrane. Membranes were immunoblotted as shown. Results are representative of two experiments.

FIGS. 21-1 and 21-2: Effect of treatment on cancer cell viability and apoptosis assessed by propidium iodide (PI) staining after 4 hours of treatment with Trastuzumab, Pertuzumab and mAb104 as monotherapy and in combination (A and B) NCI-N87 gastric cancer and (C) OE-19 oesophageal cancer cells.

FIGS. 30-1 and 30-2: NCI-N87 xenograft tumours were evaluated by immunohistochemistry for the effect of anti-HER2 monotherapy (0.5 mg dose) (A to C) or in combination with Trastuzumab (D to F) on (A and D) proliferation by Ki67; (B and E) downstream signalling by staining for phosphor-Akt and (C and F) effect on vasculature by staining for podocalyxin.

FIGS. 31-1 and 31-2: OE-19 xenograft tumours were evaluated by immunohistochemistry for the effect of anti-HER2 monotherapy (0.5 mg dose) (A to C) or in combination with Trastuzumab (D to F) on (A and D) proliferation by Ki67; (B and E) downstream signalling by staining for phosphor-Akt and (C and F) effect on vasculature by staining for podocalyxin.

FIG. 32: Binding assay for the determination of the immunoreactive fraction of $^{89}$Zr-labelled anti-HER antibodies. A) shows a conventional plot of specific binding over total applied radioactivity, as a function of increasing cell concentration. B) and C) are the double inverse plot of the same data as in A, allowing immunoreactive fraction to be determined for conditions representing infinite antigen excess.

KEY TO SEQUENCE LISTING

Figure 2A:
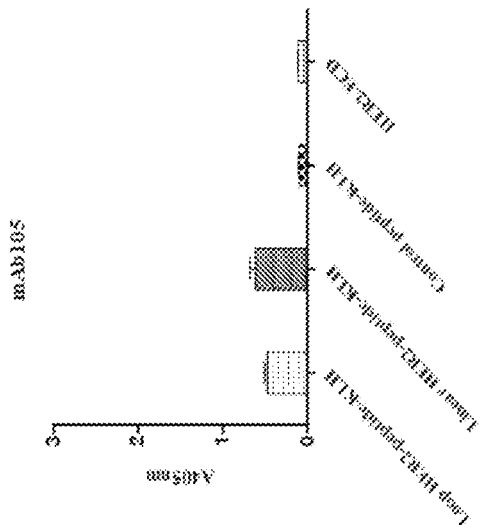
FIG. 2: Comparative binding of 10 μg/mL (A) mAb104, (B) mAb105, (C) mAb106 and (D) mAb107 to the HER2 extracellular domain, circularised and linear peptide immunogens linked to keyhole limpet hemocyanin (KLH) which the antibodies were generated against, or control irrelevant peptide linked to KLH, using an ELISA based assay. Binding activity of triplicate samples was measured with optical density absorbance reading at 405 nm using a Versamax microplate reader (Molecular Devices) with Softmax Pro 4.8 Software and Mean±SD determined. mAb104 (A) and mAb106 (C) showed the strongest binding activity for all immobilised HER2 formats, and mAb105 (B) displayed the weakest binding. Specificity was confirmed by lack of binding to control peptide. Results are representative of two independent experiments.

SEQ ID NO:1: HER2/ErbB2 epitope sequence
SEQ ID NO:2: VH of mAb104

SEQ ID NO:3: VL of mAb104
SEQ ID NO:4: VH of mAb106
SEQ ID NO:5: VL of mAb106
SEQ ID NO:6: VH CDR1 consensus sequence
SEQ ID NO:7: VH CDR2 consensus sequence
SEQ ID NO:8: VH CDR3 consensus sequence
SEQ ID NO:9: VL CDR1 consensus sequence
SEQ ID NO:10: VL CDR2 consensus sequence
SEQ ID NO:11: VL CDR3 consensus sequence
SEQ ID NO:12: VH consensus sequence
SEQ ID NO:13: VL consensus sequence
SEQ ID NO:14: VH CDR1 of mAb104
SEQ ID NO:15: VH CDR1 of mAb106
SEQ ID NO:16: VH CDR2 of mAb104
SEQ ID NO:17: VH CDR2 of mAb106
SEQ ID NO:18: VH CDR3 of mAb104
SEQ ID NO:19: VH CDR3 of mAb106
SEQ ID NO:20: VL CDR1 of mAb104
SEQ ID NO:21: VL CDR1 of mAb106
SEQ ID NO:22: VL CDR2 of mAb104
SEQ ID NO:23: VL CDR2 of mAb106
SEQ ID NO:24: VL CDR3 of mAb104
SEQ ID NO:25: VL CDR3 of mAb106
SEQ ID NO:26: sequence of cyclised peptide used for immunisation
SEQ ID NO:27: sequence of HER2/ErbB2
SEQ ID NO:28: light chain primer sequence
SEQ ID NO:29: light chain primer sequence
SEQ ID NO:30: light chain primer sequence
SEQ ID NO:31: light chain primer sequence
SEQ ID NO:32: light chain primer sequence
SEQ ID NO:33: light chain primer sequence
SEQ ID NO:34: light chain primer sequence
SEQ ID NO:35: light chain primer sequence
SEQ ID NO:36: light chain primer sequence
SEQ ID NO:37: light chain primer sequence
SEQ ID NO:38 light chain primer sequence
SEQ ID NO:39: light chain primer sequence
SEQ ID NO:40: light chain primer sequence
SEQ ID NO:41: heavy chain primer sequence
SEQ ID NO:42: heavy chain primer sequence
SEQ ID NO:43: heavy chain primer sequence
SEQ ID NO:44: heavy chain primer sequence
SEQ ID NO:45: heavy chain primer sequence
SEQ ID NO:46: heavy chain primer sequence
SEQ ID NO:47: heavy chain primer sequence
SEQ ID NO:48: heavy chain primer sequence
SEQ ID NO:49: heavy chain primer sequence
SEQ ID NO:50: heavy chain primer sequence
SEQ ID NO:51: heavy chain primer sequence
SEQ ID NO:52: heavy chain primer sequence
SEQ ID NO:53: heavy chain primer sequence
SEQ ID NO:54: light chain primer sequence
SEQ ID NO:55: light chain primer sequence

DETAILED DESCRIPTION OF THE DISCLOSURE

General

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or group of compositions of matter.

Those skilled in the art will appreciate that the present disclosure is susceptible to variations and modifications other than those specifically described. It is to be understood that the disclosure includes all such variations and modifications. The disclosure also includes all of the steps, features, compositions and compounds referred to or indicated in this specification, individually or collectively, and any and all combinations or any two or more of said steps or features.

The present disclosure is not to be limited in scope by the specific examples described herein, which are intended for the purpose of exemplification only. Functionally-equivalent products, compositions and methods are clearly within the scope of the disclosure.

Any example of the present disclosure herein shall be taken to apply mutatis mutandis to any other example of the disclosure unless specifically stated otherwise.

Unless specifically defined otherwise, all technical and scientific terms used herein shall be taken to have the same meaning as commonly understood by one of ordinary skill in the art (for example, in cell culture, molecular genetics, immunology, immunohistochemistry, protein chemistry, and biochemistry).

Unless otherwise indicated, the recombinant protein, recombinant DNA techniques, molecular biology, microbiology, cell culture, and immunological techniques utilized in the present disclosure are standard procedures, well known to those skilled in the art. Such techniques are described and explained throughout the literature in sources such as, J. Perbal, A Practical Guide to Molecular Cloning, John Wiley and Sons (1984), J. Sambrook et al. Molecular Cloning: A Laboratory Manual, Cold Spring Harbour Laboratory Press (1989), T. A. Brown (editor), Essential Molecular Biology: A Practical Approach, Volumes 1 and 2, IRL Press (1991), D. M. Glover and B. D. Hames (editors), DNA Cloning: A Practical Approach, Volumes 1-4, IRL Press (1995 and 1996), and F. M. Ausubel et al. (editors), Current Protocols in Molecular Biology, Greene Pub. Associates and Wiley-Interscience (1988, including all updates until present), Ed Harlow and David Lane (editors) Antibodies: A Laboratory Manual, Cold Spring Harbour Laboratory, (1988), and J. E. Coligan et al. (editors) Current Protocols in Immunology, John Wiley & Sons (including all updates until present).

The description and definitions of variable regions and parts thereof, immunoglobulins, antibodies and fragments thereof herein may be further clarified by the discussion in Kabat, 1987 and/or 1991, Bork et al., 1994 and/or Chothia and Lesk, 1987 and/or 1989 or AI-Lazikani et al., 1997 or the IMGT numbering of Lefranc M.-P., (1997) Immunology Today 18, 509.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

As used herein the term "derived from" shall be taken to indicate that a specified integer may be obtained from a particular source albeit not necessarily directly from that source.

The terms "consisting of" or "consisting essentially of" in the context of a peptide sequence refers to a peptide sequence of a defined number of residues which is not covalently attached to a larger product.

Any example herein shall be taken to apply mutatis mutandis to any other example unless specifically stated otherwise.

Selected Definitions

As used herein, the singular forms "a", "an" and "the" include plural referents unless the context clearly dictates otherwise. The terms "a" (or "an"), as well as the terms "one or more," and "at least one" can be used interchangeably herein.

Furthermore, "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

The term "about" is used herein to mean approximately, roughly, around, or in the regions of. When the term "about" is used in conjunction with a numerical range, it modifies that range by extending the boundaries above and below the numerical values set forth. In general, the term "about" is used herein to modify a numerical value above and below the stated value by a variance of 10 percent (%), up or down (higher or lower).

It will be understood that the HER2 binding proteins and antibodies, nucleic acids, cells and vectors described herein are in isolated form. By "isolated" it is meant a polypeptide, antibody, polynucleotide, vector, or cell, that is in a form not found in nature. Isolated polypeptides, antibodies, polynucleotides, vectors, or cells include those which have been purified to a degree that they are no longer in a form in which they are found in nature. In some aspects, an antibody, polynucleotide, vector, or cell that is isolated is substantially pure. In some aspects an antibody, polynucleotide, vector, or cell that is isolated is "recombinant."

The term "HER2" as used herein is understood to refer to the human HER2 receptor as shown in FIG. 1 and in particular domain II of the HER2 receptor as represented by amino acid residues 190 to 269 of the wild-type HER2 sequence (Coussens L et al. (1985) Science 230(4730):1132-9). The term HER2 can be used interchangeably with ErbB2.

The term "aberrant expression" or "aberrantly expressed" is intended to encompass the state where abnormal (usually increased) quantities/levels of the protein are present, irrespective of the efficient cause of that abnormal quantity or level. Aberrant expression includes and contemplates any scenario or alteration wherein the protein expression or post-translational modification machinery in a cell is taxed or otherwise disrupted due to enhanced expression or increased levels or amounts of a protein, including wherein an altered protein, as in mutated protein or variant due to sequence alteration, deletion or insertion, or altered folding is expressed. In the present context, aberrant expression is associated with HER2 expression seen in tumourigenic, hyperproliferative or abnormal cells but not wild-type or normal cells.

As used herein, the term "affinity" refers to the strength of binding of a single molecule to its ligands and is typically expressed as the equilibrium dissociation constant (KD) for the reversible binding of two agents. It is determined by the ratio of Koff/Kon, between the HER2 binding protein and HER2. KD and affinity are inversely related. The KD value relates to the concentration of HER2 binding protein and so the lower the KD value (lower concentration), the higher the affinity of the binding protein. Affinity of a HER2 binding protein of the present disclosure to HER2 can be, for example, from about 100 nanomolar (nM) to about 0.1 nM, from about 100 nM to about 1 picomolar (pM), or from about 100 nM to about 1 femtomolar (fM) or more.

As used herein, the term "binds" in reference to the interaction of a HER2 binding protein with a target means that the interaction is dependent upon the presence of a particular structure (e.g., an antigenic determinant or epitope) on the target. For example, a HER2 binding protein recognizes and binds to a specific protein structure rather than to proteins generally.

The term "binding protein" as used herein is intended to describe a member of a pair of molecules which have binding specificity for one another. The members of a specific binding pair may be naturally derived or wholly or partially synthetically produced. One member of the pair of molecules has an area on its surface, or a cavity, which specifically binds to and is therefore complementary to a particular spatial and polar organisation of the other member of the pair of molecules. Thus the members of the pair have the property of binding specifically to each other. Examples of types of specific binding pairs are antigen-antibody, biotin-avidin, hormone-hormone receptor, receptor-ligand, enzyme-substrate. This application is concerned with antigen-antibody type reactions.

The term "antibody" describes an immunoglobulin whether natural or partly or wholly synthetically produced. The term also covers any polypeptide or protein having a binding domain which is, or is homologous to, an antibody binding domain. CDR grafted antibodies are also contemplated by this term. An "antibody" is any immunoglobulin, including antibodies and fragments thereof, that binds a specific epitope. The term encompasses polyclonal, monoclonal, and chimeric antibodies, the last mentioned described in further detail in U.S. Pat. Nos. 4,816,397 and 4,816,567. The term "antibody(ies)" includes a wild type immunoglobulin (Ig) molecule, generally comprising four full length polypeptide chains, two heavy (H) chains and two light (L) chains, or an equivalent Ig homologue thereof (e.g., a camelid nanobody, which comprises only a heavy chain); including full length functional mutants, variants, or derivatives thereof, which retain the essential epitope binding features of an Ig molecule, and including dual specific, bispecific, multispecific, and dual variable domain antibodies; Immunoglobulin molecules can be of any class (e.g., IgG, IgE, IgM, IgD, IgA, and IgY), or subclass (e.g., IgG1, IgG2, IgG3, IgG4, IgA1, and IgA2). As antibodies can be modified in a number of ways, the term "antibody" should be construed as covering any specific binding member or substance having a binding domain with the required specificity. Thus, this term covers antibody fragments, derivatives, functional equivalents and homologues of antibodies, including any polypeptide comprising an immunoglobulin binding domain, whether natural or wholly or partially synthetic. Chimeric molecules comprising an immunoglobulin binding domain, or equivalent, fused to another polypeptide are therefore included. Cloning and expression of chimeric antibodies are described in EP-A-0120694 and EP-A-0125023 and U.S. Pat. Nos. 4,816,397 and 4,816,567. Also included within the meaning of the term "antibody" are any "antibody fragment".

An "antibody fragment" means a molecule comprising at least one polypeptide chain that is not full length, including (i) a Fab fragment, which is a monovalent fragment consisting of the variable light (VL), variable heavy (VH), constant light (CL) and constant heavy 1 (CH1) domains; (ii) a F(ab')2 fragment, which is a bivalent fragment comprising two Fab fragments linked by a disulfide bridge at the hinge region; (iii) a heavy chain portion of an Fab (Fd) fragment, which consists of the VH and CH1 domains; (iv) a variable fragment (Fv) fragment, which consists of the VL and VH domains of a single arm of an antibody, (v) a domain antibody (dAb) fragment, which comprises a single variable domain (Ward, E. S. et al., Nature 341, 544-546 (1989)); (vi) a camelid antibody; (vii) an isolated complementarity determining region (CDR); (viii) a Single Chain Fv Fragment wherein a VH domain and a VL domain are linked by a peptide linker which allows the two domains to associate to form an antigen binding site (Bird et al, Science, 242, 423-426, 1988; Huston et al, PNAS USA, 85, 5879-5883, 1988); (ix) a diabody, which is a bivalent, bispecific antibody in which VH and VL domains are expressed on a single polypeptide chain, but using a linker that is too short to allow for pairing between the two domains on the same chain, thereby forcing the domains to pair with the complementarity domains of another chain and creating two antigen binding sites (WO94/13804; P. Holliger et al Proc. Natl. Acad. Sci. USA 90 6444-6448, (1993)); and (x) a linear antibody, which comprises a pair of tandem Fv segments (VH-CH1-VH-CH1) which, together with complementarity light chain polypeptides, form a pair of antigen binding regions; (xi) multivalent antibody fragments (scFv dimers, trimers and/or tetramers (Power and Hudson, J Immunol. Methods 242: 193-204 9 (2000)); and (xii) other non-full length portions of heavy and/or light chains, or mutants, variants, or derivatives thereof, alone or in any combination.

As used herein the term "antigen-binding fragment" is taken to include an Fab, Fab', F(ab')2, Fv, Fd, single-chain Fv (scFv), disulfide-linked Fvs (sdFv), VL and VH domain fragments, domain antibody, trispecific (Fab3), bispecific (Fab2), diabody ((VL-VH)2 or (VH-VL)2), triabody (trivalent), tetrabody (tetravalent), minibody ((scFv-CH3)2), bispecific single-chain Fv (Bis-scFv), IgGdeltaCH2, scFv-Fc and (scFv)2-Fc. An "Fab fragment" consists of a monovalent antigen-binding fragment of an antibody molecule, and can be produced by digestion of a whole antibody molecule with the enzyme papain, to yield a fragment consisting of an intact light chain and a portion of a heavy chain. An "Fab' fragment" of an antibody molecule can be obtained by treating a whole antibody molecule with pepsin, followed by reduction, to yield a molecule consisting of an intact light chain and a portion of a heavy chain. Two Fab' fragments are obtained per antibody molecule treated in this manner. An "F(ab')2 fragment" of an antibody consists of a dimmer of two Fab' fragments held together by two disulfide bonds, and is obtained by treating a whole antibody with the enzyme pepsin, without subsequent reduction. An "Fv fragment" is a genetically engineered fragment containing the variable region of a light chain and the variable region of a heavy chain expressed as two chains. A "single chain antibody" (SCA) is a genetically engineered single chain molecule containing the variable region of a light chain and the variable region of a heavy chain, linked by a suitable, flexible polypeptide linker.

As used herein, "antibody variable region" refers to the portions of the light and heavy chains of antibody molecules that include amino acid sequences of complementarity determining regions (CDRs; i.e., CDR1, CDR2 and CDR3), and framework regions (FRs). VH refers to the variable region of the heavy chain. VL refers to the variable region of the light chain. According to the methods used in this invention, the amino acid positions assigned to CDRs and FRs may be defined according to Kabat (Sequences of Proteins of Immunological Interest (National Institutes of Health, Bethesda, Md., 1987 and 1991)) or Chotia and Lesk 1987 J. Mol Biol. 196:901-917). Amino acid numbering of antibodies or antigen binding fragments is also according to that of Kabat.

The term "constant region" (CR) as used herein, refers to the portion of the antibody molecule which confers effector functions. The constant regions of the subject humanized antibodies are derived from human immunoglobulins. The heavy chain constant region can be selected from any of the five isotypes: alpha, delta, epsilon, gamma or mu. Further, heavy chains of various subclasses (such as the IgG subclasses of heavy chains) are responsible for different effector functions and thus, by choosing the desired heavy chain constant region, antibodies with desired effector function can be produced. Preferred heavy chain constant regions are gamma 1 (IgG1), gamma 2 (IgG2), gamma 3 (IgG3) and gamma 4 (IgG4). Light chain constant regions can be of the kappa or lambda type, preferably of the kappa type.

"Framework regions" (hereinafter FR) are those variable domain residues other than the CDR residues. Each variable domain of a naturally-occurring antibody typically has four FRs identified as FR1, FR2, FR3 and FR4.

As used herein, the term "complementarity determining regions" (syn CDRs; i.e. CDR1, CDR2, and CDR3) refers to the amino acid residues of an antibody variable domain the presence of which are necessary for antigen binding. Each variable domain typically has three CDR regions identified as CDR1, CDR2 and CDR3. Each complementarity determining region may comprise amino acid residues from a CDR region as defined by Kabat (i.e. about residues 24-34 or 24-39 (LI)), 50-56 or 55-61 (L2) and 89-97 or 93-102 (L3) in the light chain variable domain and 31-35 or 26-35 (HI), 50-65 or 50-66 (H2) and 95-102 or 97-108 (H3) in the heavy chain variable domain; Kabat et al., Sequences of Proteins of Immunological Interest, 5th Ed. Public Health Service, National Institutes of Health, Bethesda, Md. (1991)) and/or those residues from a "hypervariable loop" i.e. about residues 26-32 (LI), 50-52 (L2) and 91-96 (L3) in the light chain variable domain and 26-32 (HI), 53-55 (H2) and 96-101 (H3) in the heavy chain variable domain; Chothia and Lesk (1987) J. Mol Biol. 196:901-917). In some instances, a complementarity determining region can include amino acids from both a CDR region defined according to Kabat and a hypervariable loop. The skilled artisan will be aware of some variation in the positioning of the FRs, e.g., as a result of mutations (e.g., deletions and/or insertions), e.g., up to 5 residues variation, or 4 residues variation, or 2 residues variation, or 1 residue variation (e.g., as exemplified antibodies herein).

The term "monoclonal antibody" as used herein refers to a preparation of antibody molecules of single molecular composition. A monoclonal antibody displays a single binding specificity and affinity for a particular epitope. The monoclonal antibodies can be generated from any animal, e.g., mouse, rat, rabbit, pig, etc., or can be generated synthetically and be in part or entirely of human sequence.

The term "chimeric antibody" refers to antibodies in which a portion of the heavy and/or light chain is identical with or homologous to corresponding sequences in antibodies derived from a particular species (e.g. murine) or belonging to a particular antibody class or subclass, while the remainder of the chain(s) is identical with or homologous to corresponding sequences in antibodies derived from another species (e.g. primate) or belonging to another antibody class or subclass, as well as fragments of such antibodies, so long as they exhibit the desired biological activity.

The term "humanized antibody" shall be understood to refer to a chimeric molecule, generally prepared using recombinant techniques, having an epitope binding site derived from an immunoglobulin from a non-human species and the remaining immunoglobulin structure of the molecule based upon the structure and/or sequence of a human immunoglobulin. The antigen-binding site preferably comprises the complementarity determining regions (CDRs) from the non-human antibody grafted onto appropriate framework regions in the variable domains of human antibodies and the remaining regions from a human antibody.

The term "human antibody" as used herein in connection with antibody molecules and binding proteins refers to antibodies having variable (e.g. VH, VL, CDR and FR regions) and constant antibody regions derived from or corresponding to sequences found in humans, e.g. in the human germline or somatic cells.

As used herein, the term "specifically binds" shall be taken to mean a binding protein or antibody reacts or associates more frequently, more rapidly, with greater duration and/or with greater affinity with a particular cell or substance than it does with alternative cells or substances. It is also understood by reading this definition that, for example, an antibody that specifically binds to a first target may or may not specifically bind to a second target. As such, "specific binding" does not necessarily require exclusive binding or non-detectable binding of another molecule, this is encompassed by the term "selective binding". Generally, but not necessarily, reference to binding means specific binding.

As used herein, the terms "cell proliferative disorder" and grammatical variations thereof, when used in reference to a cell, tissue or organ, refers to any undesirable, excessive or abnormal cell, tissue or organ growth, proliferation, differentiation or survival. Undesirable cell proliferation disorders include diseases and physiological conditions, both benign hyperplastic conditions characterized by undesirable, excessive or abnormal cell numbers, cell growth, cell proliferation, cell survival or differentiation in a subject. Specific examples of such disorders include metastatic and non-metastatic neoplasia, tumours and cancers (malignancies).

The term "identity" and grammatical variations thereof, mean that two or more referenced entities are the same. Thus, where two antibody sequences are identical, they have the same amino acid sequence, at least within the referenced region or portion. Where two nucleic acid sequences are identical, they have the same polynucleotide sequence, at least within the referenced region or portion. The identity can be over a defined area (region or domain) of the sequence. The % identity of a polynucleotide is determined by GAP (Needleman and Wunsch, J. Mol Biol. 48: 444-453.1970) analysis (GCG program) with a gap creation penalty=5, and a gap extension penalty=0.3. Unless stated otherwise, the query sequence is at least 45 nucleotides in length, and the GAP analysis aligns the two sequences over a region of at least 45 nucleotides. Preferably, the query sequence is at least 100 nucleotides in length, and the GAP analysis aligns the two sequences over a region of at least 100 nucleotides. Most preferably, the two sequences are aligned over their entire length.

The term "isolated", including DNA, RNA or protein means a polynucleotide/polypeptide which is at least partially separated from the polynucleotide/polypeptide sequences with which it is associated or linked in its native state. Preferably, the isolated polynucleotide/polypeptide is at least 60% free, preferably at least 75% free, and most preferably at least 90% free from other components with which they are naturally associated.

The term "nucleic acid" as used herein is used interchangeably with the term "polynucleotide".

The term "pharmaceutical composition", as used herein, means any composition, which contains at least one therapeutically or biologically active agent and is suitable for administration to the patient. Any of these formulations can be prepared by well-known and accepted methods of the art. See, for example, Gennaro, A. R., ed., Remington: The Science and Practice of Pharmacy, 20th Edition, Mack Publishing Co., Easton, Pa. (2000).

The phrase "pharmaceutically acceptable" is employed herein to refer to those compounds, materials, compositions, and/or dosage forms that are, within the scope of sound medical judgment, suitable for use in contact with the tissues of human beings and animals without excessive toxicity, irritation, allergic response, and/or other problem or complication, commensurate with a reasonable benefit/risk ratio.

By "subject" is meant any subject, particularly a mammalian subject, for whom diagnosis, prognosis, or therapy is desired. As used herein, the term "subject" includes any human or nonhuman animal. The term "nonhuman animal" includes all vertebrates, e.g., mammals and non-mammals, such as nonhuman primates, sheep, dogs, cats, horses, cows, bears, chickens, amphibians, reptiles, etc. and may, where appropriate, be used interchangeably with the term "patient". Preferably, the subject is a primate. Particularly, the subject is a human.

As used herein, reference to a "similar" level of binding will be understood to mean that an antibody binds to an antigen at a level within about 30% or 25% or 20% of the level at which it binds to another antigen. This term can also mean that one antibody binds to an antigen at a level within about 30% or 25% or 20% of the level at which another antibody binds to the same antigen.

As used herein, reference to "substantially the same level" of binding will be understood to mean that an antibody binds to an antigen at a level within about 15% or 10% or 5% of the level at which it binds to another antigen. This term can also mean that one antibody binds to an antigen at a level within about 5% or 4% or 3% of the level at which another antibody binds to the same antigen.

The term "competitively inhibits" shall be understood to mean that a protein of the disclosure reduces or prevents binding of a recited antibody (e.g. mAb104) produced to domain II of human HER2 or a fragment thereof. It will be apparent from the foregoing that the protein need not completely inhibit binding of the antibody, rather it need only reduce binding by a statistically significant amount, for example, by at least about 10% or 20% or 30% or 40% or 50% or 60% or 70% or 80% or 90% or 95%. Methods for determining competitive inhibition of binding are known in the art and/or described herein. For example, the antibody is exposed to HER2 or a fragment thereof either in the presence or absence of the protein. If less antibody binds in the presence of the protein than in the absence of the protein, the protein is considered to competitively inhibit binding of the antibody. In one example, the protein and antibody are exposed to HER2 substantially simultaneously. Additional methods for determining competitive inhibition of binding will be apparent to the skilled artisan and/or described herein. In one example, the antigen binding domain of the protein competitively inhibits binding of the antibody.

By "overlapping" in the context of two epitopes shall be taken to mean that two epitopes share a sufficient number of amino acid residues to permit an antibody that binds to one epitope to competitively inhibit the binding of an antibody that binds to the other epitope. For example, the epitopes share at least one or two or three or four or five or six or seven or eight or nine or ten amino acids.

As used herein, the term "does not substantially bind" shall be understood to mean that a protein, e.g., an antibody, binds to a candidate antigen at a level less than 10%, or 8% or 6% or 5% above background. The background can be the level of binding signal detected in the absence of the protein and/or in the presence of a negative control protein (e.g., an isotype control antibody) and/or the level of binding detected in the presence of a negative control antigen. The level of binding is detected using biosensor analysis (e.g. Biacore) in which the protein is immobilized and contacted with an antigen.

The term "therapeutically effective amount" shall be taken to mean a sufficient quantity of an antibody or antigen-binding fragment to reduce or inhibit one or more symptoms of a cellular proliferation disorder to a level that is below that observed and accepted as clinically characteristic of that disorder. The skilled artisan will be aware that such an amount will vary depending on the specific antibody, fragment, and/or particular subject and/or type or severity or level of disease. Accordingly, this term is not to be construed to limit the invention to a specific quantity.

As used herein, the terms "treat," "treating," "treatment" and grammatical variations thereof mean subjecting an individual patient to a protocol, regimen, process or remedy, in which it is desired to obtain a physiologic response or outcome in that patient. Since every treated patient may not respond to a particular treatment protocol, regimen, process or remedy, treating does not require that the desired physiologic response or outcome be achieved in each and every patient or patient population. Accordingly, a given patient or patient population may fail to respond or respond inadequately to treatment.

The terms "tumour," or "cancer" are used interchangeably and refer to a cell or population of cells whose growth, proliferation or survival is greater than growth, proliferation or survival of a normal counterpart cell, e.g. a cell proliferative or differentiative disorder. Typically, the growth is uncontrolled.

The terms "104 antibody" or "mAb104", and any variants not specifically listed, may be used herein interchangeably, and as used throughout the present application and claims refer to proteinaceous material including single or multiple proteins, and extends to those proteins having the amino acid sequence data described herein and the profile of activities set forth herein and in the claims. Accordingly, proteins displaying substantially equivalent or altered activity are likewise contemplated. These modifications may be deliberate, for example, such as modifications obtained through site-directed mutagenesis, or may be accidental, such as those obtained through mutations in hosts that are producers of the complex or its named subunits. Also, the terms "104 antibody", or "mAb104" are intended to include within their scope proteins specifically recited herein as well as all substantially homologous analogs and allelic variations.

DETAILED DESCRIPTION OF EMBODIMENTS

The present invention is not to be limited in scope by the specific embodiments described herein, which are intended for the purpose of exemplification only.
Antibody Generation The general methodology for making monoclonal antibodies by hybridoma is well known. Immortal, antibody-producing cell lines can also be created by techniques other than fusion, such as direct transformation of B lymphocytes with oncogenic DNA, or transfection with Epstein-Barr virus. See, e.g., M. Schreier et al., "Hybridoma Techniques" (1980); Hammerling et al., "Monoclonal Antibodies And T-cell Hybridomas" (1981); Kennett et al., "Monoclonal Antibodies" (1980); see also U.S. Pat. Nos. 4,341,761; 4,399,121; 4,427,783; 4,444,887; 4,451,570; 4,466,917; 4,472,500; 4,491,632; 4,493,890. Panels of monoclonal antibodies produced against HER2 can be screened for various properties; i.e., isotype, epitope, affinity, etc. as described herein. Of particular interest are monoclonal antibodies that bind to domain II of aberrantly expressed HER2. Such monoclonals can be readily identified in specific binding member activity assays. High affinity antibodies are also useful when immunoaffinity purification of native or recombinant specific binding member is possible. A monoclonal antibody useful in practicing the present invention can be produced by initiating a monoclonal hybridoma culture comprising a nutrient medium containing a hybridoma that secretes antibody molecules of the appropriate antigen specificity. The culture is maintained under conditions and for a time period sufficient for the hybridoma to secrete the antibody molecules into the medium. The antibody-containing medium is then collected. The antibody molecules can then be further isolated by well-known techniques.

The antibodies of the disclosure can also be produced by immunisation of an animal with a purified antigen corresponding to a cyclic peptide comprising residues 277 to 312 or residues 293 to 309 of the mature normal or wild type human HER2.

The HER2 binding protein of the disclosure may also be synthesisd by standard techniques such as solid phase peptide synthesis and/or native protein ligation.

Suitable techniques that additionally may be employed in antibody methods include affinity purification, non-denaturing gel purification, HPLC or RP-HPLC, size exclusion, purification on protein A column, or any combination of these techniques. The antibody isotype can be determined using an ELISA assay, for example, a human Ig can be identified using mouse Ig-absorbed anti-human Ig.
Recombinant Antibody Production The antibodies and antigen-binding fragments of the invention can also be produced recombinantly using techniques and materials readily obtainable to those skilled in the art.

The variable domains may be derived from any germline or rearranged human variable domain, or may be a synthetic variable domain based on consensus sequences of known human variable domains. The CDR-derived sequences of the invention, may be introduced into a repertoire of variable domains lacking CDR regions, using recombinant DNA technology. For example, Marks et al (Bio/Technology, 1992, 10:779-783) describe methods of producing repertoires of antibody variable domains in which consensus primers directed at or adjacent to the 5' end of the variable domain area are used in conjunction with consensus primers to the third framework region of human VH genes to provide a repertoire of VH variable domains lacking one or more CDR. Marks et al further describe how this repertoire may be combined with a CDR of a particular antibody. Using analogous techniques, the CDR-derived sequences of the present invention may be shuffled with repertoires of VH or VL domains lacking one or more CDR, and the shuffled complete VH or VL domains combined with a cognate VL or VH domain to provide antibodies of the invention. The repertoire may then be displayed in a suitable host system such as the phage display system of WO92/01047 so that suitable specific binding members may be selected. A repertoire may consist of from anything from $10^4$ individual members upwards, for example from $10^6$ to $10^8$ or $10^{10}$ members. Analogous shuffling or combinatorial techniques are also disclosed by Stemmer (Nature, 1994, 370:389-391), who describes the technique in relation to a β-lactamase gene but observes that the approach may be used for the generation of antibodies.

The antibodies may also be affinity matured using known selection and/or mutagenesis methods as are known in the art.

Recombinant antibodies of the invention can also be produced by phage display methodology such as that disclosed in U.S. Pat. No. 5,969,108.

Antibodies of the invention may further comprise antibody constant regions or parts thereof. For example, antibodies based on SEQ ID NOs: 3 or 5 may be attached at their C-terminal end to antibody light chain constant domains including human CK or Cλ chains. Similarly, antibodies based on SEQ ID NOs: 2 or 4 may be attached at their C-terminal end to all or part of an immunoglobulin heavy chain derived from any antibody isotype, e.g. IgG, IgA, IgE, IgD and IgM and any of the isotype subclasses, particularly IgGI, IgG2b, and IgG4.

For recombinant production, the nucleic acid encoding an antibody of the invention is preferably isolated and inserted into a replicable vector for further cloning (amplification of the DNA) or for expression. DNA encoding the antibody is readily isolated or synthesized using conventional procedures (e.g., by using oligonucleotide probes that are capable of binding specifically to DNAs encoding the heavy and light chains of the antibody). Many vectors are available. The vector components generally include, but are not limited to, one or more of the following: a signal sequence, a sequence encoding an antibody of the present invention or fragment thereof (e.g., derived from the information provided herein), an enhancer element, a promoter, and a transcription termination sequence.

(i) Signal sequence component. The antibody of this invention may be produced recombinantly not only directly, but also as a fusion polypeptide with a heterologous polypeptide, which is preferably a signal sequence or other polypeptide having a specific cleavage site at the N-terminus of the mature protein or polypeptide. The heterologous signal sequence selected preferably is one that is recognized and processed (i.e., cleaved by a signal peptidase) by the host cell. For prokaryotic host cells that do not recognize and process the native antibody signal sequence, the signal sequence is substituted by a prokaryotic signal sequence selected, for example, from the group of the alkaline phosphatase, penicillinase, Ipp, or heat-stable enterotoxin II leaders. For yeast secretion the native signal sequence may be substituted by, e.g., the yeast invertase leader, a factor leader, or acid phosphatase leader, the *C. albicans* glucoamylase leader, or the signal described in WO 90/13646. In mammalian cell expression, mammalian signal sequences as well as viral secretory leaders, for example, the herpes simplex gD signal, are available. The DNA for such precursor region is ligated in reading frame to DNA encoding the antibody.

(ii) Promoter component. Expression and cloning vectors usually contain a promoter that is recognized by the host organism and is operably linked to the antibody nucleic acid. Promoters suitable for use with prokaryotic hosts include the phoA promoter, β-lactamase and lactose promoter systems, alkaline phosphatase, a tryptophan (trp) promoter system, and hybrid promoters such as the tac promoter. However, other known bacterial promoters are suitable. Promoters for use in bacterial systems also will contain a Shine-Dalgarno (S. D.) sequence operably linked to the DNA encoding the antibody.

Promoters are known for eukaryotes. Virtually all eukaryotic genes have an AT-rich region located approximately 25 to 30 bases upstream from the site where transcription is initiated. Another sequence found 70 to 80 bases upstream from the start of transcription of many genes is a CNCAAT region where N may be any nucleotide. At the 3' end of most eukaryotic genes is an AATAAA sequence that may be the signal for addition of the poly A tail to the 3' end of the coding sequence. All of these sequences are suitably inserted into eukaryotic expression vectors. Examples of suitable promoting sequences for use with yeast hosts include the promoters for 3-phosphoglycerate kinase or other glycolytic enzymes, such as enolase, glyceraldehyde-3-phosphate dehydrogenase, hexokinase, pyruvate decarboxylase, phosphofructokinase, glucose-6-phosphate isomerase, 3-phosphoglycerate mutase, pyruvate kinase, triosephosphate isomerase, phosphoglucose isomerase, and glucokinase. Other yeast promoters, which are inducible promoters having the additional advantage of transcription controlled by growth conditions, are the promoter regions for alcohol dehydrogenase 2, isocytochrome C, acid phosphatase, degradative enzymes associated with nitrogen metabolism, metallothionein, glyceraldehyde-3-phosphate dehydrogenase, and enzymes responsible for maltose and galactose utilization. Suitable vectors and promoters for use in yeast expression are further described in EP 73,657. Yeast enhancers also are advantageously used with yeast promoters.

Antibody transcription from vectors in mammalian host cells is controlled, for example, by promoters obtained from the genomes of viruses such as polyoma virus, fowlpox virus, adenovirus (such as Adenovirus 2). CMV, bovine papilloma virus, avian sarcoma virus, cytomegalovirus, a retrovirus, hepatitis-B virus and most preferably Simian Virus 40 (SV40), from heterologous mammalian promoters, e.g., the actin promoter or an immunoglobulin promoter, from heat-shock promoters, provided such promoters are compatible with the host cell systems.

(iii) Enhancer element component. Transcription of a DNA encoding the antibody of this invention by higher eukaryotes is often increased by inserting an enhancer sequence into the vector. Many enhancer sequences are now known from mammalian genes (globin, elastase, albumin, α-fetoprotein, and insulin). Typically, however, one will use an enhancer from a eukaryotic cell virus. Examples include the SV40 enhancer on the late side of the replication origin (bp 100-270), the cytomegalovirus early promoter enhancer, the polyoma enhancer on the late side of the replication origin, and adenovirus enhancers. See also Yaniv (1982) Nature 297: 17-18 on enhancing elements for activation of eukaryotic promoters. The enhancer may be spliced into the vector at a position 5' or 3' to the antibody-encoding sequence, but is preferably located at a site 5' from the promoter.

(iv) Transcription termination component. Expression vectors used in eukaryotic host cells (yeast, fungi, insect, plant, animal, human, or nucleated cells from other multicellular organisms) will also contain sequences necessary for the termination of transcription and for stabilizing the mRNA. Such sequences are commonly available from the 5' and, occasionally 3', untranslated regions of eukaryotic or viral DNAs or cDNAs. These regions contain nucleotide segments transcribed as polyadenylated fragments in the untranslated portion of the mRNA encoding the antibody. One useful transcription termination component is the bovine growth hormone polyadenylation region. See WO94/1 1026 and the expression vector disclosed therein.

(v) Selection and transformation of host cells. Suitable host cells for cloning or expressing the DNA in the vectors herein are the prokaryote, yeast, or higher eukaryote cells described above. Suitable prokaryotes for this purpose include eubacteria, such as Gram-negative or Gram-positive organisms, for example, Enterobacteriaceae such as *Escherichia*, e.g., *E. coli, Enterobacter, Erwinia, Klebsiella, Proteus, Salmonella*, e.g., *Salmonella typhimurium, Serratia*, e.g., *Serratia marcescans*, and *Shigella*, as well as Bacilli such as *B. subtilis* and *B. licheniformis, Pseudomonas* such as *P. aeruginosa*, and *Streptomyces*. One preferred *E. coli* cloning host is *E. coli* 294 (ATCC 31,446), although other strains such as *E. coli* B, *E. coli* X 1776 (ATCC 31,537), and *E. coli* W3110 (ATCC 27,325) are suitable. These examples are illustrative rather than limiting.

In addition to prokaryotes, eukaryotic microbes such as filamentous fungi or yeast are suitable cloning or expression hosts for antibody-encoding vectors. *Saccharomyces cerevisiae*, or common baker's yeast, is the most commonly used among lower eukaryotic host microorganisms. However, a number of other genera, species, and strains are commonly available and useful herein, such as *Schizosaccharomyces pombe; Kluyveromyces* hosts such as, e.g., *K. lactis, K. fragilis* (ATCC 12,424), *K. bulgaricus* (ATCC 16,045), *K. wickeramii* (ATCC 24,178), *K. waltii* (ATCC 56,500), *K. drosophilarum* (ATCC 36,906), *K. thermotolerans*, and *K. marxianus; yarrowia* (EP 402,226); *Pichia pastoris* (EP 183,070); *Candida; Trichoderma reesia* (EP 244,234); *Neurospora crassa; Schwanniomyces* such as *Schwanniomyces occidentalis*; and filamentous fungi such as, e.g., *Neurospora, Penicillium, Tolypocladium*, and *Aspergillus* hosts such as *A. nidulans* and *A. niger*.

Suitable host cells for the expression of glycosylated antibody are derived from multicellular organisms. Examples of invertebrate cells include plant and insect cells. Numerous baculoviral strains and variants and corresponding permissive insect host cells from hosts such as *Spodoptera frugiperda* (caterpillar), *Aedes aegypti* (mosquito), *Aedes albopictus* (mosquito), *Drosophila melanogaster* (fruitfly), and *Bombyx mori* have been identified. A variety of viral strains for transfection are publicly available, e.g., the L-I variant of *Autographa californica* NPV and the Bm-5 strain of *Bombyx mori* NPV, and such viruses may be used as the virus herein according to the present invention, particularly for transfection of *Spodoptera frugiperda* cells.

Examples of useful mammalian host cell lines are monkey kidney CVI line transformed by SV40 (COS-7, ATCC CRL 1651); human embryonic kidney line (293 or 293 cells subcloned for growth in suspension culture, Graham et al. (1977) Gen Virol. 36:59); baby hamster kidney cells (BHK, ATCC CCL 10); Chinese hamster ovary cells (CHO, Urlaub et al. (1980) Proc. Natl. Acad. Sci USA 77:4216); mouse Sertoli cells (TM4, Mather (1980) Biol. Reprod. 23:243-251); monkey kidney cells (CVI ATCC CCL 70); African green monkey kidney cells (VERO-76, ATCC CRL-1587); human cervical carcinoma cells (HELA, ATCC CCL 2); canine kidney cells (MDCK, ATCC CCL 34); buffalo rat liver cells (BRL 3A, ATCC CRL 1442); human lung cells (W138, ATCC CCL 75); human liver cells (Hep G2, HB 8065); mouse mammary tumour (MMT 060562, ATCC CCL51); TRI cells (Mather et al. (1982) Annals N. Y. Acad. Sci. 383:44-68); MRC 5 cells; FS4 cells; and PER.C6™ (Crucell N V).

Functionally Equivalent Antibodies

The present disclosure also contemplates antibodies or antigen-binding fragments thereof with one or more amino acid additions, deletions, or substitutions of the heavy and light chain variable region sequences of the antibodies of the invention but still retain the function of an antibody of the invention. These modifications may be deliberate, such as, for example through site-directed mutagenesis, or may be accidental such as those obtained through mutations in hosts that express the antibody.

Mutant (altered) polypeptides can be prepared using any technique known in the art. For example, a polynucleotide of the invention can be subjected to in vitro mutagenesis. Such in vitro mutagenesis techniques include sub-cloning the polynucleotide into a suitable vector, transforming the vector into a "mutator" strain such as the *E. coli* XL-1 red (Stratagene) and propagating the transformed bacteria for a suitable number of generations. Products derived from mutated/altered DNA can readily be screened using techniques described herein to determine if they have receptor-binding and/or -inhibitory activity.

In designing amino acid sequence mutants, the location of the mutation site and the nature of the mutation will depend on characteristic(s) to be modified. The sites for mutation can be modified individually or in series, e.g., by (1) substituting first with conservative amino acid choices and then with more radical selections depending upon the results achieved, (2) deleting the target residue, or (3) inserting other residues adjacent to the located site.

Amino acid sequence deletions generally range from about 1 to 15 residues, more preferably about 1 to 10 residues and typically about 1 to 5 contiguous residues.

Substitution mutants have at least one amino acid residue in the antibody and/or immunoglobulin chain molecule, including in the variable region, removed and a different residue inserted in its place. The sites of greatest interest for substitutional mutagenesis include sites identified as important for antigen binding. These sites, especially those falling within a sequence of at least three other identically conserved sites of human antibodies and/or immunoglobulin chains, are preferably substituted in a relatively conservative manner. Such conservative substitutions are shown in the table below under the heading of "exemplary substitutions".

Conservative amino acid substitutions are also contemplated by the present invention. These are taken to mean amino acid substitutions set forth in the following Table.

Exemplary Substitutions

| Original Residue | Exemplary Substitutions |
| --- | --- |
| Ala (A) | val; leu; ile; gly |
| Arg (R) | lys |
| Asn (N) | gln; his |
| Asp (D) | glu |
| Cys (C) | ser |
| Gln (Q) | asn; his |
| Glu (E) | asp |
| Gly (G) | pro, ala |
| His (H) | asn; gln |
| Ile (I) | leu; val; ala |
| Leu (L) | ile; val; met; ala; phe |
| Lys (K) | arg |
| Met (M) | leu; phe |

| Original Residue | Exemplary Substitutions |
| --- | --- |
| Phe (F) | leu; val; ala |
| Pro (P) | gly |
| Ser (S) | thr |
| Thr (T) | ser |
| Trp (W) | tyr |
| Tyr (Y) | trp; phe |
| Val (V) | ile; leu; met; phe; ala |

The amino acids described herein are preferably in the "L" isomeric form. However, residues in the D isomeric form can be substituted for any L-amino acid residue, as long as the desired functional property of immunoglobulin binding is retained by the polypeptide. Modifications also include structural and functional analogues, for example, peptidomimetics having synthetic or non-natural amino acids or amino acid analogues and derivatized forms.

Chimeric Antibodies

Chimeric antibodies are made by recombinant means by combining the variable light and heavy chain regions (VL and VH), obtained from antibody producing cells of one species with the constant light and heavy chain regions from another. Typically chimeric antibodies utilize rodent or rabbit variable regions and human constant regions, in order to produce an antibody with predominantly human domains. For example, a chimeric antibody comprises a variable region from a mouse antibody as described herein according to any embodiment fused to a human constant region. The production of such chimeric antibodies is known in the art, and may be achieved by standard means (as described, e.g., in Morrison, Science 229:1202 (1985); Oi et al, BioTechniques 4:214 (1986); Gillies et al, (1989) J. Immunol. Methods 125:191-202; U.S. Pat. Nos. 5,807,715; 4,816,567 and 4,816,397). It is further contemplated that the human constant regions of chimeric antibodies of the invention may be selected from IgGl, IgG2, IgG3, IgG4, IgG5, IgG6, IgG7, IgG8, IgG9, IgG10, IgG11, IgG12, IgG13, IgG14, IgG15, IgG16, IgG17, IgG18 or IgG19 constant regions.

Humanized and Human Antibodies

The antibodies of the present disclosure may be humanized antibodies or human antibodies. Humanized forms of non-human (e.g., murine) antibodies are chimeric immunoglobulins, immunoglobulin chains or fragments thereof (such as Fv, Fab, Fab', F(ab')$_2$ or other antigen-binding subsequences of antibodies) which contain minimal sequence derived from non-human immunoglobulin. Humanized antibodies include human immunoglobulins (recipient antibody) in which residues from a complementary determining region (CDR) of the recipient are replaced by residues from a CDR of a non-human species (donor antibody) such as mouse, rat or rabbit having the desired specificity, affinity and capacity. In some instances, Fv framework residues of the human immunoglobulin are replaced by corresponding non-human residues. Humanized antibodies may also comprise residues which are found neither in the recipient antibody nor in the imported CDR or framework sequences. In general, the humanized antibody will comprise substantially all of at least one, and typically two, variable domains, in which all or substantially all of the CDR regions correspond to those of a non-human immunoglobulin and all or substantially all of the FR regions are those of a human immunoglobulin consensus sequence. The humanized antibody optimally also will comprise at least a portion of an immunoglobulin constant region (Fc), typically that of a human immunoglobulin (Jones et al. (1986) Nature, 321:522-525; Riechmann et al. (1988) Nature, 332: 323-329; and Presta (1992) Curr Op Struct Biol, 2:593-59).

Methods for humanizing non-human antibodies are known in the art. Generally, a humanized antibody has one or more amino acid residues introduced into it from a source which is non-human. These non-human amino acid residues are often referred to as "import" residues, which are typically taken from an "import" variable domain. Humanization can be essentially performed following the method of Jones et al. supra; Riechmann et al. supra; Verhoeyen et al. (1988) Science, 239:1534-1536), by substituting rodent CDRs or CDR sequences for the corresponding sequences of a human antibody. Accordingly, such "humanized" antibodies are chimeric antibodies (U.S. Pat. No. 4,816,567), wherein substantially less than an intact human variable domain has been substituted by the corresponding sequence from a non-human species. In practice, humanized antibodies are typically human antibodies in which some CDR residues and possibly some FR residues are substituted by residues from analogous sites in rodent antibodies.

Human antibodies can also be produced using various techniques known in the art, including phage display libraries (Hoogenboom and Winter (1991) J Mol Biol, 227:381; Marks et al. (1991) J Mol Biol, 222:581). The techniques of Cole et al. and Boerner et al. are also suitable for the preparation of human monoclonal antibodies (Cole et al., Monoclonal Antibodies and Cancer Therapy, Alan R. Liss, p. 77 (1985) and Boerner et al. (1991) J Immunol, 147:86-95). Similarly, human antibodies can be made by introducing of human immunoglobulin loci into transgenic animals, e.g., mice in which the endogenous immunoglobulin genes have been partially or completely inactivated. Upon challenge, human antibody production is observed, which closely resembles that seen in humans in all respects, including gene rearrangement, assembly, and antibody repertoire. This approach is described, for example, in U.S. Pat. Nos. 5,545,807; 5,545,806; 5,569,825; 5,625,126; 5,633, 425; 5,661,016.

Completely human antibodies which recognize a selected epitope can also be generated using a technique referred to as "guided selection." In this approach a selected non-human monoclonal antibody, e.g., a mouse antibody, is used to guide the selection of a completely human antibody recognizing the same epitope (Jespers et al, Bio/technology 12:899-903 (1988)).

The antibodies may also be affinity matured using known selection and/or mutagenesis methods as are known in the art. Preferred affinity matured antibodies have an affinity which is five times, more preferably 10 times, even more preferably 20 or 30 times greater than the starting antibody (generally murine, humanized or human) from which the matured antibody is prepared.

Synhumanized and Primatized Proteins

The HER2 binding proteins of the present disclosure may be synhumanized proteins. The term "synhumanized protein" refers to a protein prepared by a method described in WO2007/019620. A synhumanized HER2 binding protein includes a variable region of an antibody, wherein the variable region comprises FRs from a New World primate antibody variable region and CDRs from a non-New World primate antibody variable region. For example, a synhumanized HER2 binding protein includes a variable region of an antibody, wherein the variable region comprises FWRs from a New World primate antibody variable region and CDRs from a mouse antibody, e.g., as described herein. In one example, the synhumanized HER2 binding protein is an HER2 binding antibody in which one or both of the variable regions are synhumanized.

The HER2 binding proteins of the present disclosure may be primatized proteins. A "primatized protein" comprises variable region(s) from an antibody generated following immunization of a non-human primate (e.g., a cynomolgus macaque). Optionally, the variable regions of the non-human primate antibody are linked to human constant regions to produce a primatized antibody. Exemplary methods for producing primatized antibodies are described in U.S. Pat. No. 6,113,898.

De-Immunized Antibodies and Proteins

The present disclosure also contemplates a de-immunized antibody or HER2 binding protein. De-immunized antibodies have one or more epitopes, e.g., B cell epitopes or T cell epitopes removed (i.e., mutated) to thereby reduce the likelihood that a subject will raise an immune response against the antibody or protein. Methods for producing de-immunized antibodies and proteins are known in the art and described, for example, in WO 00/34317, WO 2004/108158 and WO 2004/064724.

Methods for introducing suitable mutations and expressing and assaying the resulting protein will be apparent to the skilled artisan based on the description herein.

Antibody Variable Region Containing Proteins.

Single-Domain Antibodies

In some examples, a HER2 binding protein of the disclosure is a single-domain antibody (which is used interchangeably with the term "domain antibody" or "dAb"). A single-domain antibody is a single polypeptide chain comprising all or a portion of the heavy chain variable region of an antibody. In certain example, a single-domain antibody is a human single-domain antibody (Domantis, Inc., Waltham, MA; see, e.g., U.S. Pat. No. 6,248,516; WO90/05144 and/or WO2004/058820).

Diabodies, Triabodies, Tetrabodies

Exemplary HER2 binding proteins comprising an antibody antigen binding domain are diabodies, triabodies, tetrabodies and higher order protein complexes such as those described in WO98/044001 and WO94/007921.

For example, a diabody is a protein comprising two associated polypeptide chains, each polypeptide chain comprising the structure VL-X-VH or VH-X-VL, wherein VL is an antibody light chain variable region, VH is an antibody heavy chain variable region, X is a linker comprising insufficient residues to permit the VH and VL in a single polypeptide chain to associate (or form an Fv) or is absent, and wherein the VH of one polypeptide chain binds to a VL of the other polypeptide chain to form an antigen binding site, i.e., to form an Fv molecule capable of specifically binding to one or more antigens. The VL and VH can be the same in each polypeptide chain or the VL and VH can be different in each polypeptide chain so as to form a bispecific diabody (i.e., comprising two Fvs having different specificity).

Single Chain Fv (scFv) Fragments

The skilled artisan will be aware that scFvs comprise VH and VL regions in a single polypeptide chain. The polypeptide chain further comprises a polypeptide linker between the VH and VL which enables the scFv to form the desired structure for antigen binding (i.e., for the VH and VL of the single polypeptide chain to associate with one another to form a Fv). For example, the linker comprises in excess of 12 amino acid residues with (Gly$_4$Ser)$_3$ being one of the more favoured linkers for a scFv.

The present disclosure also contemplates a disulfide stabilized Fv (or diFv or dsFv), in which a single cysteine residue is introduced into a FR of VH and a FR of VL and the cysteine residues linked by a disulfide bond to yield a stable Fv (see, for example, Brinkmann et at, (1993) Proc Natl Acad Sci USA 90:547-551).

Alternatively, or in addition, the present disclosure provides a dimeric scFv, i.e., a protein comprising two scFv molecules linked by a non-covalent or covalent linkage, e.g., by a leucine zipper domain (e.g., derived from Fos or Jun) (see, for example, Kruif and Logtenberg, 1996). Alternatively, two scFvs are linked by a peptide linker of sufficient length to permit both scFvs to form and to bind to an antigen, e.g., as described in US20060263367.

For a review of scFv, see Ahmad Z A et al., (2012) Clinical and Developmental Immunology doi:10.1155/2012/980250.

Minibodies

The skilled artisan will be aware that a minibody comprises the VH and VL domains of an antibody fused to the (CH2 and/or (CH3 domain of an antibody. Optionally, the minibody comprises a hinge region between the VH and a VL, sometimes this conformation is referred to as a Flex Minibody. A minibody does not comprise a CH1 or a CL. In one example, the VH and VL domains are fused to the hinge region and the CH3 domain of an antibody. At least one of the variable regions of said minibody binds to HER2 in the manner of the disclosure. Exemplary minibodies and methods for their production are described, for example, in WO94/09817.

Other Antibody Variable Region Containing Proteins

The present disclosure also contemplates other variable region containing HER2 binding proteins, such as:
(i) "key and hole" bispecific proteins as described in U.S. Pat. No. 5,731,168;
(ii) heteroconjugate proteins, e.g., as described in U.S. Pat. No. 4,676,980;
(iii) heteroconjugate proteins produced using a chemical cross-linker, e.g., as described in U.S. Pat. No. 4,676,980;
(iv) Fab'-SH fragments, e.g., as described in Shalaby (1992) j Exp Med 1; 175(1):217-25;
(v) single chain Fab; or
(vi) Fab3 (e.g., as described in EP 19930302894).

Non-Antibody Based Antigen Binding Domain Containing Proteins

Immunoglobulins and Immunoglobulin Fragments

An example of a compound of the present disclosure is a protein comprising a variable region of an immunoglobulin, such as a T cell receptor or a heavy chain immunoglobulin (e.g., an IgNA, a camelid antibody).

The term "immunoglobulin" will be understood to include any antigen binding protein comprising an immunoglobulin domain. Exemplary immunoglobulins are antibodies. Additional proteins encompassed by the term "immunoglobulin" include domain antibodies, camelid antibodies and antibodies from cartilaginous fish (i.e., immunoglobulin new antigen receptors (IgNARs)). Generally, camelid antibodies and IgNARs comprise a VH, however lack a VL and are often referred to as heavy chain immunoglobulins. Other "immunoglobulins" include T cell receptors.

Heavy Chain Immunoglobulins

Heavy chain immunoglobulins differ structurally from many other forms of immunoglobulin (e.g., antibodies), in so far as they comprise a heavy chain, but do not comprise a light chain. Accordingly, these immunoglobulins are also referred to as "heavy chain only antibodies". Heavy chain immunoglobulins are found in, for example, camelids and cartilaginous fish (also called IgNAR).

The variable regions present in naturally occurring heavy chain immunoglobulins are generally referred to as "VHH domains" in camelid Ig and V-NAR in IgNAR, in order to distinguish them from the heavy chain variable regions that are present in conventional 4-chain antibodies (which are referred to as "VH domains") and from the light chain variable regions that are present in conventional 4-chain antibodies (which are referred to as "VL domains").

Heavy chain immunoglobulins do not require the presence of light chains to bind with high affinity and with high specificity to a relevant antigen. This means that single domain binding fragments can be derived from heavy chain immunoglobulins, which are easy to express and are generally stable and soluble. A general description of heavy chain immunoglobulins from camelids and the variable regions thereof and methods for their production and/or isolation and/or use is found inter alia in the following references WO94/04678, WO97/49805 and WO 97/49805.

A general description of heavy chain immunoglobulins from cartilaginous fish and the variable regions thereof and methods for their production and/or isolation and/or use is found inter alia in WO2005/118629.

V-Like Proteins

An example of a HER2 binding protein of the disclosure is a T-cell receptor. T cell receptors have two V-domains that combine into a structure similar to the Fv module of an antibody. Novotny et al, Proc Natl Acad Sci USA 88: 8646-8650, 1991 describes how the two V-domains of the T-cell receptor (termed alpha and beta) can be fused and expressed as a single chain polypeptide and, further, how to alter surface residues to reduce the hydrophobicity directly analogous to an antibody scFv. Other publications describing production of single-chain T-cell receptors or multimeric T cell receptors comprising two V-alpha and V-beta domains include WO1999/045110 or WO2011/107595.

Other non-antibody proteins comprising antigen binding domains include proteins with V-like domains, which are generally monomeric. Examples of proteins comprising such V-like domains include CTLA-4, CD28 and ICOS. Further disclosure of proteins comprising such V-like domains is included in WO1999/045110.

Adnectins

In one example, a HER2 binding protein of the disclosure is an adnectin.

Adnectins are based on the tenth fibronectin type III (10Fn3) domain of human fibronectin in which the loop regions are altered to confer antigen binding. For example, three loops at one end of the β-sandwich of the 10Fn3 domain can be engineered to enable an Adnectin to specifically recognize an antigen. For further details see US20080139791 or WO2005/056764.

Anticalins

In a further example, a HER2 binding protein of the disclosure is an anticalin. Anticalins are derived from lipocalins, which are a family of extracellular proteins which transport small hydrophobic molecules such as steroids, bilins, retinoids and lipids. Lipocalins have a rigid β-sheet secondary structure with a plurality of loops at the open end of the conical structure which can be engineered to bind to an antigen. Such engineered lipocalins are known as anticalins. For further description of anticalins see U.S. Pat. No. 7,250,297B1 or US20070224633.

Affibodies

In a further example, a HER2 binding protein of the disclosure is an affibody. An affibody is a scaffold derived from the Z domain (antigen binding domain) of Protein A of *Staphylococcus aureus* which can be engineered to bind to antigen. The Z domain consists of a three-helical bundle of approximately 58 amino acids. Libraries have been generated by randomization of surface residues. For further details see EP 1641818.

Avimers

In a further example, a HER2 binding protein of the disclosure is an Avimer. Avimers are multidomain proteins derived from the A-domain scaffold family. The native domains of approximately 35 amino acids adopt a defined disulphide bonded structure. Diversity is generated by shuffling of the natural variation exhibited by the family of A-domains. For further details see WO2002088171.

DARPins

In a further example, a HER2 binding protein of the disclosure is a Designed Ankyrin Repeat Protein (DARPin). DARPins are derived from Ankyrin which is a family of proteins that mediate attachment of integral membrane proteins to the cytoskeleton. A single ankyrin repeat is a 33 residue motif consisting of two a-helices and a β-turn. They can be engineered to bind different target antigens by randomizing residues in the first a-helix and a β-turn of each repeat. Their binding interface can be increased by increasing the number of modules (a method of affinity maturation). For further details see US20040132028.

Other Non-Antibody Polypeptides

Other non-antibody proteins comprising binding domains include those based on human γ-crystallin and human ubiquitin (affilins), kunitz type domains of human protease inhibitors, PDZ-domains of the Ras-binding protein AF-6, scorpion toxins (charybdotoxin), C-type lectin domain (tetranectins).

Constant Regions

The present disclosure encompasses HER2 binding proteins comprising a variable region and a constant region or a domain(s) thereof, e.g., Fc, CH2 and/or CH3 domain. The skilled artisan will be aware of the meaning of the terms constant region and constant domain based on the disclosure herein and references discussed herein.

Constant region sequences useful for producing the HER2 binding proteins of the present disclosure may be obtained from a number of different sources. In some examples, the constant region or portion thereof of the HER2 binding protein is derived from a human antibody. Moreover, the constant domain or portion thereof may be derived from any antibody class, including IgM, IgG, IgD, IgA and IgE, and any antibody isotype, including IgG1, IgG2, IgG3 and IgG4. In one example, the human isotype IgG1 is used.

A variety of constant region gene sequences are available in the form of publicly accessible deposits or the sequence thereof is available from publicly available databases. Constant regions can be selected having a particular effector function (or lacking a particular effector function) or with a particular modification to reduce immunogenicity.

In one example, a protein of the present disclosure has or displays an effector function that facilitates or enables at least partial depletion, substantial depletion or elimination of cells expressing HER2. Such an effector function may be enhanced binding affinity to Fc receptors, antibody-dependent cell-mediated cytotoxicity (ADCC), antibody-dependent cell mediated phagocytosis (ADCP) and/or complement dependent cytotoxicity (CDC).

In one example, the HER2 binding protein is capable of inducing an enhanced level of effector function.

In one example, the level of effector function induced by the constant region is enhanced relative to a wild-type Fc region of an IgGI antibody or a wild-type Fc region of an IgG3 antibody.

In another example, the constant region is modified to increase the level of effector function it is capable of inducing compared to the constant region without the modification. Such modifications can be at the amino acid level and/or the secondary structural level and/or the tertiary structural level and/or to the glycosylation of the Fc region.

The skilled addressee will appreciate that greater effector function may be manifested in any of a number of ways, for example as a greater level of effect, a more sustained effect or a faster rate of effect. Exemplary constant region modifications include amino acid substitutions, such as, S239D/1332E, numbered according to the EU index of Kabat or S239D/A330L/1332E, numbered according to the EU index of Kabat.

Additional amino acid substitutions that increase ability of an Fc region to induce effector function are known in the art and/or described, for example, in U.S. Pat. No. 6,737,056 or 7,317,091.

In one example, the glycosylation of the constant region is altered to increase its ability to induce enhanced effector function. In some examples, Fc regions according to the present disclosure comprise a carbohydrate structure that lacks fucose attached (directly or indirectly) to an Fc region, i.e., the Fc region is "afucosylated". Such variants may have an improved ability to induce ADCC. Methods for producing afucosylated antibodies include, expressing the HER2-binding protein in a cell line incapable of expressing a-I,6-fucosyltransferase (FUT8) (e.g., as described in Yumane-Ohnuki et ah, 2004). Other methods include the use of cell lines which inherently produce antibodies capable of inducing enhanced effector function (e.g. duck embryonic derived stem cells for the production of viral vaccines, WO2008/129058; Recombinant protein production in avian EBX® cells, WO 2008/142124).

HER2 binding proteins can also comprise an Fc region capable of inducing enhanced levels of CDC. For example, hybrids of IgG1 and IgG3 produce antibodies having enhanced CDC activity (Natsume et at, 2008).

Methods for determining the ability of an antibody or antigen binding fragment thereof to induce effector function and known in the art and/or described herein.

In another example, the protein comprises one or more amino acid substitutions that increase the half-life of the HER2 binding protein. For example, the HER2 binding protein comprises a constant region comprising one or more amino acid substitutions that increase the affinity of the constant region for the neonatal Fc region (FcRn). For example, the constant region has increased affinity for FcRn at lower pH, e.g., about pH 6.0, to facilitate Fc/FcRn binding in an endosome. In one example, the constant region has increased affinity for FcRn at about pH 6 compared to its affinity at about pH 7.4, which facilitates the re-release of Fc into blood following cellular recycling. These amino acid substitutions are useful for extending the half-life of a protein, by reducing clearance from the blood.

Exemplary amino acid substitutions include T250Q and/or M428L or T252A, T254S and T266F or M252Y, S254T and T256E or H433K and N434F according to the EU numbering system. Additional or alternative amino acid substitutions are described, for example, in US20070135620 or U.S. Pat. No. 7,083,784.

HER2 binding proteins of the present disclosure can comprise an IgG4 constant region or a stabilized IgG4 constant region. The term "stabilized IgG4 constant region" will be understood to mean an IgG4 constant region that has been modified to reduce Fab arm exchange or the propensity to undergo Fab arm exchange or formation of a half-antibody or a propensity to form a half antibody. "Fab arm exchange" refers to a type of protein modification for human IgG4, in which an IgG4 heavy chain and attached light chain (half-molecule) is swapped for a heavy-light chain pair from another IgG4 molecule. Thus, IgG4 molecules may acquire two distinct Fab arms recognizing two distinct antigens (resulting in bispecific molecules). Fab arm exchange occurs naturally in vivo and can be induced in vitro by purified blood cells or reducing agents such as reduced glutathione. A "half antibody" forms when an IgG4 antibody dissociates to form two molecules each containing a single heavy chain and a single light chain.

In one example, a stabilized IgG4 constant region comprises a proline at position 241 of the hinge region according to the system of Kabat. This position corresponds to position 228 of the hinge region according to the EU numbering system. In human IgG4, this residue is generally a serine. Following substitution of the serine for proline, the IgG4 hinge region comprises a sequence CPPC. In this regard, the skilled person will be aware that the "hinge region" is a proline-rich portion of an antibody heavy chain constant region that links the Fc and Fab regions that confers mobility on the two Fab arms of an antibody. The hinge region includes cysteine residues which are involved in inter-heavy chain disulfide bonds. It is generally defined as stretching from Glu226 to Pro243 of human IgG11 according to the numbering system of Kabat. Hinge regions of other IgG isotypes may be aligned with the IgG11 sequence by placing the first and last cysteine residues forming inter-heavy chain disulphide (S—S) bonds in the same positions (see for example WO2010/080538).

Modified Proteins

The present disclosure provides a HER2 binding protein having at least 80% identity to a sequence of the disclosure and having the same functional characteristics described or claimed herein.

In one example, a HER2 binding protein of the disclosure comprises a sequence having at least 90% or 91% or 92% or 93% or 94% or 95% or 96% or 97% or 98% or 99% identity to a VL sequence disclosed herein, for example, SEQ ID NO:3.

In another example, a HER2 binding protein of the disclosure comprises a sequence having at least 90% or 91% or 92% or 93% or 94% or 95% or 96% or 97% or 98% or 99% identity to a VH of the disclosure described herein, for example, SEQ ID NO:2.

The present disclosure also provides a nucleic acid encoding the foregoing proteins or nucleic acids that hybridize thereto under moderate to high stringency conditions.

The present disclosure also encompasses nucleic acids encoding a protein comprising a sequence set forth in SEQ ID NO:2 and SEQ ID NO:3, which differs from a sequence exemplified herein as a result of degeneracy of the genetic code.

The present disclosure also encompasses nucleic acids encoding a protein comprising a sequence set forth in SEQ ID NO:4 and SEQ ID NO:5, which differs from a sequence exemplified herein as a result of degeneracy of the genetic code.

The % identity of a nucleic acid or polypeptide is determined by GAP (Needleman and Wunsch. 1970) analysis (GCG program) with a gap creation penalty=5, and a gap extension penalty=0.3. The query sequence is preferably at least 50 residues in length, and the GAP analysis aligns the two sequences over a region of at least 50 residues. For example, the query sequence is at least 100 residues in length and the GAP analysis aligns the two sequences over a region of at least 100 residues. In one example, the two sequences are aligned over their entire length.

Modified Glycosylation

The glycosylation pattern of an antibody may be altered from the original glycosylation pattern of the reference antibody. By altering is meant deleting one or more carbohydrate moieties found in the antibody, and/or adding one or more glycosylation sites that are not present in the antibody, and/or adding one or more carbohydrate moieties to the original glycosylation pattern of the reference antibody. Glycosylation of antibodies is typically either N-linked or O-linked. N-linked refers to the attachment of the carbohydrate moiety to the side chain of an asparagine residue. The tripeptide sequences asparagine-X-serine and asparagine-X-threonine, where X is any amino acid except proline, are the recognition sequences for enzymatic attachment of the carbohydrate moiety to the asparagine side chain. Thus, the presence of either of these tripeptide sequences in a polypeptide creates a potential glycosylation site. O-linked glycosylation refers to the attachment of one of the sugars N-aceylgalactosamine, galactose, or xylose to a hydroxyamino acid, most commonly serine or threonine, although 5-hydroxyproline or 5-hydroxylysine may also be used. Addition of glycosylation sites to the antibody is conveniently accomplished by altering the amino acid sequence such that it contains one or more of the above-described tripeptide sequences (for N-linked glycosylation sites). The alteration may also be made by the addition of, or substitution by, one or more serine or threonine residues to the sequence of the original antibody (for 0-linked glycosylation sites).

Modified glycoforms of antibodies of the present disclosure may be useful for a variety of purposes, including but not limited to enhancing or reducing effector function and/or modifying half-life of the antibody (see, for example, WO/2007/010401). Such alterations may result in a decrease or increase of Clq binding and CDC or of FcγR binding and ADCC. Substitutions can, for example, be made in one or more of the amino acid residues of the heavy chain constant region, thereby causing an alteration in an effector function while retaining the ability to bind to the antigen as compared with the modified antibody, cf. U.S. Pat. Nos. 5,624,821 and 5,648,260. Engineered glycoforms may be generated by any method known to one skilled in the art, for example by using engineered or variant expression strains, by co-expression with one or more enzymes, for example β(I,4)-N-acetylglucosaminyltransferase III (GnTII 1), by expressing an antibody or fragment thereof in various organisms or cell lines from various organisms, or by modifying carbohydrate(s) after the antibody or fragment has been expressed. Methods for generating engineered glycoforms are known in the art, and include but are not limited to those described in Umana et al, 1999, Nat. Biotechnol 17:176-180; Davies et al., 2007 Biotechnol Bioeng 74:288-294; Shields et al, 2002, J Biol Chem 277:26733-26740; Shinkawa et al., 2003, J Biol Chem 278:3466-3473) U.S. Pat. No. 6,602,684; U.S. Ser. No. 10/277,370; U.S. Ser. No. 10/113,929; PCT WO 00/61739A1; PCT WO 01/292246A1; PCT WO 02/311140AI; PCT WO 02/30954A1; Potelligent® technology (Biowa, Inc. Princeton, N. J.); GlycoMAb™ glycosylation engineering technology (GLYCART biotechnology AG, Zurich, Switzerland). See, e.g., WO 00061739; EA01229125; US 20030115614; Okazaki et al., 2004, JMB, 336: 1239-49.

Effector Function

It may be desirable to modify the antibody of the disclosure with respect to effector function, e.g., so as to enhance antigen-dependent cell-mediated cyotoxicity (ADCC) and/or complement dependent cytotoxicity (CDC) of the antibody. This may be achieved by introducing one or more amino acid substitutions in an Fc region of the antibody. Alternatively, or additionally, cysteine residue(s) may be introduced in the Fc region, thereby allowing interchain disulfide bond formation in this region. The homodimeric antibody thus generated may have improved internalization capability and/or increased complement-mediated cell killing and antibody-dependent cellular cytotoxicity (ADCC). See Caron et al., J. Exp Med. 176:1 191-1 195 (1992) and Shopes, B. J. Immunol. 148:2918-2922 (1992). Homodimeric antibodies with enhanced anti-tumour activity may also be prepared using heterobifunctional cross-linkers as described in Wolff et al. Cancer Research 53:2560-2565 (1993). Alternatively, an antibody can be engineered which has dual Fc regions and may thereby have enhanced complement lysis and ADCC capabilities. See Stevenson et al. Anti-Cancer Drug Design 3:219-230 (1989).

Half-Life

To increase the serum half-life of the antibody, one may incorporate a salvage receptor binding epitope into the antibody (especially an antibody fragment) as described in U.S. Pat. No. 5,739,277, for example. As used herein, the term "salvage receptor binding epitope" refers to an epitope of the Fc region of an IgG molecule (e.g., IgG1, IgG2, IgG3, or IgG4) that is responsible for increasing the in vivo serum half-life of the IgG molecule. Alternatively, the antibody half-life may be increased by pegylation.

Assaying Activity of a Binding Protein of the Disclosure

Binding Assays

One form of such an assay is an antigen binding assay, e.g., as described in Scopes (1994) Protein Purification: principles and practice Springer-Verlag. Such a method generally involves labelling the HER2 binding protein and contacting it with immobilized antigen or a fragment thereof, e.g., a protein comprising residues 293 to 309 of mature normal or wild type human HER2 as shown in FIG. 1. Following washing to remove non-specific bound protein, the amount of label and, as a consequence, bound protein is detected. Of course, the HER2 binding protein can be immobilized and the antigen labelled. Panning-type assays can also be used. The examples herein describe binding assays based on flow cytometry.

HER2 binding proteins that competitively inhibit a HER2 antibody of the invention for binding to an epitope can be screened and identified using conventional competition binding assays known in the art for example, enzyme linked immunosorbent assay (ELISA).

Competitive Binding Assays

Assays for determining an HER2 binding protein that competitively inhibits binding of an antibody of the disclosure (e.g. mAb104) will be apparent to the skilled artisan. For example, the antibody of the disclosure is conjugated to a detectable label, e.g., a fluorescent label or a radioactive label. The labelled antibody and the test HER2 binding protein are then mixed and contacted with HER2 or a peptide comprising an epitope thereof (e.g. corresponding to residues 293 to 309 of domain II of human HER2). The level of labelled antibody is then determined and compared to the level determined when the labelled antibody is contacted with HER2 or a peptide comprising an epitope thereof in the absence of the HER2 binding protein. If the level of labelled antibody is reduced in the presence of the test HER2 binding protein compared to the absence of the HER2 binding protein, the HER2 binding protein competitively inhibits binding of the antibody.

Optionally, the test HER2 binding protein is conjugated to a different label than the antibody. This permits detection of the level of binding of the test HER2 binding protein to the protein or epitope.

In another example, the test HER2 binding protein is permitted to bind to HER2 or a peptide comprising an epitope thereof prior to contacting the HER2 or a peptide comprising an epitope thereof with an antibody described herein. A reduction in the amount of bound antibody in the presence of the HER2 binding protein compared to in the absence of the HER2 binding protein indicates that the HER2 binding protein competitively inhibits binding of the antibody to HER2. A reciprocal assay can also be performed using labelled HER2 binding protein and first allowing the antibody to bind to HER2 or a peptide comprising an epitope thereof. In this case, a reduced amount of labelled HER2 binding protein bound to HER2 or a peptide comprising an epitope thereof in the presence of the antibody compared to in the absence of antibody indicates that the HER2 binding protein competitively inhibits binding of the antibody to HER2.

Affinity Assays

Optionally, the dissociation constant (Kd) or association constant (Ka) or binding constant (KD, i.e., Ka/Kd) of an HER2 binding protein for HER2 or an epitope containing peptide thereof is determined. These constants for an HER2 binding protein is in one example measured by a radiolabelled or fluorescently-labelled HER2 binding assay. This assay equilibrates the HER2 binding protein with a minimal concentration of labelled HER2 in the presence of a titration series of unlabelled HER2. Following washing to remove unbound HER2, the amount of label is determined. According to another example the constants are measured by using surface plasmon resonance assays, e.g., using BIAcore surface plasmon resonance (BIAcore, Inc., Piscataway, NJ) with immobilized HER2 or a region thereof.

Protein Detection Assays

One example of the disclosure detects the presence of HER2 or a cell expressing same (e.g. breast cancer cell). The amount, level or presence of a protein or cell is determined using any of a variety of techniques known to the skilled artisan such as, for example, a technique selected from the group consisting of flow cytometry, immunohistochemistry, immunofluorescence, an immunoblot, a Western blot, a dot blot, an enzyme linked immunosorbent assay (ELISA), radioimmunoassay (RIA), enzyme immunoassay, fluorescence resonance energy transfer (FRET), matrix-assisted laser desorption ionization time of flight (MALDI-TOF), electrospray ionization (ESI), mass spectrometry (including tandem mass spectrometry, e.g. LC MS/MS), biosensor technology, evanescent fibre-optics technology or protein chip technology.

In one example the assay used to determine the amount or level of a protein is a semi-quantitative assay. In another example the assay used to determine the amount or level of a protein is a quantitative assay.

For example, the protein is detected with an immunoassay, e.g., using an assay selected from the group consisting of, immunohistochemistry, immunofluorescence, enzyme linked immunosorbent assay (ELISA), fluorescence linked immunosorbent assay (FLISA), Western blotting, radioimmunoassay (RIA), a biosensor assay, a protein chip assay and an immunostaining assay (e.g. immunofluorescence).

Standard solid-phase ELISA or FLISA formats are particularly useful in determining the concentration of a protein from a variety of samples.

In one form, an ELISA or FLISA comprises of immobilizing a HER2 binding protein of the disclosure or a protein that binds to a different epitope of HER2 on a solid matrix, such as, for example, a membrane, a polystyrene or polycarbonate microwell, a polystyrene or polycarbonate dipstick or a glass support. A sample is then brought into physical relation with the immobilized protein, HER2 is bound or 'captured'. The bound HER2 is then detected using a second labelled compound that binds to a different epitope of HER2. Alternatively, a third labelled antibody can be used that binds the second (detecting) antibody. It will be apparent to the skilled person that the assay formats described herein are amenable to high throughput formats, such as, for example automation of screening processes or a microarray format. Furthermore, variations of the above-described assay will be apparent to those skilled in the art, such as, for example, a competitive ELISA.

In an alternative example, a polypeptide is detected within or on a cell, using methods known in the art, such as, for example, immunohistochemistry or immunofluorescence. Methods using immunofluorescence are exemplary, as they are quantitative or at least semi-quantitative. Methods of quantitating the degree of fluorescence of a stained cell are known in the art and described, for example, in Cuello, 1984.

Biosensor devices generally employ an electrode surface in combination with current or impedance measuring elements to be integrated into a device in combination with the assay substrate (such as that described in U.S. Pat. No. 5,567,301). A HER2 binding protein of the disclosure is incorporated onto the surface of a biosensor device and a biological sample contacted to said device. A change in the detected current or impedance by the biosensor device indicates protein binding to said HER2 binding protein. Some forms of biosensors known in the art also rely on surface plasmon resonance (SPR) to detect protein interactions, whereby a change in the surface plasmon resonance surface of reflection is indicative of a protein binding to a ligand or antibody (U.S. Pat. Nos. 5,485,277 and 5,492,840).

Biosensors are of particular use in high throughput analysis due to the ease of adapting such systems to micro- or nano-scales. Furthermore, such systems are conveniently adapted to incorporate several detection reagents, allowing for multiplexing of diagnostic reagents in a single biosensor unit. This permits the simultaneous detection of several proteins or peptides in a small amount of body fluids.

Binding of proteins to HER2 can also be detected using flow cytometry as described herein in the examples.

Epitope Bound by the Binding Protein of the Disclosure

The present inventors have generated binding molecules specific for a conformationally exposed epitope in domain II of human HER2 present in tumourigenic, hyperproliferative or abnormal cells but not wild-type or normal cells. This conformationally exposed epitope lies in the distal part of domain II and is flanked by disulphide bonds allowing flexible changes in this region and exposure of the epitope for mAb104 binding. In particular, the epitope appears to be exposed in cells in response to HER2 amplification or activation. What is particularly surprising about the present antibodies is that they do not block binding of Pertuzumab or Trastuzumab to the extracellular domain of HER2 indicating that this epitope region of domain II when conformationally exposed, allows the antibody to bind without blocking binding of these antibodies, potentially allowing dual therapy approaches.

The crystal structure of Pertuzumab binding to HER2 has been determined (see Franklin M C et al., (2004) Cancer Cell vol 5:317-328). Pertuzumab binds to HER2 near the centre of domain II, sterically blocking a binding pocket necessary for receptor dimerization and signalling. It is understood that the CDR H3 of Pertuzumab makes hydrophobic and hydrogen bond contacts with residues Lys311 and His296 of HER2. His296 is thoroughly buried upon Pertuzumab binding. As Pertuzumab specifically inhibits HER2 heterodimerisation by occluding the pocket on HER2 that would accept the dimerization loop of a heterodimer receptor partner, without wishing to be bound by theory, the inventors postulate that it is sterically possible for the present binding molecules (e.g. mAb104) to bind on a different face of the epitope loop in HER2. The inventors hypothesize that this epitope may be revealed in a subset of receptors on the cancer cell surface when the receptor undergoes a conformational change due to redox disulphide bond switching or aberrant expression in conditions of HER2 overexpression or hypoxia in cancer or when HER2 engages with a dimerization partner and undergoes a conformational change to reveal the loop bound by the present binding molecules rendering it more accessible. Furthermore, it is known that within an epitope region an antibody does not bind every amino acid in the region and due to the conformational nature of the mAb104 epitope this could explain why the closely opposed epitopes do not impact the binding of both antibodies.

In one example, the HER2 binding protein inhibits HER2 heterodimerisation.

Antibody Conjugates

The present invention also provides HER2-binding protein as described herein conjugated to a moiety. A moiety can include, but is not limited to, a detectable or functional label. In some embodiments, the moiety is selected from the group consisting of a radioisotope, a detectable label, a therapeutic compound, a colloid, a toxin, a nucleic acid, a peptide, a protein, a compound that increases the half-life of the HER2-binding protein in a subject and mixtures thereof. As would be understood by the person skilled in the art, the moiety can be classified as one or more of the above list. For example, the moiety can be classified as both a therapeutic compound and a toxin.

In some embodiments, the moiety is a radioisotope. Suitable radioisotopes include the isotopes $^3H$, $^{14}C$, $^{32}P$, $^{33}P$, $^{35}S$, $^{36}Cl$, $^{47}Sc$, $^{51}Cr$, $^{57}Co$, $^{58}Co$, $^{59}Fe$, $^{67}Ga$, $^{68}Ga$, $^{89}Zr$, $^{90}Y$, $^{121}I$, $^{124}I$, $^{125}I$, $^{131}I$, $^{111}In$, $^{177}Lu$, $^{211}At$, $^{198}Au$, $^{67}Cu$, $^{223}Ra$, $^{225}Ac$, $^{213}Bi$, $^{99}Tc$ and $^{186}Re$, which may be attached to antibodies of the invention using conventional chemistry known in the art of antibody imaging.

In some embodiments, the moiety is a detectable label. Suitable detectable labels include, but are not limited to, radiolabels such as the isotopes $^3H$, $^{14}C$, $^{32}P$, $^{33}P$, $^{35}S$, $^{36}Cl$, $^{47}Sc$, $^{51}Cr$, $^{57}Co$, $^{58}Co$, $^{59}Fe$, $^{67}Ga$, $^{68}Ga$, $^{89}Zr$, $^{90}Y$, $^{121}I$, $^{124}I$, $^{125}I$, $^{131}I$, $^{111}In$, $^{177}Lu$, $^{211}At$, $^{198}Au$, $^{67}Cu$, $^{223}Ra$, $^{225}Ac$, $^{213}Bi$, $^{99}Tc$ and $^{186}Re$, which may be attached to antibodies of the invention using conventional chemistry known in the art of antibody imaging. Labels also include fluorescent labels (for example fluorescein, rhodamine, Texas Red, phycoerythrin) and labels used conventionally in the art for MRI-CT imaging. They also include enzyme labels such as horseradish peroxidase, β-glucoronidase, β-galactosidase, urease, catalase, alkaline phosphatase, and chloramphenicol transferase. Labels also include peptide tags such as T7-, His-, myc-, HA- and FLAG-tags. Labels further include chemical moieties such as biotin which may be detected via binding to a specific cognate detectable moiety, e.g. labelled avidin. Labels also include electron-dense reagents; energy transfer molecules; paramagnetic labels, chemi-luminescent (imidazole, luciferase); and bio-luminescent agents.

In some embodiments, the moiety is a nucleic acid. Suitable nucleic acids include a double stranded DNA, single stranded DNA, siRNA, DNAzyme or ribozyme.

In some embodiments, the moiety is a therapeutic compound. Suitable therapeutic compound include compounds which a capable of modifying a biological response (such as, for example and without limitation, inhibiting or preventing the expression activity of cells, causing the destruction of cells, or otherwise effecting the function of cells). Such therapeutic compounds include, for example and without limitation, chemical ablation agents, toxins, immunomodulators, cytokines, cytotoxic agents, chemotherapeutic agents and/or drugs, and include, but are not limited to, the following 4-desacetylvinblastine-3-carbohydiazide; 5-fluoro-2'-deoxyuridine; 5-fluorouracil; 5-fluorouracil decarbonizes; 6-mercaptopurine; 6-thioguanine; abrin; abrin A chain; actinomycin D; 1-dehydrotestosterone; adriamycin; *Aleurites fordii* proteins; alkylating agents; alkylphosphocholines; aminopterin; angiogenin; angiostatin; anthracyclines; anthramycin; anti-angiogenics; anti-folates; anti-metabolites; anti-mitotics; antibiotics; ara-C; asparaginase auristatin derivatives (see, for example and without limitation, U.S. Patent Publication Nos. 2008/0300192, 2009/0018086, 2009/0018086, and 2009/0111756, each of which is hereby incorporated by reference in its entirety); auristatin E (see, for example and without limitation, U.S. Pat. No. 5,635,483, hereby incorporated by reference in its entirety); auristatin E valeryl benzylhydrazone; auristatin F phenylene diamine; auristatins; auromycins; bis-iodo-phenol mustard; bismuth; bleomycin; busulfan; calicheamicin; carboplatin; carminomycin; carmustine; cc-1065 compounds (see, for example and without limitation, U.S. Pat. Nos. 5,475,092, 5,585,499, 5,846,545, 6,534,660, 6,586,618, 6,756,397, 7,049,316, 7,329,760, 7,388,026, 7,655,660, and 7,655,661, U.S. Patent Publication. Nos. 2007/0135346, 2008/0260685, and 2009/0281158, and 2009/0318668, and PCT Publication No. WO2009/017394, each of which is hereby incorporated by reference in its entirety); chlorambucil; cis-dichlorodiamine platinum (cisplatin); cladribine; colchicin (colchicine); combrestatin; crotin; curicin; cyclophosphamide; cytarabine; cytochalasin B; cytosine arabinoside; cytoxin; dacarbazine; dactinomycin (actinomycin); daunorubicin (daunomycin); dianthin proteins; dibromomannitol; dihydroxy anthracin dione; diphtheria toxin; dolastatin-10; doxetaxel; doxorubicin; doxorubicin hydrazides; duocarmycins (see, for example and without limitation, U.S. Pat. No. 7,214,685, hereby incorporated by reference in its entirety); emetine; endostatin; enediyenes; enomycin; epirubicin; esperamicin compounds (see, for example and without limitation, U.S. Pat. No. 4,675,187, hereby incorporated by reference in its entirety); ethidium bromide; etoposide; fludarabine gelonin; gefitinib, gemcitabine; glucocorticoids; gramicidin D; granulocyte colony stimulating factor; granulocyte macrophage colony stimulating factor; idarubicin; intercalating agents; interleukin-1; interleukin-2; interleukin-6; lidocaine; lomustine; lymphokine; maytansinols (see, for example and without limitation, U.S. Pat. Nos. 4,137,230, 4,151,042, 4,162,940, 4,190,580, 4,225,494, 4,228,239, 4,248,870, 4,256,746, 4,260,608, 4,263,294, 4,264,596, 4,265,814, 4,294,757, 4,307,016, 4,308,268, 4,308,269, 4,309,428, 4,317,821, 4,320,200, 4,322,348, 4,331,598, 4,360,462, 4,361,650, 4,362,663, 4,364,866, 4,371,533, 4,424,219, 4,450,234, 5,141,736, and 5,217,713, each of which is hereby incorporated by reference in its entirety); mechlorethamine; melphalan (and other related nitrogen mustards); methotrexate; minor groove-binders; mithramycin; mitogellin; mitomycin C; mitomycins; mitoxantrone; MMAF-dimethylaminoethylamine; MMAF-N-t-butyl; MMAF-tetraethylene glycol; modeccin A chain; *Momordica charantia* inhibitor; mono-methyl auristatin E (MMAE) (see, for example and without limitation, U.S. Pat. Nos. 6,884,869, 7,098,308, 7,256,257, and 7,423,116, and U.S. Patent Publication Nos. 2003/0083263, 2004/0157782, 2005/0009751, 2005/0113308, and 2006/0229253, each of which is hereby incorporated by reference in its entirety); mono-methyl auristatin F (MMAF) (see, for example and without limitation, U.S. Pat. No. 7,498,298, and U.S. Patent Publication Nos. 2008/0226657, 2008/0248051, 2008/0248053, and 2009/0047296, each of which is hereby incorporated by reference in its entirety); morpholinodoxorubicin; N2'-deacetyl-N2'-(c-mercapto-1 oxopropyl)-maytansine (DM1) (see, for example and without limitation, U.S. Pat. No. 5,208,020, hereby incorporated by reference in its entirety); N2'-deacetyl-N2'-(4-mercapto-4-methyl-1-oxopentyl)-maytansine (DM4) (see, for example and without limitation, U.S. Pat. No. 7,276,497, hereby incorporated by reference in its entirety); neocarzinostatin; nerve growth factor (and other growth factors); onapristone; paclitaxel; PE40; phenomycin; *Phytolaca americana* proteins (PAPI, PAPII, and PAP-S); platelet derived growth factor; plicamycin; prednisone; procaine; procarbazine; propranolol; *Pseudomonas* exotoxin A; puromycin; pyrrolobenzodiazepine, radioactive isotopes (such as, for example and without limitation, $At^{211}$, $Bi^{212}$, $Bi^{213}$, $Cf^{252}$, $I^{125}$, $I^{131}$, $In^{111}$, $Ir^{192}$, $Lu^{177}$, $P^{32}$, $Re^{186}$, $Re^{188}$, $Sm^{153}$, $Y^{90}$, and $W^{188}$); retstrictocin; restrictocin; ricin A; ricins; *Sapaonaria officinalis* inhibitor; saporin; streptozotocin; suramin; tamoxifen; taxanes; taxoids; taxol; tenoposide; tetracaine; thioepa chlorambucil; thiotepa; thrombotic agents; tissue plasminogen activator; topoisomerase I inhibitors; topoisomerase II inhibitors; toxotere; tricothecenes; tumour necrosis factor; vinblastine; vinca alkaloids; vincas; vincristine; vindesine; vinorelbine; yttrium; α-interferon; α-sarcin; and β-interferon, as well as analogs, homologs, fragments, variants, and derivatives thereof (see also Garnett (2001) Advanced drug Delivery Reviews 53:171-216, hereby incorporated by reference in its entirety).

In preferred embodiments, the therapeutic compound is selected from the group consisting of an auristatin or a derivative thereof, a maytansine or a derivative thereof (also referred to as a maytansinoid) or a pyrrolobenzodiazepine or a derivative thereof. In one example, the therapeutic agent is N2'-deacetyl-N2'-(c-mercapto-1 oxopropyl)-maytansine (DM1). In another example, the therapeutic agent is mono-methyl auristatin E (MMAE). In another example, the therapeutic agent is pyrrolobenzodiazepine.

The present disclosure also contemplates immunotoxin conjugates as described for example in WO93/21232.

Suitable colloids include colloidal gold and gold nanoparticles. The HER2-binding protein may be conjugated to the colloid by techniques known to the person in the art (see Jazayeri et al (2016) Sensing and Bio-Sensing Research, 9:17-22).

In some embodiments, the moiety is a toxin. Suitable toxins include, but are not limited to, enzymatically active toxins of bacterial, fungal, plant or animal origin, or an enzymatically active fragment of such a toxin. Enzymatically active toxins and fragments thereof used are diphtheria A chain, nonbinding active fragments of diphtheria toxin, exotoxin A chain (from *Pseudomonas aeruginosa*), ricin A chain, abrin A chain, modeccin A chain, alpha-sarcin, *Aleurites fordii* proteins, dianthin proteins, *Phytolaca americana* proteins (PAPI, PAPII, and PAP-S), *Momordica charantia* inhibitor, curcin, crotin, *Sapaonaria officinalis* inhibitor, gelonin, mitogellin, restrictocin, phenomycin, enomycin and the tricothecenes.

In some embodiments, the moiety is a compound that increases the half-life of the HER2-binding protein in a subject. Suitable compounds that increase the half-life of the HER2-binding protein in a subject include PEG, recombinant PEG mimics (including flexible polypeptides such as XTEN, elastin-like polypeptide, gelatin-like polypeptide and (Pro-Ala-Ser)$_n$), carbohydrates (such as dextran, hydroxyethyl starch, polysialic acid and hyaluronic acid) and peptides/polypeptides (such as albumin and the Fc portin of IgG).

Furthermore, HER2 binding proteins of the present disclosure, particularly antibodies and fragments thereof, may be conjugated to a second antibody to form an antibody heteroconjugate (see, for example and without limitation, U.S. Pat. No. 4,676,980, hereby incorporated by reference in its entirety), may be administered (either with or without an agent attached or conjugated thereto) alone or in combination with another agent (for example and without limitation, an agent set forth above), and/or may be conjugated to an anti-cancer pro-drug activating enzyme capable of converting the pro-drug to its active form.

As will be understood by those of skill in the art, the moieties set forth above, as well as other suitable moieties, may be conjugated or attached to the HER2 binding proteins of the present disclosure, particularly antibodies and fragments thereof, in any suitable manner to produce the antibody conjugate. For example and without limitation, in various embodiments of the present invention the HER2 binding protein(s) and moiety may be covalently attached and/or may be conjugated using linker, spacer and/or stretcher compounds, which in various embodiments of the present invention are cleavable, are non-cleavable, and result in the agent(s) being internalized by the target cell.

For example, such linker, spacer and/or stretcher compounds include, but are not limited to, the following: amino benzoic acid spacers (see, for example and without limitation, U.S. Pat. Nos. 7,091,186 and 7,553,816, each of which is hereby incorporated by reference in its entirety); maleimidocaproyl; p-aminobenzylcarbamoyl (PAB); lysosomal enzyme-cleavable linkers (see, for example and without limitation, U.S. Pat. No. 6,214,345, hereby incorporated by reference in its entirety); maleimidocaproyl-polyethylene glycol (MC(PEG)6-OH); N-methyl-valine citrulline; N-succinimidyl 4-(N-maleimidomethyl)cyclohexane-1-carboxylate (SMCC) (see, for example and without limitation, Yoshitake et al. (1979) Eur. J. Biochem., 101, 395-399, hereby incorporated by reference in its entirety); N-succinimidyl 4-(2-pyridyldithio)butanoate (SPDB) (see, for example and without limitation, U.S. Pat. No. 4,563,304, hereby incorporated by reference in its entirety); N-Succinimidyl 4-(2-pyridylthio)pentanoate (SPP); valine-citrulline; and other linker, spacer, and/or stretcher compounds (see, for example and without limitation, U.S. Pat. Nos. 7,090, 843, 7,223,837, and 7,659,241, and U.S. Patent Publication Nos. 2004/0018194, 2004/0121940, 2006/0116422, 2007/0258987, 2008/0213289, 2008/0241128, 2008/0311136, 2008/0317747, and 2009/0010945, each of which is hereby incorporated by reference in its entirety).

Generally speaking, techniques for attaching and/or conjugating the moieties set forth above, as well as other moieties, to the HER2 binding proteins of the present disclosure, particularly antibodies and fragments thereof, are known in the art. In various embodiments of the present invention the HER2 binding protein(s) and moiety may be covalently attached and/or may be conjugated via lysine or cysteine residues present in the HER2 binding protein. In one embodiment, the moiety, MMAE is attached by conjugation with a cysteine residue. In one embodiment, the moiety, DM1 is attached by conjugation with a lysine residue. In one embodiment, the moiety, PBD (pyrrolobenzodiazepine) is attached by conjugation with a cysteine residue. Suitable conjugation chemistries are reviewed in Jain et al (2015) Pharmaceutical Research, 32:3526. See also, for example and without limitation, Amon et al., "Monoclonal Antibodies For Immunotargeting Of Drugs In Cancer Therapy", in Monoclonal Antibodies And Cancer Therapy, Reisfeld et al. (eds.), pp. 243-56 (Alan R. Liss, Inc. 1985); Hellstrom et al., "Antibodies For Drug Delivery", in Controlled Drug Delivery (2nd Ed.), Robinson et al. (eds.), pp. 623-53 (Marcel Dekker, Inc. 1987); Thorpe, "Antibody Carriers Of Cytotoxic Agents In Cancer Therapy: A Review", in Monoclonal Antibodies '84: Biological And Clinical Applications, Pinchera et al. (eds.), pp. 475-506 (1985); "Analysis, Results, And Future Prospective Of The Therapeutic Use Of Radiolabeled Antibody In Cancer Therapy", in Monoclonal Antibodies For Cancer Detection And Therapy, Baldwin et al. (eds.), pp. 303-16 (Academic Press 1985), and Thorpe et al., "The Preparation And Cytotoxic Properties Of Antibody-Toxin Conjugates", Immunol. Rev., 62:119-58 (1982), Parslow et al. (2016) Biomedicines, 4, 14, each of which is hereby incorporated by reference in its entirety.

In embodiments where the attached moiety is a peptide or polypeptide, the conjugate may be a fusion protein where the HER2 binding protein and peptide or polypeptide form a single continuous polypeptide chain. Such fusion proteins may be produced using techniques known in the art, including recombinant techniques or synthetic techniques.

Also, antibodies including fragments thereof, and drugs that modulate the production or activity of the specific binding members, antibodies and/or their subunits may possess certain diagnostic applications and may for example, be utilized for the purpose of detecting and/or measuring conditions such as cancer, precancerous lesions, conditions related to or resulting from hyperproliferative cell growth or the like. For example, the specific binding members, antibodies or their subunits may be used to produce both polyclonal and monoclonal antibodies to themselves in a variety of cellular media, by known techniques such as the hybridoma technique utilizing, for example, fused mouse spleen lymphocytes and myeloma cells. Likewise, small molecules that mimic or antagonize the activity(ies) of the specific binding members of the invention may be discovered or synthesized, and may be used in diagnostic and/or therapeutic protocols.

The radiolabelled specific binding members, particularly antibodies and fragments thereof, are useful in in vitro diagnostics techniques and in in vivo radioimaging techniques and in radioimmunotherapy. In the instance of in vivo imaging, the specific binding members of the present invention may be conjugated to an imaging agent rather than a radioisotope(s), including but not limited to a magnetic resonance image enhancing agent, wherein for instance an antibody molecule is loaded with a large number of paramagnetic ions through chelating groups. Examples of chelating groups include EDTA, porphyrins, polyamines crown ethers and polyoximes. Examples of paramagnetic ions include gadolinium, iron, manganese, rhenium, europium, lanthanium, holmium and ferbium. In a further aspect of the invention, radiolabelled specific binding members, particularly antibodies and fragments thereof, particularly radioimmunoconjugates, are useful in radioimmunotherapy, particularly as radiolabelled antibodies for cancer therapy. In a still further aspect, the radiolabelled specific binding members, particularly antibodies and fragments thereof, are useful in radioimmuno-guided surgery techniques, wherein they can identify and indicate the presence and/or location of cancer cells, precancerous cells, tumour cells, and hyperproliferative cells, prior to, during or following surgery to remove such cells.

Competitive Inhibition

Antibodies that competitively inhibit an HER2 antibody of the invention for binding to an epitope can be screened and identified using conventional competition binding assays known in the art for example, enzyme linked immunosorbent assay (ELISA).

Compositions of the Invention

The HER2 binding proteins including conjugates thereof according to the present disclosure will usually be administered in the form of a pharmaceutical composition, which may comprise at least one component in addition to the HER2 binding protein, HER2 antibody or antigen-binding fragment thereof. Thus pharmaceutical compositions according to the present disclosure, and for use in accordance with the present invention, may comprise, in addition to active ingredient, a pharmaceutically acceptable excipient, carrier, buffer, stabiliser or other materials well known to those skilled in the art. Such materials should be non-toxic and should not interfere with the efficacy of the active ingredient. The precise nature of the carrier or other material will depend on the route of administration, which may be oral, or by injection, e.g. intravenous.

Pharmaceutical compositions for oral administration may be in tablet, capsule, powder or liquid form. A tablet may comprise a solid carrier such as gelatin or an adjuvant. Liquid pharmaceutical compositions generally comprise a liquid carrier such as water, petroleum, animal or vegetable oils, mineral oil or synthetic oil. Physiological saline solution, dextrose or other saccharide solution or glycols such as ethylene glycol, propylene glycol or polyethylene glycol may be included.

For intravenous, injection, or injection at the site of affliction, the active ingredient will be in the form of a parenterally acceptable aqueous solution which is pyrogen-free and has suitable pH, isotonicity and stability. Those of relevant skill in the art are well able to prepare suitable solutions using, for example, isotonic vehicles such as Sodium Chloride Injection, Ringer's Injection, Lactated Ringer's Injection. Preservatives, stabilisers, buffers, antioxidants and/or other additives may be included, as required.

In some embodiments, liposomes and/or nanoparticles may also be employed with the active ingredients. The formation and use of liposomes is generally known to those of skill in the art. Liposomes can be formed from phospholipids that are dispersed in an aqueous medium and spontaneously form multilamellar concentric bilayer vesicles (also termed multilamellarvesicles (MLVs)). MLVs can generally have diameters of from 25 nm to 4 µm. Sonication of MLVs results in the formation of small unilamellar vesicles (SUVs) with diameters in the range of 200 to 500 angstrom, containing an aqueous solution in the core. Phospholipids can form a variety of structures other than liposomes when dispersed in water, depending on the molar ration of lipid to water. At low ratios the liposome is the preferred structure. The physical characteristics of liposomes depend on pH, ionic strength and the presence of divalent cations. Liposomes can show low permeability to ionic and polar substances, but at elevated temperatures undergo a phase transition which markedly alters their permeability. The phase transition involves a change from a closely packed, ordered structure, known as the gel state, to a loosely packed, less-ordered structure, known as the fluid state.

The HER2 binding protein or composition comprising same may be administered alone or in combination with other treatments, therapeutics or agents, either simultaneously or sequentially dependent upon the condition to be treated. In addition, the present disclosure contemplates and includes compositions comprising the HER2 binding protein herein described and other agents or therapeutics such as anti-cancer agents or therapeutics, hormones, other anti-HER2 agents or antibodies, or anti-EGFR agents or antibodies. More generally these anti-cancer agents may be tyrosine kinase inhibitors or phosphorylation cascade inhibitors, post-translational modulators, cell growth or division inhibitors (e.g. anti-mitotics), or signal transduction inhibitors. Other treatments or therapeutics may include the administration of suitable doses of pain relief drugs such as non-steroidal anti-inflammatory drugs (e.g. aspirin, paracetamol, ibuprofen or ketoprofen) or opiates such as morphine, or anti-emetics. The composition can be administered in combination (either sequentially (i.e. before or after) or simultaneously) with tyrosine kinase inhibitors (including, but not limited to AG1478 and ZD1839, STI571, OSI-774, SU-6668), doxorubicin, temozolomide, cisplatin, carboplatin, nitrosoureas, procarbazine, vincristine, hydroxyurea, 5-fluoruracil, cytosine arabinoside, cyclophosphamide, epipodophyllotoxin, carmustine, lomustine, and/or other chemotherapeutic agents. Thus, these agents may be anti-HER2 specific agents, or tyrosine kinase inhibitors such as lapatinib, Afatinib, AG1478, ZDI 839, STI571, OSI-774, or SU-6668 or may be more general anti-cancer and anti-neoplastic agents such as doxorubicin, cisplatin, temozolomide, nitrosoureas, procarbazine, vincristine, hydroxyurea, 5-fluoruracil, cytosine arabinoside, cyclophosphamide, epipodophyllotoxin, carmustine, or lomustine. In addition, the composition may be administered with hormones such as dexamethasone, immune modulators, such as interleukins, tumour necrosis factor (TNF) or other growth factors or cytokines which stimulate the immune response and reduction or elimination of cancer cells or tumours, or angiogenesis inhibitors.

In some examples, the HER2 binding protein or composition comprising same is combined with a chemotherapeutic agent, a radioimmunotherapeutic agent or an immunotherapeutic agent. In one example, the immunotherapeutic agent is a checkpoint inhibitor. In a further example, the checkpoint inhibitor is selected from Ipilimumab (CTLA4), nivolumab (PD-1), pembrolizumab (PD-1), atezolizumab (PD-L1), avelumab (PD-L1), durvalumab (PD-L1) and cemiplimab (PD-1).

In some examples, the HER2 binding protein or composition comprising same is administered with an immunosuppressive drug.

In some examples, the HER2 binding protein or composition comprising same is administered with an immunomodulatory. Examples of suitable immunomodulators include interleukins (e.g. IL-2, IL-7, IL-12), cytokines (e.g. interferons, G-CSF), chemokines (e.g. CCL3, CCL26 and CXCL7), and immunomodulatory imide drugs (e.g. thalidomide).

HER2 binding proteins of the present disclosure may be administered to a patient in need of treatment via any suitable route, usually by injection into the bloodstream or CSF, or directly into the site of the tumour. The precise dose will depend upon a number of factors, including whether the antibody is for diagnosis or for treatment, the size and location of the tumour, the precise nature of the HER2 binding protein (whether whole antibody, fragment, diabody, etc), and the nature of the detectable or functional label attached to the antibody. Where a radionuclide is used for therapy, a suitable minimum single dose is about 45 $mCi/m^2$, to a maximum of about 250 $mCi/m^2$. Preferable dosage is in the range of 15 to 40 mCi, with a further preferred dosage range of 20 to 30 mCi, or 10 to 30 mCi. Such therapy may require bone marrow or stem cell replacement. A typical antibody dose for either tumour imaging or tumour treatment will be in the range of from 0.5 to 40 mg, preferably from 1 to 4 mg of antibody in $F(ab')_2$ form. Naked antibodies are preferable administered in doses of 20 to 1000 mg protein per dose, or 20 to 500 mg protein per dose, or 20 to 100 mg protein per dose. This is a dose for a single treatment of an adult patient, which may be proportionally adjusted for children and infants, and also adjusted for other antibody formats in proportion to molecular weight. Treatments may be repeated at daily, twice-weekly, weekly or monthly intervals, at the discretion of the physician.

Examples of suitable angiogenesis inhibitors (anti-angiogenic agents) include, but are not limited to, urokinase inhibitors, matrix metalloprotease inhibitors (such as marimastat, neovastat, BAY 129566, AG 3340, BMS275291 and similar agents), inhibitors of endothelial cell migration and proliferation (such as TNP470, squalamine, 2methoxyestradiol, combretastatins, endostatin, angiostatin, penicillamine, SCH66336 (Schering-Plough Corp, Madison, NJ), R115777 (Janssen Pharmaceutica, Inc, Titusville, NJ) and similar agents), antagonists of angiogenic growth factors (such as such as ZD6474, SU6668, antibodies against angiogenic agents and/or their receptors (such as VEGF, bFGF, and angiopoietin1), thalidomide, thalidomide analogs (such as CC5013), Sugen 5416, SU5402, antiangiogenic ribozyme (such as angiozyme), interferon α (such as interferon α2a), suramin and similar agents), VEGF-R kinase inhibitors and other anti-angiogenic tyrosine kinase inhibitors (such as SU011248), inhibitors of endothelial-specific integrin/survival signalling (such as vitaxin and similar agents), copper antagonists/chelators (such as tetrathiomolybdate, captopril and similar agents), carboxyamido-triazole (CAI), ABT627, CM101, interleukin12 (IL12), IM862, PNU145156E as well as nucleotide molecules inhibiting angiogenesis (such as antisense-VEGF-cDNA, cDNA coding for angiostatin, cDNA coding for p53 and cDNA coding for deficient VEGF receptor2) and similar agents. Other examples of inhibitors of angiogenesis, neovascularization, and/or other vascularization are anti-angiogenic heparin derivatives and related molecules (e.g., heperinase III), temozolomide, NK4, macrophage migration inhibitory factor (MIF), cyclooxygenase2 inhibitors, inhibitors of hypoxia-inducible factor 1, anti-angiogenic soy isoflavones, oltipraz, fumagillin and analogs thereof, somatostatin analogues, pentosan polysulfate, tecogalan sodium, dalteparin, tumstatin, thrombospondin, NM3, combrestatin, canstatin, avastatin, antibodies against other relevant targets (such as anti-alpha-v/beta-3 integrin and anti-kininostatin mAbs) and similar agents.

Measuring Cell Viability and Proliferation

Cell toxicity and viability (cell apoptosis, lysis, growth proliferation, etc.) can be measured in a variety of ways on the basis of calorimetric, luminescent, radiometric, or fluorometric assays known in the art and as described in the Examples herein. Colorimetric techniques for determining cell viability include, for example, Trypan Blue exclusion. In brief, cells are stained with Trypan Blue and counted using a hemocytometer. Viable cells exclude the dye whereas dead and dying cells take up the blue dye and are easily distinguished under a light microscope. Neutral Red is adsorbed by viable cells and concentrates in cell lysosomes; viable cells can be determined with a light microscope by quantitating numbers of Neutral Red stained cells.

Fluorometric techniques for determining cell viability include, for example, propidium iodide, a fluorescent DNA intercalating agent. Propidium iodide is excluded from viable cells but stains the nucleus of dead cells. Flow cytometry of propidium iodide labeled cells can then be used to quantitate viable and dead cells. Release of lactate dehydrogenase (LDH) indicates structural damage and death of cells, and can be measured by a spectrophotometric enzyme assay. Bromodeoxyuridine (BrdU) is incorporated into newly synthesized DNA and can be detected with a fluorochrome-labeled antibody. The fluorescent dye Hoechst 33258 labels DNA and can be used to quantitate proliferation of cells (e.g., flow cytometry). Quantitative incorporation of the fluorescent dye carboxyfluorescein diacetate succinimidyl ester (CFSE or CFDA-SE) can provide cell division analysis (e.g., flow cytometry). This technique can be used either in vitro or in vivo. 7-aminoactinomycin D (7-AAD) is a fluorescent intercalator that undergoes a spectral shift upon association with DNA, and can provide cell division analysis (e.g., flow cytometry).

Radiometric techniques for determining cell proliferation include, for example, [$^3$H]-Thymidine, which is incorporated into newly synthesized DNA of living cells and frequently used to determine proliferation of cells. Chromium ($^{51}$Cr)-release from dead cells can be quantitated by scintillation counting in order to quantitate cell viability.

Luminescent techniques for determining cell viability include, for example, the CellTiter-Glo luminescent cell viability assay (Promega Madison Wis.). This technique quantifies the amount of ATP present to determine the number of viable cells.

Commercially available kits for determining cell viability and cell proliferation include, for example, Cell Proliferation Biotrak ELISA (Amersham Biosciences Piscataway, N.J.); the Guava ViaCount Assay, which provides rapid cell counts and viability determination based on differential uptake of fluorescent reagents (Guava Technologies, Hayward, Calif.); the CyQUANT. Cell Proliferation Assay Kit (Molecular Probes, Inc., Eugene, Oreg.); and the CytoLux Assay Kit (PerkinElmer Life Sciences Inc., Boston, Mass.). The DEL-FIA Assay Kits (PerkinElmer Life Sciences Inc., Boston, Mass.) can determine cell proliferation and viability using a time-resolved fluorometric method. The Quantos Cell Proliferation Assay is a fluorescence-based assay that measures the fluorescence of a DNA-dye complex from lysed cells (Stratagene, La Jolla, Calif.). The CellTiter-Glo cell viability assay is a luminescent assay for measuring cell viability (Promega, Madison Wis.).

Uses (i) Diagnostic and Therapeutic Uses

The unique specificity of the HER2 binding proteins, particularly antibodies or fragments thereof, of the present disclosure, whereby the binding protein(s) recognize an HER2/ErbB2 epitope which is found in tumourigenic, hyperproliferative or abnormal cells and not detectable in normal or wild type cells and wherein the protein(s) bind to amplified EGFR but not the wild-type HER2, provides diagnostic and therapeutic uses to identify, characterize, target and treat, reduce or eliminate a number of tumourigenic cell types and tumour types, for example head and neck, breast, lung, bladder or prostate tumours and glioma, without the problems associated with normal tissue uptake that may be seen with previously known HER2 antibodies.

Thus, cells overexpressing HER2 (e.g. by amplification), may be recognized, isolated, characterized, targeted and treated or eliminated utilizing the binding protein(s), particularly antibody(ies) or fragments thereof of the present disclosure.

The HER2 binding proteins (e.g. antibodies) of the present disclosure can thus specifically categorize the nature of HER2 tumours or tumourigenic cells, by staining or otherwise recognizing those tumours or cells wherein HER2 overexpression is present. Further, the antibodies of the present invention, as exemplified by mAb104, demonstrate significant in vivo anti-tumour activity against tumours containing amplified HER2 and HER2 positive xenografts.

As outlined above, the inventors have found that the HER2 binding proteins of the disclosure recognise tumour-associated forms of HER2 but not the normal, wild-type receptor when expressed in normal cells. It is believed that antibody recognition is dependent upon a conformation in response to HER2 amplification or activation which opens up a conformationally exposed epitope for binding.

mAb104 was shown to inhibit growth of overexpressing (e.g. amplified) HER2 xenografts of human tumours and to induce necrosis within such tumours.

(ii) Therapeutic HER2 Binding Proteins and Uses

The in vivo properties, particularly with regard to tumour: blood ratio and rate of clearance, of HER2 binding proteins of the disclosure will be at least comparable to mAb104. Following administration to a human or animal subject such a specific binding member will show a peak tumour to blood ratio of >1:1. Preferably at such a ratio the specific binding member will also have a tumour to organ ratio of greater than 1:1, preferably greater than 2:1, more preferably greater than 5:1. Preferably at such a ratio the binding protein will also have an organ to blood ratio of <1:1 in organs away from the site of the tumour. These ratios exclude organs of catabolism and secretion of the administered binding protein. Thus in the case of scFvs and Fabs the binding members will be secreted via the kidneys. In the case of whole IgGs, clearance will be at least in part, via the liver. The peak localisation ratio of the intact antibody will normally be achieved between 10 and 200 hours following administration of the HER2 binding protein. More particularly, the ratio may be measured in a tumour xenograft of about 0.2-1.0 g formed subcutaneously in one flank of an athymic nude mouse.

HER2 binding proteins (e.g. antibodies) of the disclosure may be labelled with a detectable or functional label or moiety. As would be understood by the person skilled in the art, a label can be defined under more than one category. Detectable labels include, but are not limited to, radiolabels such as the isotopes $^3$H, $^{14}$C, $^{32}$P, $^{35}$S, $^{36}$Cl, $^{51}$Cr, $^{57}$Co, $^{58}$Co, $^{59}$Fe, $^{90}$Y, $^{121}$I, $^{124}$I, $^{125}$I, $^{131}$I, $^{\pi\prime}$In, $^{211}$At, $^{198}$Au, $^{67}$Cu, $^{225}$Ac, $^{213}$Bi, $^{99}$Tc and $^{186}$Re, which may be attached to antibodies of the disclosure using conventional chemistry known in the art of antibody imaging. Labels also include fluorescent labels and labels used conventionally in the art for MRI-CT imaging. They also include enzyme labels such as horseradish peroxidase. Labels further include chemical moieties such as biotin which may be detected via binding to a specific cognate detectable moiety, e.g. labelled avidin.

Functional labels include substances which are designed to be targeted to the site of a tumour to cause destruction of tumour tissue. Such functional labels include cytotoxic drugs such as 5-fluorouracil or ricin and enzymes such as bacterial carboxypeptidase or nitroreductase, which are capable of converting prodrugs into active drugs at the site of a tumour.

Also, antibodies including both polyclonal and monoclonal antibodies, and drugs that modulate the production or activity of the binding proteins, antibodies and/or their subunits may possess certain diagnostic applications and may for example, be utilized for the purpose of detecting and/or measuring conditions such as cancer, precancerous lesions, conditions related to or resulting from hyperproliferative cell growth or the like. For example, the HER2 binding proteins, antibodies or their subunits may be used to produce both polyclonal and monoclonal antibodies to themselves in a variety of cellular media, by known techniques such as the hybridoma technique utilizing, for example, fused mouse spleen lymphocytes and myeloma cells. Likewise, small molecules that mimic or antagonize the activity (ies) of the HER2 binding proteins of the disclosure may be discovered or synthesized, and may be used in diagnostic and/or therapeutic protocols.

The radiolabelled HER2 binding proteins, particularly antibodies and fragments thereof, are useful in in vitro diagnostics techniques and in in vivo radioimaging techniques and in radioimmunotherapy. In the instance of in vivo imaging, the HER2 binding proteins of the present disclosure may be conjugated to an imaging agent rather than a radioisotope(s), including but not limited to a magnetic resonance image enhancing agent, wherein for instance an antibody molecule is loaded with a large number of paramagnetic ions through chelating groups. Examples of chelating groups include EDTA, porphyrins, polyamines crown ethers and polyoximes. Examples of paramagnetic ions include gadolinium, iron, manganese, rhenium, europium, lanthanium, holmium and ferbium. In a further example of the disclosure, radiolabelled HER2 binding proteins, particularly antibodies and fragments thereof, particularly radioimmunoconjugates, are useful in radioimmunotherapy, particularly as radiolabelled antibodies for cancer therapy. In a still further example, the radiolabelled HER2 binding proteins, particularly antibodies and fragments thereof, are useful in radioimmuno-guided surgery techniques, wherein they can identify and indicate the presence and or location of cancer cells, precancerous cells, tumour cells, and hyperproliferative cells, prior to, during or following surgery to remove such cells.

Immunoconjugates or antibody fusion proteins of the present disclosure, wherein the HER2 binding proteins, particularly antibodies and fragments thereof, of the present disclosure are conjugated or attached to other molecules or agents further include, but are not limited to binding proteins conjugated to a chemical ablation agent, toxin, immunomodulator, cytokine, cytotoxic agent, chemotherapeutic agent or drug.

Radioimmunotherapy (RAFT) has entered has demonstrated efficacy using various antibody immunoconjugates. $^{131}$I labeled humanized anti-carcinoembryonic antigen (anti-CEA) antibody hMN-14 has been evaluated in colorectal cancer (Behr T M et al (2002) Cancer 94(4Suppl): 1373-81) and the same antibody with $^{90}$Y label has been assessed in medullary thyroid carcinoma (Stein R et al (2002) Cancer 94(1): 51-61). Radioimmunotherapy using monoclonal antibodies has also been assessed and reported for non-Hodgkin's lymphoma and pancreatic cancer (Goldenberg D M (2001) Crit Rev Oncol Hematol 39(1-2): 195-201; Gold D V et al (2001) Crit Rev Oncol Hematol 39 (1-2) 147-54). Radioimmunotherapy methods with particular antibodies are also described in U.S. Pat. Nos. 6,306,393 and 6,331,175.

Radioimmunoguided surgery (RIGS) has demonstrated efficacy and usefulness, including using anti-CEA antibodies and antibodies directed against tumour-associated antigens (Kim J C et al (2002) Int J Cancer 97(4):542-7; Schneebaum S et al (2001) World J Surg 25(12): 1495-8; Avital S et al (2000) Cancer 89(8):1092-8; Mc Losh D G et al (1997) Cancer Biothcr Radiopharai 12 (4):257-94).

HER2 binding proteins (e.g. antibodies) of the present disclosure may be administered to a patient in need of treatment via any suitable route, usually by injection into the bloodstream or CSF, or directly into the site of the tumour. The precise dose will depend upon a number of factors, including whether the antibody is for diagnosis or for treatment, the size and location of the tumour, the precise nature of the antibody (whether whole antibody, fragment, diabody, etc), and the nature of the detectable or functional label attached to the antibody. Where a radionuclide is used for therapy, a suitable maximum single dose is about 45 mCi/m$^2$, to a maximum of about 250 mCi/m$^2$. Preferable dosage is in the range of 15 to 40 mCi, with a further preferred dosage range of 20 to 30 mCi, or 10 to 30 mCi. Such therapy may require bone marrow or stem cell replacement. A typical antibody dose for either tumour imaging or tumour treatment will be in the range of from 0.5 to 40 mg, preferably from 1 to 4 mg of antibody in F(ab')2 form. Naked antibodies are preferable administered in doses of 20 to 1000 mg protein per dose, or 20 to 500 mg protein per dose, or 20 to 100 mg protein per dose. This is a dose for a single treatment of an adult patient, which may be proportionally adjusted for children and infants, and also adjusted for other antibody formats in proportion to molecular weight. Treatments m y be repeated at daily, twice-weekly, weekly or monthly intervals, at the discretion of the physician.

These formulations may include a second binding protein, such as EGFR binding proteins or HER2 binding proteins described herein. In an especially preferred form, this second binding protein is Trastuzumab.

(iii) Anti-Cancer Therapy

The HER2 binding proteins (e.g. antibodies) of the present disclosure are useful in a variety of applications, including research, diagnostic and therapeutic applications. In one example, the present disclosure provides a method of treating or preventing a disorder in a subject. As used herein, a "disorder" is a disruption of or interference with normal function.

(iv) Diagnostic Assays

The present disclosure also relates to a variety of in vitro or in vivo diagnostic applications, including methods for detecting the presence of aberrantly expressed HER2, by reference to their ability to be recognized by an HER2 binding protein (e.g. antibody) of the invention. Diagnostic applications of the antibody(ies) of the present invention include in vitro and in vivo applications well known and standard to the skilled artisan and based on the present description. Diagnostic assays and kits for in vitro assessment and evaluation of HER2 status, particularly with regard to aberrant expression of HER2, may be utilized to diagnose, evaluate and monitor patient samples including those known to have or suspected of having cancer, a precancerous condition, a condition related to hyperproliferative cell growth or from a tumour sample. The assessment and evaluation of HER2 status is also useful in determining the suitability of a patient for a clinical trial of a drug or for the administration of a particular chemotherapeutic agent or specific binding member, particularly an antibody, of the present disclosure, including combinations thereof, versus a different agent or antibody. This type of diagnostic monitoring and assessment is already in practice utilizing antibodies against the HER2 protein in breast cancer (Hercep Test, Dako Corporation), where the assay is also used to evaluate patients for antibody therapy using Herceptin. In vivo applications include imaging of tumours or assessing cancer status of individuals, including radioimaging.

The presence of HER2 in cells can be ascertained in vitro or in vivo immunological procedures known to persons skilled in the art. For example, the HER2 receptor forms complexes with one or more antibody(ies) and one member of the complex is labeled with a detectable label. The labels most commonly employed for these studies are radioactive elements, enzymes, chemicals which fluoresce when exposed to ultraviolet light, and others. A number of fluorescent materials are known and can be utilized as labels. These include, for example, fluorescein, rhodamine, auramine, Texas Red, AMCA blue and Lucifer Yellow. The anti HER2 antibody can also be labeled with a radioactive element or with an enzyme. The radioactive label can be detected by any of the currently available counting procedures. The preferred isotope may be selected from $^3$H, $^{14}$C, $^{32}$P, $^{35}$S, $^{36}$Cl, $^{51}$Cr, $^{57}$Co, $^{58}$Co, $^{59}$Fe, $^{90}$Y, $^{121}$I, $^{124}$I, $^{125}$I, $^{131}$I, $^{111}$In, $^{211}$At, $^{198}$Au, $^{67}$Cu, $^{225}$Ac, $^{213}$Bi, $^{99}$Tc and $^{186}$Re. Enzyme labels are likewise useful, and can be detected by any of the presently utilized colorimetric, spectrophotometric, fluorospectrophotometric, amperometric or gasometric techniques. The enzyme is conjugated to the selected particle by reaction with bridging molecules such as carbodiimides, diisocyanates, glutaraldehyde and the like. Many enzymes which can be used in these procedures are known and can be utilized. The preferred are peroxidase, β-glucuronidase, β-D-glucosidase, β-D-galactosidase, urease, glucose oxidase plus peroxidase and alkaline phosphatase. U.S. Pat. Nos. 3,654,090; 3,850,752; and 4,016,043 are referred to by way of example for their disclosure of alternate labeling material and methods.

Kits

The disclosure also contemplates the use of therapeutic or diagnostic kits comprising a HER2 binding protein of the disclosure for use in the present treatment methods. Such kits will generally contain, in suitable container means, a pharmaceutically acceptable formulation of at least one HER2 binding protein (such as an antibody or fragment) of the present disclosure. The kits can be used in detecting the presence of a HER2 receptor in a biological sample. The antibody compositions of the present disclosure can be provided in liquid or lyophilized form, either alone or in combination with additional antibodies specific for other epitopes. The antibodies, which can be labeled or unlabeled, can be included in the kits with adjunct ingredients (e.g., buffers, such as Tris, phosphate and carbonate, stabilizers, excipients, biocides and/or inert proteins, e.g., bovine serum albumin). For example, the antibodies can be provided as a lyophilized mixture with the adjunct ingredients, or the adjunct ingredients can be separately provided for combination by the user. Generally these adjunct materials will be present in less than about 5% weight based on the amount of active antibody, and usually will be present in a total amount of at least about 0.001% weight based on antibody concentration. Where a second antibody capable of binding to the antibody is employed, such antibody can be provided in the kit, for instance in a separate vial or container. The second antibody, if present, is typically labeled, and can be formulated in an analogous manner with the antibody formulations described herein.

Commercial test kits suitable for use by a medical specialist may be prepared to determine the presence or absence of aberrant expression of HER2, including but not limited to amplified HER2, in suspected target cells. In accordance with the testing techniques discussed above, one class of such kits will contain at least the labeled HER2 or its binding partner, for instance an antibody specific thereto, and directions, of course, depending upon the method selected, e.g., "competitive," "sandwich," "DASP" and the like. The kits may also contain peripheral reagents such as buffers, stabilizers, etc.

Accordingly, a test kit may be prepared for the demonstration of the presence or capability of cells for aberrant expression of HER2, comprising:
 (a) a predetermined amount of at least one labeled immunochemically reactive component obtained by the direct or indirect attachment of the HER2 binding protein described herein or a specific binding partner thereto, to a detectable label;
 (b) other reagents; and
 (c) directions for use of said kit.

More specifically, the diagnostic test kit may comprise:
 (a) a known amount of the HER2 binding protein as described above (or a binding partner) generally bound to a solid phase to form an immunosorbent, or in the alternative, bound to a suitable tag, or plural such end products, etc. (or their binding partners) one of each;
 (b) if necessary, other reagents; and
 (c) directions for use of said test kit.

In a further example, the test kit may be prepared and used for the purposes stated above, which operates according to a predetermined protocol (e.g. "competitive," "sandwich," "double antibody," etc.), and comprises:
 (a) a labeled component which has been obtained by coupling the HER2 binding protein to a detectable label;
 (b) one or more additional immunochemical reagents of which at least one reagent is a ligand or an immobilized ligand, which ligand is selected from the group consisting of:
  (i) a ligand capable of binding with the labeled component (a);
  (ii) a ligand capable of binding with a binding partner of the labeled component (a);
  (iii) a ligand capable of binding with at least one of the component(s) to be determined; and
  (iv) a ligand capable of binding with at least one of the binding partners of at least one of the component(s) to be determined; and
 (c) directions for the performance of a protocol for the detection and/or determination of one or more components of an immunochemical reaction between the HER2, the HER2 binding protein, and a specific binding partner thereto.

In accordance with the above, an assay system for screening potential drugs effective to modulate the activity of the HER2, the aberrant expression of the HER2, and/or the activity or binding of the HER2 binding protein may be prepared. The receptor or the binding protein may be introduced into a test system, and the prospective drug may also be introduced into the resulting cell culture, and the culture thereafter examined to observe any changes in the S-phase activity of the cells, due either to the addition of the prospective drug alone, or due to the effect of added quantities of the known agent(s).

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The present invention is described further in the following non-limiting examples.

EXAMPLES

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Materials and Methods

Cells Lines and Culture Conditions

Parental lines were obtained from American Type Culture Collection (ATCC, USA) Asterand Bioscience (USA), Ludwig Institute for Cancer Research or Cell Bank Australia (Australia). Cells were cultured in supplier recommended media in a 37° C. incubator with 5% $CO_2$. All media were supplemented with 10% foetal calf serum (FCS) (CSL, Melbourne, Victoria, Australia), 2 mM glutamine (Sigma Chemicals Co, St Louis, Mo., USA) and 2 mM penicillin/streptomycin (Life Technologies, Grand Island, N.Y., USA). Cells were passaged and their media replaced when 80% confluent. Cells were utilised for experiments during exponential growth phase. For passaging adherent cells, media was removed and an appropriate volume (based on the growth surface area) of PBS with 2 mM EDTA and Trypsin (Life Technologies™, Australia) solution was added. Cell lines are described in Table 1.

Antibodies and Antigen

Primary antibodies were purchased from commercially available sources as listed in Table 2 below or purified from hybridoma supernatant using Protein-C affinity chromatography.

TABLE 2

Antibodies used in the present application

| Antibody | Source |
|---|---|
| EGFR | Cell Signaling Technology, Beverly, MA |
| P-EGFR | Cell Signaling Technology, Beverly, MA |
| HER2 | Cell Signaling Technology, Beverly, MA |
| P-HER2 | Cell Signaling Technology, Beverly, MA |
| HER3 | Cell Signaling Technology, Beverly, MA |
| P-HER3 | Cell Signaling Technology, Beverly, MA |
| AKT | Cell Signaling Technology, Beverly, MA |
| P-AKT | Cell Signaling Technology, Beverly, MA |
| ERK | Cell Signaling Technology, Beverly, MA |
| P-ERK | Cell Signaling Technology, Beverly, MA |
| GAPDH | AbClon, Medford, MA. |
| LMH-3 (Mouse anti-3S193 idiotype antibody, used as mouse isotype control antibody (Liu Z, Panousis C, Smyth FE, Murphy R, Wirth V, Cartwright G, et al. Generation of anti-idiotype antibodies for application in clinical immunotherapy laboratory analyses. Hybridoma and hybridomics. 2003;22(4):219-28.) | Ludwig Institute for Cancer Research |
| Trastuzumab (Herceptin ® anti-HER2 antibody) | Roche Products Pty Limited (Australia) |
| Pertuzumab (Perjeta ®, anti HER2 antibody) | Genentech |
| IRDye 800 CW Donkey anti-Rabbit (used as a secondary antibody) | LI-COR, Lincoln, NE |
| IRDye 800 CW Donkey anti-Mouse (used as a secondary antibody) | LI-COR, Lincoln, NE |

TABLE 1

Cell lines

| Cell Line | Description |
|---|---|
| BT474 | Adherent cell line derived from a female patient with invasive ductal carcinoma of the breast, epithelial origin. The cell line is ER/PR-positive; Overexpresses HER-2 |
| SK-BR-3 | Adherent cell line derived from a metastatic site (pleural fluid) in a female patient with breast adenocarcinoma, epithelial origin. The cell line is ER-negative; PR-positive; Overexpresses HER-2 |
| SUM-159PT | Cell line isolated from a primary tumour of a patient with anaplastic breast carcinoma. The cell line is ER/PR/HER-2-negative |
| NCI-N87 | Adherent HER2 overexpressing cell line derived from a metastatic site (liver) in a male patient with gastric adenocarcinoma, epithelial origin |
| OE19 (JROECL19) | Adherent cell line OE19 derived from a moderately differentiated adenocarcinoma of gastric cardia/oesophageal gastric junction in a male patient. The tumour was identified as pathological stage III (UICC). |
| COLO 205 | Adherent cell line derived from a metastatic site (ascitic fluid) in a male patient with colorectal adenocarcinoma, epithelial origin |
| LIM1215 | Patchy adherent cell line LIM1215 from a metastatic site (omentum) in a male patient with adenocarcinoma of the ascending colon (Whitehead RH, Macrae FA, St. John DJB, Ma J. A colon cancer cell line (LIM1215) derived from a patient with inherited nonpolyposis colorectal cancer. Journal of the National Cancer Institute. 1985;74(4):759-65.). |

TABLE 2-continued

Antibodies used in the present application

| Antibody | Source |
|---|---|
| Goat anti-mouse Ig (whole)-Alkaline phosphatase (A-3688) (used as a secondary antibody) | Sigma |
| Alexa-488-conjugated anti-mouse IgG antibody (used as a secondary antibody) | ThermoFisher |
| Alexa-488-conjugated anti-human IgG antibody (used as a secondary antibody) | ThermoFisher |

Antigen

Linear and cyclised peptide immunogen and irrelevant control peptide were chemically synthesized and coupled with keyhole limpet hemocyanin (KLH) by Mimitopes Pty Ltd (Clayton, Australia). The linear peptide sequence was H-CPLHNQEVTAEDGTQR-NH2 (SEQ ID NO: 56) and cyclic peptide sequence was H-GCPLHNQEVTAE-DGTQRC-NH2 (SEQ ID NO: 26), where H- at the N terminus means free amine. Control irrelevant peptide H-LEEKKGNYVVTDHC-NH2 (SEQ ID NO: 57) coupled to KLH was also prepared.

The HER2 extracellular domain (HER2-ECD) was generated in the laboratory of academic collaborator Prof A. W. Burgess (The Walter and Eliza Hall Institute of Medical Research) based upon prior published methods (Xu Y, Soo P, Walker F, Zhang H H, Redpath N, Tan C W, et al. LRIG1 extracellular domain: Structure and function analysis. Journal of molecular biology. 2015; 427(10):1934-48.). Briefly, synthetic DNAs (GenScript®) corresponding to human HER2-ECD was cloned into the expression vector and expressed in Hi5 insect cells and purified by anti-FLAG M2 beads (Sigma-Aldrich). The proteins were further purified by gel filtration in 20 mM Tris-HCl (pH 8.5) and 100 mM NaCl.

Cell Biology Reagents and Source

Details of the reagents are provided in the following table.

TABLE 3

Reagents used

| Reagent | Source |
|---|---|
| Dimethyl sulphoxide | Sigma Chemical Co., USA |
| Dulbecco's Modified Eagles Medium (DMEM) | Gibco BRL, Australia |
| Dynabeads ™ Protein G | ThermoFisher Scientific |
| Ethylenediaminetetraacetate (EDTA) | Sigma Chemical Co., USA |
| Foetal Calf Serum (FCS) | Gibco BRL, Australia |
| Opti-MEM ® Reduced Serum Medium | Gibco BRL, Australia |
| P-Nitrophenyl Phosphate (pNPP) | Sigma Chemical Co, USA |
| Propidium iodide (PI) | Sigma Chemical Co, USA |
| RPMI 1640 | Gibco BRL, Australia |
| TrypLE ™ | Life technologies ™, Australia |
| Trypan Blue | BioRAD |
| Trypsin/EDTA | Gibco BRL, Australia |

Media and Solutions

Agarose (1-1.5%): Agarose dissolved in 1×TAE to a final concentration of 1-1.5% w/v.

Agarose buffer 1×: 10 mM BisTris HCl pH 6.5; 0.2 mM EDTA; 100 mM NaCl.

Blocking Buffer: 5% w/v skim milk powder (Fonterra, Mount Waverly, Australia), 0.1% v/v Tween20 (ICN Biomedicals) in Tris buffered saline (TBS; 20 mM Tris-HCl, 150 mM NaCl).

Diethanolamine-HCl buffer: Diethanolamine (10% or 0.1 M), MgCl2.6H2O (1 mM), NaN3

DMEM-10: Dulbeccos modified eagles medium supplemented with 10% FCS, 2 mM L-alanyl-L-glutamine GlutaMAX™), 100 U/ml penicillin and 100 mg/ml streptomycin.

EDTA-PBS: 2 mM of EDTA in PBS without Ca2+ or Mg2+.

EDTA-PBS-3% FCS: EDTA-PBS supplemented with 3% FCS.

MATRIGEL™ Matrix:

| Composition MATRIGEL ™ Matrix (Product information) | |
|---|---|
| Component | Amount |
| Structural Protein | |
| Laminin | 56% |
| Collagen IV | 31% |
| Entactin | 8% |
| Growth Factors | |
| Epidermal Growth Factor | 0.7 ng/mL |
| Platelet Derived Growth Factor | 12 pg/mL |
| Insulin-like Growth Factor-1 | 16 ng/mL |
| Transforming Growth Factor-β | 2.3 ng/mL |

RIPA Buffer: 50 mM Tris, 150 mM NaCl, 5 mM EDTA, 0.5% sodium deoxycholate, 10 mM NaF and protease inhibitors (pH 7.5).

RPMI-10 medium: RPMI-1640 containing 10% fetal calf serum (FCS), 2 mM L-alanyl-L-glutamine (GlutaMAX™), 100 U/ml penicillin and 100 mg/ml streptomycin.

Running buffer (Western blot): 20× NuPAGE® SDS Running Buffer (Invitrogen) diluted to 1× Running Buffer in milliqH2O.

TBS (10×): 24.2 g Trizma® Base; 80 g Sodium Chloride; 970 ml H2O, Adjusting the pH using HCL to 7.5 in total volume of 1000 ml.

TBS-T: 1×TBS supplemented with 0.05% Tween® 20.

Cell Biology Instruments

Details of the cell biology instruments are provided in the following table.

TABLE 4

Instrument details

| | |
|---|---|
| FACSArialII flow cytometer | Becton Dickinson, USA |
| FACSCanto II flow cytometer | Becton Dickinson, USA |
| iBlot ® 2 Gel Transfer Device | ThermoFisher, USA |
| Inverted microscope (CKX41) | Olympus, USA |
| Inverted microscope (CX31) | Olympus, USA |
| Leica TCS SP2 laser scanning confocal microscope | Life Sciences, USA |
| Magnetic column (MPC-L) | Dynal, Norway |
| Needles (23-gauge, 26-gauge) | Terumo, USA |
| Pipette Aid | Drummond, USA |
| Pipettes (3 ml, 5 mL, 10 mL, 25 mL) | Costar, USA |
| Polypropylene round-bottom FACS tubes (5 ml) | Becton Dickinson, USA |
| Polystyrene round-bottom FACS tubes (5 ml) | Becton Dickinson, USA |
| Polystyrene round-bottom FACS tubes (5 ml) | Proscience, Australia |
| Rotary Microtome KD-1508R | Bio-EQUIP, China |
| Versamax microplate reader | Molecular Devices, USA |

TABLE 4-continued

Instrument details

| | |
|---|---|
| Tissue culture petri dishes (60/90 mm) | Greiner Bio-One, Germany |
| Tissue culture plates (96 wells-U bottom) | BD Falcon, Australia |
| Tissue culture plates (96 wells-V bottom) | Costar, USA |

Immunization of Mice and Monoclonal Antibodies Production

Female BALB/c mice were immunized with 30 µg peptide comprising a conformationally exposed region of the HER2 extracellular domain, as determined by structural modelling, with sequence H-GCPLHNQEVTAEDGTQRC-NH$_2$ (SEQ ID NO: 26) synthesized as a cyclic peptide and coupled with keyhole limpet hemocyanin (KLH) as a carrier protein. Injections were administered into the peritoneum at four-week intervals. The antigen was prepared in phosphate-buffered saline (PBS, pH 7.2) and then mixed with Freund's complete adjuvant (Sigma, St. Louis, Mo.) (Flies D B, Chen L. A simple and rapid vortex method for preparing antigen/adjuvant emulsions for immunization. Journal of immunological methods. 2003;276(1):239-42) for the first injection and with Freund's incomplete adjuvant for the second injection. Two booster injections of peptide immunogen alone then followed. Three days after the last immunization, mice were sacrificed and splenocytes from hyperimmunized mice were harvested and fused with mouse myeloma cell line SP2/0 at a ratio of 1:50 to produce hybridomas (Yokoyama W M, Christensen M, Santos G D, Miller D, Ho J, Wu T, et al. Production of monoclonal antibodies. Current protocols in immunology. 2006:2.5. 1-2.5. 29). Fused cells were grown in complete RPMI media supplemented with 10% FCS and additives. Supernatants of growing cells were screened using indirect ELISA.

Enzyme-Linked Immunosorbent Assay (ELISA)

Polystyrene 96-well plates were coated with 3 µg/mL HER2-ECD peptide-KLH antigen as either the linear or cyclic peptide, negative control-KLH conjugated peptide, or recombinant HER2 ECD in PBS overnight at 4° C. The plates were blocked with 3% FCS in PBS for one hour at room temperature (RT). Plates were incubated with serially diluted hybridoma supernatants starting at 1:50 dilutions along with appropriate controls for one hour. Following washing three times, plates were incubated with anti-mouse IgG HRP conjugate (1:2000 dilutions) for one hour at RT. After a further three washes phosphatase activity was measured using pNPP substrate with absorbance (OD) reading at 405 nm using a Versamax microplate reader (Molecular Devices) with Softmax Pro 4.8 Software.

Following identification of positive hybridomas purified antibody from 4 candidate clones (referred to herein as mAb104, mAb105, mAb106 or mAb107), was assessed by ELISA. Polystyrene 96-well plates were coated with 3% FCS in PBS for one hour at RT. A final peptide concentration of 1 mg/mL was achieved by diluting the peptide in 0.1% acetic acid. This peptide solution was further diluted to 30 µg/ml in 3% FCS-PBS. Plates were incubated with the linear or cyclic peptide immunogen coupled to KLH, HER2-ECD or negative control peptide-KLH, in dilution buffer (3% FCS-PBS) for one hour at RT. After washing plates three times with 0.05% Tween 20-PBS, wells were incubated with 10 µg/mL mAb104, mAb105, mAb106 or mAb107 for another hour at RT. Following washing, plates were then incubated with anti-mouse Ig-Alkaline phosphatase (Sigma A-3688), (1:3000 dilutions) for one hour at RT. After a further three washes phosphatase activity was measured using pNPP substrate with optical density absorbance reading at 405 nm using a Versamax microplate reader (Molecular Devices) with Softmax Pro 4.8 Software.

Polystyrene 96-well plates were coated with 50 ml/well, 3 µg/mL recombinant ErbB2 ECD, ErbB3 ECD, ErbB4 ECD or EGFR501 in PBS overnight at 4° C. The plates were blocked with 3% FCS in PBS for one hour at room temperature (RT). Plates were incubated with 10 µg/mL serially diluted purified antibody along with appropriate controls for one hour at RT. Following washing three times, plates were incubated with anti-mouse IgG AP conjugate (1:2000 dilutions) for one hour at RT. After a further three washes phosphatase activity was measured using pNPP substrate with absorbance (OD) reading at 405 nm using a SPECTROstar microplate reader (BMG LABTECH, Victoria, Australia).

FACS Analysis

Cells (1×10$^4$) plated in a 96-well plate were incubated for one hour at 4° C. with 10 µg/ml anti-HER2 antibodies or IgG1 isotype control antibody. Humanised antibodies Trastuzumab and Pertuzumab were detected using Alexa-488-conjugated anti-human IgG antibody. Bound mAb104, mAb105, mAb106 or mAb107 or mouse isotype control LMH-3 were detected using Alexa-488-conjugated anti-mouse IgG antibody and fluorescence was read on a Becton Dickinson FACScan (CellQuestPro Version 4.0.2). Negative controls included secondary antibodies alone and background fluorescence of cells alone.

Biosensor Analysis

Surface Plasmon Resonance (SPR) kinetic analyses were performed in a BIAcore™ T200 system using a carboxymethyldextran-coated sensor chip (CM5-S, GE Life Sciences). The test channel was derivatised HER2-ECD to 200 response units (RU) using standard amine coupling chemistry (0.05M NHS/0.2M EDC). The blank control channel for correction of refractive index effects was derivatised with ethanolamine.

Samples of mAb104, mAb106, Pertuzumab or Trastuzumab anti-HER2 antibodies were diluted in PBS/0.005% Tween 20 buffer to concentrations of 320 µg/mL to 0 µg/mL in two-fold dilution, (2133 to 0 nM). The samples were injected at 45 uL/min for 200 seconds (30 µL at 10 µL/min) in PBS buffer containing 0.005% Tween-20 over immobilized HER2-ECD using PBS/0.005% Tween 20 as running buffer. After the injection phase, the dissociation was monitored by flowing running buffer over the chip surface for 600 s. Bound antibody was eluted and the chip surface regenerated between samples by injection of 30 µl of 50 mM NaOH at 30 uL/min for 30 s.

Western Blot Analysis

Reactivity of anti-HER2 monoclonal antibodies against native HER2 was determined using western blot. Trypsinised cells were lysed with RIPA buffer [50 mM Tris pH 7.5, 150 mM NaCl, 5 mM EDTA, 200 mM Na$_3$VO$_4$, 0.5% deoxycholate, 0.05% SDS, 10 mM NaF and the protease inhibitor cocktail set 1 m, CA, USA)] for 20 minutes and centrifuged at 17,000 rpm for 15 minutes. 10 µg of cell lysis proteins were run on 4-12% gradient Nu-PAGE gels and electrotransferred onto nitrocellulose membrane using the iBlot® 2 Gel Transfer Device (ThermoFisher). The presence of EGFR and HER2 using commercial antibodies and HER2 bound by mAb104 was assessed by probing the blots with the respective antibodies. The blots were observed on a Storm 804 Phosphoimager (Amersham Bioscience) for analysis using the ImageQuant TL image Analysis Software (Version 2005).

Immunohistochemistry

To confirm the tumour selectivity of mAb104, an immunohistochemical methodology was developed and used to screen a range of normal and tumour tissue types for mAb104 reactivity. Variations of antigen retrieval, primary antibody concentrations and incubation times were evaluated prior to optimising conditions as described. In the following, only the final protocol is briefly discussed. Slides were placed in the oven at 60° C. for 30 minutes and transferred to a xylene bath with a change in bath after 10 minutes. The slides were then rehydrated in two changes of 100% ethanol for ten minutes each, and then for ten minutes in a 70% ethanol bath. Slides were rinsed three times in a double distilled (dd)$H_2O$ with each wash lasting about two minutes. The slides were then quenched in 3% $H_2O_2$ for 20 minutes. Antigen retrieval was achieved by treating the slides in a 10% (v/v) EDTA buffer bath for 30 minutes at 100° C. After cooling and washing with phosphate-buffer saline (PBS), slides were pre-incubated in protein blocking reagent (SuperBlock™ T20, ThermoFisher®) for 60 minutes. Slides were then incubated with mAb104 primary antibody (2.5 ag/mL) for 60 minutes at room temperature. After staining with primary antibody, bound antibodies were detected using Streptavidin-Horse Radish Peroxidase (HRP)-labelled anti-murine secondary antibody (Dakocytomation, Carpinteria, Calif., USA). Bound antibodies were detected with 3,3'-Diaminobenzidine (DAB) substrate and counterstained in haematoxylin and Eosin (H&E) (BDH Laboratory, Poole, UK), dehydrated in ethanol and xylene and mounted.

Using this method the expression of these proteins was examined in eleven normal human tissues and ten common tumour types (breast intraductal carcinoma, mesothelioma, colorectal and gastric adenocarcinoma, renal cell carcinoma, lung adenocarcinoma, lung squamous cell carcinoma, hepatocellular carcinoma, prostate adenocarcinoma, and brain glioblastoma multiformae from 9-27 different human donors using tissue microarrays (TMAs). Tumour and normal tissues were not derived from the same patient (i.e. unmatched). Human tissues were obtained from the Department of Anatomical Pathology, Austin Health (Melbourne, Australia). The study was approved by the Austin Health Human Research and Ethics Committee.

Ki-67: The expression of the human protein Ki-67 protein is strictly associated with cell proliferation and is present during all active phases of the cell cycle (Gerdes J, editor Ki-67 and other proliferation markers useful in immunohistological diagnostic and prognostic evaluations in human malignancies. Seminars in cancer biology (1990)). Antigens were retrieved in 10% (v/v) citrate buffer (pH 6.0) in water at 100° C. for 20 minutes. After cooling, non-specific binding sites were blocked with protein blocking reagent (SuperBlock™ T20, ThermoFisher®) for 20 minutes at room temperature. Rabbit anti-human Ki-67 primary antibody (RM-9106-S1, ThermoFisher®) diluted in 1:100 in blocking buffer and incubated at room temperature for two hours. After washing off excess antibody, bound antibody was detected using species appropriate secondary antibody (Dakocytomation, Carpinteria, Calif., USA) for 30 minutes at room temperature. Bound antibodies were detected with 3,3'-Diaminobenzidine (DAB) substrate. Slides were then counterstained in haematoxylin and Eosin (H&E) (BDH Laboratory, Poole, UK), dehydrated in ethanol and xylene and mounted.

Apoptosis: Apoptotic cells were detected by the In Situ Cell Death Detection Kit, Fluorescein (11684795910 Roche, USA) using the terminal deoxynucleotidyl transferase (TdT) dUTP Nick-End Labeling (TUNEL) assay. Slides generated from paraffin embedded tissue were dewaxed and rehydrated as described above and rinsed three times in a dd$H_2O$ with each wash lasting about two minutes. Tissue sections were incubated in Proteinase K working solution for 20 minutes at room temperature and then rinsed in PBS rinse two times. Positive and negative controls were prepared as per product specifications. 100 µl of TUNEL reaction mixture or 100 µl Control Label solution for negative control added to each slide and incubated in a humidified chamber for 60 minutes at 37° C. Following the period of incubation, slides were washed three times with PBS. 50 µl of Covertor-POD applied to slides with a coverslip after applying to avoid evaporation loss and incubated in humidified chamber for 30 minutes at 37° C. After washing three times with PBS 50-100 µl of DAB substrate applied to slides and incubated for ten minutes at RT. Slides washed with PBS and analysed under light microscope.

Podocalyxin: Slides generated from paraffin embedded tissue were dewaxed and rehydrated as previously. After quenching slides in 3% $H_2O_2$ for 20 minutes at room temperature, antigens were retrieved by incubating slides in 10% (v/v) citrate buffer (pH 6.0) at 100° C. in a water bath for 20 minutes. 15 µg/mL of goat anti-mouse podocalyxin primary antibody (Catalog # AF1556, R&D Systems®) added to each slide and incubated for two hours at room temperature. The sections were then washed and bound antibodies were detected using the anti-goat HRP, counterstained in haematoxylin and Eosin (H&E) (BDH Laboratory, Poole, UK), dehydrated in ethanol and xylene and mounted.

p-Akt: Slides generated from paraffin embedded tissue were dewaxed by heating to 60° C., and rehydrated in xylene and graded alcohols. After rinsing sides three times in a dd$H_2O$ antigen retrieval was performed by incubating slides in 0.01 M citrate buffer (pH 6.0) for 20 min in a 95% water bath. Once slides were allowed to cool, slides were sequential rinsed in PBS and 50 mm Tris-HCl (pH 7.6), 150 mm NaCl, Tween 20 (0.1%; TBS-T). Endogenous peroxidase activity was quenched by incubation in TBS-T containing 3% hydrogen peroxide at room temperature for 15 minutes. Sections were then incubated in primary antibody (Rabbit polyclonal phospho-Akt (Ser 473; Cell Signaling Technology, Beverly, Mass., Cat. No 9277, IHC specific) diluted in TBS-T at a 1:100 dilution overnight at 4° C. After washing slides three times in TBS-T, with each wash lasting about two minutes, slides were incubated in rabbit biotinylated secondary at a 1:200 dilution for one hour. Bound antibodies were detected using DAB substrate and counterstained in haematoxylin and Eosin (H&E) (BDH Laboratory, Poole, UK), dehydrated in ethanol and xylene and mounted.

Cell Proliferation Assay

Cells ($1 \times 10^4$) in serum-depleted media were seeded in a 96-well microtiter plate and allowed to adhere overnight. Antibodies with appropriate controls added with serial dilutions the following day and one plate was harvested for a time 0 (T=0) measurement. Remaining cell plates were incubated for 3 to 5 days. Cell viability was assessed using the MTS colourimetric viability assay with 3-(4,5-dimethylthiazol-2-yl)-5-(3-carboxymethoxyphenyl)-2-(4-sulfophenyl)-2H-tetrazolium (MTS) as a substrate (Promega, Australia). Absorbance was assessed at 490 nm using a VersaMax Microplate Reader (Molecular Devices, USA) and SoftMax Pro 5.4.1 software (Molecular Devices, USA). Absorbance at 630 nm was also determined as background and the value subtracted from the 490 nm reading. Experiments were performed in triplicate and repeated for two to three independent runs. All data were normalized to signal at the time of compound addition (T=0). Dose-response curves were analyzed using GraphPad prism 4.03 (Graphpad Software Inc, La Jolla, Calif., USA)

Downstream Signalling

Cells ($1\times10^6$) were seeded into 6 wells plates in duplicate and allowed to establish overnight. The media in each well was discarded and replaced with serum-free media containing a total concentration of 10 mg/mL of desired antibodies. At designated time points (24 hours) half the wells were treated with 100 ng EGF for 10 minutes at room temperature. The reaction was stopped by washing with ice-cold PBS, and lysed with RIPA buffer [50 mM Tris pH 7.5, 150 mM NaCl, 5 mM EDTA, 200 mM $Na_3VO_4$, 0.5% deoxycholate, 0.05% SDS, 10 mM NaF and the protease inhibitor cocktail set 1 m, CA, USA)] for 30 minutes. This was followed by centrifugation at 17,000 rpm for 15 minutes. Total protein concentration was determined using the Bio-Rad protein assay kit (Bio-Rad Laboratories, Hemel Hempstead, UK). MAPK activation was assessed by Western blotting using commercial antibodies against HER2 (#4290), pHER2 (#2243), HER3 (#12708), pHER3 (#4791), EGFR (#4267), pEGFR (#3777), AKT (#4691), pAKT (#4060), ERK (#4695), and pERK (#4370) purchased from Cell Signaling Technology. Anti-GAPDH (AbC-1001) antibody was purchased from AbClon. Bands were visualized using AbSignal (AbClon, AbC-3001).

Cell Death Detection by Enzyme-Linked Immunosorbent Assay (ELISA)

Cell death and apoptosis were assessed using an ELISA assay (Cell Death Detection ELISAPlus kit; Roche Molecular Biochemicals) (Holdenrieder S, Stieber P, Bodenmuller H, Fertig G, Furst H, Schmeller N, et al. Nucleosomes in serum as a marker for cell death. Clinical Chemistry and Laboratory Medicine. 2001; 39(7):596-605) according to the manufacturer's instructions. In brief, cells were cultured in 96-well plates and allowed to establish overnight. Cells were treated with Trastuzumab, Pertuzumab and mAb104 as monotherapy and in combinations for 24 hours in serum-depleted (1%) growth media. The plate was centrifuged at 200×g at 4° C. for 10 minutes. The supernatant was carefully removed and 200 µl of manufacturer's lysis buffer added and incubated for 30 minutes at room temperature. Following incubation the plate was centrifuged and 20 µl of supernatant and cell lysate solutions were placed in triplicate into a streptavidin-coated microplate. A further 80 µL of the immunoreagent containing a mixture of anti-histone-biotin and anti-DNA-POD were added to the supernatant. The plate was incubated for 2 hours at room temperature in a shaking incubator. The extent of apoptosis was quantitatively determined photometrically with ABTS (2,2'-azinobis-3-ethyl-benzothiazoline-6-sulfonic acid) as substrate using microplate reader at a wavelength 405 nm and reference wavelength of 490 nm using a Versamax microplate reader (Molecular Devices) running the Softmax Pro 4.8 Software.

Apoptosis Assay

Propidium iodide (PI) uptake and binding of Annexin V were used to determine cell viability. In brief, cells ($5\times10^4$) were cultured in a 24 well plate and allowed to establish overnight. Cells were treated with antibody as monotherapy and in combination or in media for 24 hours with appropriate controls. Cells were transferred to a 96-well plate and after washing three times with cold-PBS and re-suspended in binding buffer with 2.5 µl FITC Annexin V and 2.5 µl PI for 15 minutes in the dark with gentle agitation at room temperature. A further 150 µl binding buffer was added after incubation prior to flow cytometric analysis.

Migration (Wound Healing) Assay

To assess the effect of mAbO14 on cellular migration, OE-19 cells ($1\times10^5$) were seeded in a 6 well plate and allowed to grow to 80% confluence. Three parallel scratches were made in each well using a 100 µl pipette tip. Cells were treated with 100 µg/mL of desired antibody or isotype control. Phase control microscope photographs were taken a starting immediately post treatment (designated T0) for 72 hours.

Effect of mAb104 on ErbB Receptor Dimerization

Cells in serum-depleted media were seeded in a 12-well plate and allowed to adhere overnight. Cells were treated with 10 µg/mL of relevant antibody or control for one hour in duplicates. At the designated time point half the wells were treated with 100 ng EGF for 10 minutes at room temperature. The reaction was stopped by washing with ice-cold PBS, and cells incubated with BS3 (Bis (sulfosuccinimidyl) substrate ((BS3), Pierce, Rockford, Ill., USA) for 20 minutes at room temperature with gentle rocking as per the manufacturer's instructions (Staros J V. N-hydroxysulfo-succinimide active esters: bis (N-hydroxysulfosuccinimide) esters of two dicarboxylic acids are hydrophilic, membrane-impermeant, protein cross-linkers. Biochemistry. 1982; 21(17):3950-5). After quenching the crosslinking reaction mixture with buffer containing 10 mM Tris-HCl, cells were washed twice with cold PBS and lysed with RIPA buffer [50 mM Tris pH 7.5, 150 mM NaCl, 5 mM EDTA, 200 mM $Na_3VO_4$, 0.5% deoxycholate, 0.05% SDS, 10 mM NaF and the protease inhibitor cocktail set 1 M, CA, USA)] for 30 minutes. Cell lysates were subject to immunoprecipitation with the relevant antibodies and immunoblotted for EGFR and HER2.

Gel Electrophoresis of DNA

DNA gel electrophoresis was performed on gels containing 1% (w/v) DNA grade agarose (Bioline) prepared in 1× Tris-acetate EDTA (TAE) buffer (Invitrogen) with SYBR® Safe DNA Gel Stain (Invitrogen). All DNA samples were diluted with a 10× stock of Orange G (Sigma) gel loading buffer before loading on to agarose gels. Electrophoresis was performed at 70-150V and the 1 kb Plus DNA ladder (Invitrogen) was used as a reference for estimation of size. DNA bands were visualised and photographed under UV light on a transilluminator (Bio-Rad).

Hybridoma cDNA Synthesis

The High Capacity cDNA Reverse Transcription kit (Applied Biosystems, California, USA) was used for reverse transcription (RT) of 10 µL (~1-5 µg) RNA to cDNA using a reaction size of 20 µl. cDNA synthesis was performed in 200 µl thin-walled polypropylene PCR tubes (Eppendorf, USA) with the following reaction and cycle condition using a T100™ (BIO-RAD, USA) or MasterCycler® (Eppendorf, USA) thermal cycler according to standard methods.

cDNA Synthesis Conditions:
  25° C. for 10 minutes
  37° C. for 120 minutes
  85° C. for 5 minutes
  4° C. holding Murine Light Chain Variable Region Primers:

(i)
                                (SEQ ID NO: 28)
ATG AAG TTG CCT GTT AGG CTG TTG GTG CTG (ii)
                                (SEQ ID NO: 29)
ATG GAG WCA GAC ACA CTC CTG YTA TGG GT

-continued (iii)
(SEQ ID NO: 30)
ATG AGT GTG CTC ACT CAG GTC CTG GSG TTG (iv)
(SEQ ID NO: 31)
ATG AGG RCC CCT GCT CAG WTT YTT GGM WTC TTG (v)
(SEQ ID NO: 32)
ATG GAT TTW CAG GTG CAG ATT WTC AGC TTC (vi)
(SEQ ID NO: 33)
ATG AGG TKC YYT GYT SAG YTY CTG RGG (vii)
(SEQ ID NO: 34)
ATG GGC WTC AAG ATG GAG TCA CAK WYY CWG G (viii)
(SEQ ID NO: 35)
ATG TGG GGA YCT KTT TYC MMT TTT TCA ATT G (ix)
(SEQ ID NO: 36)
ATG GTR TCC WCA SCT CAG TTC CTT G (x)
(SEQ ID NO: 37)
ATG TAT ATA TGT TTG TTG TCT ATT TCT (xi)
(SEQ ID NO: 38)
ATG GAA GCC CCA GCT CAG CTT CTC TTC C (xii)
(SEQ ID NO: 39)
ATG AAG TTT CCT TCT CAA CTT CTG CTC Murine Light Chain Variable Region Reverse Primer Sequence:

MKC:
(SEQ ID NO: 40)
TGG ATG GTG GGA AGA TG

Murine Heavy Chain Variable Region primers:

(i)
(SEQ ID NO: 41)
ATG AAA TGC AGC TGG GTC ATS TTC TTC (ii)
(SEQ ID NO: 42)
ATG GGA TGG AGC TRA TCA TSY TCT T (iii)
(SEQ ID NO: 43)
ATG AAG WTG TGG TTA AAC TGG GTT TTT (iv)
(SEQ ID NO: 44)
ATG RAC TTT GWY TCA GCT TGR TTT (v)
(SEQ ID NO: 45)
ATG GAC TCC AGG CTC AAM AGT TTT CCT T (vi)
(SEQ ID NO: 46)
ATG GCT GTC YTR GSG CTR CTC TTC TGC (vii)
(SEQ ID NO: 47)
ATG GRA TGG AGC KGG RTC TTT MTC TT (viii)
(SEQ ID NO: 48)
ATG AGA GTG CTG ATT CTT TTG TG (ix)
(SEQ ID NO: 49)
ATG GMT TGG GTG TGG AMC TTG CTA TTC CTG (x)
(SEQ ID NO: 50)
ATG GGC AGA CTT ACA TTC TCA TTC CTG (xi)
(SEQ ID NO: 51)
ATG GAT TTT GGG CTG ATT TTT TTT ATT G (xii)
(SEQ ID NO: 52)
ATG ATG GTG TTA AGT CTT CTG TAC CTG Murine Heavy Chain Variable Region Reverse Primer Sequence:

MHC:
(SEQ ID NO: 53)
CCAGTGGATAGACAGATG

Murine Light Chain Variable Region Degenerate Forward and Reverse Primers:

Kappa F:
(SEQ ID NO: 54)
GCC GAA TTC GAY ATT GTG MTS ACM CAR WCT MCA

Kappa R:
(SEQ ID NO: 55)
CCG GTC GAC GGA TAC AGT TGG TGC AGC ATC

Key to Symbols:
R=A or G, Y=C or T, M=A or C, K=G or T, S=G or C, W=A or T, H=A or T or C
B=G or T or C, D=G or A or T, N=A or C or G or T, V=G or A or C Polymerase Chain Reaction To amplify DNA fragments for cloning, Platinum® Pfx DNA polymerase (Invitrogen) was used according to manufacturer's instructions. The PCR reaction mix was then performed in 200 µL thin-walled polypropylene PCR tubes (Eppendorf) with the following reaction and cycle condition using a T100™ (BIO-RAD, USA) or a MasterCycler® (Eppendorf) thermal cycler according to standard methods.

PCR Conditions:
94° C. for 3 minutes
(94° C. for 1 minute→x°C$^a$ for 55-90 seconds$^b$→72° C. for 2 minutes) for 15-25 cycles
72° C./10 minutes
4° C. holding In Vivo Studies NOD-SCID-IL2R$^{-/-}$ mice (4 to 6-weeks old, Animal Research Centre, Perth, Australia) were injected subcutaneously with $5\times10^6$ of NCI-N87 or $8\times10^6$ of BT-474 cells into the flank area in Matrigel (BD Biosciences). Mice injected with BT-474 cells were implanted with estrogen pellets 24 hours prior. Tumour volumes were calculated using the formula $(L\times W^2)/2$, where "W" represents the width of the tumour and "L" the length of the tumours. Tumours were allowed to grow to approximately 100 mm$^3$ in size, and mice were than randomized into various treatment groups. Tumours which failed to engraft were excluded from further analysis. Treatments were given three times a week at doses indicated via intraperitoneal injections for three weeks. Animals were observed post treatment and sacrificed when the average tumour volume was >1000 mm$^3$ or displayed prolonged symptoms of stress. Post mortem tumours were resected and processed as formalin-fixed, paraffin-embedded specimen sections, collected for Reverse Phase Protein Array (RPPA) and excess tissue stored at −80° C. At the end of therapy, percentage tumour growth inhibition (% TGI) was calculated as follows: % TGI=[1−{T/T$_0$/C/C$_0$}−{C$_0$/C}]×100 where T=mean tumour volume of treated at endpoint, T$_0$=mean tumour volume of treated at time 0, C=mean tumour volume of control at endpoint and C$_0$=mean tumour volume of vehicle control at time 0.

All animal study protocols were approved by the Austin Health Animal Ethics Committee (protocol # A2015/05297) and conducted in accordance with the Australian Code of Practice for the Care and Use of Animals for Scientific Purposes (8th Edition 2013).

Reverse Phase Protein Array (RPPA)

Protein was extracted from HER2 overexpressing breast PDX tumours and RPPA was performed as described previously (Hennessy B T, Lu Y, Gonzalez-Angulo A M, Carey M S, Myhre S, Ju Z, et al. A technical assessment of the utility of reverse phase protein arrays for the study of the functional proteome in non-microdissected human breast cancers. Clinical proteomics. 2010; 6(4):129). Tumour samples obtained at the end of treatment were lysed by homogenisation using lysis buffer (Cat no. #9803, Cell Signaling Technology, Beverly, Mass., USA), supplemented with protease and phosphatase inhibitors (Roche Applied Science Cat. #05056489001, Penzberg Germany). Protein concentration was determined using the Pierce™ BCA Protein Assay Kit, normalised to 1 mg/mL and samples boiled with 2-mercapto-ethanol and SDS. The treated protein lysates were sent to the MD Anderson Cancer Centre, Houston, Tex., USA for RPPA analysis as described below.

Lysates were serially diluted in five-fold serial dilutions with lysis buffer to achieve a 1:16 dilution. Lysates were arrayed on nitrocellulose-coated slides (Grace Biolab) in an 11×11 format. Samples were probed with 297 validated primary antibodies by tyramide-based signal amplification approach and visualized by DAB colorimetric reaction. Slides were scanned, analyzed, and quantified by Array-Pro Analyzer (Meyer Instruments, INC. Houston, Tex.) to generate spot intensity.

Each dilution curve was fitted with a logistic model ("Supercurve Fitting," developed by the Department of Bioinformatics and Computational Biology at MD Anderson Cancer Center, Houston, Tex., USA). All the data were normalized by median polish for protein-loading correction factor and transformed to linear values using the median expression levels of all antibody experiments. "Red" in the heatmaps means above median and "green" means below median.

Statistical Analysis

Analyses were performed using Prism® Version 5.04. All p-values are two-sided and values≤0.05 were considered significant.

For comparison of means, Student t-test or the non-parametric Mann Whitney U test was employed where only two groups were being considered. For comparison between three or more groups, parametric data were analysed by ANOVA and if p≤0.05, then post-hoc testing using the Bonferroni method was undertaken to determine which group(s) differed significantly. The non-parametric test employed for multiple groups was the Kruskal-Wallis test and if p≤0.05 then post-hoc testing was undertaken to determine which group(s) differed significantly.

The survival of groups was also compared and if the log-rank test across all groups was significantly different (p≤0.05), then post-hoc testing by further log-rank testing was undertaken to determine which group(s) differed significantly.

Example 1—In Vitro Antibody Generation and Characterisation

The immunising antigen and immunisation protocol are described earlier. Through a series of immunisations and screening strategies involving HER2 peptides, recombinant proteins and HER2 expressing cell-based assays, the inventors were finally successful in generating tumour specific monoclonal antibodies to a conformationally flexible region of domain II of HER2.

The inventors undertook immunization strategies with the linear peptide linked to biotin, GST, MBP, and KLH carrier proteins and Baf/03 hematopoietic cells (expressing no HER members on cell surface) transfected to express erbB2 with cysteine mutations to expose the peptide loop, but were not successful in generating any clones. Immunisation with the mutant expressing cells plus recombinant mutant ECD ErbB2 did not generate mAbs binding the peptide, but to different locations within the ECD of ErbB2. It was only once the inventors immunized with the cyclized peptide linked to KLH that they were able to obtain monoclonal antibody clones recognising the peptide and binding to erbB2 expressing cells. This is summarised in the below Table (Table 5).

TABLE 5

Results of immunisation protocol

| ErbB2 | Avidin + biotin-B2 peptide × 4 One Fusion (−) GST/MBP-B2 linear peptide Six Fusion (−) KLH-linear peptide Two Fusion (−) KLH-Cyclised peptide** (2 + 2 clone recognising peptide and binding ErbB2 on cells) = mAb 104, 105, 106, 107 | Baf/3- B2$^{C277A/C289A}$ × 4 Five Fusion (−) | Baf/3- B2$^{C277A/C289A}$ × 3 + B2caca protein × 2 (7 clones to ECD) BT474 × 3 + ErbB2-peptide × 2 (2 clones ECD) |

Using the immunisation protocol, the inventors generated hydridoma clones producing novel monoclonal antibodies (mAb) against a conformationally exposed region of the HER2 extracellular domain that was thought to be available for binding only in conditions found in tumour cells. These monoclonal antibodies were generated to a conformational epitope through immunization of mice with the peptide immunogen from the HER2 extracellular domain: H-GCPLHNQEVTAEDGTQRC-NH2 (SEQ ID NO: 26) folded as a loop through the cysteine (C) residues and linked to KLH protein. This sequence is underlined in the human HER2 sequence provided in FIG. 1. The sequence is derived ncbi database at the following link ncbi.nlm.nih.gov/protein/NP_004439.2.

This region is within domain II but distant to the known epitope for Pertuzumab (Franklin M C, et al., (2004) Insights into ErbB signaling from the structure of the ErbB2-Pertuzumab complex. Cancer cell. 5(4):317-2).

Screening of Hybridomas

The specificity of hybridoma culture supernatants, designated mAb104, mAb105, mAb106 and mAb107, were screened using an ELISA-based assay for reactivity to the HER2 extracellular domain (ECD) as well as to the loop (cyclic) and linear peptides of the antigen that the antibodies were generated against. Purified antibodies were extracted from hybridoma supernatants using protein-G affinity chromatography. The integrity of eluted antibodies was confirmed by SDS-PAGE analyses under reducing and non-reducing conditions. The immunoglobulin isotype of the selected antibodies was detected by Monoclonal Antibody Isotyping Kit (Thermo Scientific Inc., IL, USA) and all were found to be IgG1 with K-light chains. Results of ELISA analyses with the purified mAbs are shown in FIG. 2.

Figure 2B:
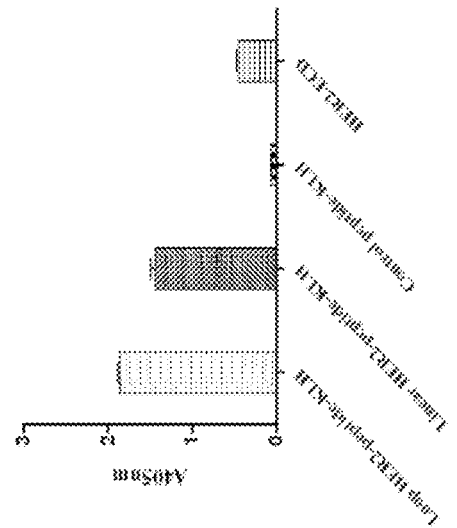
Figure 2C:
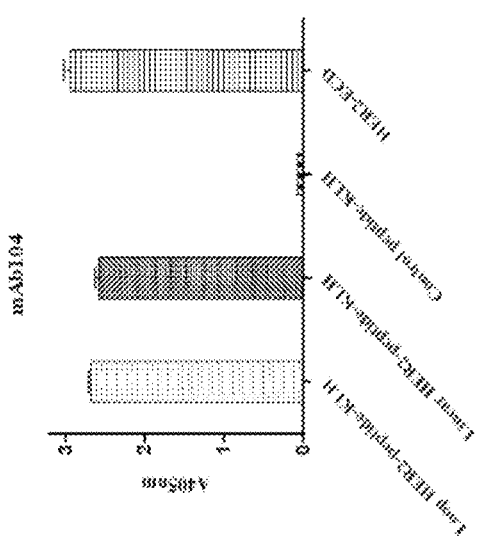
Figure 2D:
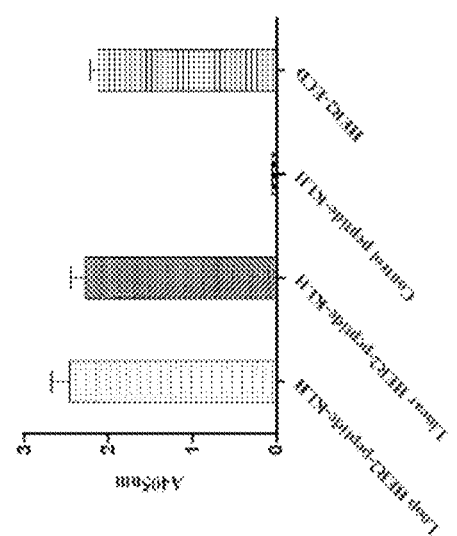

Monoclonal antibodies mAb104 and mAb106 demonstrated the strongest binding activity for all peptide configurations while mAb105 displayed the lowest binding (see FIG. 2B). The clones producing the antibodies with the highest affinity were selected for further development, namely mAb104 and mAb106 and their antibodies selected for further analysis and characterization.

Binding Analysis of Hybridomas by FACS

The extent of binding of 10 ug/ml purified antibodies (mAb104, mAb105, mAb106 and mAb107) for cellular HER2 was tested by flow cytometry on HER2-overexpressing breast (BT474, SK-BR-3, and MDA-MB-453) and gastric (NCI-N87) cancer cell lines.

Results are summarised in Table 6 below and are representative of two or more experiments.

TABLE 6

FACS analysis of antibodies

|  | mAb104 | mAb105 | mAb106 | mAb107 |
| --- | --- | --- | --- | --- |
| MDA-MB-453 | + | — | — | — |
| BT 474 | ++ | — | + | — |
| SK-BR-3 | ++ | — | — | — |
| NCI-N87 | +++ | — | +++ | +++ |

In all cell lines evaluated, mAb104 showed the highest binding compared to the other antibodies. Of the cell lines evaluated, mAb104 showed the highest log shift in NCI-N87 and SK-BR-3 cell lines. mAb105 binding was not seen in any of the cell lines evaluated. For all antibodies, binding was less than that of commercial HER2 binding antibodies. The inventors propose that these antibodies bind to a fraction of the receptors on the cell surface, suggesting exposure of the epitope in only a proportion of the HER2 receptor population.

Binding Analysis by Western Blot

The ability of these novel antibodies to bind to the HER2 protein was further evaluated in human breast (BT474, SK-BR-3, and MDA-MB-453) and gastric (NCI-N87) cancer cell lines by western blot analysis. Trypsinised cells were washed, lysed and immunoblotted with the respective purified antibodies. The anti-HER2 antibody, 2242 (Cell Signaling Technology, Beverly, Mass.), was used as a positive control.

Consistent with the previous ELISA and FACS data, mAb104 showed the strongest binding in all cell lines (mAb104>mAb106>mAb107>mAb105) (FIG. 3) and bound to all four cell lines tested.

Sequence of mAb104 and mAb106

PCR reactions were purified using the BioLine Isolate II PCR and Gel extraction kit (BIO-52059). Purified amplification products were sent for Sanger DNA sequencing at the Monash Micromon DNA sequencing facility using the same primers that amplified the products as the sequencing primers.

The CDRs are defined according to both the Chothian and Kabat numbering system and amino acids in the CDRs that fall into both. The heavy and light chain variable region sequences are shown in FIG. 4.

The complementary determining region sequences for each antibody is provided below:

```
mAb104 VH chain
CDR1:
                                      (SEQ ID NO: 14)
GYSFTGYFMH

CDR2:
                                      (SEQ ID NO: 16)
RINPYNGDIRYNQNFKD

CDR3:
                                      (SEQ ID NO: 18)
LNFAY mAb104 VL chain
CDR1:
                                      (SEQ ID NO: 20)
KSSQSLLDSDGKTFLN

CDR2:
                                      (SEQ ID NO: 22)
LVSKLDS

CDR3:
                                      (SEQ ID NO: 24)
WQGTHFPWT mAb106 VH chain
CDR1:
                                      (SEQ ID NO: 15)
GYTFTDYGMN

CDR2:
                                      (SEQ ID NO: 17)
WINTYTGKPTYDDDFKG

CDR3:
                                      (SEQ ID NO: 19)
RFLNTVAGRSVYFDY mAb106 VL chain
CDR1:
                                      (SEQ ID NO: 21)
SVSSSVGSMY

CDR2:
                                      (SEQ ID NO: 23)
LTSNLAS

CDR3:
                                      (SEQ ID NO: 25)
QQWSSNPPT
```

BIAcore Analysis

The epitope bound by mAb104 is flanked by disulphide bonds which suggests flexibility around the epitope site and exposure of the epitope for binding by mAb104 under certain conditions or environments.

The binding characteristics and apparent affinity of purified mAb104 and mAb106 for HER2 compared to Trastuzumab was examined by Surface Plasmon Resonance (BIAcore) using a BIAcore T200. Recombinant HER2 extracellular domain was immobilised on a CM5 sensor chip, after which various concentrations of mAb104, mAb106 and commercial anti-HER2 mAbs were passed over the sensor to determine apparent binding affinities.

Figure 5A:
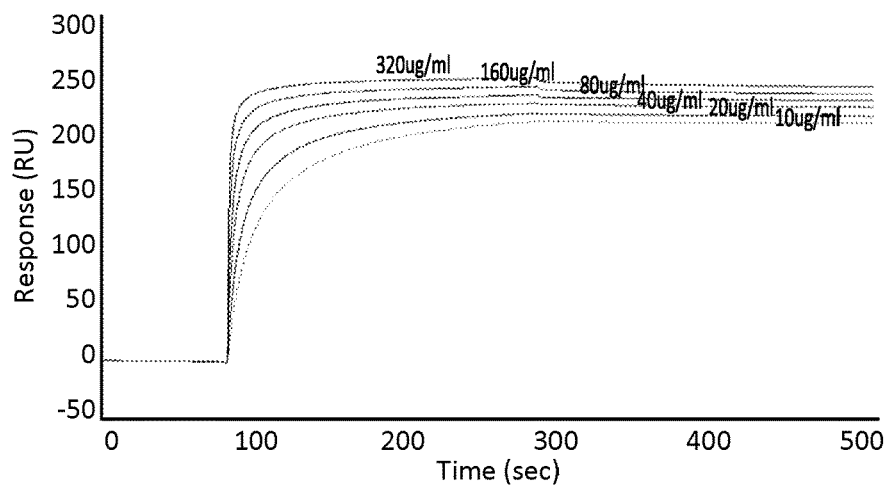
FIG. 5: Comparison of the binding of HER2 antibodies (A) Trastuzumab (B) mAb106 and (C) mAb104 to HER2 ECD was examined by Surface Plasmon Resonance using a BIAcore T200 biosensor over an antibody concentration of 320 μg/mL to 10 μg/mL (2133 to 66 nM). Traces represent the binding and the dissociation of antibodies in solution to immobilised recombinant HER2 ECD. Results are representative of two or more experiments
Figure 5B:
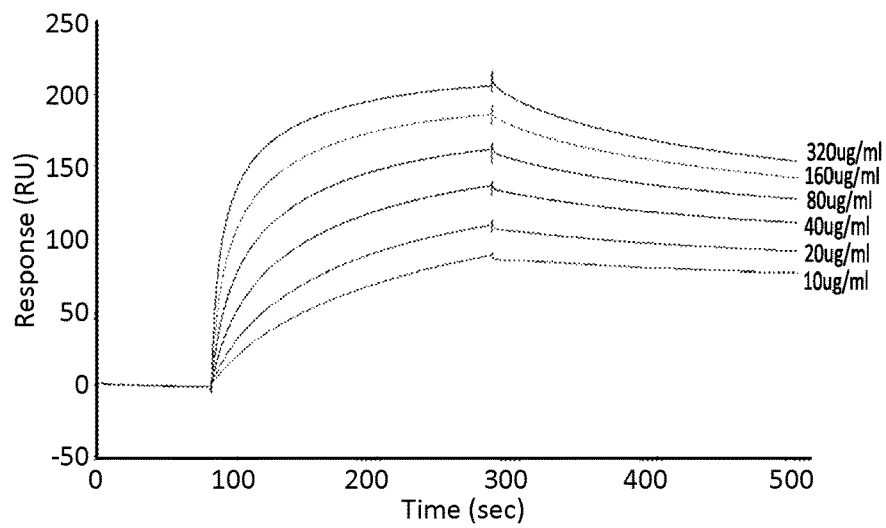
Figure 5C:
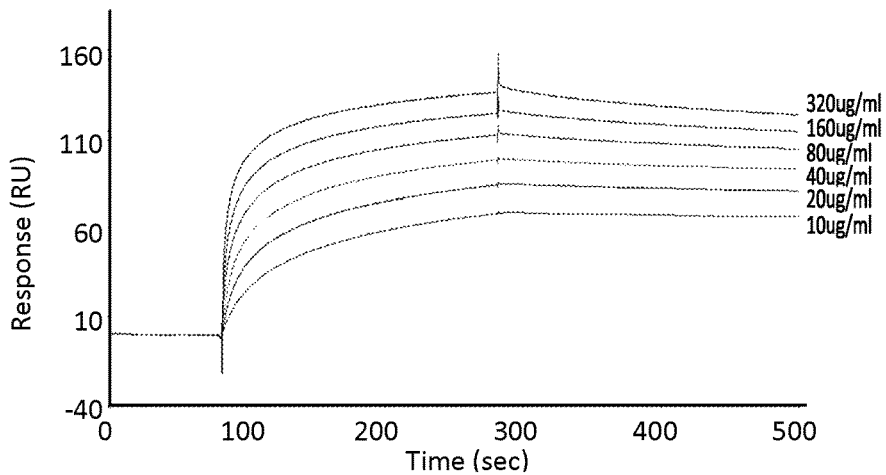

As shown in FIG. 5C, mAb104 demonstrated high binding affinity, with KD's in the nanomolar range. The binding affinity of mAb104 is a log less than that reported for Trastuzumab and similar to the binding affinity of Pertuzumab (Table 7).

TABLE 7

The binding affinity of mAb104

| Antibody | $K_D$ (nM) | Chi$^2$ |
|---|---|---|
| mAb104 | 2.91 | 0.03 |
| mAb106 | 3.18 | 0.13 |
| Trastuzumab | 0.1 | 0.12 |
| Pertuzumab | 1.9 | 14.3 |

In summary, mAb104, mAb106 and mAb107 bind to a spectrum of HER2-over expressing tumour cells. mAb104 appeared to consistently show stronger in vitro binding than mAb106. Based on the findings of these initial screening tests, mAb104 was chosen for further evaluation.

Example 2 Epitope Analysis and Competition Assays

The mAb104 antibody variable domains binding the antigen epitope located on domain II of HER2 were computationally predicted from homology modelled 3D structures of the antibody Fv domains and the known X-ray structure of human HER2 using the methods previously described (Zhang W, Zeng X, Zhang L, Peng H, Jiao Y, Zeng J, et al. Computational identification of epitopes in the glycoproteins of novel bunyavirus (SFTS virus) recognized by a human monoclonal antibody (MAb 4-5). Journal of Computer-Aided Molecular Design. 2013; 27(6):539-50).

The predicted HER2 binding of mAb104 was compared with the known crystal structures of Pertuzumab and Trastuzumab binding HER2 (Hu S, Sun Y, Meng Y, Wang X, Yang W, Fu W, et al. Molecular architecture of the ErbB2 extracellular domain homodimer. Oncotarget. 2015; 6(3): 1695). Without wishing to be bound by theory, it is thought that the binding of mAb104 to HER2 requires a conformational change that occurs upon receptor activation as previously described for EGFR/HER1 (Garrett T P, Burgess A W, Gan H K, Luwor R B, Cartwright G, Walker F, et al. Antibodies specifically targeting a locally misfolded region of tumour associated EGFR. Proceedings of the National Academy of Sciences. 2009; 106(13):5082-7) where the disulphide bonds of domain II of the HER2 ECD could be formed and broken dynamically.

Epitope Recognised by mAb104 Compared to Other Known HER2 Binding Antibodies

Antibody H2-18 (Lu et al. (2016) Oncotarget 7(41),) Chinese Patent CN104447993 recognises an epitope within domain I of HER2/ErbB2. H2-18 has been shown to inhibit the growth of Trastuzumab-resistant breast cancer cells in vivo and in vitro and induces programmed cell death in both Trastuzumab-sensitive and -resistant breast cancer cell lines.

Antibody A21 (Hu S et al. (2015) Oncotarget 6(3):1695-1706) appears to recognise a conformational epitope comprising a large region mostly from ErbB2 EC Domain I. The antibody bivalency of A21 was found to be necessary for its inhibitory activities to tumour cells as well as ErbB2 phosphorylation and receptor downregulation.

Trastuzumab/Herceptin (4D5) binds to the juxtamembrane region in subdomain IV of ErbB2 and may interrupt the activation of ErbB2 by metalloproteinase cleavage and also block ErbB2 dimerization.

Pertuzumab (2C4) with epitopes within or near subdomain 11 can directly disrupt the association between ErbB2 and other ErbB receptors, and thus inhibit tumour cell growth.

The epitopes recognised by Pertuzumab and mAb104 share only three amino acids in common, namely P294, L295 and H296 although it is understood that H296 is thoroughly buried upon Pertuzumab binding (Franklin M C et al. (2004) Cancer Cell 5:317). The epitope bound by Pertuzumab consists of H245, Y252, F257, D285, V286, S288, T290, P294, L295, H296, K311, K314 and P315.

In contrast, the epitope recognised by mAb104 is the sequence CPLHNQEVTAEDGTQRC (SEQ ID NO:1).

While both antibodies recognise epitopes within domain II of HER2, the epitopes bound by Pertuzumab and mAb104 are clearly distinct.

Without wishing to be bound by theory, the inventors postulate that Pertuzumab and mAb104 bind to opposite faces/sides of Domain II of HER2/ErbB2 thus accounting for why mAb104 does not block binding of Pertuzumab despite closely opposed epitopes. A conformational change in Domain II, for example as occurs during activation, hypoxic conditions and/or aberrant expression, would allow both antibodies to bind and mAb104 binding alone to CPLHNQEVTAEDGTQRC in domain II to a small sub-population of the HER2 receptors that have undergone such a conformational change. However, the conformational change required could be possible, if for example the disulfide bond (C277/C289 (numbering not including the leader sequence)) preceding the mAb104 epitope (C293/C309 (numbering not including the leader sequence)) was transiently broken or underwent disulphide bond switching allowing re-arrangement of at least part of domain II exposing the mAb104 epitope. The Pertuzumab binding epitope could stay mostly unperturbed during the rearrangement. However, in silico with recombinant HER2-ECD adsorbed for ELISA capture it is possible that the structural re-arrangement of domain II is fixed and minor steric hindrance by mAb104 binding could result in reduced Pertuzumab binding (e.g. as shown below). A possible loss of binding affinity could be balanced by synergistic interaction between the two antibodies.

Competition Assay

Figure 6A:
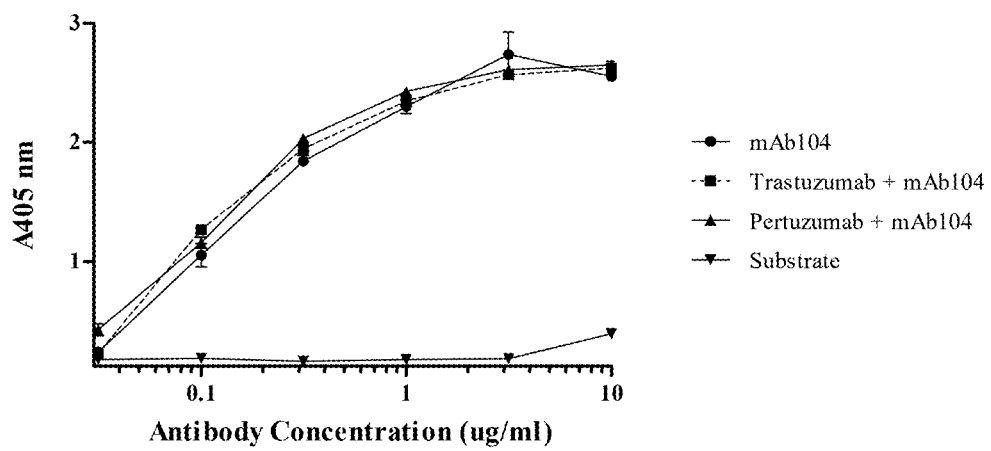
FIG. 6: ELISA-based HER2-ECD Binding competition assay (A) Trastuzumab and Pertuzumab do not affect mAb104 binding (B) mAb104 does not impact on Trastuzumab binding (C) mAb104 partially affects Pertuzumab binding to ELISA plate bound recombinant HER2 ECD. (Data; Mean±SE; n=3) Results are representative of two experiments.
Figure 6B:
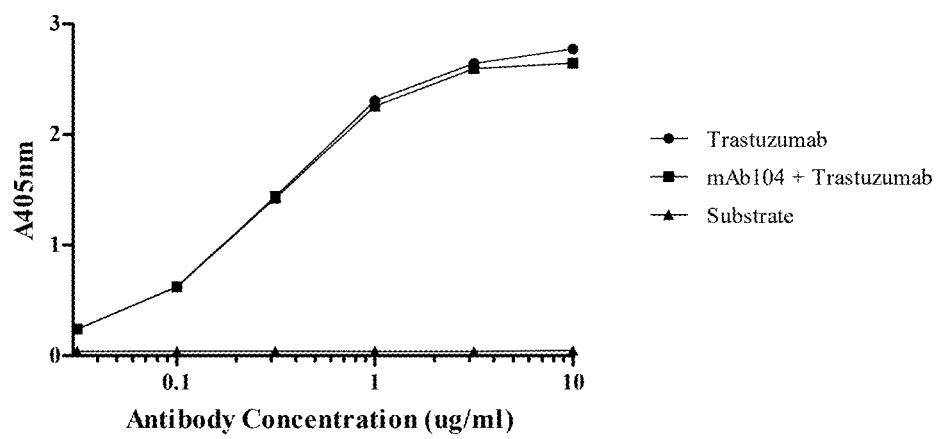
Figure 6C:
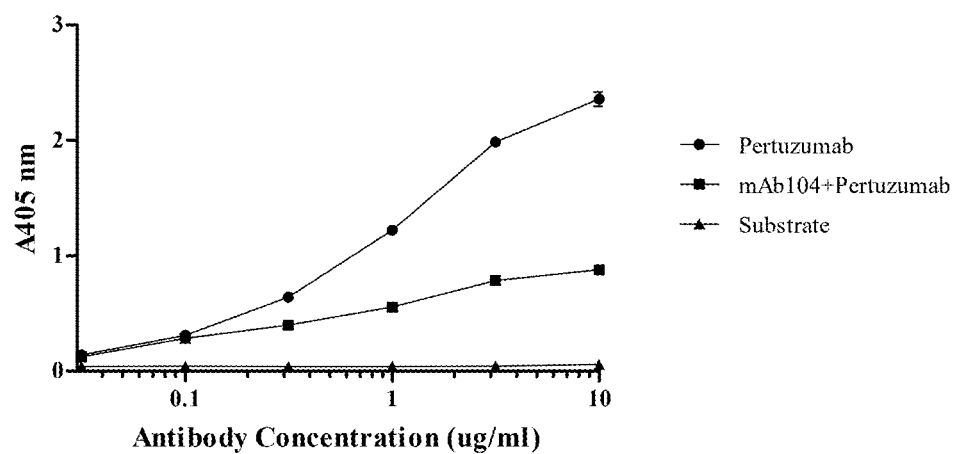
Figure 7A:
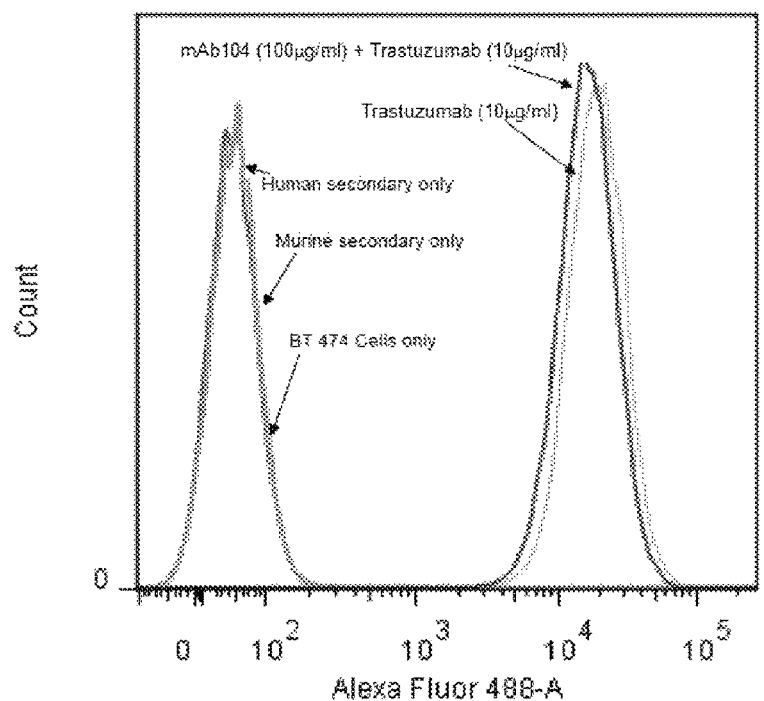
Figure 7B:
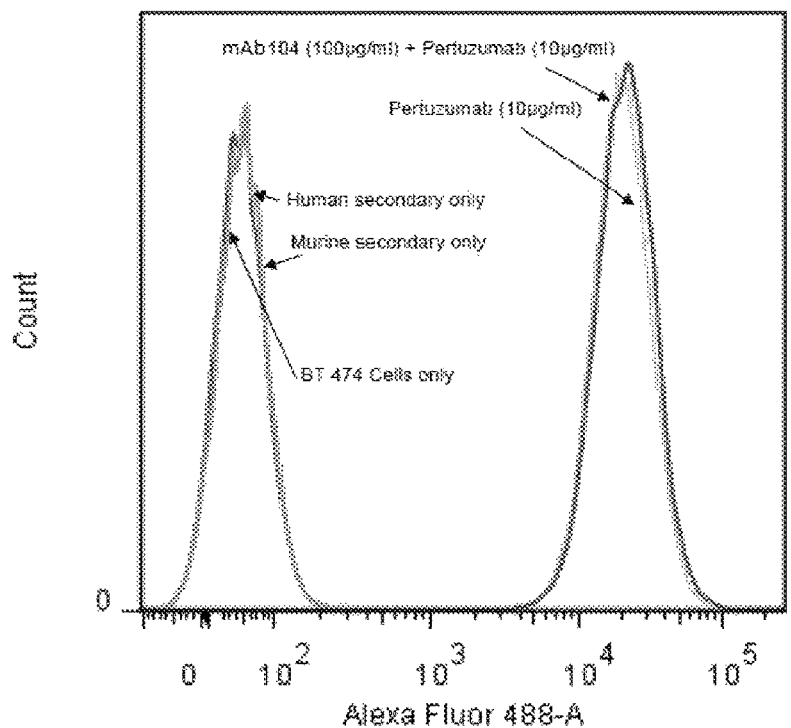
Figure 7C:
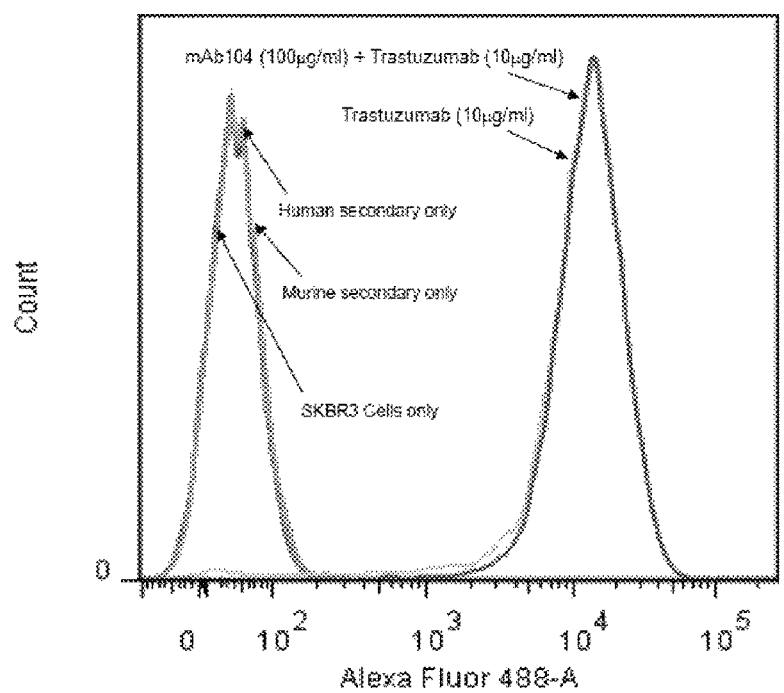
Figure 7D:
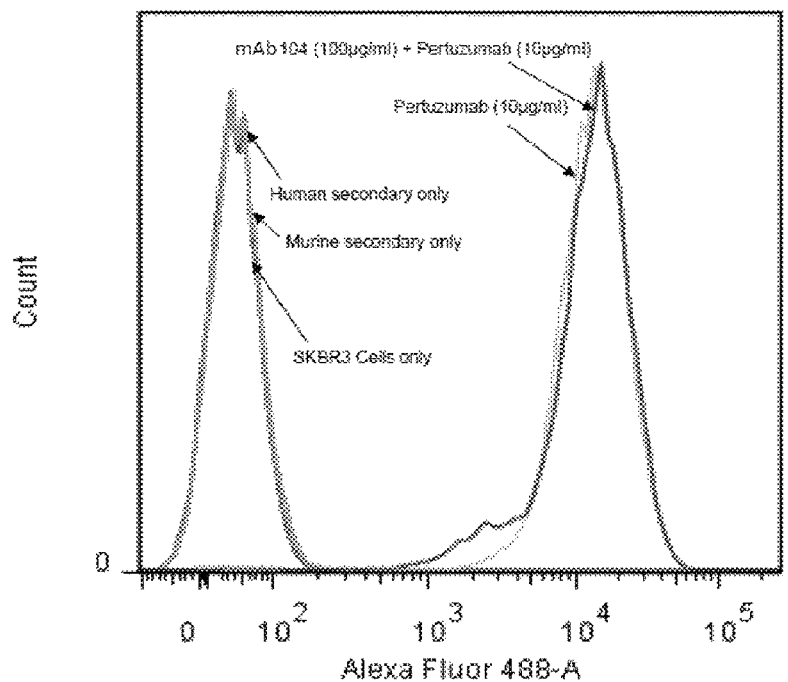
Figure 7E:
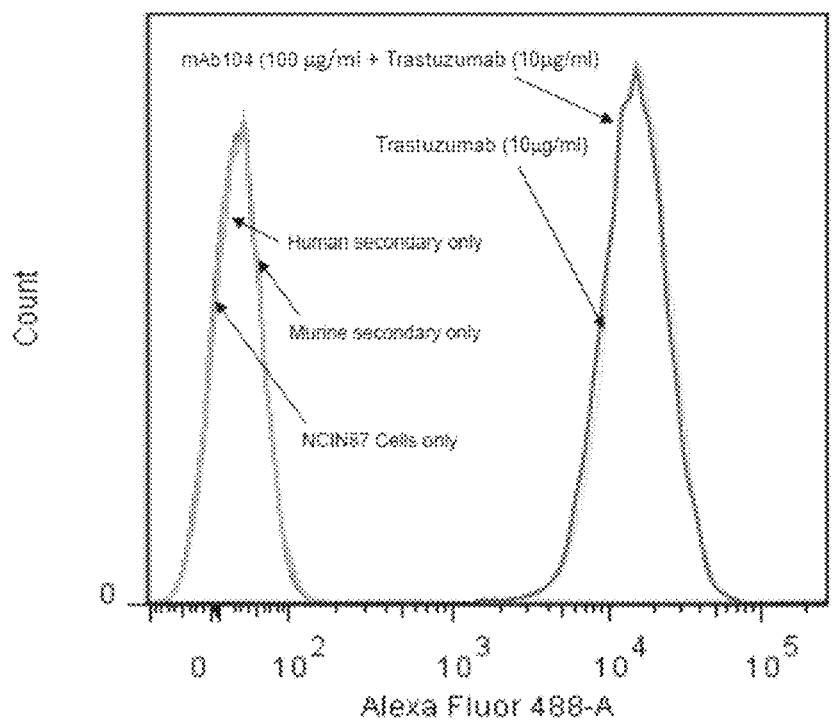
Figure 7F:
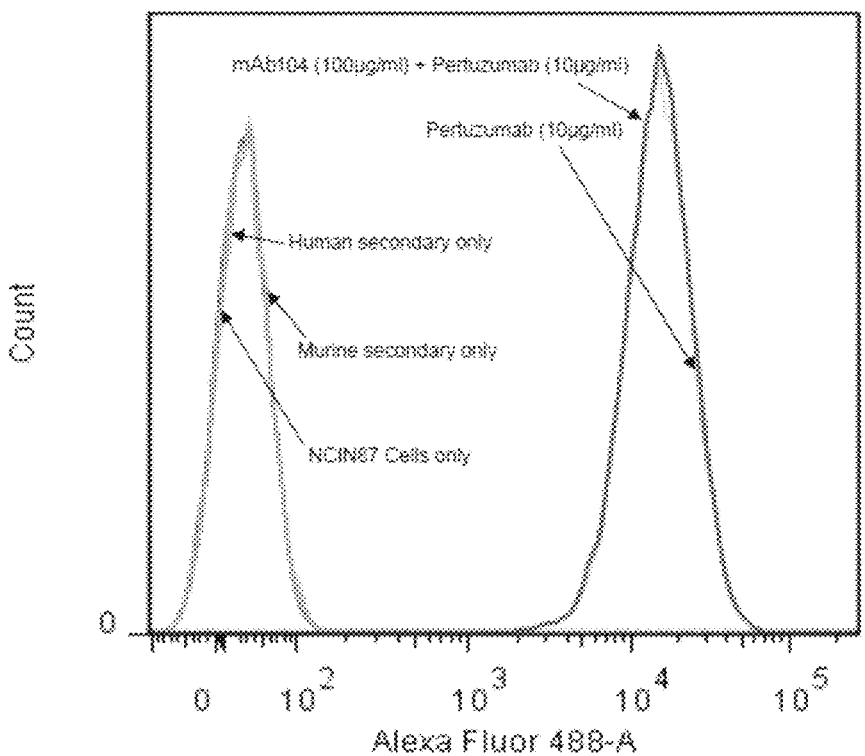
Figure 7G:
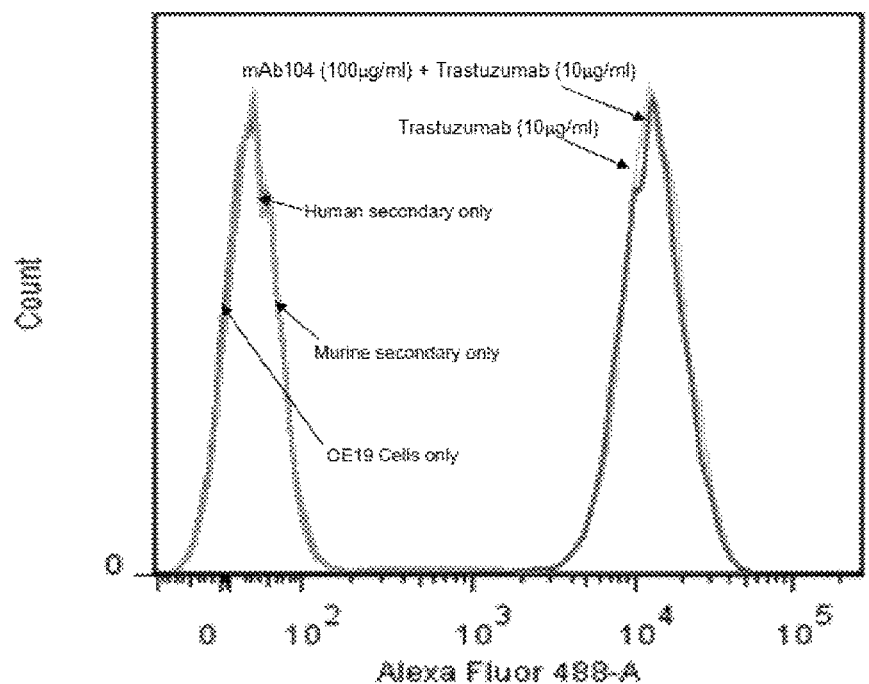
Figure 7H:
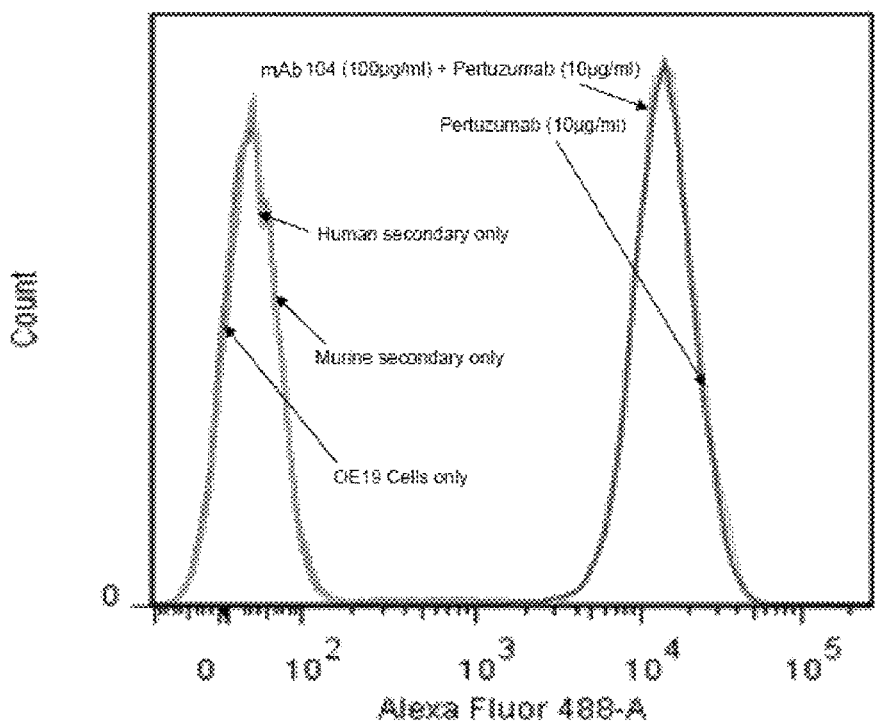
Figure 8A:
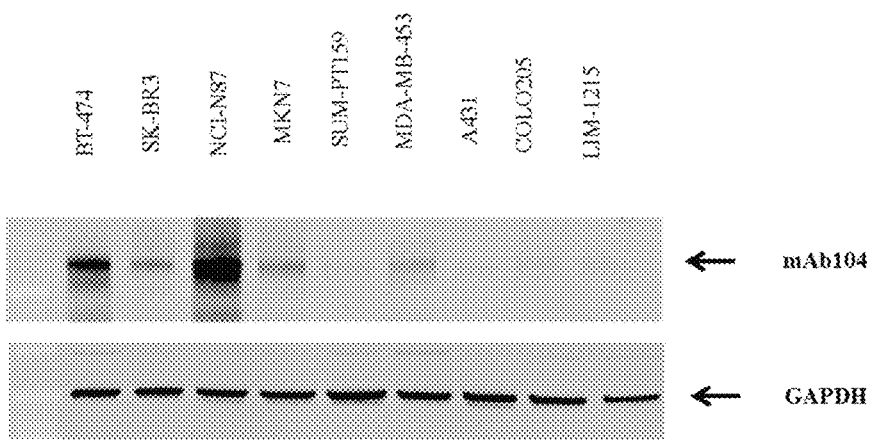
Figure 8B:
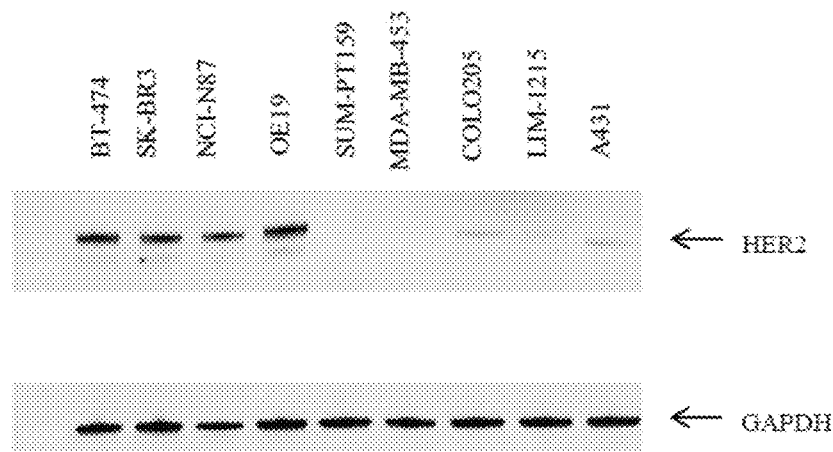
Figure 8C:
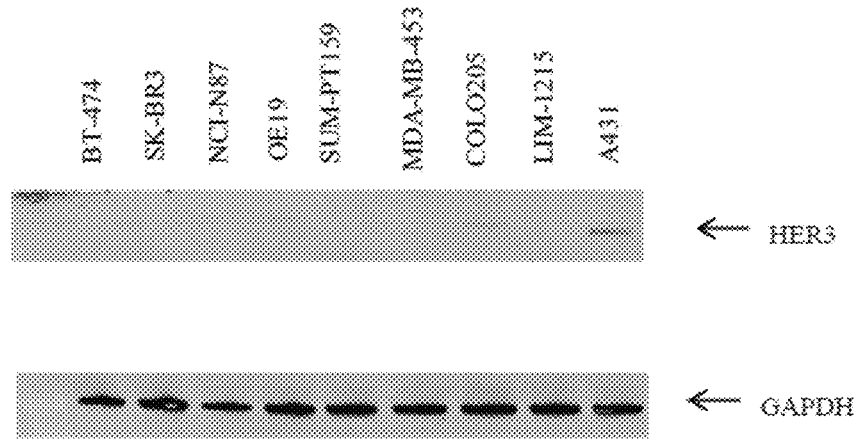
Figure 8D:
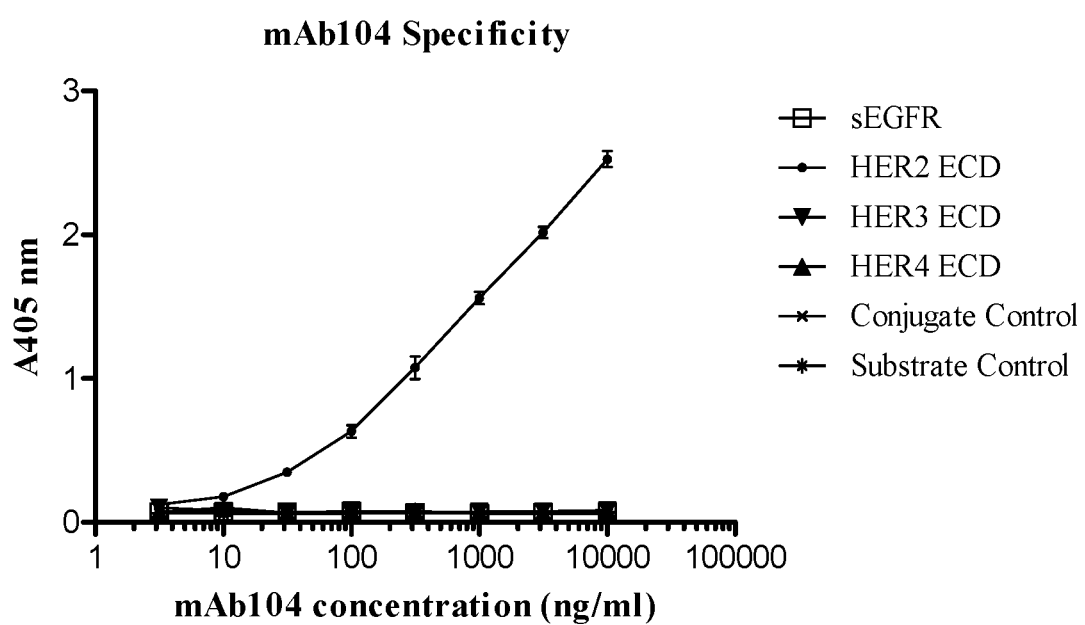

To better define the epitope for mAb104, ELISAs were used to compare binding of mAb104 to HER2-ECD and the ability to interfere with the binding of domain II binding antibody Pertuzumab and the spatially distant domain IV epitope of Trastuzumab (FIG. 6). In these experiments, the inventors evaluated the effect of pre-incubation with mAb014 on Trastuzumab and Pertuzumab binding (FIGS. 6B and C) and also determined the effect of prior incubation with Trastuzumab and Pertuzumab on mAb104 binding.

The inventors showed that Trastuzumab and mAb104 do not affect each other's binding to HER2-ECD (FIGS. 6A and B). The inventors also demonstrated prior incubation with Pertuzumab does not affect mAb104 binding (FIG. 6A). However, interestingly prior incubation with mAb104 reduced Pertuzumab binding to HER2-ECD (FIG. 6C), indicating mAb104 binding to its epitope may result in some steric hindrance of Pertuzumab under certain circumstances.

Figure 3:
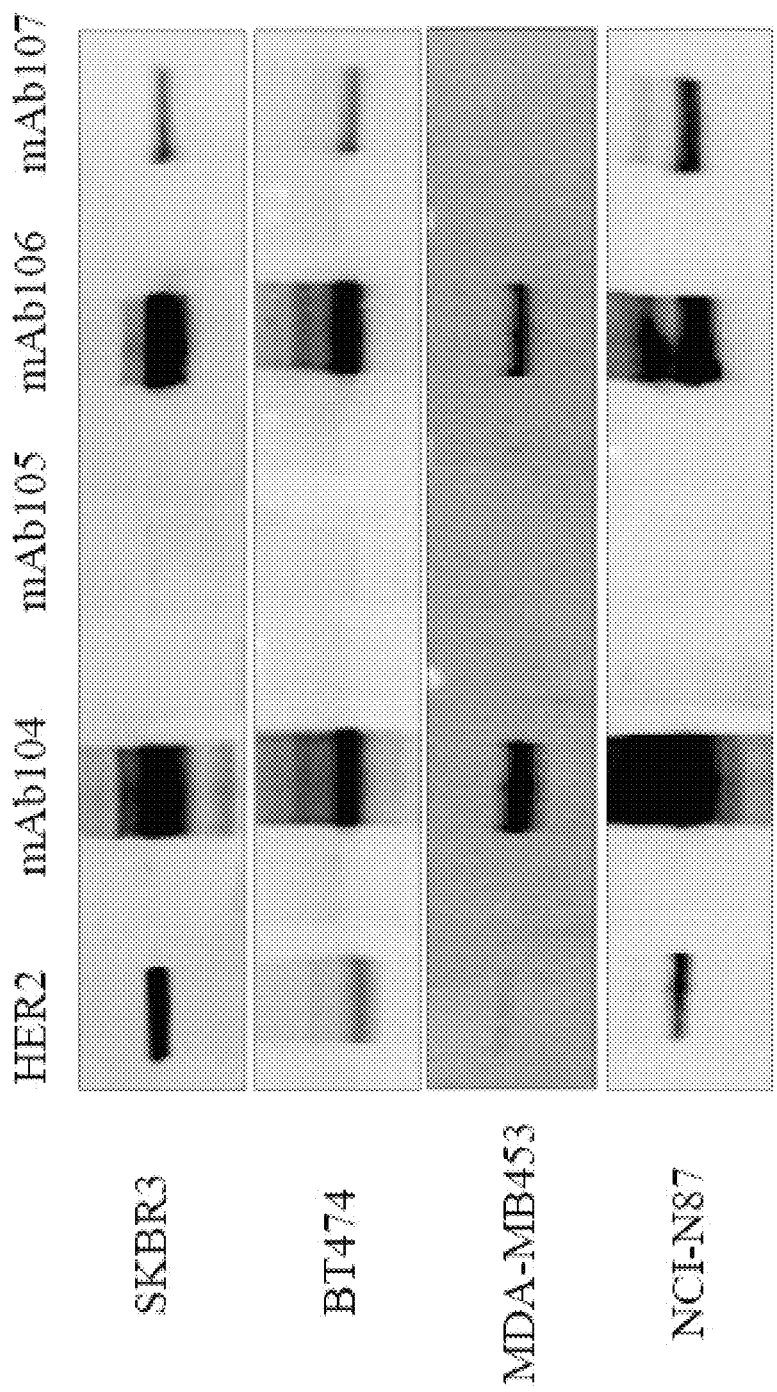
FIG. 3: Antibody binding to cell lysates by western blot. SK-BR-3, BT-474, MDA-MB-453, and NCI-N87 cells were washed, lysed and immunoblotted for endogenous HER2 (commercial positive control antibody 2242, Cell Signaling Technology, Beverly, MA), mAb104, mAb105, mAb106, mAb107. Results are representative of two independent experiments.

Competition between mAb104 and Pertuzumab and Trastuzumab for endogenous HER2 was further investigated by flow cytometry in HER2-overexpressing breast (BT474 and SK-BR-3; FIGS. 7-1, and 7-2) and gastric cell lines (NCI-N87 and OE19; FIGS. 7-3 and 7-4) using the two sequential incubation approaches discussed above. These sets of experiments utilised high doses (100 µg/mL) of mAb104 pre-incubation to maximise the changes of seeing an impact on the binding of Trastuzumab and Pertuzumab. Prior incubation with a much higher dose of mAb104, did not affect Trastuzumab nor Pertuzumab binding to cell surface HER2. Discordance in the results for mAb104 competing with Pertuzumab using flow cytometry and ELISA may be accounted for by differences between the antigenic preparations in the assays, i.e. the presence of HER2 is in its physiological conformation when analysed by flow cytometry, versus partially denatured in ELISA, and consequent epitope presentation and availability.

Example 3 Binding of mAb104 to Cell Surface HER2

The inventors examined the pattern and efficiency of mAb104 binding by FACS analysis using a panel of cell lines with differential HER2 expression.

The results are summarised in Table 8 below. Results are compared to binding with a secondary only antibody.

TABLE 8

Binding of mAb104

|  | Herceptin | Pertuzumab | mAb104 |
| --- | --- | --- | --- |
| BT-474 | +++ | +++ | — |
| SK-BR-3 | +++ | +++ | — |
| NCI-N87 | +++ | +++ | ++ |
| OE-19 | +++ | +++ | + |
| MDA-MB-231 | ND | ND | — |
| MCF-7 | ND | ND | — |

FACS Analysis mAb104 binding to HER2 expressing cells BT474, SK-BR-3, NCI-N87, OE-19, MDA-MB-231, and MCF7 cells were incubated with 10 µg/mL Trastuzumab, Pertuzumab or mAb104 or secondary antibody alone and the extent of binding determined by FACS analysis. Results are representative of two or more experiments In cell lines that over-express HER2, mAb104 showed strongest binding to HER2 population in the gastric cell line, NCI-N87, with negligible HER2 binding seen in low HER2-expressing cell lines (MDA-MB-231 and MCF-7).

Trastuzumab (Herceptin) and Pertuzumab FACS demonstrated greater fluorescence indicating they bound to a greater number of HER2 receptors on all the cell lines evaluated when compared to mAb104 (Table 8), with no differences observed in the extent of binding between the two humanised antibodies across the different cell lines. The inventors' findings support the hypothesis mAb104 binds to a subset of receptors on the cell surface, and would explain the differences seen in the extent of binding between the antibodies.

Specificity of mAb104 for HER2

In order to confirm the specificity of mAb104 for endogenously expressed HER2 and HER3, the inventors performed western blot assays using different HER2 positive and negative cancer cell line lysates prepared under reducing conditions (FIG. 8-1).

The antibody, 2242, a commercially available antibody from Cell Signaling Technology which was raised against an intracellular HER2 epitope was used as a positive control for total HER2. As demonstrated in FIG. 8A, mAb104 showed strong reactivity across a variety of cancer cell lines expressing HER2 and was comparable to the control antibody which provided positive signals representing the HER2 overexpression status of the various cell lines. The correlation of mAb104 and control 2242 HER2 binding is a reflection of the HER2 epitope recognised by mAb104 being revealed under the reduced conditions. HER3 expression levels were very low in the cancer cell lines investigated as also observed by FACS analyses and previously in other studies (Brockhoff G, Heiss P, Schlegel J, Hofstaedter F, Knuechel R. Epidermal growth factor receptor, c-erbB2 and c-erbB3 receptor interaction, and related cell cycle kinetics of SK-BR-3 and BT474 breast carcinoma cells. Cytometry Part A. 2001; 44(4):338-48.).

Specificity for HER2/ErbB2 was also assessed by ELISA assay. As shown in FIG. 8-2, mAb104 was specific for ErbB2/HER2 and did not bind EGFR/HER1 ectodomain, or the ECD of ErbB3/HER3 or ErbB4/HER4.

Efficacy of mAb104 in Breast Cancer In Vitro

Example 4 Anti-Proliferative Effect of mAb104

The effect of mAb104 as monotherapy and in combination with Trastuzumab or Pertuzumab on the proliferation of HER2 overexpressing breast cancer cell lines was determined using increasing concentrations up to a maximum concentration of 100 ug/mL in serum-depleted conditions (1% FCS) by the MTS cell proliferation assay (FIG. 9).

Figure 9A:
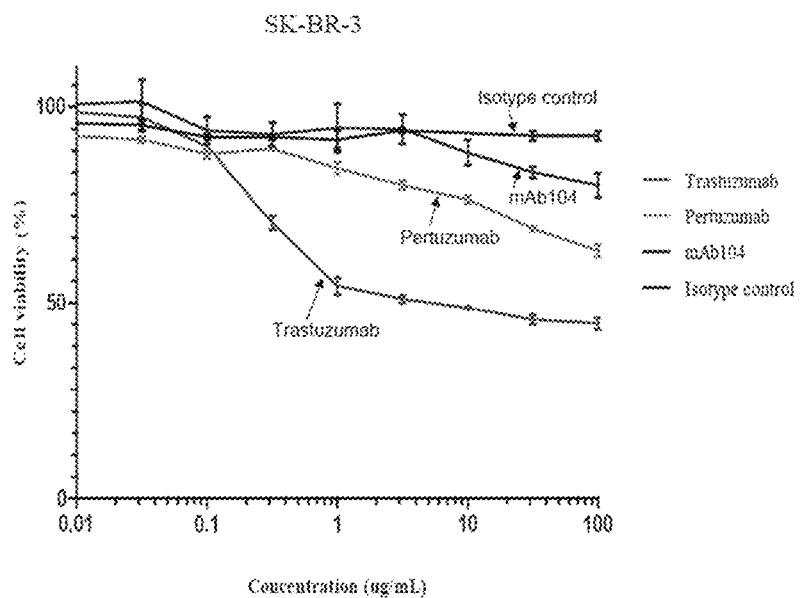
Figure 9B:
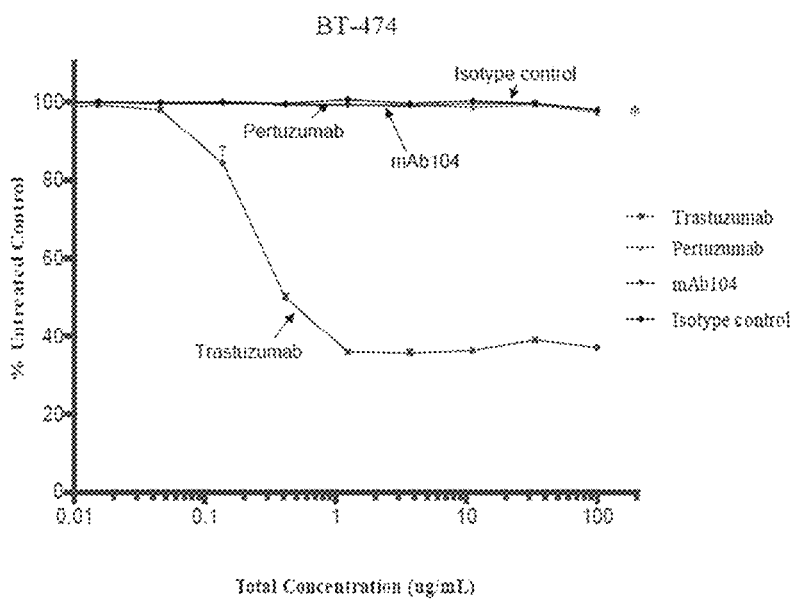

Trastuzumab significantly reduced proliferation in BT-474 (FIG. 9B) and SK-BR-3 (FIG. 9A) in comparison to the isotype control antibody (p=0.0006 and p=0.0005 respectively; two-sided) while Pertuzumab monotherapy did not have any significant anti-proliferative activity in the cell lines evaluated (p=0.22 and p=0.15 respectively, two-sided; see FIGS. 9A and 9B). These findings are consistent with other studies (Brockhoff G, Heckel B, Schmidt-Bruecken E, Plander M, Hofstaedter F, Vollmann A, et al. Differential impact of Cetuximab, Pertuzumab and Trastuzumab on BT474 and SK-BR-3 breast cancer cell proliferation. Cell proliferation. 2007; 40(4):488-507; Tokuda Y, Ohnishi Y, Shimamura K, Iwasawa M, Yoshimura M, Ueyama Y, et al. In vitro and in vivo anti-tumour effects of a humanised monoclonal antibody against c-erbB-2 product. British journal of cancer. 1996; 73(11):1362; Yamashita-Kashima Y, Iijima S, Yorozu K, Furugaki K, Kurasawa M, Ohta M, et al. Pertuzumab in combination with Trastuzumab shows significantly enhanced antitumour activity in HER2-positive human gastric cancer xenograft models. Clinical Cancer Research. 2011; 17(15):5060-70; Nahta R, Hung M-C, Esteva F J. The HER-2-targeting antibodies Trastuzumab and Pertuzumab synergistically inhibit the survival of breast cancer cells. Cancer research. 2004; 64(7):2343-6; Gong S J, Jin C J, Rha S Y, Chung H C. Growth inhibitory effects of Trastuzumab and chemotherapeutic drugs in gastric cancer cell lines. Cancer letters. 2004; 214(2):215-24; Ko B-K, Lee S-Y, Lee Y-H, Hwang I-S, Persson H, Rockberg J, et al. Combination of novel HER2-targeting antibody 1E11 with Trastuzumab shows synergistic antitumour activity in HER2-positive gastric cancer. Molecular oncology. 2015; 9(2):398-408; Tomioka H, Mukohara T, Kataoka Y, Ekyalongo R C, Funakoshi Y, Imai Y, et al. Inhibition of the mTOR/S6K signal is necessary to enhance fluorouracil-induced apoptosis in gastric cancer cells with HER2 amplification. International journal of oncology. 2012; 41(2):551-8).

mAb104 did not show any significant growth inhibition as compared to isotype control antibody in any of cell lines SK-BR-3 and BT-474 (p=0.33 and p=0.2 respectively; two-sided) (FIGS. 9A and 9B).

Figure 9C:
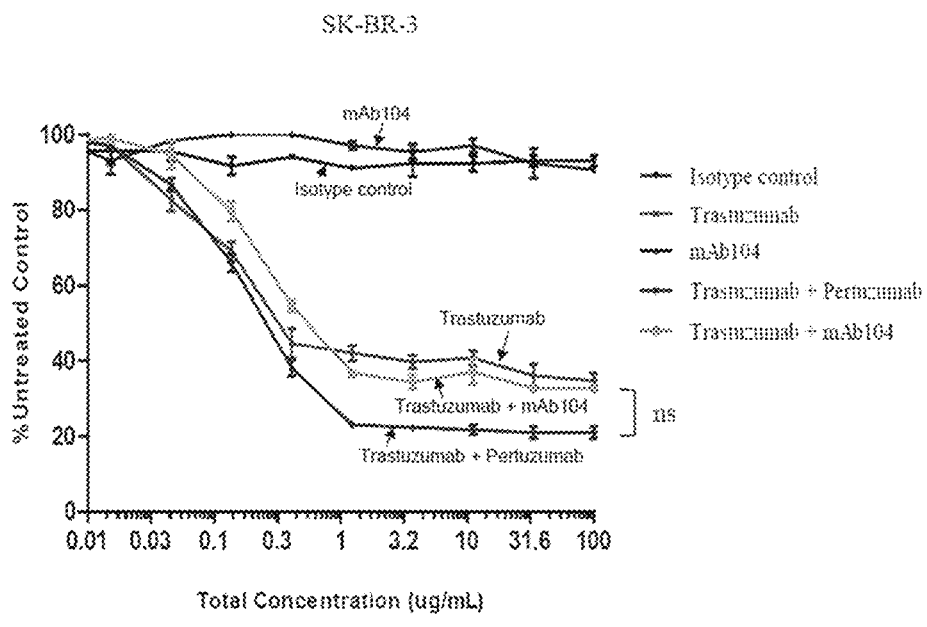
Figure 9D:
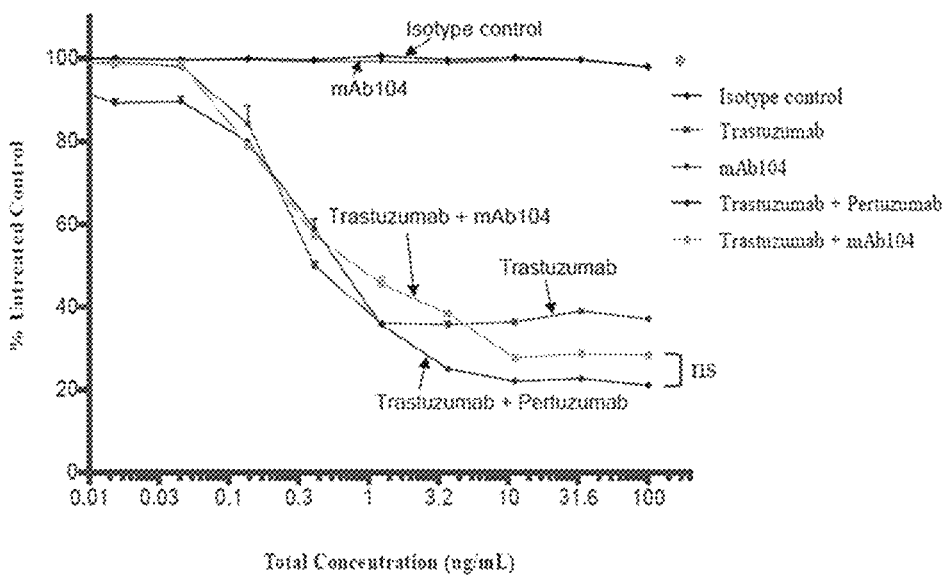
Figure 9E:
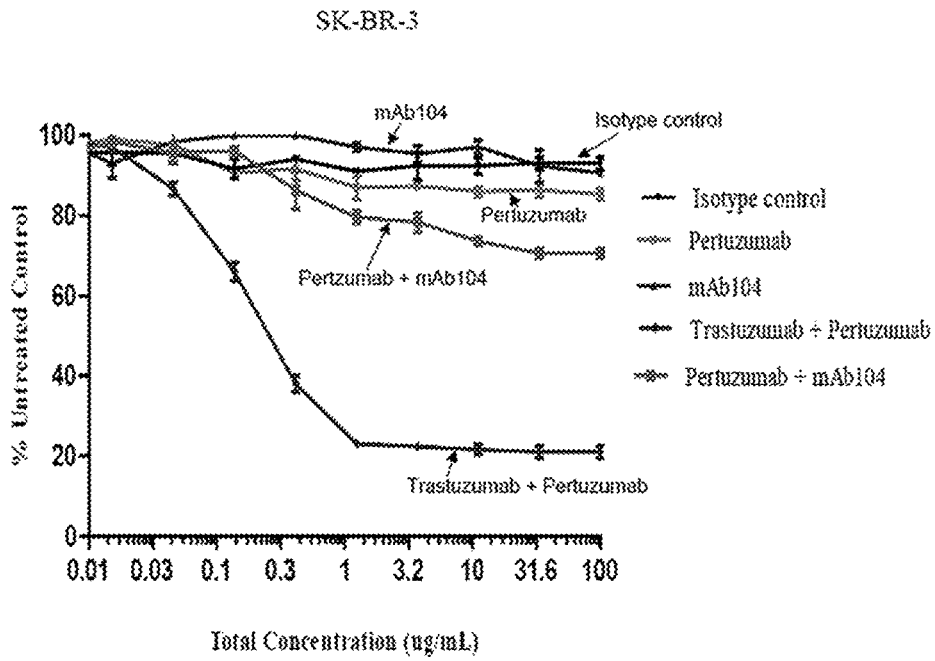
Figure 9F:
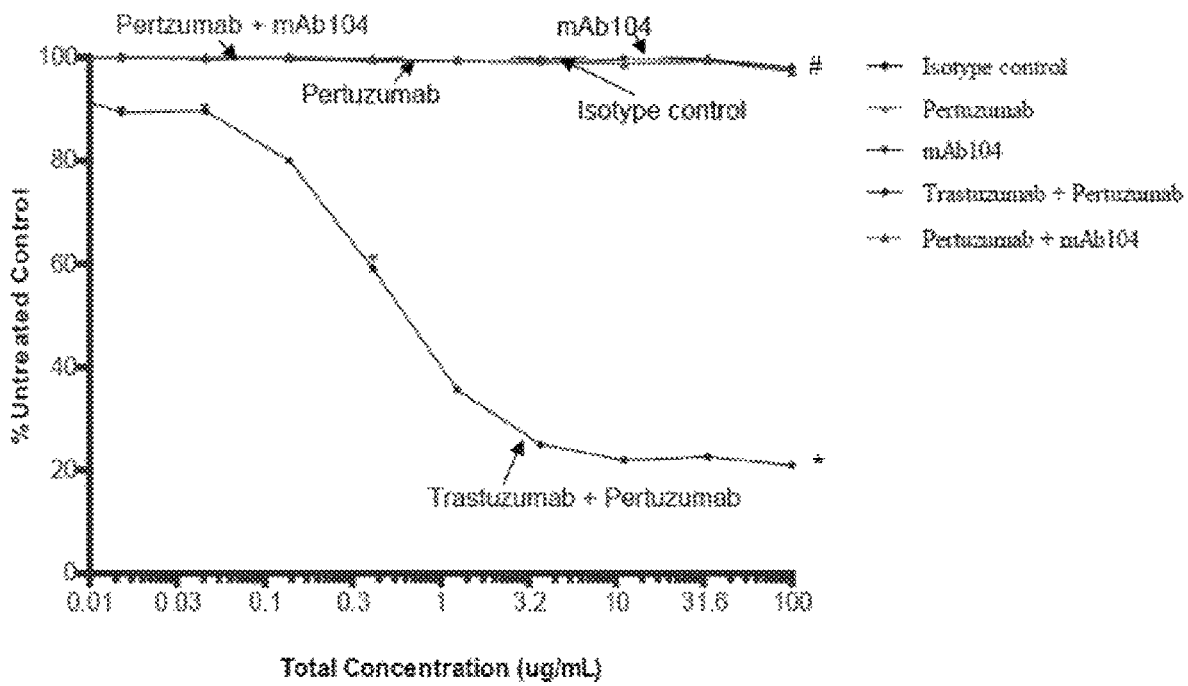

As shown in FIGS. 9C and 9D, the combination of Trastuzumab and Pertuzumab significantly inhibited proliferation in the cell lines evaluated (BT474 p=0.0008 and SK-BR-3 p=0.0007; two-sided); there was however, no statistical significant difference compared to Trastuzumab monotherapy (BT-474 p=0.59 and SK-BR-3 p=0.51 respectively; two-sided).

The addition of mAb104 to Trastuzumab or Pertuzumab did not affect the anti-cellular proliferative activity of Trastuzumab and Pertuzumab individually (FIGS. 9C to F). The anti-proliferative effect of mAb104 combined with Trastuzumab was not statistically different to that of Trastuzumab combined with Pertuzumab in cell lines evaluated (BT-474 p=0.66; SK-BR-3 p=0.47).

Accordingly, unlike Trastuzumab and Pertuzumab, mAb104 had no detectable anti-proliferative effect on HER2 positive cell lines. The complex interplay of multiple receptor kinases and signalling pathways that occur in in vivo cannot always be fully replicated in vitro and capturing the impact of a therapeutic requiring an activated receptor undergoing a conformational change may not be measureable in vitro. Antibodies targeting a conformationally exposed epitope on activated EGFR have shown significant anti-tumour activity in vivo despite failing to show any growth inhibition or altered signalling in vitro [Johns T G, Perera R M, Vernes S C, Vitali A A, Cao D X, Cavenee W K, et al. The efficacy of epidermal growth factor receptor-specific antibodies against glioma xenografts is influenced by receptor levels, activation status, and heterodimerization. Clinical Cancer Research. 2007; 13(6):1911-25].

Example 5 Effect of mAb104 on ErbB Receptors and Downstream Signalling Pathways

In view of the functional difference observed for mAb104 seen in the proliferative assays. The inventors sought to examine the effect after 24 hours treatment with mAb104 on the MAPK and Akt ligand independent pathways in SK-BR-3 and BT-474 breast cancer cell lines in serum starved conditions. To evaluate the effect of mAb104 on ligand-dependent signalling pathways, cell lines were treated with anti-HER2 antibodies for 24 hours, followed by addition of 100 ng EGF for 10 minutes.

Results for ligand-independent and -dependent effects are presented in FIGS. 10 and 11 respectively. The inventors focused on the EGFR-HER2 signalling because HER3 expression levels were very low in the cancer cell lines as evidenced in FIG. 8, consistent with other studies (Brockhoff G, et al. Epidermal growth factor receptor, c-erbB2 and c-erbB3 receptor interaction, and related cell cycle kinetics of SK-BR-3 and BT474 breast carcinoma cells. Cytometry Part A. 2001; 44(4):338-48).

In this series of experiments (FIGS. 10 and 11), the inventors demonstrated treatment with Trastuzumab and Pertuzumab for 24 hours did not significantly reduce total HER2 expression in HER2 positive breast cancer cell lines, BT-474 and SK-BR-3, as previously demonstrated by others (Molina M A, et al. (2001) Cancer research. 61(12):4744-9; Lu Q, et al. (2016) Oncotarget. 2016; 7(41):67129).

The effects of anti-HER2 antibodies were also assessed on Akt and MAPK pathways using phospho-specific antibodies. In both breast cancer cell lines cells (BT-474 and SK-BR-3), Trastuzumab treatment resulted in a reduction of Akt phosphorylation without a change in total Akt protein levels, representing a decrease in phosphorylation activity and not down-regulation of the Akt protein. These findings are also consistent with other studies (Lu Q, et al. supra; Yakes F M, et al. (2002) Cancer research. 62(14):4132-41).

Figure 10A:
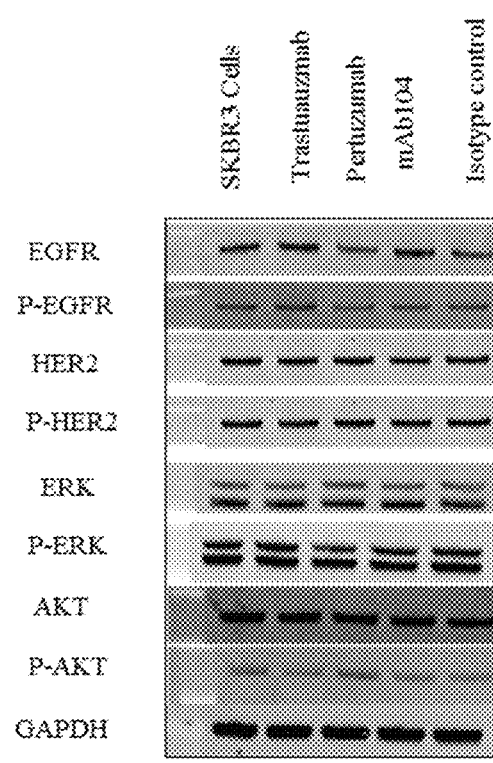
Figure 10B:
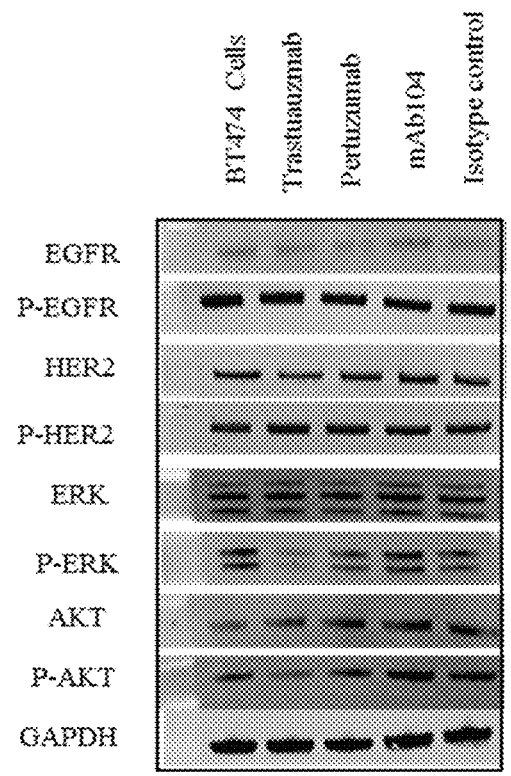
Figure 10C:
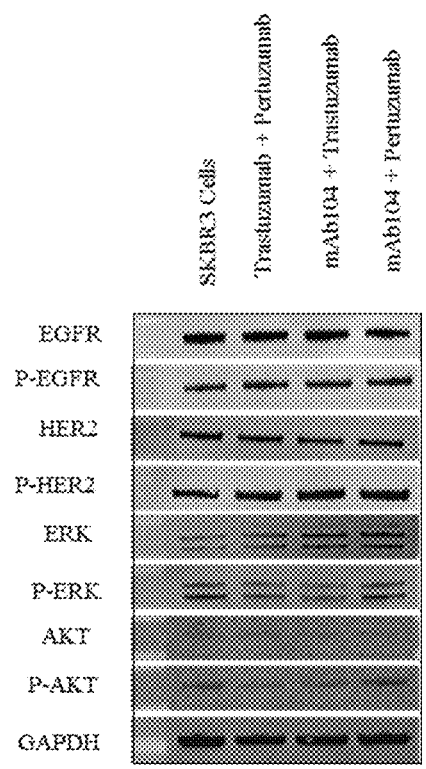

In BT-474 cells, Trastuzumab treatment resulted in reduction in MAPK activity as shown by reduction in phospho-MAPK (FIGS. 10C and D). In contrast, no change in MAPK activity was demonstrated in SK-BR-3 cells (FIGS. 10A and B) consistent with other studies (Cuello M, et al. (2001) Cancer research. 61(12):4892-900).

As shown in FIGS. 10A and B, treatment with mAb104 as monotherapy did not result in a detectable change in amount of total or phosphorylated protein in the cell lines evaluated.

Figure 10D:
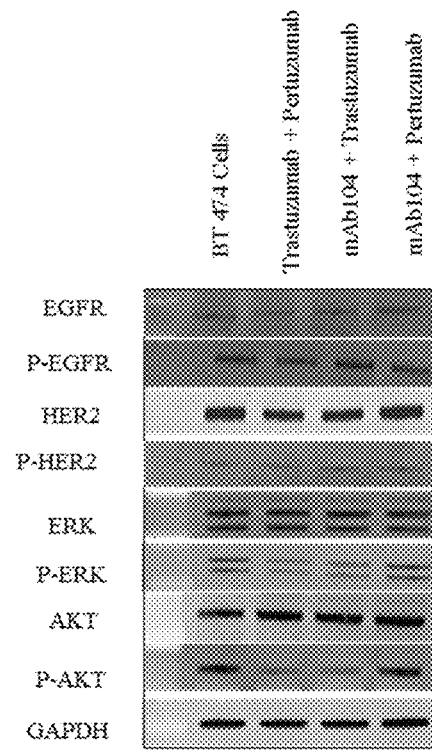

In BT-474 cells, the combination of Trastuzumab and Pertuzumab reduced levels of phospho-Akt and phosphorylated p44/p42 MAPK to a greater degree versus either agent alone, with no effect seen on total Akt or MAPK (FIG. 10D). In contrast, in SK-BR-3 signalling through the MAPK cascade was not inhibited by the combination of drugs as shown by unaltered levels of phosphorylated p44/p42 MAPK as has been previously described (Nahta R, et al. (2004) Cancer research. 64(7):2343-6). Similar changes in the Akt and MAPK signalling cascades were seen with the combination of Trastuzumab and mAb104 and Trastuzumab and Pertuzumab. There was no significant difference in the extent of downregulation between the two drug combinations (FIGS. 10C and D).

Figure 11A:
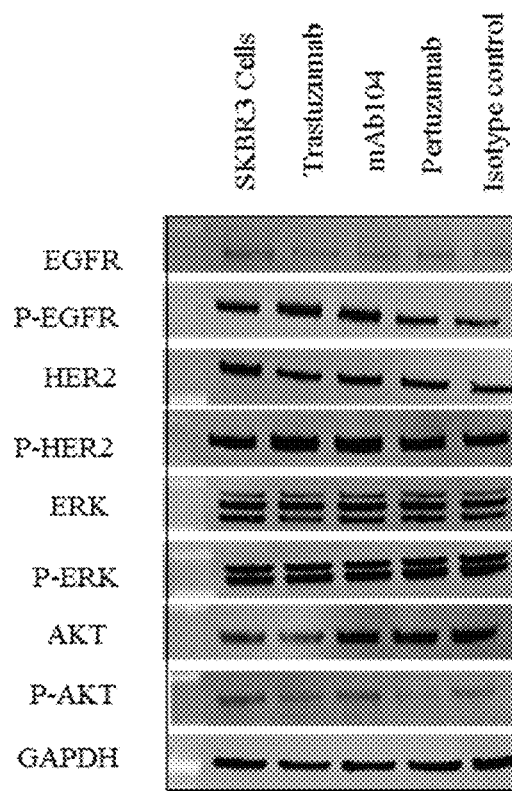
Figure 11B:
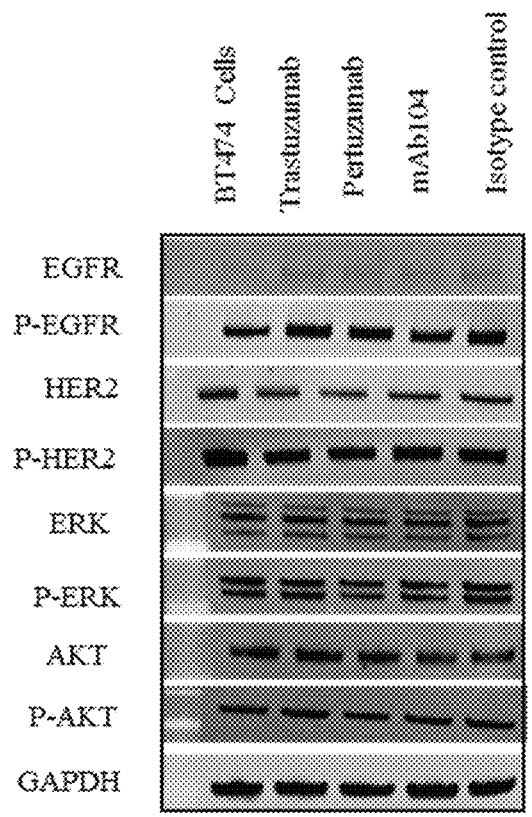
Figure 11C:
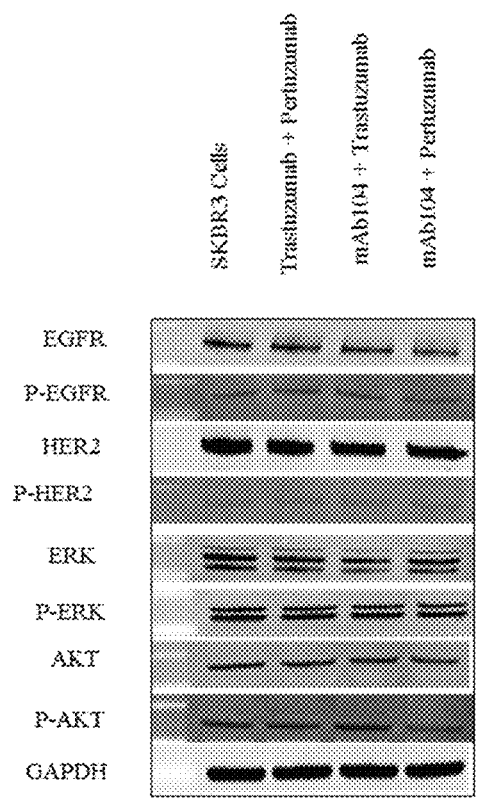
Figure 11D:
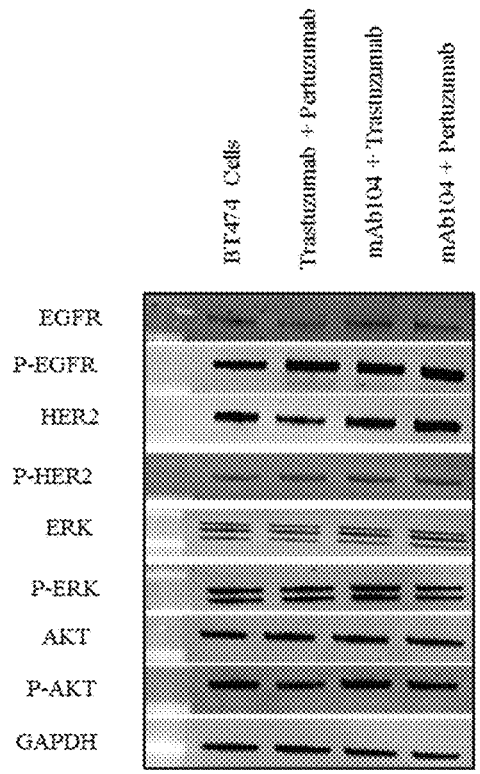
Figure 12A:
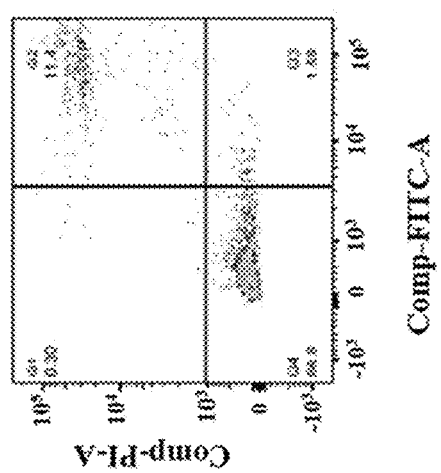
Figure 12B:
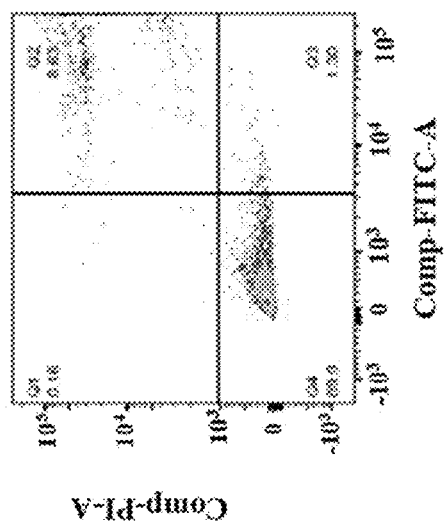
Figure 12C:
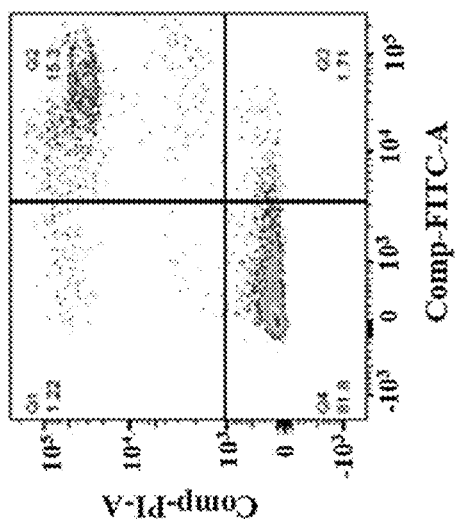
Figure 12D:
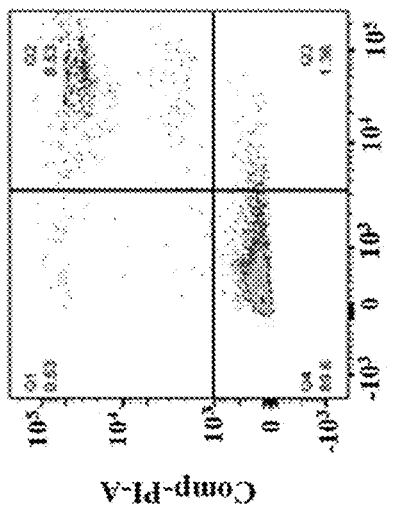
Figure 12E:
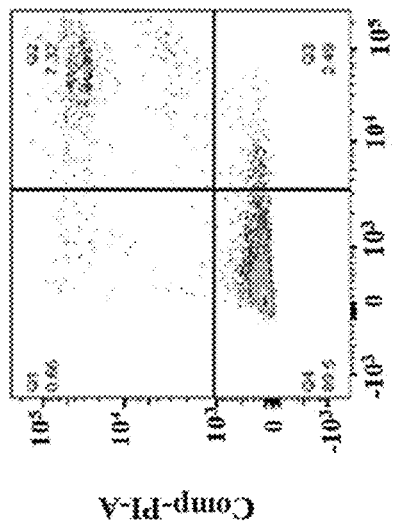
Figure 12F:
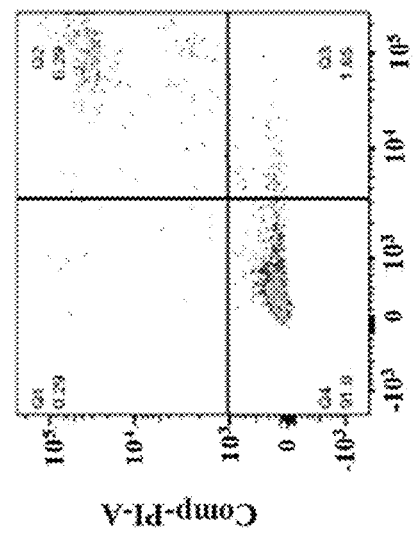
Figure 12H:
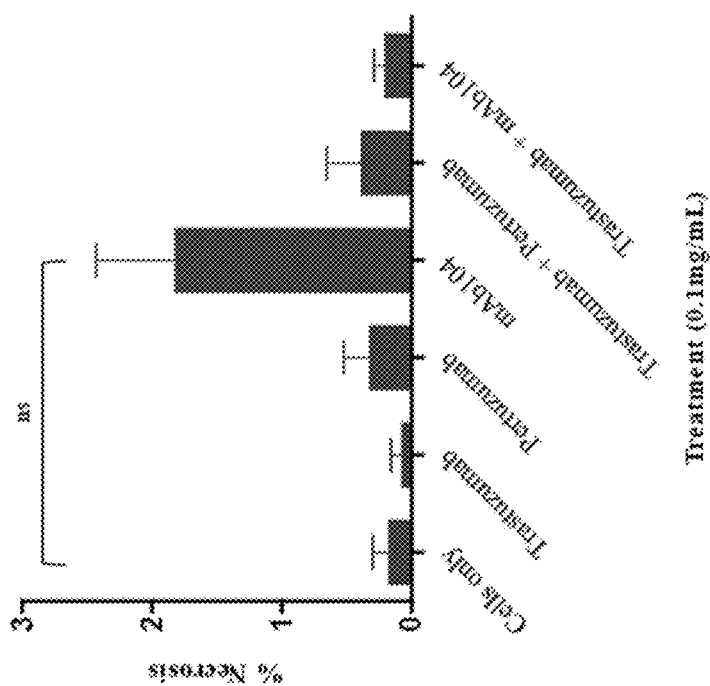
Figure 12G:
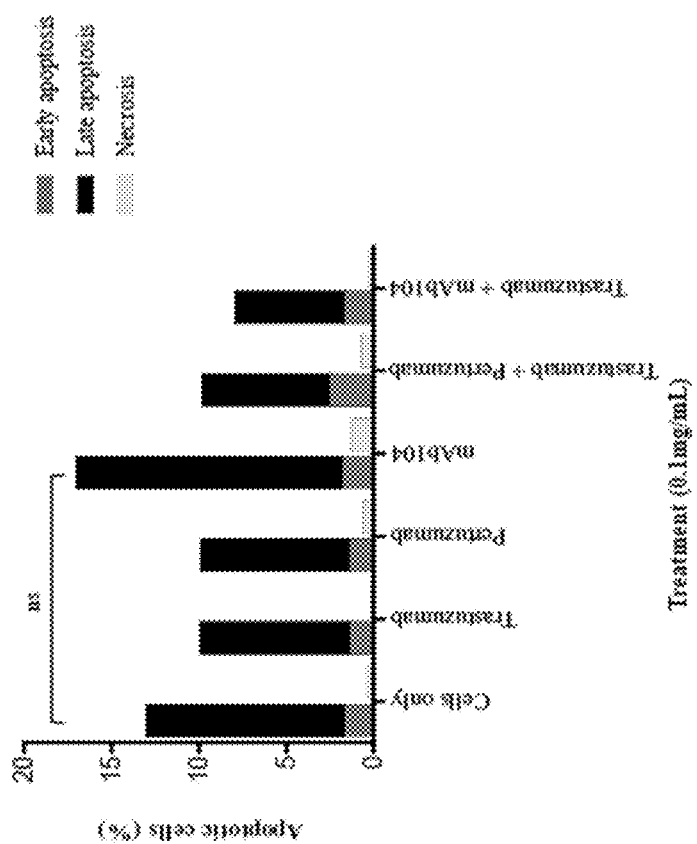
Figure 12I:
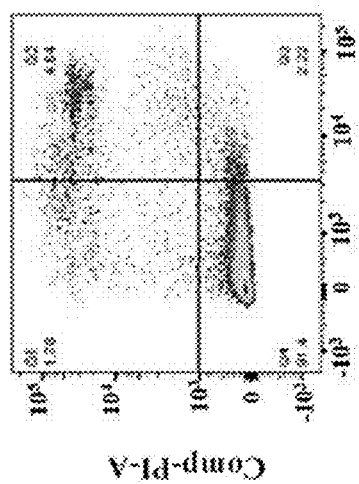
Figure 12K:
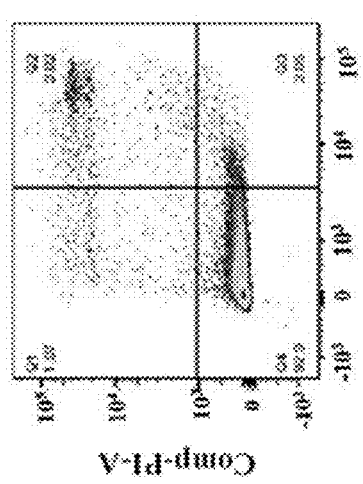
Figure 12J:
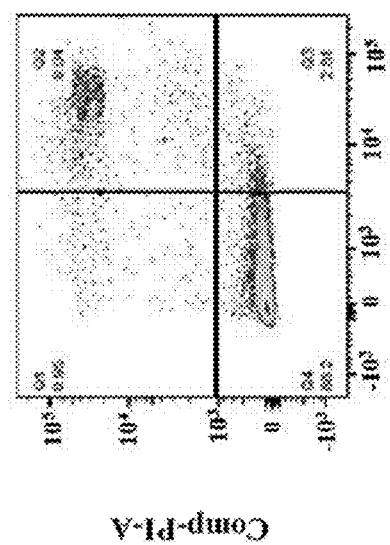
Figure 12M:
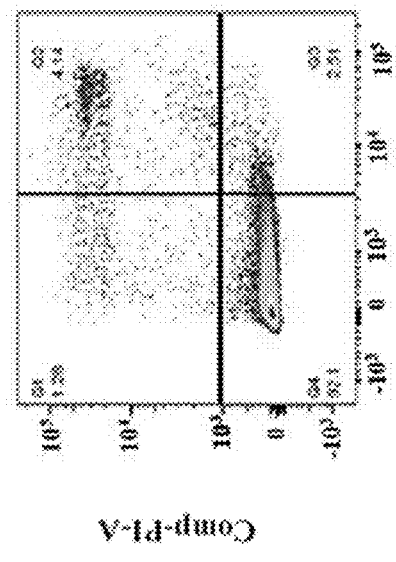
Figure 12L:
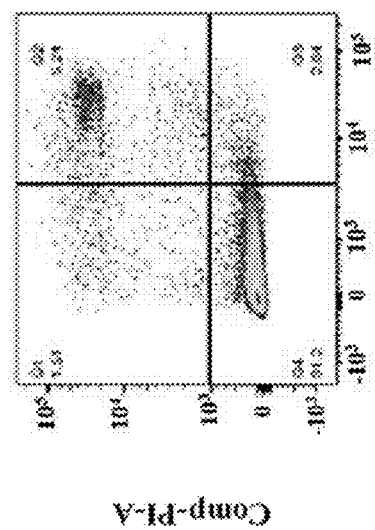
Figure 12N:
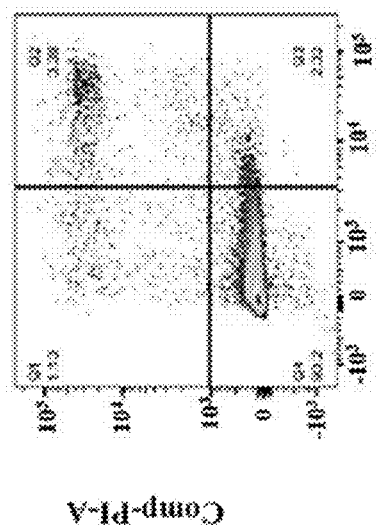
Figure 12P:
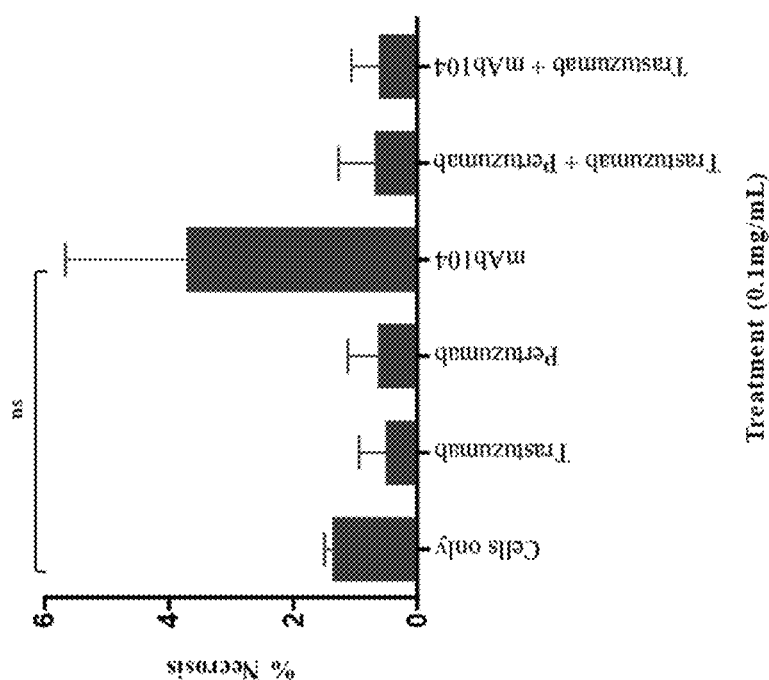
Figure 12O:
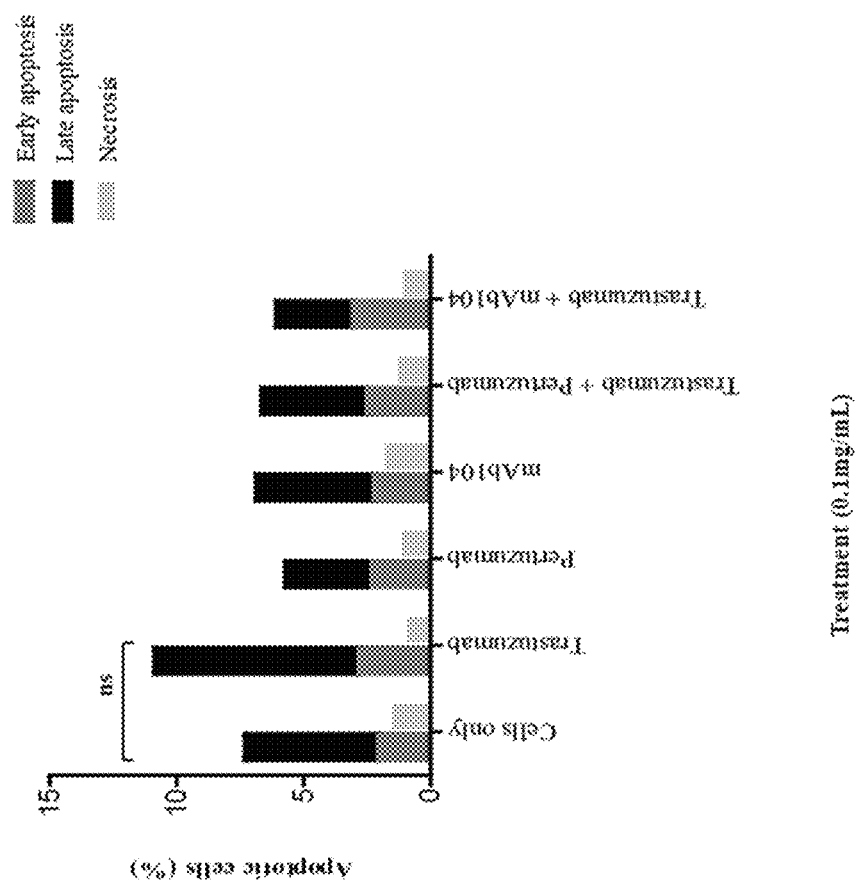

In ligand stimulated conditions (FIG. 11), Trastuzumab and Pertuzumab did not affect MAPK or Akt signalling pathways in BT-474 (FIGS. 11A and B)). In the SK-BR-3 cell line, ten minutes after EGF stimulation, prior treatment with Pertuzumab resulted in reduced Akt phosphorylation with no change in total Akt (FIG. 11A). These findings are consistent with other reports (Henjes F, et al. (2012) Oncogenesis 1(7):e16). Trastuzumab inhibits Akt-mediated signalling due to an abrogation of ligand-independent signalling, whereas Pertuzumab prevents ligand-induced signalling. The addition of EGF to mAb104 treated cells did not result in change in amount of total or phosphorylated MAPK and Akt pathway proteins in the breast cancer cell lines evaluated. In both cell lines, when treated with various mAb104 combinations, there was no effect on MAPK or Akt signalling when compared to the control antibody (FIGS. 11C and D).

Example 6 Effect of mAb104 on Apoptosis In Vitro

Flow cytometry was used to determine the apoptosis inducing activity of mAb104 in BT-474 and SK-BR-3 cells using the Dead Cell Apoptosis Kit (ThermoFisher Scientific, Catalogue No. V13241). Early and late apoptotic cell fractions were quantified by quadrant analysis. Compared to the cells only, treatment with Trastuzumab or Pertuzumab did not induce any apoptosis which is consistent with previous studies (Rockhoff G, et al. (2007) Cell proliferation. 40(4): 488-507; Nahta R, et al. (2004) Cancer Research 64(7): 2343-6; Lu Q, et al. supra) (FIG. 12). Compared to BT-474 (FIG. 12A-G), treatment of SK-BR-3 cells with Trastuzumab resulted in a larger number of apoptotic cells however this was not statistically significant (FIG. 12 I-0). Similarly, compared to cells only, mAb104 did not induce any significant apoptosis in the cell lines evaluated (p=0.494). No difference in apoptotic activity was seen between the antibodies (p=0.726).

Compared to single agent treatment, no increase in apoptotic activity was seen in cells exposed to combination treatment with Trastuzumab and Pertuzumab or mAb104. In BT-474, after treatment with Trastuzumab monotherapy 89.9% of cells were viable versus 91.8% after treatment with Trastuzumab and mAb104 (FIG. 12A-G). No difference in apoptotic activity was seen between the combination of Trastuzumab and Pertuzumab or mAb104 (FIGS. 12A-F and G).

An interesting finding was the higher number of necrotic cells seen after treatment with mAb104 as compared to cells only as well as Trastuzumab and Pertuzumab (FIGS. 12H and P) however this difference was not statistically significant. In BT-474 cells 1.8% of cells underwent necrosis compared to <0.5% of cell in all other groups; similarly, a higher number of SK-BR-3 cells underwent necrosis after treatment with mAb104 than in other treatment groups (FIG. 12P) however this difference was not statistically significant. Interestingly, cells treated with mAb104 in combination with Trastuzumab did not result in an increase in the number of cells undergoing necrosis.

The complex interplay of multiple receptor kinases and signalling pathways that occur in in vivo cannot always be fully replicated in vitro and may reflect differences in HER2 processing and function, and the impact of the tumour microenvironment on HER2 function or other factors in vivo are required for the functional effects of mAb104 targeting a conformationally exposed epitope on HER2 to be demonstrated. Antibodies targeting a conformationally exposed epitope on activated EGFR have shown significant anti-tumour activity in vivo despite failing to show any growth inhibition or altered signalling in vitro (Johns T G, Perera R M, Vernes S C, Vitali A A, Cao D X, Cavenee W K, et al. The efficacy of epidermal growth factor receptor-specific antibodies against glioma xenografts is influenced by receptor levels, activation status, and heterodimerization. Clinical Cancer Research. 2007; 13(6):1911-25).

Despite the lack of detectable in vitro activity seen with mAb104, the inventors proceeded to investigate its effect in vivo in cancer xenograft models which overexpress HER2.

In Vivo Efficacy of mAb104

Example 7 Efficacy of mAb104 Monotherapy in HER2-Overexpressing/Amplified, ER-Positive Breast Cancer Xenografts The inventors evaluated the efficacy of mAb104 in mice bearing established tumour xenografts of the ER-positive, HER2-overexpressing breast cancer cell line, BT-474. A dose of 1 mg/antibody treatment of mAb104, Trastuzumab, Pertuzumab or control antibody was administered thrice weekly for three weeks once tumour volumes reached a volume of 100-120 mm$^3$.

Figure 13:
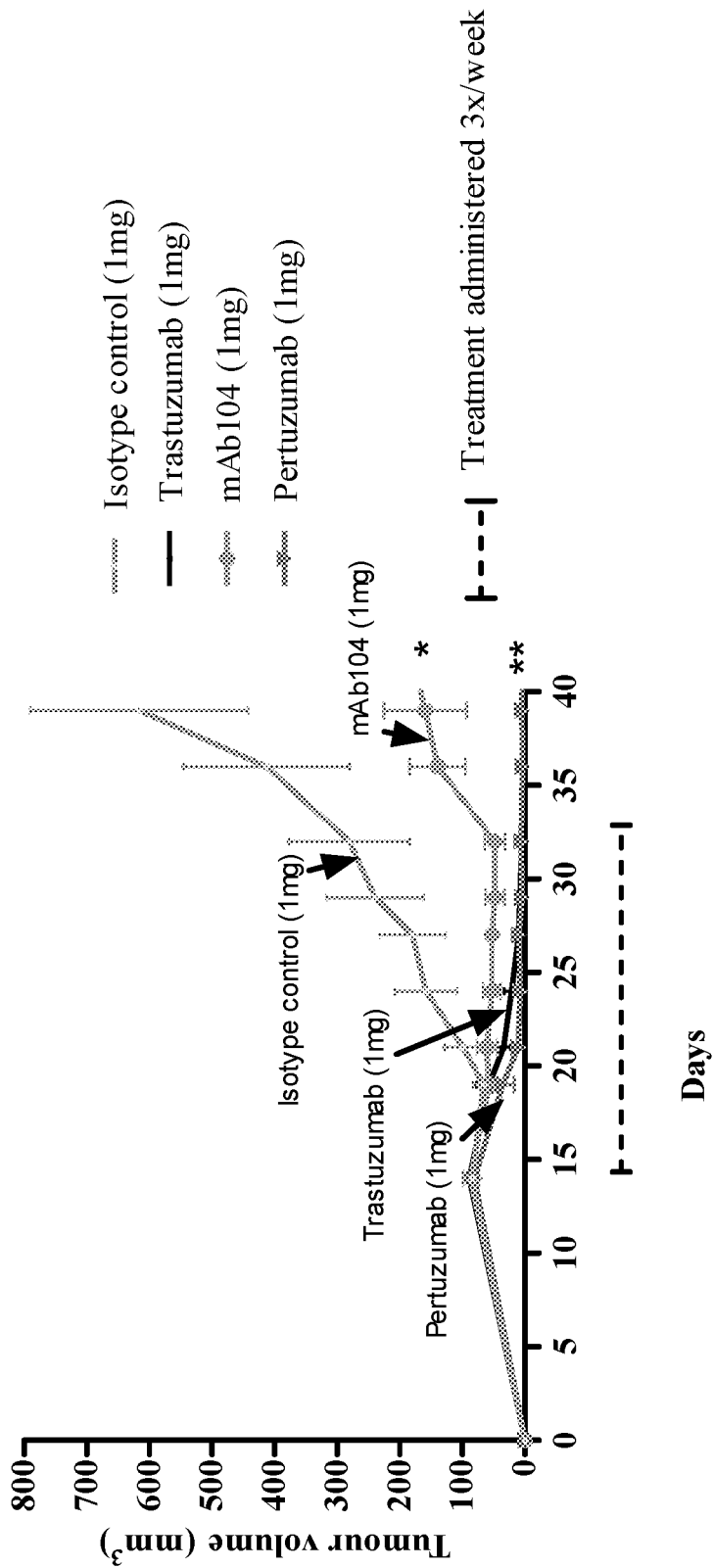
FIG. 13: Anti-tumour effects of mAb104 in BT-474 breast carcinoma xenografts. Mice (n=5) were treated with 1 mg mAb104, Trastuzumab, Pertuzumab, isotype control. Tumour volume at start of therapy was 100-120 mm³. Data shown in growth curve represents mean tumour volume±S.E. Tumours in the individual treatment groups were significantly smaller than the control group *p<0.001 control versus mAb104; **p<0.0001 control versus trastuzumab and pertuzumab.

Results are presented in FIG. 13. At the end of treatment (Day 32), all tumours in the treatment arms were significantly smaller than the control group (ANOVA p<0.0006). Post-hoc testing using the Bonferroni method, showed all treatment groups were significantly smaller (p≤0.001) when compared to the control group. At Day 32, the average tumour volumes were 337.2 mm$^3$ (control arm), 4.8 mm$^3$ (Trastuzumab), 6.7 mm$^3$ (Pertuzumab) and 48.7 mm$^3$ (mAb104). The marked anti-tumour response was sustained in the Trastuzumab and Pertuzumab treated groups until end of study (Day 39), one week following treatment cessation. However, for mAb104, tumour growth resumed upon cessation of treatment. At study end (Day 39) no significant difference in growth inhibition was seen between the treatment groups (p=0.14).

The inventors also evaluated the efficacy of a lower dose of 0.5 mg/antibody treatment of mAb104, Trastuzumab, Pertuzumab and control IgG administered thrice weekly for three weeks on established BT-474 tumour xenografts (120-150 mm$^3$).

Figure 14:
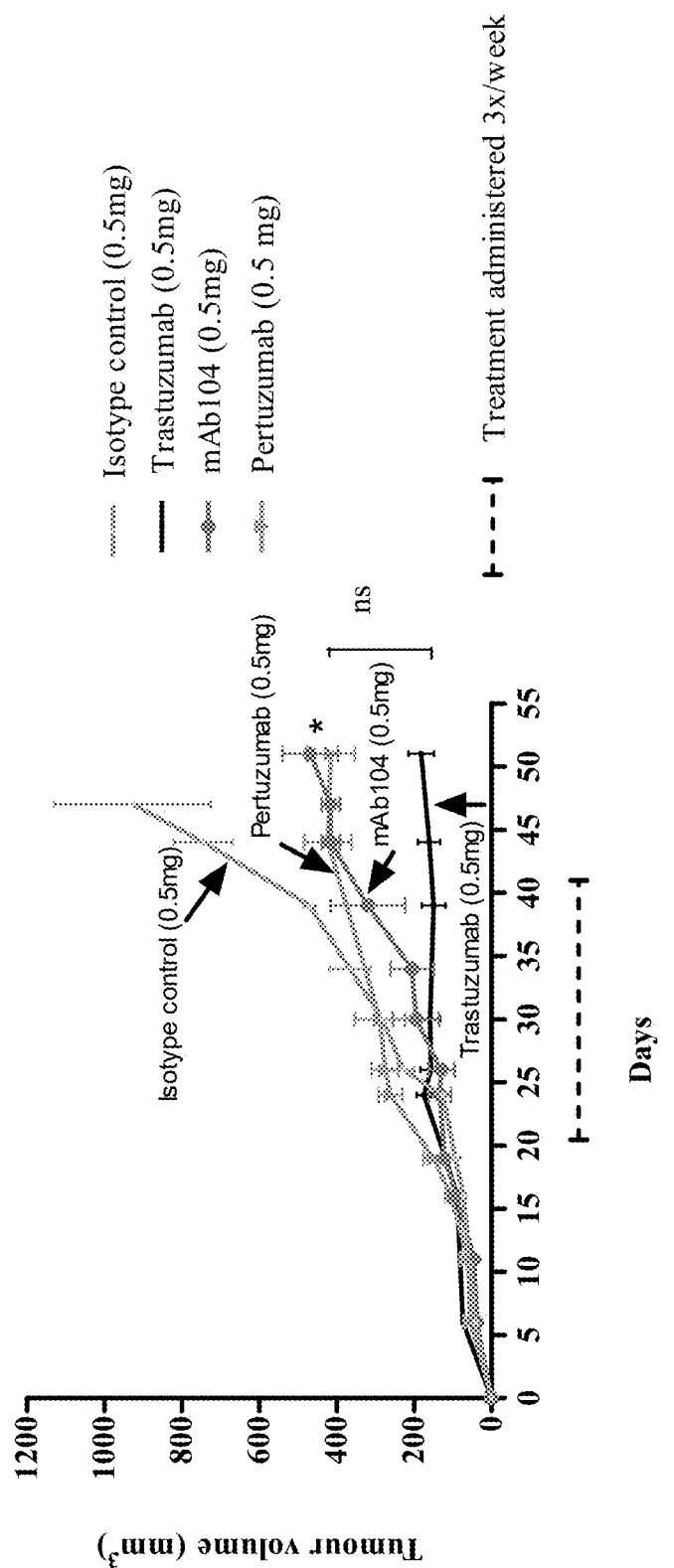
FIG. 14: Anti-tumour effects of mAb104 in BT-474 xenografts. Mice (n=5/group) were treated with 0.5 mg mAb104, Trastuzumab, Pertuzumab, isotype control. Tumour volume at start of therapy was 120-150 mm³. Data shown in growth curve represents mean tumour volume±S.E. *p<0.01, control versus mAb104 treatment arm.

Results are presented in FIG. 14. Trastuzumab treatment abrogated further tumour growth; Pertuzumab and mAb 104 reduced the tumour growth rate compared to the control arm. At the end of the study (Day 52), tumours in all the treatment groups were significantly smaller than the control group (ANOVA p<0.038). The average tumour volumes measured 927.5 mm$^3$ (control), 182.4 mm$^3$ (Trastuzumab), 415.0 mm$^3$ (Pertuzumab) and 469.1 mm$^3$ (mAb104). Post hoc testing using the Bonferroni method showed mice in the treatment groups had significantly smaller tumours compared to control (Trastuzumab p=0.0035, Pertuzumab p=0.02 and mAb014 p=0.008). At 0.5 mg/mL mAb104 showed similar anti-tumour efficacy in this model as Pertuzumab (p=0.97, two-sided). While treatment with Trastuzumab resulted in numerically greater tumour growth inhibition, there was however no significant difference between Trastuzumab and Pertuzumab (p=0.22, two-sided) or mAb104 (p=0.15, two-sided) at study end (Day 51).

Survival analysis by log-rank analysis showed mice treated with anti-HER2 antibodies had significantly longer survival rates than the control group (p<0.002) at the time the control group was culled for ethical considerations (i.e. tumour size≤1000 mm$^3$). The median survival for the mice in the control group was 41 days, while the median survival was not reached for mice in the treatment arms at the time the experiment was terminated (Day 52).

Example 8 Efficacy of mAb104 Monotherapy in HER2-Overexpressive/Amplified Breast PDX Model The inventors evaluated the effect of mAb104 in a HER2-overexpressing/amplified breast patient-derived xenograft (PDX) model. The donor samples were treatment-naïve and therefore 100% tumour susceptibility to anti-HER2 therapy was assumed. Once established tumour volumes measured between 100-120 mm$^3$ on day 64, mice were treated with a total dose 0.5 mg of mAb104, Trastuzumab, Pertuzumab or control IgG thrice weekly for three weeks. Results of tumour growth curves are presented in FIG. 15A.

Figure 15A:
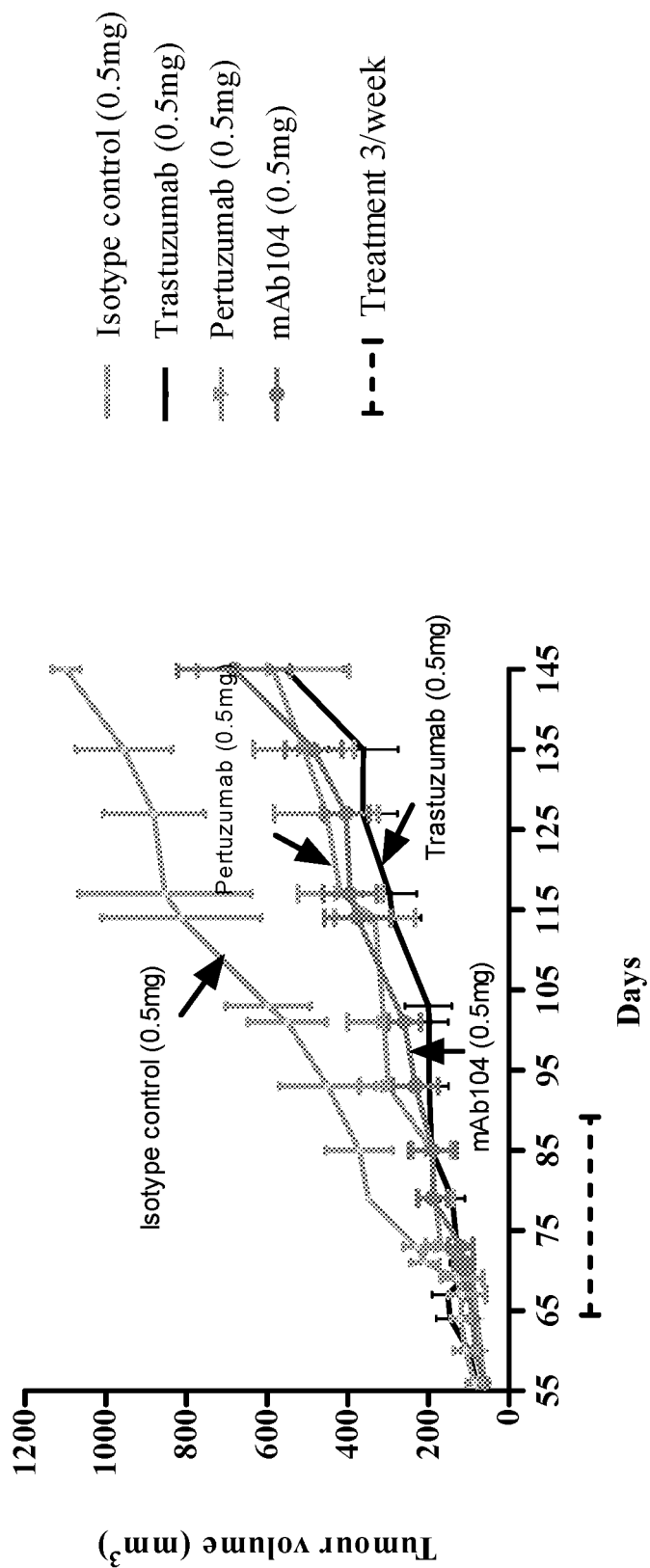

Anti-HER2 therapy had an immediate effect on the growth rate of the PDX. Following cessation of treatment on Day 86, equivalent anti-tumour efficacy was shown by all anti-HER2 treatments and the retardation of tumour growth rate continued until ~ day 125 when tumour growth curves began to parallel the control arm growth rate. At the end of the study, Day 145, the control arm was culled for ethical considerations. At Day 145 all treatment groups were significantly smaller than the control group (ANOVA p<0.04) (FIG. 15A). Post hoc testing using the Bonferroni method showed mice in the treated groups had significantly smaller tumours compared to control (Trastuzumab p=0.02; Pertuzumab p=0.02 and mAb104 p=0.038). The average tumour volumes were 1099.2 mm$^3$ (control), 761.2 mm$^3$ (mAb104), 632.8 mm$^3$ (Trastuzumab) and 691.3 mm$^3$ (Pertuzumab). mAb104 showed strong, equivalent anti-tumour activity in this model, to the approved HER2 targeting therapies with no significant differences between the anti-HER2 therapies (p=0.547 (two-sided) Trastuzumab vs. mAb104 and p=0.754 (two-sided) Pertuzumab vs. mAb104).

In the survival analysis, mice in the treatment groups had significantly longer survival than the control group (p<0.0005), with post hoc testing showing all groups treated with anti-HER2 antibodies survived significantly longer compared to control mice, p<0.001). The median survival for the mice in the control group was 145 days, while the median survival was not reached for mice in the treatment arms at the time the experiment was terminated.

Example 9 Efficacy of mAb104 in Combination with Trastuzumab in HER2-Overexpressing/Amplified, ER-Positive Breast Xenografts The combination of Trastuzumab and Pertuzumab has demonstrated in the literature more effective anti-tumour activity and prevention of metastatic tumour spread compared to either antibody alone, independent of HER2 expression. In view of the different Domain II epitope binding site of mAb104 compared to Trastuzumab and Pertuzumab, and the Inventor's observations of the potent anti-tumour activity of mAb104 as monotherapy in vivo, the inventors proceeded to evaluate mAb104 in combination with Trastuzumab, compared to Trastuzumab alone or mAb in combination with Pertuzumab.

The inventors evaluated the effect of mAb104 in combination with Trastuzumab in an established BT-474 breast cancer xenograft tumour model. Each mouse received 0.25 mg Trastuzumab and 0.25 mg mAb104 or Pertuzumab to achieve a total dose of 0.5 mg/treatment or equivalent control antibody thrice weekly for three weeks. Treatment was commenced once mean tumour volumes were 100-120 mm$^3$.

Figure 15B:
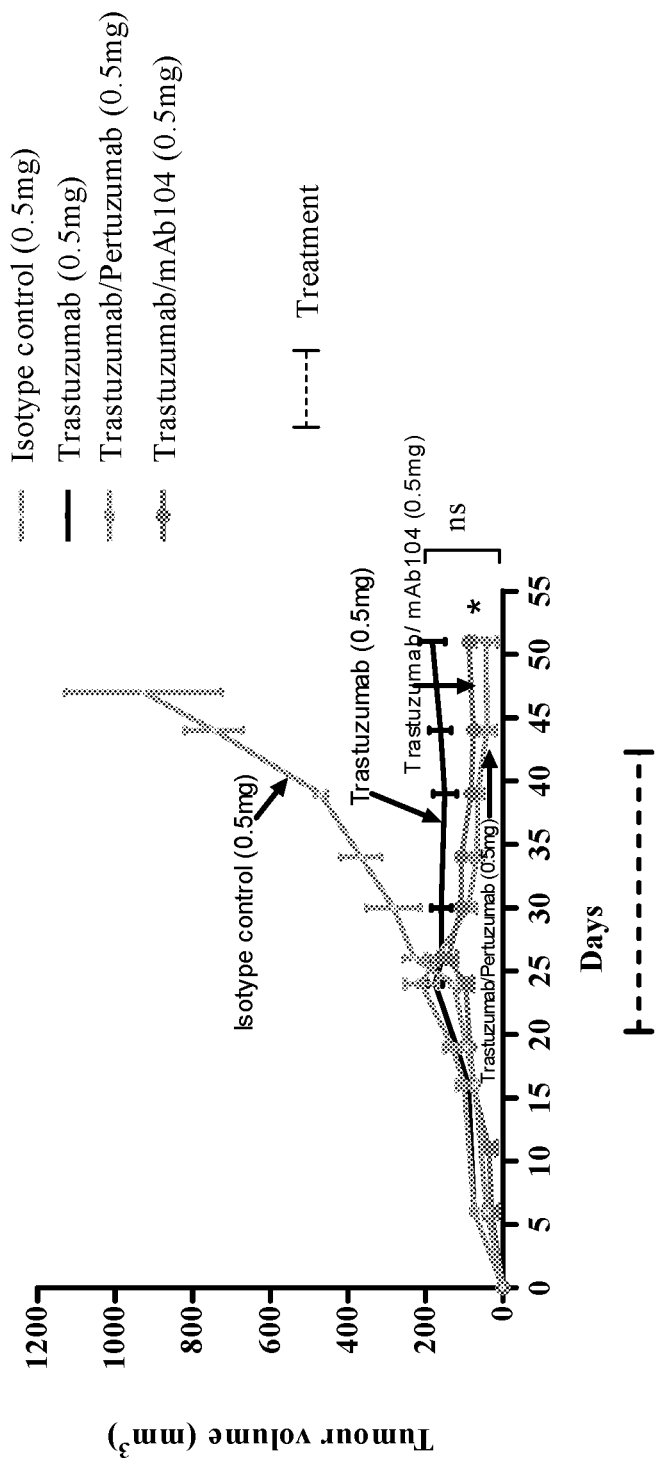

Results are presented in FIG. 15B. Anti-tumour efficacy was evident within 10 days of therapy commencement and continued following treatment cessation. At the end of the study period Day 50 the control arm was culled for ethical reasons due to tumour burden. The mean±SD tumour volumes in the Trastuzumab alone and combination arms were significantly smaller than the control group (ANOVA p<0.0001). Post-hoc testing was then undertaken with the Bonferroni method. Tumours treated with combination therapy were significantly smaller than the control group (p<0.0001), measuring 88.9 mm$^3$ (mAb104 plus Trastuzumab) and 43.6 mm$^3$ (Trastuzumab plus Pertuzumab). No complete regression of tumours was seen in any treatment group (FIG. 151B). Concurrent treatment with mAb104 and Trastuzumab resulted in greater tumour reduction compared to Trastuzumab alone, however the tumour size difference was not statistically significant between combination and monotherapy arms (p=0.09 by ANOVA).

Survival analysis showed mice in both the combination groups had significantly longer survival compared to the control group (p<0.002). The median survival of the control group was 44 days, while the median survival was not reached for the mice in the combination treatment groups). Log rank analysis showed no statistical difference between the two combination arms (p=0.21, two-sided); and treatment with mAb104 and Trastuzumab significantly inhibited tumour growth compared to mAb104 monotherapy (p 0.04, two-sided) (FIG. 15A).

Accordingly, this suggests that mAb104 in combination with Trastuzumab provides enhanced anti-tumour activity compared with either monotherapy alone.

Example 10 Efficacy of mAb104 in Combination with Trastuzumab in HER2-Overexpressing/Amplified, ER-Positive Breast PDX Model The inventors evaluated the effect of concurrent antibody treatment in HER2-overexpressing/amplified breast PDX model. The donor samples were anti-HER2 treatment-naïve and therefore 100% tumour susceptibility to treatment was assumed. Once established tumours volumes measured between 100-120 mm$^3$, mice were treated with a total treatment dose of 0.5 mg thrice weekly for three weeks of Trastuzumab or isotype control alone or combined mAb104 and Trastuzumab, or Trastuzumab plus Pertuzumab.

Figure 15C:
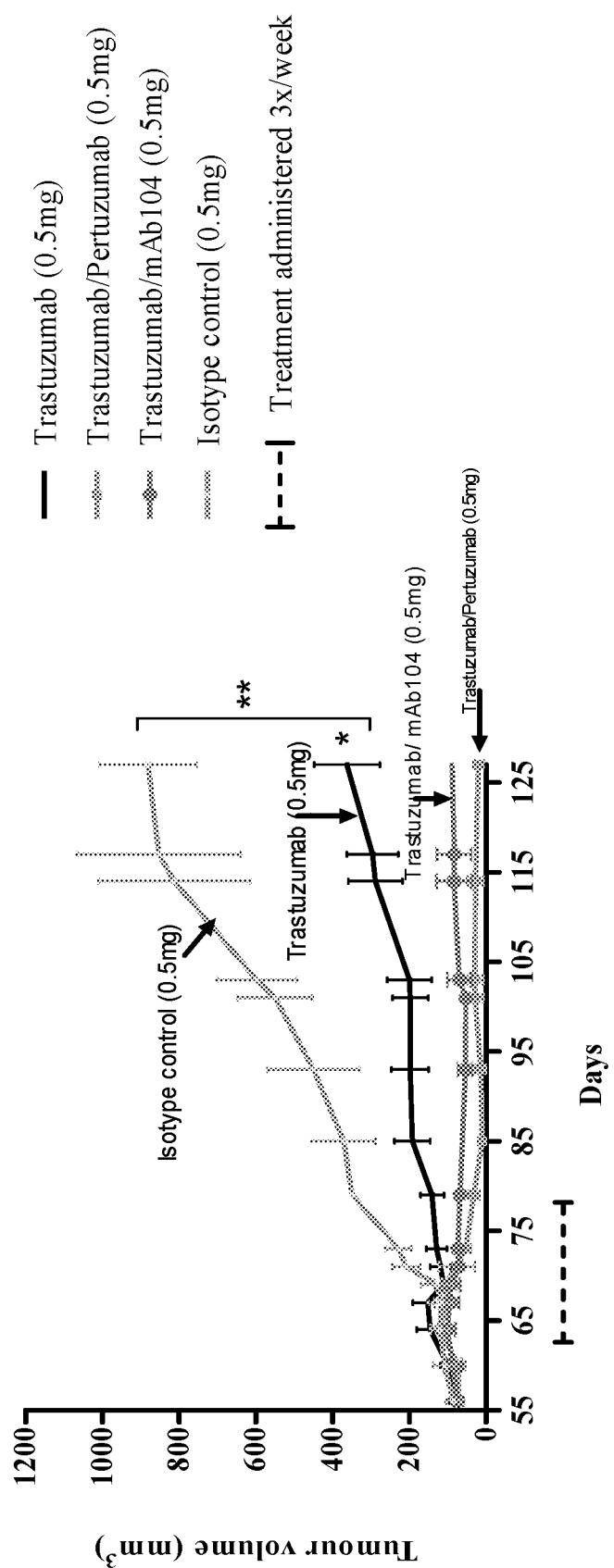

At completion of therapy on Day 85, significant differences between all treatment arms compared to control group were observed (p<0.0001) (FIG. 15C). Furthermore, the combination arms were more effective than Trastuzumab alone (p=0.001). The greater anti-tumour efficacy of the combination arms continued till the study was terminated at day 145, when the control arm was culled for ethical reasons due to tumour burden. At day 145 tumours in all treatment arms remained significantly smaller than the control group (p<0.0001). The average tumour volumes measured 164.4 mm$^3$ (mAb104 plus Trastuzumab) and 84.2 mm$^3$ (Trastuzumab plus Pertuzumab) (FIG. 15C). The difference in tumour volume between the two combination arms did not reach statistical significance (p=0.46, two-sided). No complete regressions of tumours were seen in any treatment group.

Compared to Trastuzumab monotherapy, concurrent treatment with mAb104 and Trastuzumab resulted in significantly greater tumour volume shrinkage (p<0.0001 by ANOVA). Post-hoc testing was then undertaken with the Bonferroni method. Tumours in the combination groups were significantly smaller compared to single agent Trastuzumab (p<0.0049).

Survival analysis showed mice in both the combination groups had significantly longer survival compared to the control group (p<0.0005) as well as to the mice in the single treatment groups (p=0.0014). The median survival of the control group was 145 days, with the median survival not reached for the mice in the combination treatment groups.

The results in FIGS. 15A and C demonstrated that after day 145, average tumour size for Trastuzumab alone was 632.8 mm$^3$ and 761.2 mm$^3$ for mAb104. When mAb104 was combined with Trastuzumab, tumour size substantially decreased to 164.4 mm$^3$. This decrease in tumour size suggests that the combination of mAb104 with Trastuzumab resulted in enhanced anti-tumour activity compared to monotherapy with either Trastuzumab or mAb104 alone.

Example 11 Reverse Phase Protein Array (RPPA) Analysis

Lysates obtained from HER2-breast PDX tumours (n=2/group) were collected at the completion of treatment on day 85 and analysed by RPPA. A panel of over 300 antibodies detecting total protein and/or its activated forms were included in this RPPA analysis. The key proteins are involved in critical signalling pathways and include the phosphatidylinositol 3-kinase (PI3K)/AKT pathway, the extracellular signal-regulated kinase (ERK)/mitogen-activated protein kinase (MAPK) pathway, the Janus kinase (JAK)/signal transducers and activators of transcription (STAT) pathway, apoptosis pathway, cell cycle including cell death and survival. The data collected was normalised for protein loading and transformed to a linear value for analysis. The percentage fold change was calculated as a ratio of difference in protein expression between the control arm and tumour samples treated with either with Trastuzumab, Pertuzumab or mA104 or combinations.

Despite mAb104 showing significant anti-tumour activity in the HER2-breast PDX model, no significant changes in proteins levels were seen in comparison to the other antibodies evaluated (Table 9)

TABLE 9

Differential expression of key proteins treated with Trastuzumab, Pertuzumab and mAb104 as assessed by RPPA

| Protein | Fold change Trastuzumab | Fold change mAb104 | p-value (Trastuzumab vs. mAb104) | Fold change Pertuzumab | p-value (pertuzumab vs. mAb104) |
|---|---|---|---|---|---|
| Membrane receptors and effectors ||||||
| TFRC | −2.123 | −2.793 | ns | −2.414 | ns |
| MCT4 | −1.232 | −1.707 | ns | −1.912 | ns |
| EMA | −1.358 | −1.451 | ns | −1.754 | ns |
| SLC1A5 | −1.058 | −1.311 | ns | −1.535 | ns |
| Src | −1.528 | −1.132 | ns |  | ns |
| EGFR | −2.569 | −1.125 | ns | −2.680 | ns |
| HER2 | 1.109 | 1.055 | ns | 1.117 | ns |
| Angiogenesis ||||||
| PDGFR-b | 2.863 | 1.522 | ns | 3.770 | ns |
| MAPK signalling ||||||
| HER2_pY1248 | −1.375 | −2.051 | ns | −2.010 | ns |
| P38-MAPK | 1.577 | 1.206 | ns | 1.843 | ns |
| p38_pT180_Y182 | 1.287 | 1.140 | ns | 1.515 | ns |
| EGFR_pY1173 | 1.123 | 1.035 | ns | 1.069 | ns |
| PI3K/AKT/mTOR ||||||
| PRAS40 | −1.489 | −1.125 | ns | −1.441 | ns |
| B-Raf_pS445 | 1.587 | 1.445 | ns | 1.675 | ns |
| mTOR_pS2448 | 1.382 | 1.434 | ns | 1.458 | ns |
| Akt | 1.554 | 1.277 | ns | 1.390 | ns |
| PI3K-p85 | 1.388 | 1.275 | ns | 1.602 | ns |
| Akt_pS473 | 1.123 | 1.275 | ns | 1.022 | ns |
| Mnk1 | 1.378 | 1.190 | ns | 1.553 | ns |
| S6_pS235_S236 | 1.269 | 1.134 | ns | 1.306 | ns |
| Apoptosis ||||||
| Bcl2 | −2.035 | −1.128 | ns | −2.120 | ns |
| SOD1 | −1.431 | −1.060 | ns | −1.517 | ns |
| BAP1 | −1.355 | −1.030 | ns | −1.505 | ns |
| BiP-GRP78 | −1.557 | −1.035 | ns | −1.554 | ns |
| PI3K/AKT related tumour suppressors ||||||
| PTEN | 1.421 | 1.151 | ns | 1.526 | ns |
| Epigenetics ||||||
| Histone H3 | −1.375 | −2.051 | ns | −2.010 | ns |
| NDUFB4 | −1.812 | −1.190 | ns | −1.804 | ns |
| E2F1 | −2.570 | −1.124 | ns | −2.679 | ns |
| TWIST | −1.818 | −1.108 | ns | −1.735 | ns |
| Annexin VII | −1.646 | −1.090 | ns | −1.650 | ns |
| Stat3 | 1.703 | 1.194 | ns | 1.764 | ns |
| ENY2 | −1.729 | −1.051 | ns | −1.749 | ns |
| Cell cycle ||||||
| Chk1 | −1.739 | −1.086 | ns | −1.646 | ns |
| Chk2 | −1.505 | −1.030 | ns | −1.668 | ns |
| p21 | 1.569 | 1.417 | ns | 1.422 | ns |
| Immune function ||||||
| HLA-DR-DP-DQ-DX | −2.630 | −1.198 | ns | −2.399 | ns |
| CD45 | −3.606 | −1.167 | ns | −3.212 | ns |

TABLE 9-continued

Differential expression of key proteins treated with Trastuzumab,
Pertuzumab and mAb104 as assessed by RPPA

| Protein | Fold change Trastuzumab | Fold change mAb104 | p-value (Trastuzumab vs. mAb104) | Fold change Pertuzumab | p-value (pertuzumab vs. mAb104) |
|---|---|---|---|---|---|
| CD49b | −1.508 | −1.128 | ns | −1.551 | ns |
| PD-1  | −2.336 | −1.075 | ns | −2.262 | ns |
| Lck   | 1.594  | 1.223  | ns | 1.493  | ns |

*ns: not significant.
The list evaluated key pathway kinases and in addition to their downstream effectors with fold change.
The fold change was calculated as a ratio of difference in protein expression between the control arm and treatment arms.
The p values were derived using t-tests for the comparisons shown.

Example 12 Immunohistochemical Analysis of Established Tumours

Mice (n=2) bearing established BT-474 breast tumour xenografts from each of the monotherapy and combination treatment groups were sacrificed one day after the last treatment, and xenograft tissue samples were obtained and prepared for IHC analysis of tumour proliferation, downstream signalling and angiogenesis.

Figure 16C:
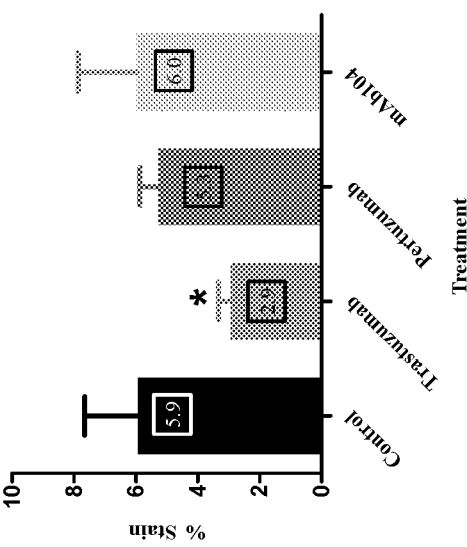
Figure 16B:
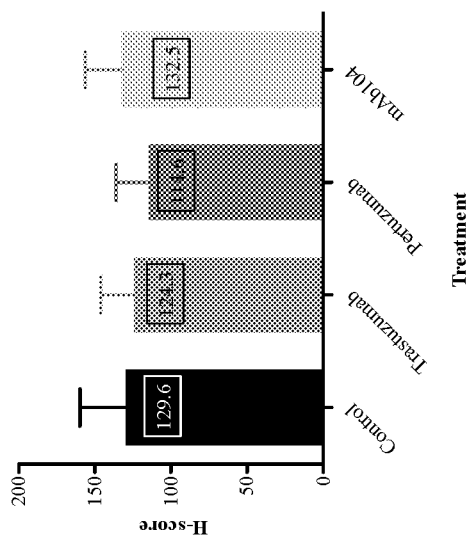
Figure 16A:
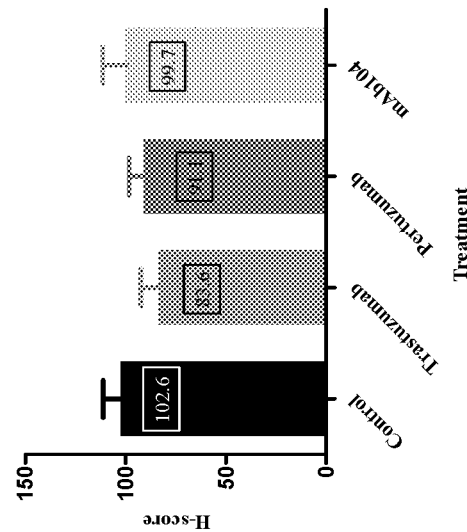

The effect of mAb104 monotherapy on tumour proliferation was examined by Ki67 staining and results are presented in FIG. 16A. In BT-474 xenograft tumours treatment with anti-HER2 antibodies did not significantly reduce proliferation compared to control group (p=0.625 by ANOVA, with post-hoc analysis demonstrating no difference between the different treatment arms). The mean H-scores were 102.6 (control), 83.9 (Trastuzumab), 91.1 (Pertuzumab), and 99.7 (mAb104).

To determine if the anti-proliferative effect was mediated through down-regulation of the Akt pathway, Akt were assessed by phosphoprotein assay (FIG. 16B). In BT-474, no significant difference in the H-score of phospho-Akt was seen between the treatment arms and the control group (p=0.958 by ANOVA, with no difference in the treatment arms on post-hoc analysis). The mean H-scores were 129.6 (control), 124.3 (Trastuzumab), 114.6 (Pertuzumab) and 132.5 (mAb104).

Trastuzumab has been shown to have an anti-angiogenic effect (Parakh S, (2017) Cancer treatment reviews. 59:1-21), the inventors therefore examined the effect of mAb104 on micro-vessel density in tumour tissue by staining for podocalyxin (FIG. 16C). Immunohistochemical staining was conducted as described previously. Microvessel density (%) was calculated from the ratio of the positive staining area to the total observation area in the viable region. In BT-474 xenograft tumours, while significant Trastuzumab anti-angiogenic activity was observed (p<0.001), mAb104 and Pertuzumab did not have any significant effect on tumour vasculature when compared to the control antibody (p=0.987).

Figure 16F:
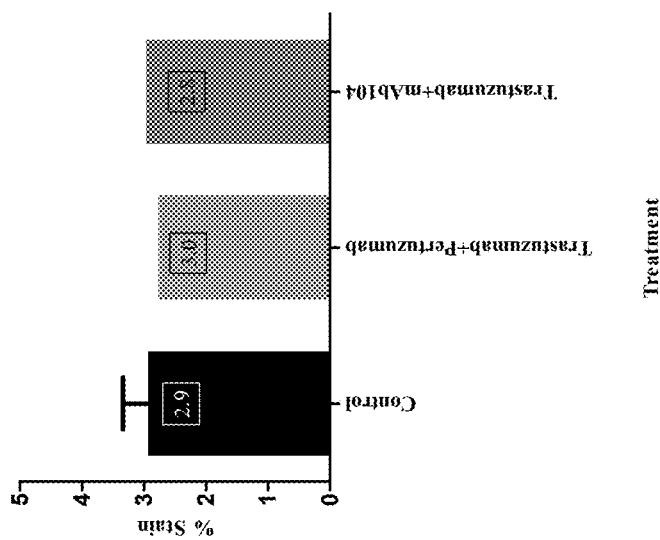
Figure 16E:
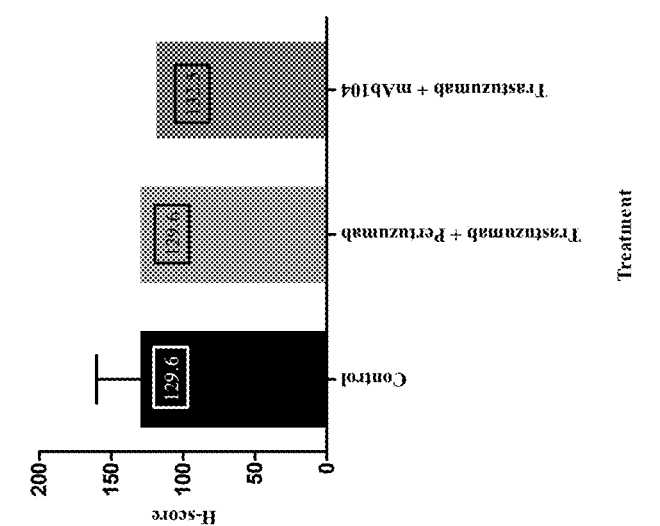
Figure 16D:
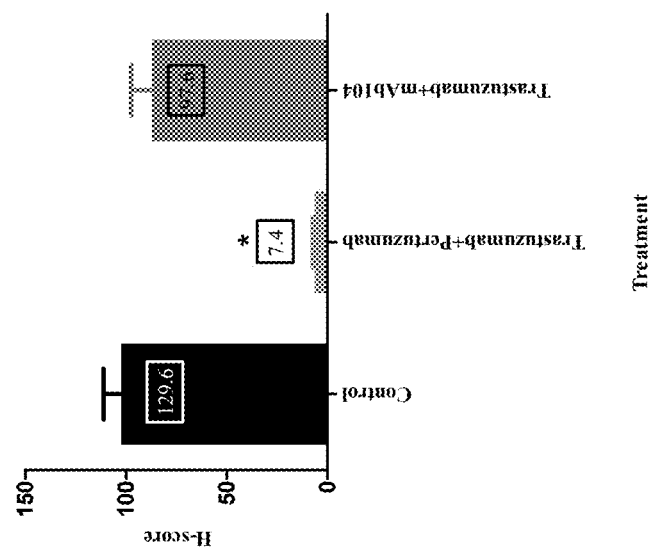

The combination of Trastuzumab and Pertuzumab significantly reduced proliferation compared to control (p<0.05) and when compared to Trastuzumab and mAb104 (p=0.017, two-sided). The mean H-scores were 129.6 (control), 7.4 (Trastuzumab plus Pertuzumab), and 97.6 (Trastuzumab plus mAb104) (FIG. 16D). These findings are similar to previous reports (Brockhoff G, (2007) Cell proliferation. 40(4):488-507).

No effects on pAkt (FIG. 16E) or angiogenesis (FIG. 16F) were observed in the BT-474 tumour samples treated with Trastuzumab plus Pertuzumab or Trastuzumab plus mAb104 when compared to the control antibody.

Gastric Cancer

Example 13 Anti-Proliferative Effect of mAb104 In Vitro

In vitro, Trastuzumab significantly (p<0.0001) inhibited growth of NCI-N87 and impacted proliferation of OE-19 gastric cancer cells (FIG. 17) in agreement with previous reports (Gravalos C, et al. (2008) Annals of oncology. 19(9):1523-9). Pertuzumab as monotherapy did not have any significant anti-proliferative activity compared to the control antibody in cell lines evaluated (NCI-N87 p=0.02; and OE19 p=0.96). These findings are consistent with other studies, despite differences in incubation times and doses (Brockhoff G, et al. (2007) Cell proliferation. 40(4):488-507; Tokuda Y, et al. (1996) British journal of cancer. 73(11):1362; Yamashita-Kashima Y, et al. (2011) Clinical Cancer Research. 17(15):5060-70; Nahta R, et al. (2004) Cancer research. 64(7):2343-6; Gong S J, et al (2004) Cancer letters. 214(2):215-24; Ko B-K, et al. (2015) Molecular oncology. 9(2):398-408; Tomioka H, et al. (2012) International journal of oncology. 41(2):551-8).

Figure 17A:
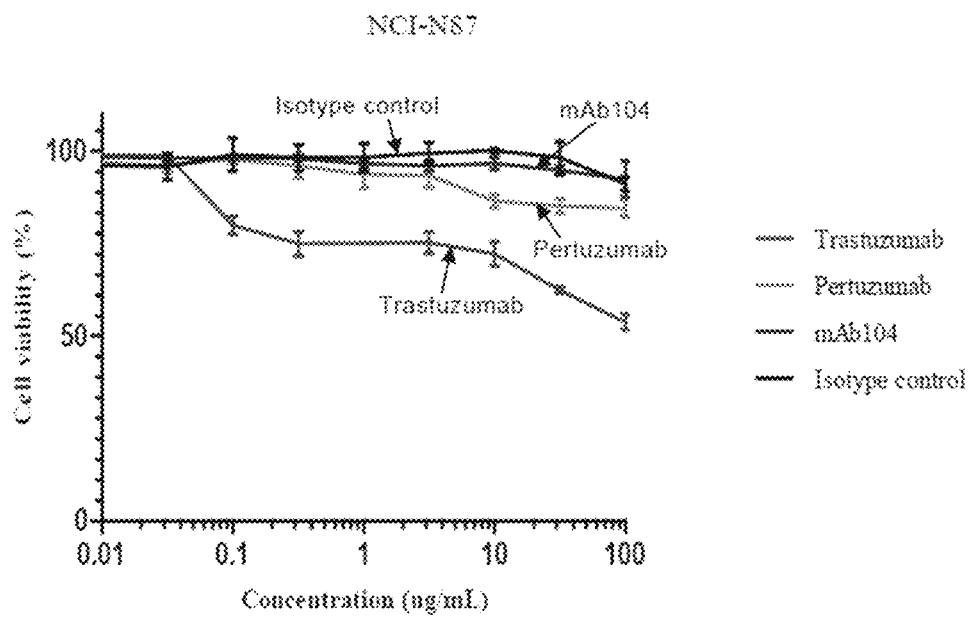
FIG. 17: mAb104 does not inhibit the growth of (A) NCI-N87 and (B) OE19 gastric cancer cells in vitro as measured by MTS assay. Cells were incubated with mAb104, Trastuzumab, Pertuzumab, isotype control as monotherapy (A and B) in serum depleted media for 5-7 days. The number of viable cells determined at baseline and at end of experiment. Results are presented as Mean±SD, n=3. Data is representative of two or more independent experiments. *p<0.0001, control versus Trastuzumab.
Figure 17B:
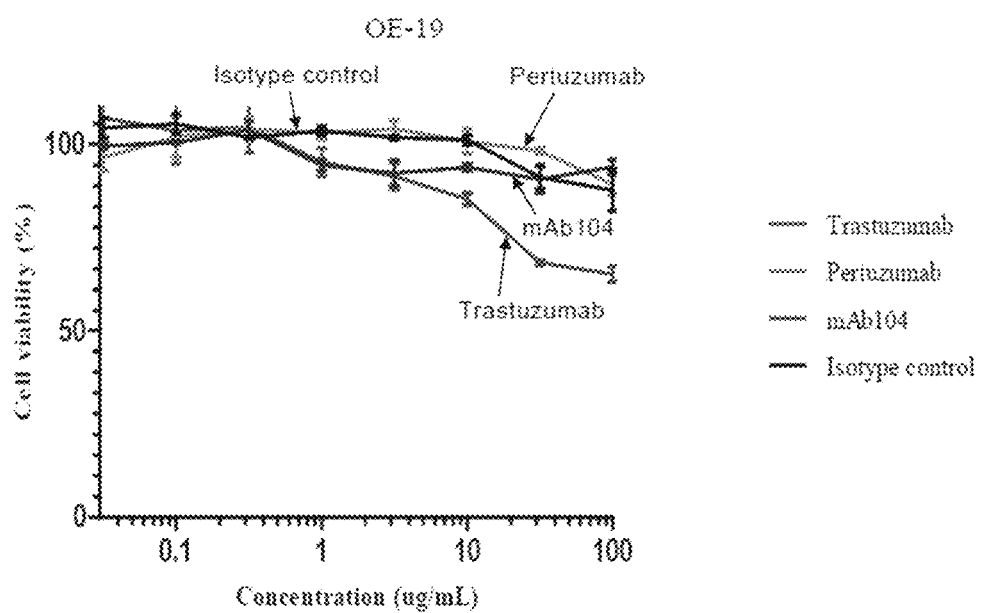

The monoclonal antibody mAb104 also did not show any significant in vitro growth inhibition as compared to isotype control antibody (NCI-N87 p=0.34; and OE19 p=0.12) (FIG. 17). This is consistent with other in vitro studies evaluating antibodies targeting conformationally exposed epitopes on the EGFR receptor (Johns T G, et al. (2003) Proceedings of the National Academy of Sciences. 100(26): 15871-6; Johns T G, et al. (2007) Clinical Cancer Research. 13(6):1911-25).

Figure 18A:
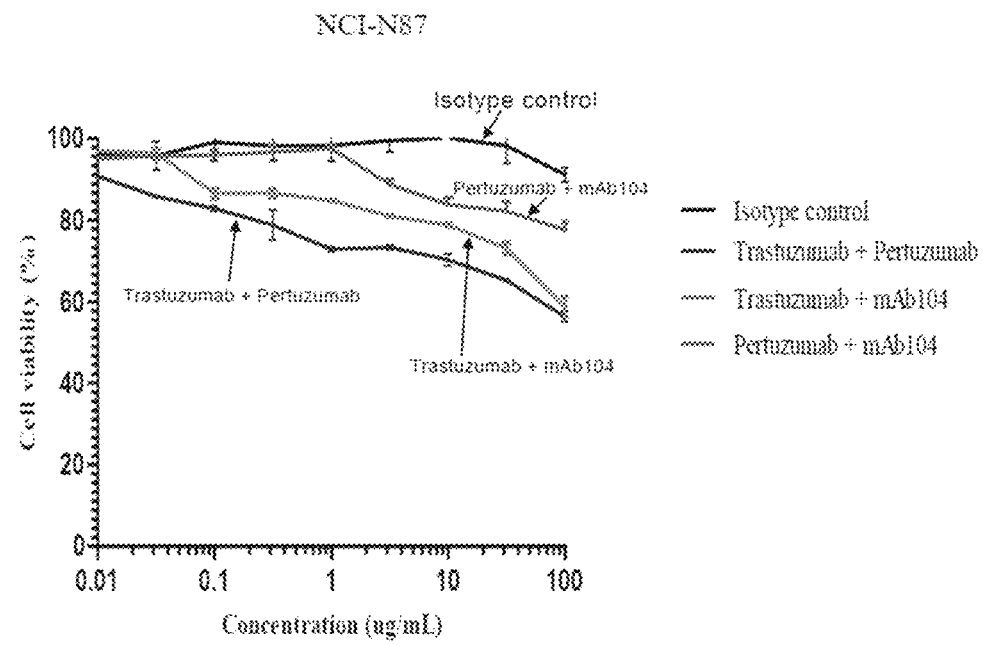
FIG. 18: mAb104 does not inhibit the growth of (A) NCI-N87 and (B) OE19 gastric cancer cells in vitro as measured by MTS assay. Cells were incubated with mAb104 in combination with Trastuzumab+Pertuzumab, Trastuzumab+mAb104 or Pertuzumab+mAb104 in serum-depleted media for 5-7 days. The number of viable cells determined at baseline and at end of experiment. Results are presented as Mean±SD, n=3. Data is representative of two or more independent experiments. *p≤0.005, compared to control
Figure 18B:
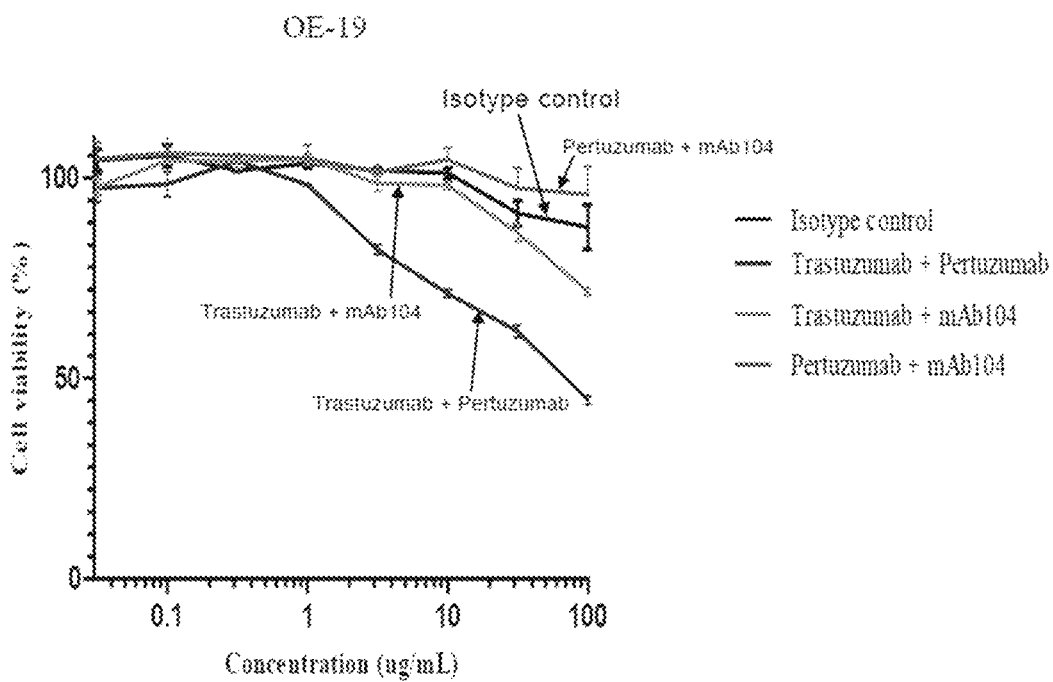

The combination of Trastuzumab and Pertuzumab significantly inhibited proliferation in the gastric/GEJ cell lines evaluated (FIG. 18). There was however, no statistical difference compared to Trastuzumab monotherapy. The effect of mAb104 in combination with Trastuzumab or Pertuzumab on proliferation was assessed; the addition of mAb104 did not add to the anti-proliferative effect compared to the individual antibodies alone. Significantly, the combination of mAb104 and Trastuzumab was not statistically different to that of Trastuzumab and Pertuzumab (NCI-N87 p=0.29; and OE19 p=0.14).

Figure 19B:
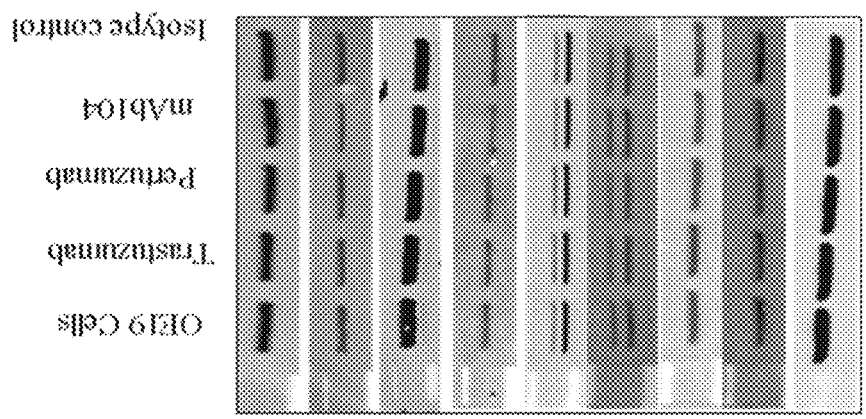
Figure 19A:
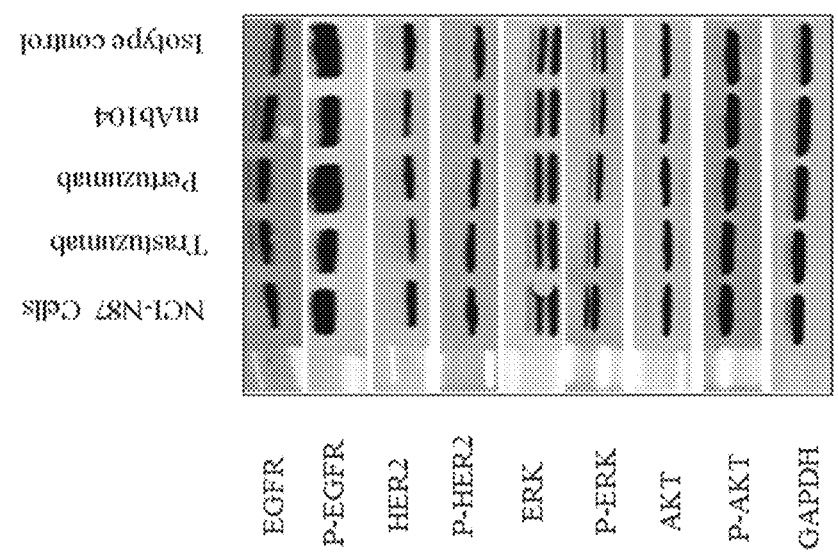
Figure 19D:
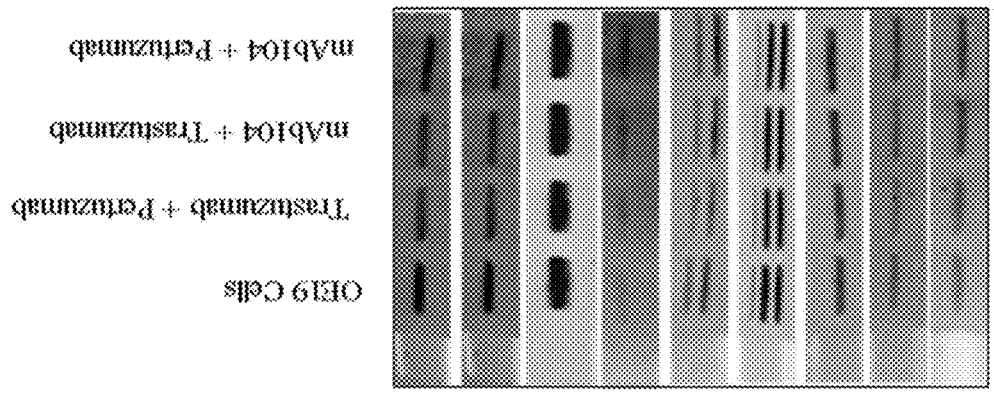

Example 14 Effect of mAb104 on ErbB Receptors and Downstream Signalling Pathways In HER2-overexpressing gastric cancer cell lines, NCI-N87 and OE19, treatment with anti-HER2 antibodies as monotherapy did not affect total or phosphorylated proteins in the MAPK and AKT signalling pathways, consistent with previous reports (Ko B-K, et al. (2015) Molecular oncology. 9(2):398-408; Tomioka H, et al. (2012) International journal of oncology. 41(2):551-8)) (FIGS. 19A and B).

Figure 19C:
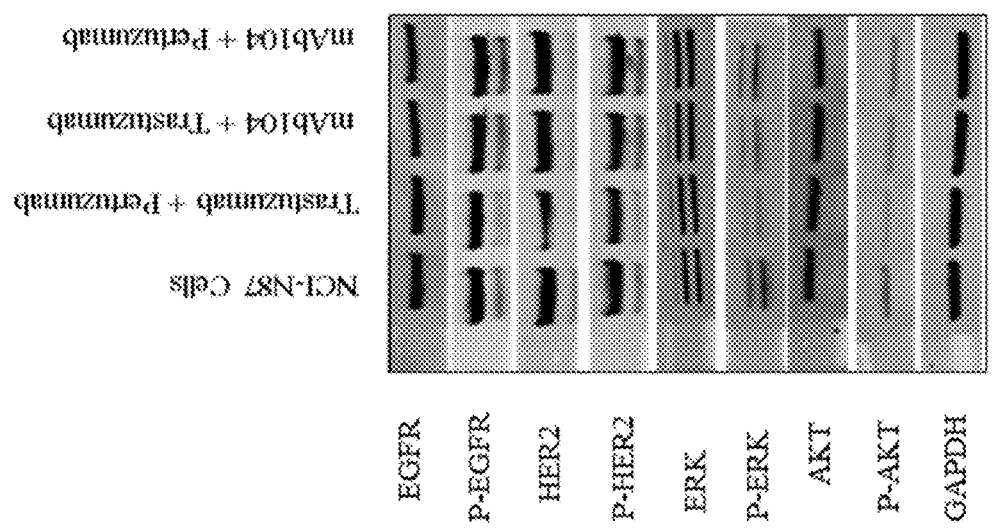

Combination treatments of Trastuzumab and Pertuzumab or mAb104 in NCI-N87 gastric cancer cell lines resulted in downregulation of phospho-Akt and phosphorylated p44/p42 MAPK while the total protein levels remained unchanged (FIGS. 19C and D).

Figure 20B:
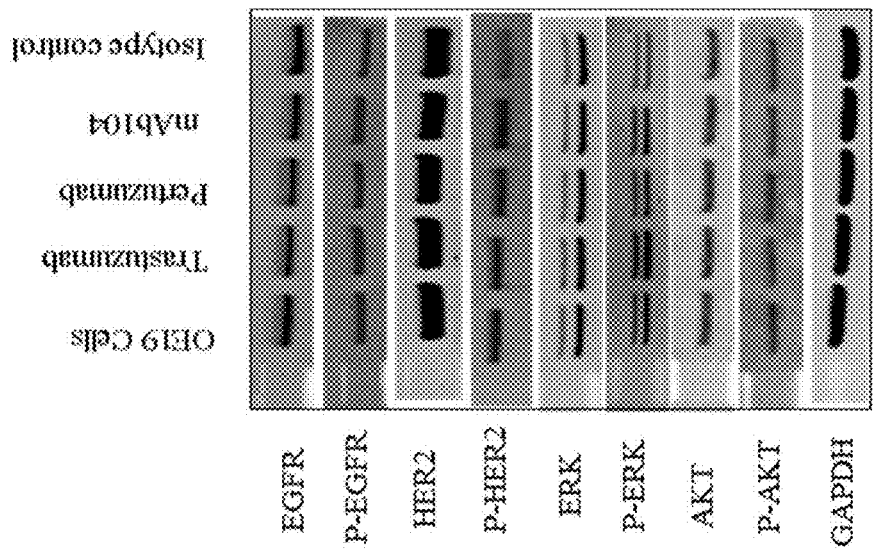
Figure 20A:
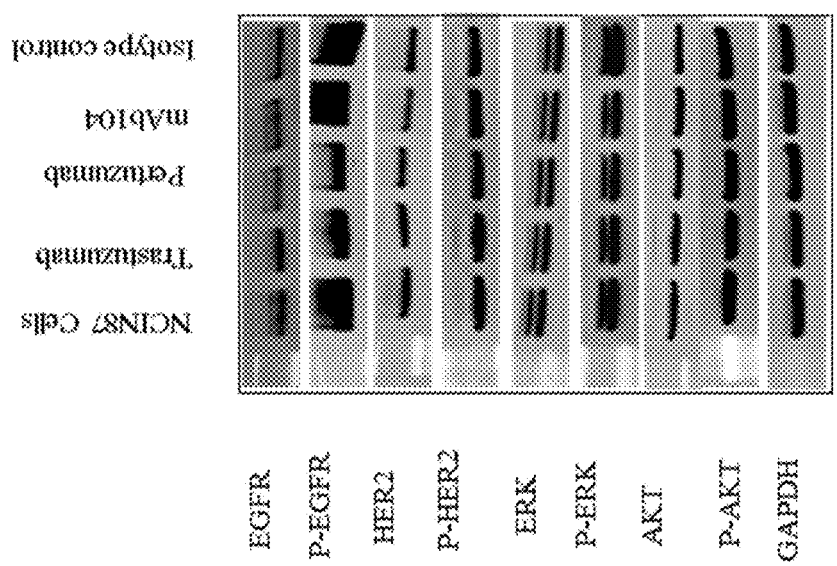
Figure 20D:
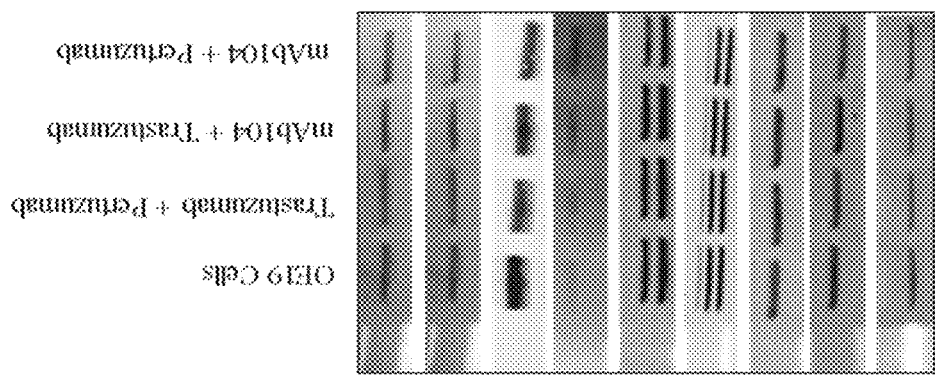
Figure 20C:
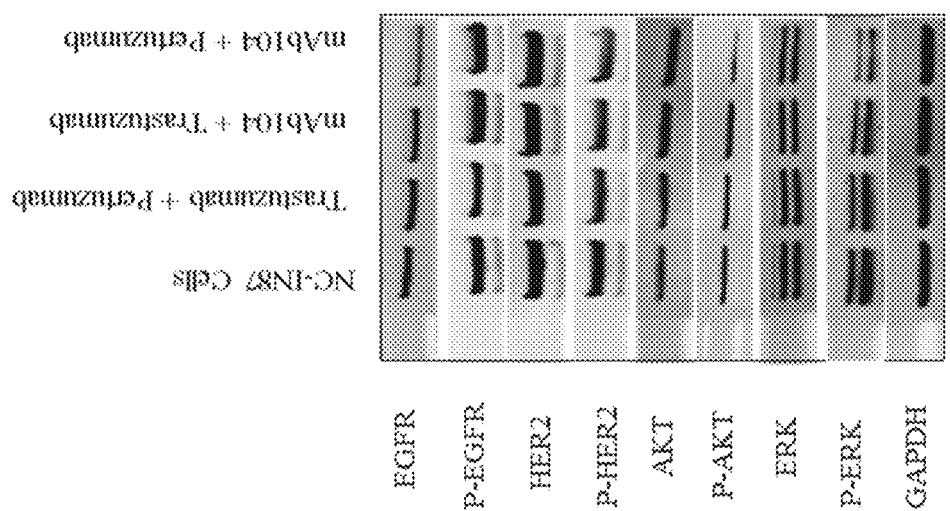

In ligand stimulated conditions (FIGS. 20A and B and 20C and D), mAb104 did not affect MAPK or Akt signalling pathways in cell lines evaluated. This lack of effect was also observed when mAb014 was used in combination with Trastuzumab and Pertuzumab (FIGS. 20C and D).

The changes described in signalling with combination treatments of Trastuzumab and Pertuzumab in this cell line are consistent with other studies (Yamashita-Kashima Y, et al. (2011) Clinical Cancer Research. 17(15):5060-70; Ko B-K, et al. (2015) Molecular oncology. 9(2):398-408; Tomioka H, et al. (2012) International journal of oncology. 41(2):551-8) and are similar to those observed with Trastuzumab and mAb104. These results suggest mAb104 in combination with Trastuzumab inhibits the activity of ErbB family proteins and suppresses downstream signalling. In contrast, no changes in total or activated protein ErbB family proteins or in the MAPK and Akt signalling cascade were seen in OE19 when treated with combination treatments of Trastuzumab with Pertuzumab or mAb104. In both gastric cancer cell lines combination treatment with Pertuzumab and mAb104 had no effect on the signalling cascade as well as on total or phosphorylated ErbB protein level.

Example 15 Effect of mAb104 on Apoptosis of Gastric Cancer Cells

Figure 21A:
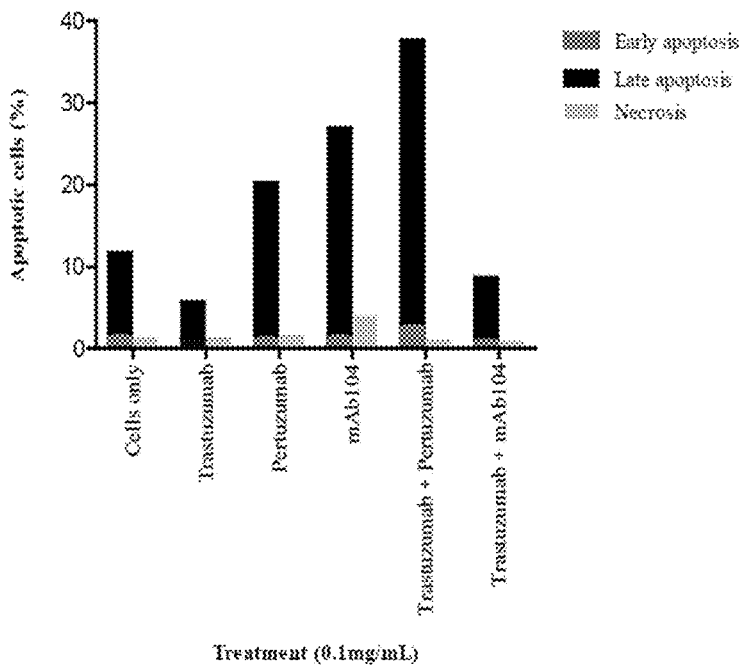
Figure 21B:
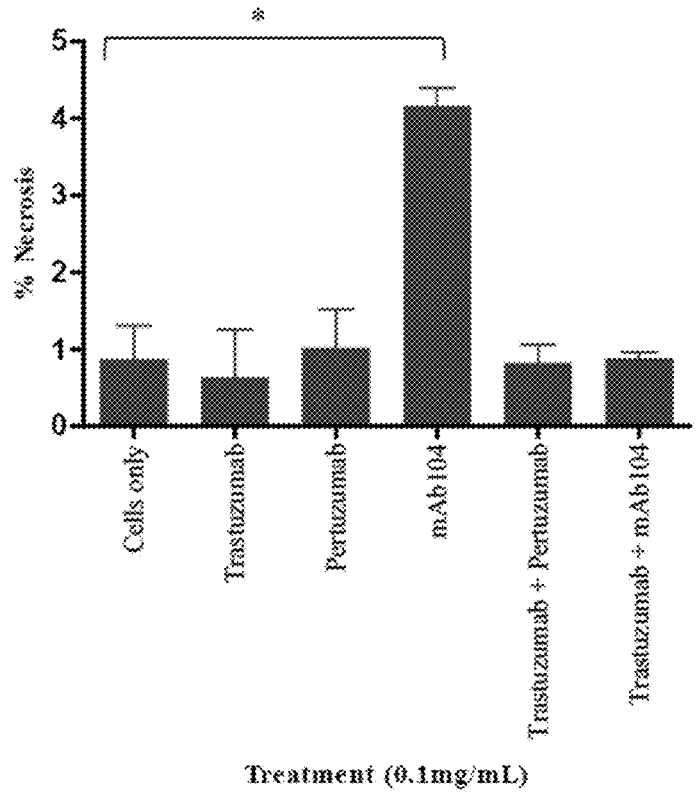
Figure 21C:
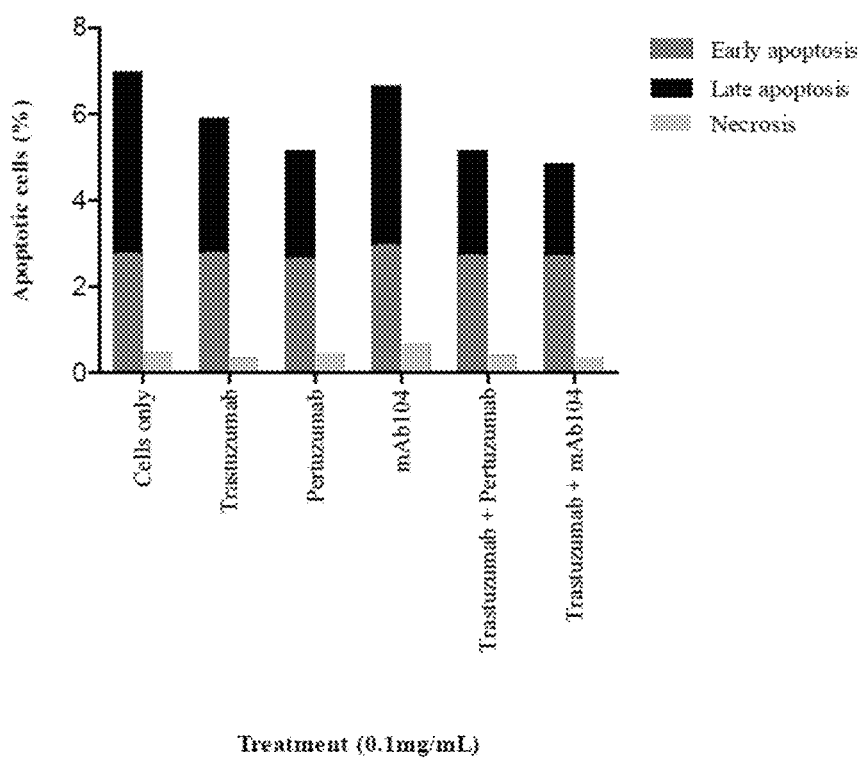

Flow cytometry was used to determine the apoptosis inducing activity of mAb104 in NCI-N87 (FIGS. 21A and B) and OE-19 cell lines (FIG. 21C) with early and late apoptotic cell fractions quantified by quadrant analysis (FIG. 21). Cells treated with Trastuzumab did not induce apoptosis compared to the control antibody; in comparison treatment with Pertuzumab resulted in more cells in the late phase of apoptosis. These findings are consistent with other published studies. mAb104 increased late apoptotic cell population compared to Trastuzumab or Pertuzumab single agent treatments. In OE-19, compared to the control antibody no antibody induced any apoptosis as monotherapy or in combination (FIG. 21C).

Treatment with Trastuzumab and Pertuzumab in combination resulted in significantly more apoptotic cells than Trastuzumab and mAb104 in combination. Following treatment with Trastuzumab and Pertuzumab 61.4% of cells were viable versus 90.5% after Trastuzumab with mAb104 (FIG. 21A). Trastuzumab and mAb104 combination did not induce apoptosis compared to the control antibody or to other monotherapy treatments.

A significant finding was the higher number of necrotic cells seen after treatment with mAb104 as compared to the control antibody and Trastuzumab and Pertuzumab (FIG. 21C). In both cell lines evaluated, there was a two-fold increase in necrotic cells after mAb014 treatment compared to other treatment groups. Interestingly, cells treated with mAb104 in combination with Trastuzumab did not result in an increase in the number of cells undergoing necrosis.

Example 16 Effect of mAb104 on Migration (Wound Healing) Assay

Figure 22:
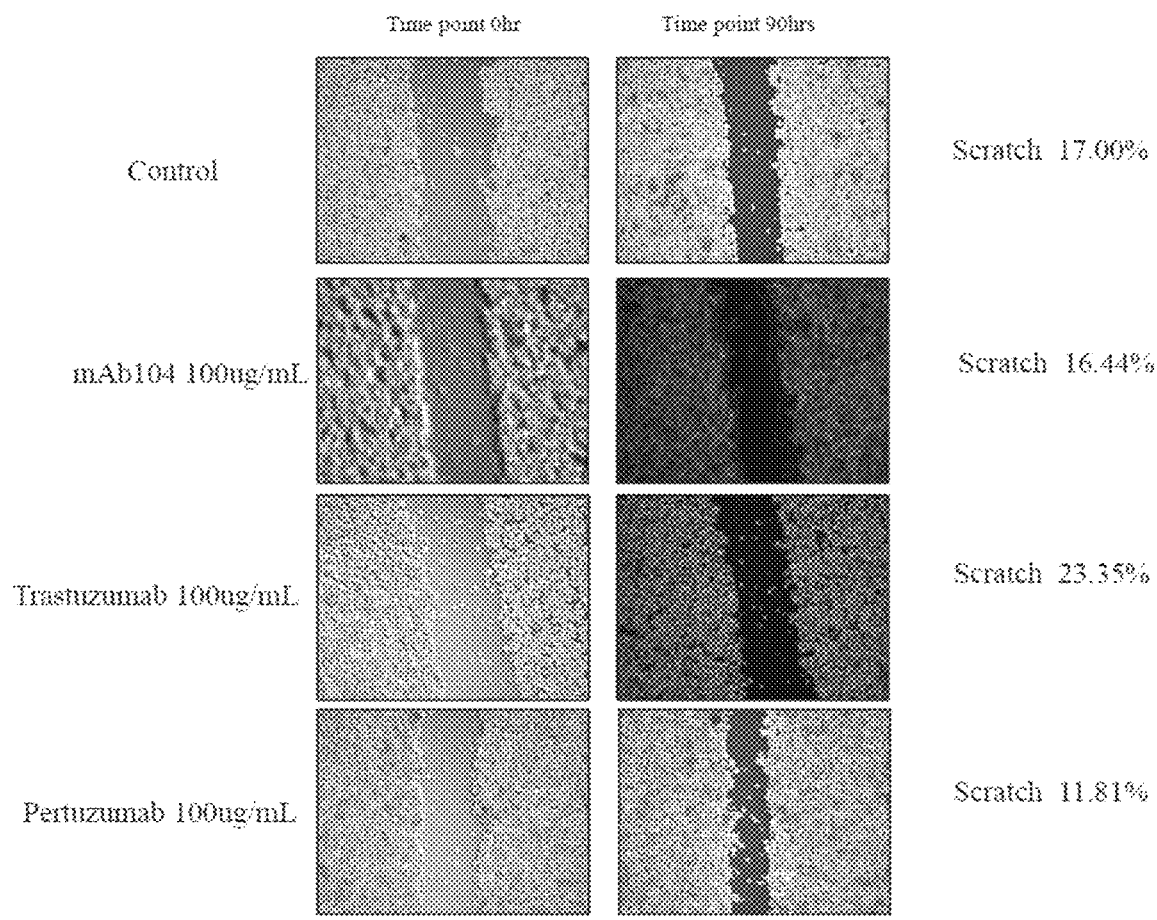
FIG. 22: Confluent OE-19 cells utilised for Migration assay. Images collected at 0 hr and 90 hrs of 0 or 100 µg/mL antibody incubation. Antibodies did not delay the migration of OE-19 cells compared to control antibodies at a dose of 100 µg/mL 90-hours post treatment.

Due to its morphology and growth patterns, the OE-19 cell line was used to evaluate the effect of mAb104 on migration. NCI-N87 cells typically attach initially in small islands then proliferate into dense patches, thus making it hard to correctly estimate confluency and therefore were not used. The addition of antibodies did not delay the migration of OE-19 cells compared to control antibodies at a dose of 100 µg/mL 72-hours post treatment (FIG. 22).

The breast cancer cell line, BT-474 typically form adherent patches that are compact multilayered colonies that rarely become confluent and therefore would not be appropriate for this assay.

Example 17 Efficacy of mAb104 Monotherapy in HER2-Overexpressive/Amplified Gastric Cancer Xenografts The inventors examined the anti-tumour activity of mAb104 in mice bearing xenograft of the HER2-overexpressing gastric cancer cell line, NCI-N87. Mice were treated with mAb104, Trastuzumab, Pertuzumab and control IgG thrice weekly injections for three weeks. In all experiments treatment was commenced when the mean tumour volumes were 100-120 mm$^3$. Preliminary experiments involving NCI-N87 xenograft models utilised different treatment dosages to confirm mAb104 efficacy in tumour models.

Figure 23:
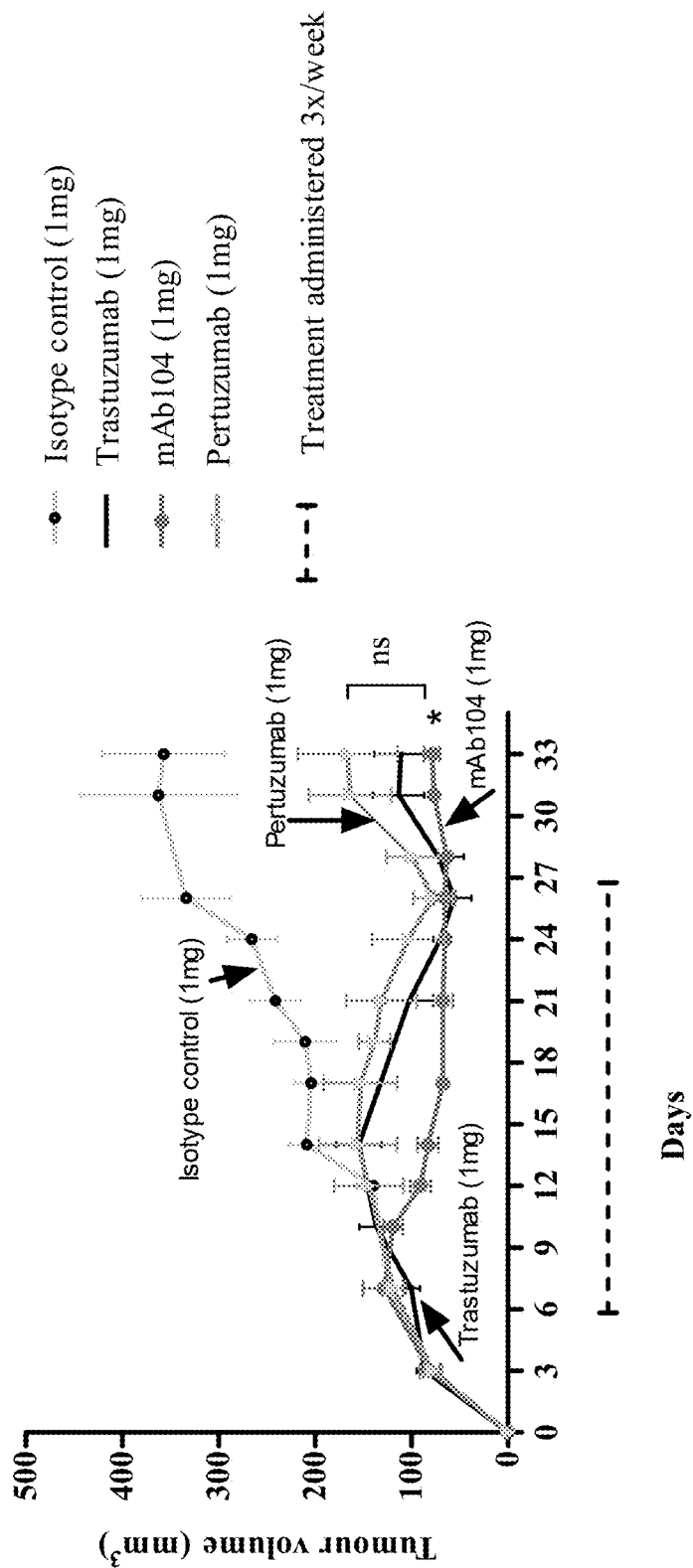
FIG. 23: Anti-tumour effects of mAb104 in NCI-N87 xenografts. Mice (n=5) were treated with 1 mg mAb104, Trastuzumab, Pertuzumab, isotype control or no treatment. Tumour volume at start of therapy was 100-120 mm$^3$. Data shown in growth curve represents mean tumour volume±S.E. *p≤0.01, control versus mAb104.

An initial dose of 1 mg/treatment was utilised and results are shown in FIG. 23. At the end of treatment (day 28), all tumours in the treatment arms were significantly smaller than the control group (ANOVA p<0.0001). Post-hoc testing was undertaken with the Bonferroni method. Tumours in all treatment groups were significantly smaller, p<0.0001); the average tumour volumes were 333.9 mm$^3$ (control), 56.1 mm$^3$ (Trastuzumab), 77.9 mm$^3$ (Pertuzumab) and 66.1 mm$^3$ (mAb 04), No statistical difference in growth inhibition was seen between the various treatment groups (p>0.05).

Figure 24A:
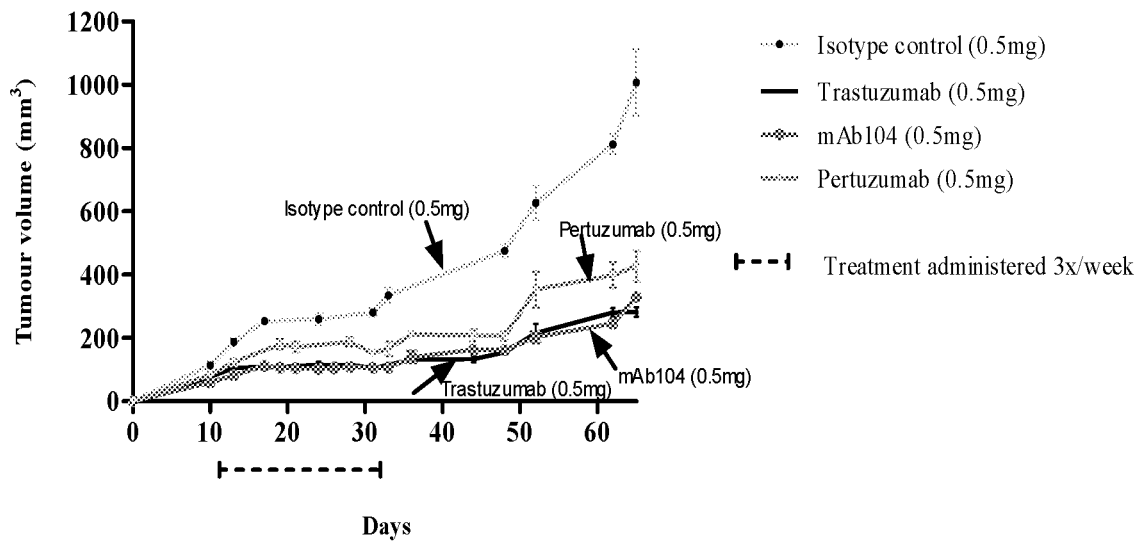
FIG. 24: Anti-tumour effects of mAb104 in NCI-N87 xenografts. Mice (n=5) were treated with 0.5 mg mAb104, Trastuzumab, Pertuzumab, isotype control or no treatment. Tumour volume at start of therapy was 100-120 mm$^3$. Growth curve (A) and survival curve (B) are shown. Data shown in growth curve represents mean tumour volume±S.E. The endpoint for survival analysis was tumour volume >1000 mm$^3$ or moribund status. *p<0.001, control versus mAb104; **p<0.0001 control versus treatment arms.
Figure 24B:
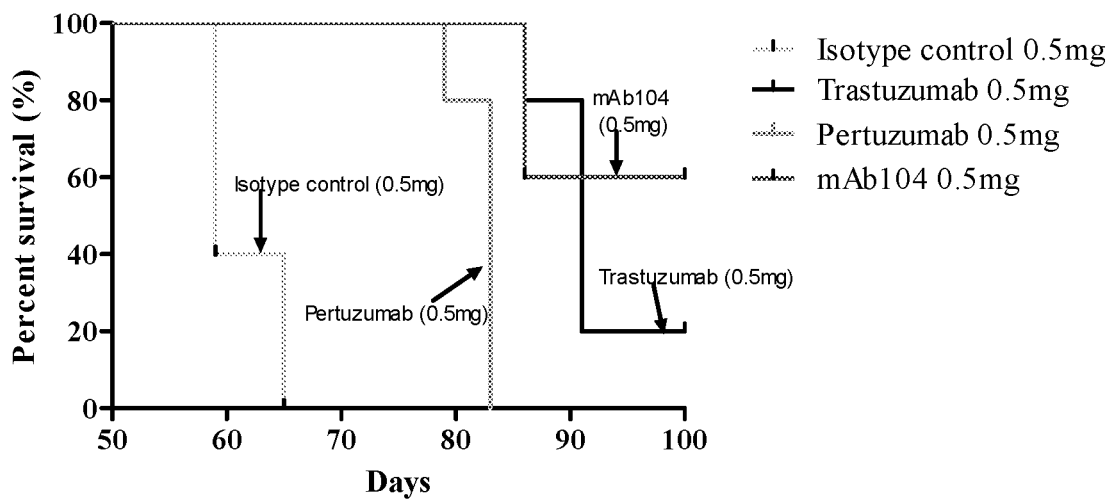

Based on the efficacy seen with the 1 mg dose, experiments were repeated using a lower dose of 0.5 mg/treatment. Tumour growth curves are shown in FIG. 24. At the end of treatment (Day 32) all tumours in the treatment arms were significantly smaller than the control group (ANOVA p<0.0001). Post hoc testing by the Bonferroni method showed all treatment groups were significantly smaller, (p<0.0001) than the control group. The average tumour volumes were 280.8 mm$^3$ (control), 104.0 mm$^3$ (Trastuzumab), 152.2 mm$^3$ (Pertuzumab) and 105.7 mm$^3$ (mAb104) respectively. No statistical difference in growth inhibition was seen between the treatment groups. The halt in tumour growth was evident from onset of treatment in all antibody arms until Day 50, 22 days post treatment cessation.

Mice treated with anti-HER2 antibodies had significantly longer survival compared to the control group (ANOVA p<0.0002 with post hoc testing showing all treated groups survived significantly longer compared to control mice, p<0.0001). At day 100 end of study mAb104 demonstrated a marked survival advantage with 60% animals surviving compared to 20% in Trastuzumab and none in other arms. The median survival of the groups was 59 days (control), 91 days (Trastuzumab), 83 days (Pertuzumab) and was not reached in mice treated with mAb104 at the time the experiment was terminated (Day 100). This observation may be due to the murine mAb104 having an anticipated longer half-life in the mice circulation compared to the humanised constructs.

Figure 25A:
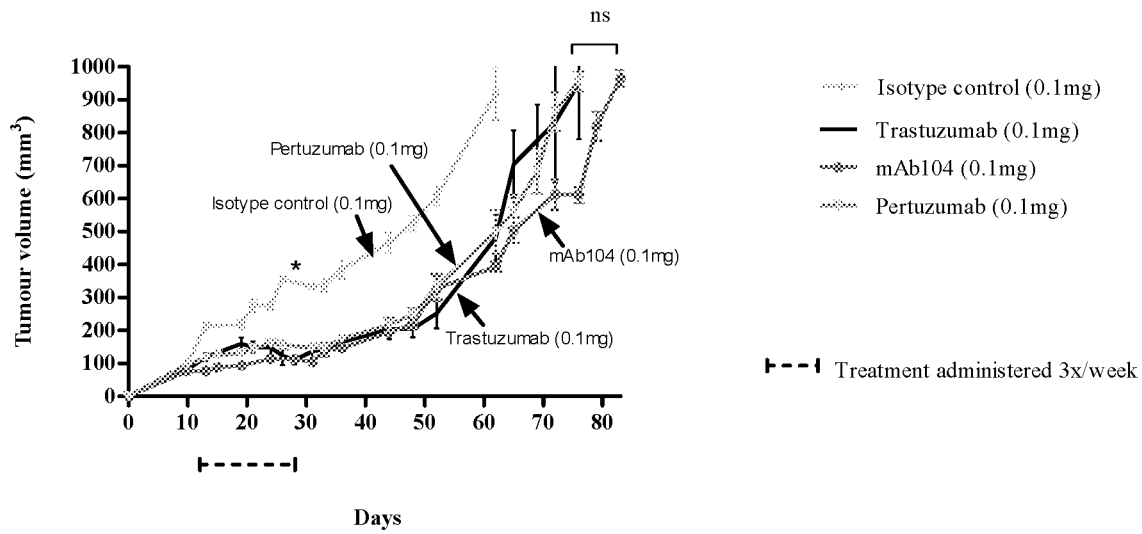
FIG. 25: Anti-tumour effects of mAb104 in NCI-N87 xenografts. Mice (n=5) were treated with 0.1 mg mAb104, Trastuzumab, Pertuzumab, isotype control or no treatment. Tumour volume at start of therapy was 100-120 mm$^3$. Growth curve (A) and survival curve (B) are shown. Data shown in growth curve represents mean tumour volume±S.E. The endpoint for survival analysis was tumour volume>1000 mm$^3$ or moribund status. *p<0.001, control versus mAb104; **p<0.0002 control versus treatment arms.

Similar potent in vivo efficacy was seen when experiments were repeated in established NCI-N87 gastric cancer xenografts using a dose of 0.1 mg/treatment (FIG. 25). At the end of treatment (Day 28) all tumours in the treatment arms were significantly smaller than the control group (ANOVA p<0.0001. The average tumour volumes were 340.4 mm$^3$ (control), 136.3 mm$^3$ (Trastuzumab), 147.5 mm$^3$ (Pertuzumab) and 104.4 mm$^3$ (mAb104) respectively. No statistical difference in growth inhibition was seen between the treatment groups (FIG. 25A).

Figure 25B:
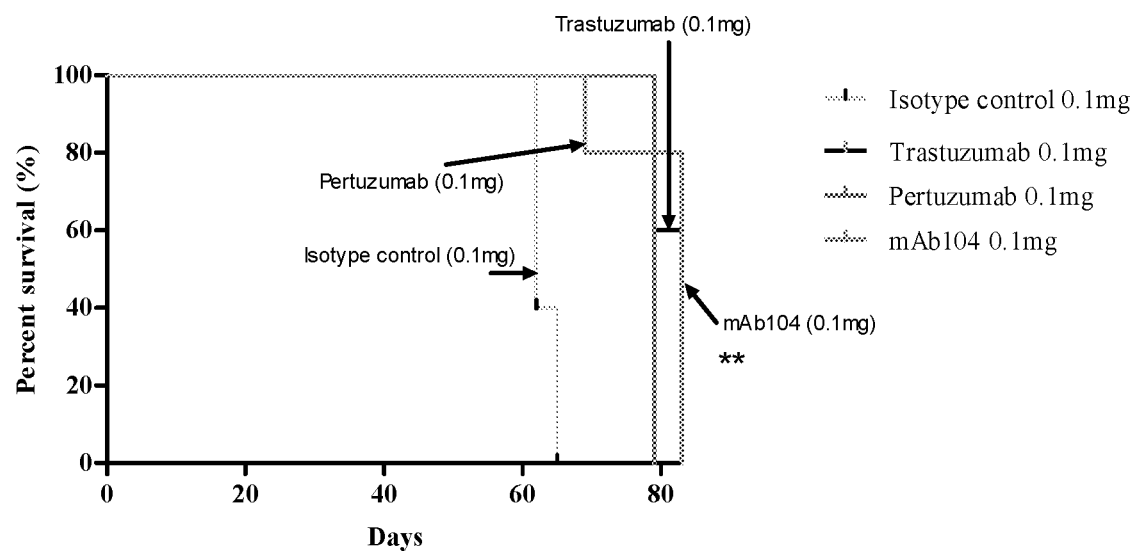

Mice treated with 0.1 mg/dose anti-HER2 antibodies had significantly longer survival compared to the control group by log-rank analysis (p<0.0001 with post hoc testing showing all treated groups survived significantly longer compared to control mice, p<0.0002) (FIG. 25B). The median survival of the groups was 62 days (control), 83 days (Trastuzumab), 79 days (Pertuzumab) and 83 days for mice treated with mAb104.

Example 18 Efficacy of mAb104 Monotherapy in HER2-Overexpressive/Amplified Qastro-Oesophageal Cancer Xenografts The inventors examined the in vivo anti-tumour activity of mAb104 in mice bearing OE-19 xenografts. Mice received a dose of 1 mg/antibody treatment of mAb104, Trastuzumab, Pertuzumab and control IgG thrice weekly for three weeks. Treatment was commenced when the mean tumour volumes were 100-120 mm$^3$. In this rapidly growing tumour model, mice treated with the isotype control antibody were culled before completion of the treatment schedule (Day 19; doses of antibody received—5) as tumour volumes exceeded the ethically approved 1000 mm$^3$.

Figure 26:
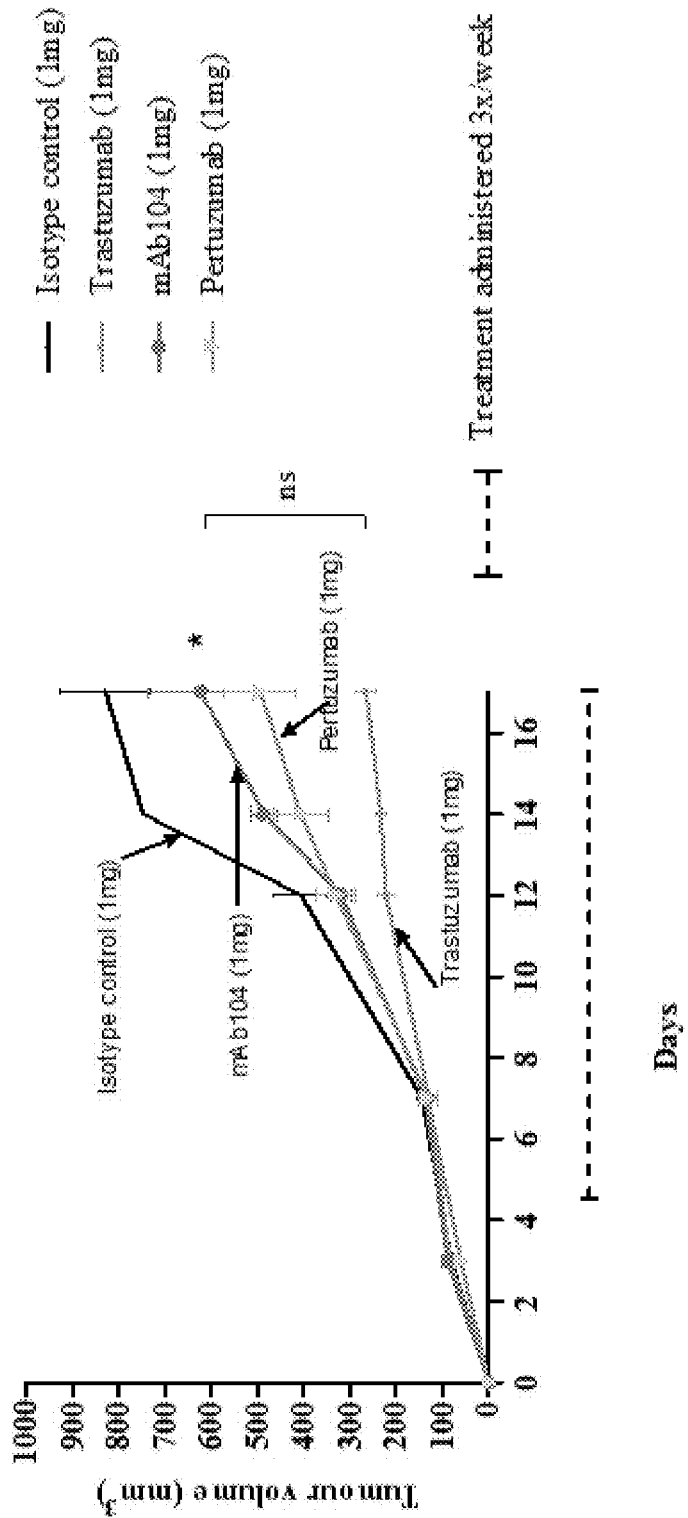
FIG. 26: Anti-tumour effects of mAb104 in OE-19 xenografts. Mice (n=5) were treated with 1 mg mAb104, Trastuzumab, Pertuzumab, isotype control or no treatment. Tumour volume at start of therapy was 100-120 mm$^3$. Data shown in growth curve represents mean tumour volume±S.E. *p<0.0001, control versus mAb104.

Results are shown in FIG. 26. At Day 19, all tumours in the treatment arms were significantly smaller than the control group (ANOVA p<0.0001). Post-hoc testing was undertaken with the Bonferroni method. Tumours in the individual treatment groups were significantly smaller than the control group (p<0.0001). At the end of the study there was no statistical difference in tumour growth inhibition between Trastuzumab, Pertuzumab or mAb104 (p=0.16).

Figure 27A:
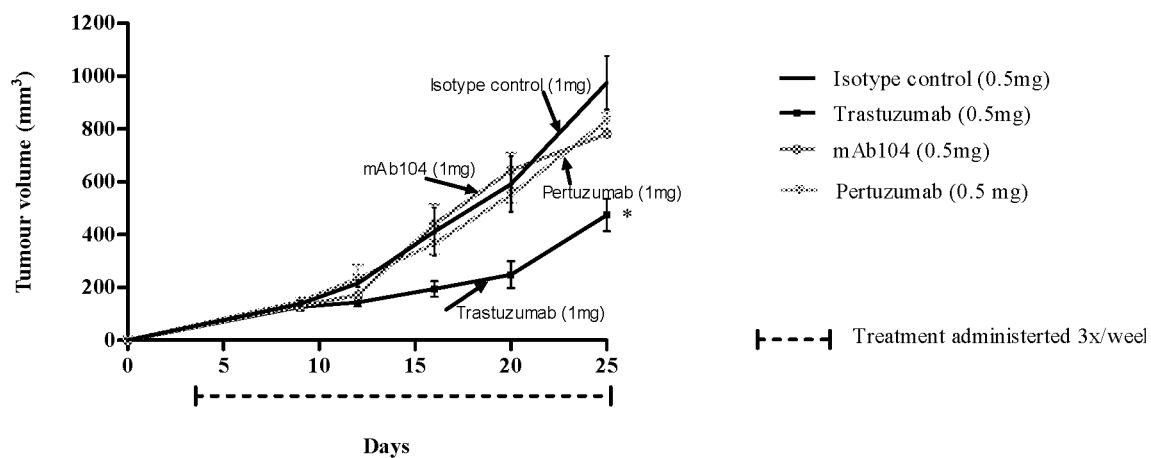
FIG. 27: Anti-tumour effects of mAb104 in OE-19 xenografts. Mice (n=5) were treated with 0.5 mg mAb104, Trastuzumab, Pertuzumab, isotype control. Tumour volume at start of therapy was 100-120 mm$^3$. Growth curve (A) and survival curve (B) are shown. Data shown in growth curve represents mean tumour volume±S.E. The endpoint for survival analysis was tumour volume>1000 mm$^3$ or moribund status. *p<0.001, control versus trastuzumab. **p<0.006, control versus treatment arms.

The inventors repeated this experiment using a lower dose of 0.5 mg/treatment, and tumour growth curves are shown in FIG. 27. Treatment was commenced when the mean tumour volumes were 100-120 mm$^3$. At the end of study (Day 25), the average tumour volumes in the treatment arms were 974.8 mm$^3$ (control), 782.0 mm$^3$ (mAb104), 474.5 mm$^3$ (Trastuzumab), 832.0 mm$^3$ (Pertuzumab). Tumours treated in the Trastuzumab arm were significantly smaller than the control group (p<0.001). Despite tumours in the mAb104 and Pertuzumab arms being numerically smaller, this difference in growth inhibition did not reach statistical difference on post hoc the Bonferroni method. No statistical difference in growth inhibition was seen between Pertuzumab and mAb104 (p=0.39, two tailed for both comparisons). Trastuzumab was more efficacious than both Pertuzumab (p=0.024; two-sided) and mAb104 (p=0.004; two-sided) (FIG. 27A).

Figure 27B:
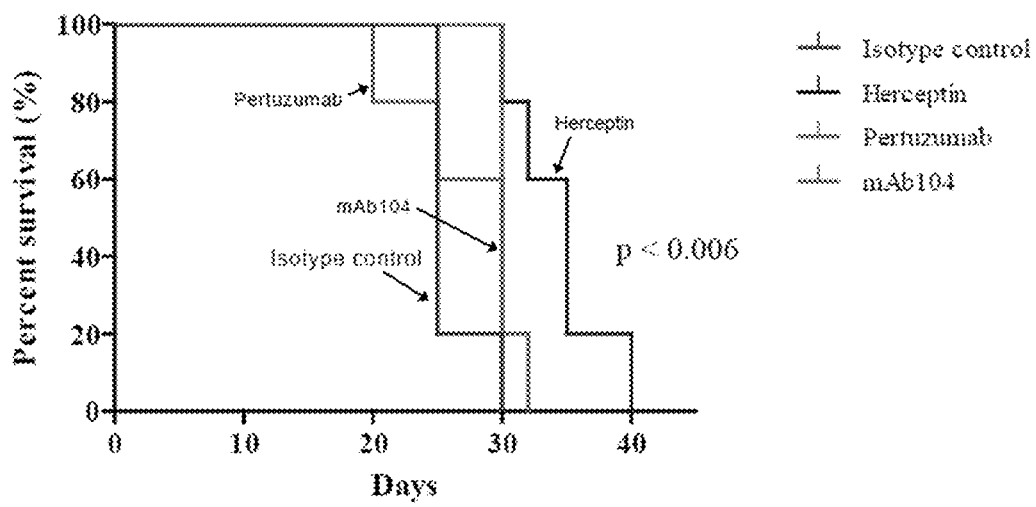

Mice treated with anti-HER2 antibodies had significantly longer survival compared to the control group by log-rank analysis (p<0.0005 with post hoc testing showing all treated groups survived significantly longer compared to control mice, p<0.006). The median survival of the groups was 25 days (control), 30 days (Pertuzumab), 30 days (mAb104) and 35 days (Trastuzumab) (FIG. 27B).

Example 19 Efficacy of mAb04 in Combination with Trastuzumab in NCI-N87 Gastric Cancer Xenografts The inventors assessed the efficacy of mAb104 in combination with Trastuzumab in NCI-N87 xenograft models. Mice were treated with a total dose 0.5 mg of concurrent mAb104 and Trastuzumab, Trastuzumab and Pertuzumab or control IgG only. Each mouse received a 0.25 mg of Trastuzumab and 0.25 mg mAb104 or Pertuzumab to achieve a total dose of 0.5 mg/treatment. Treatments were commenced Day 9 when the mean tumour volumes were 100-120 mm$^3$ and tumour growth curves are presented in FIG. 28.

Figure 28:
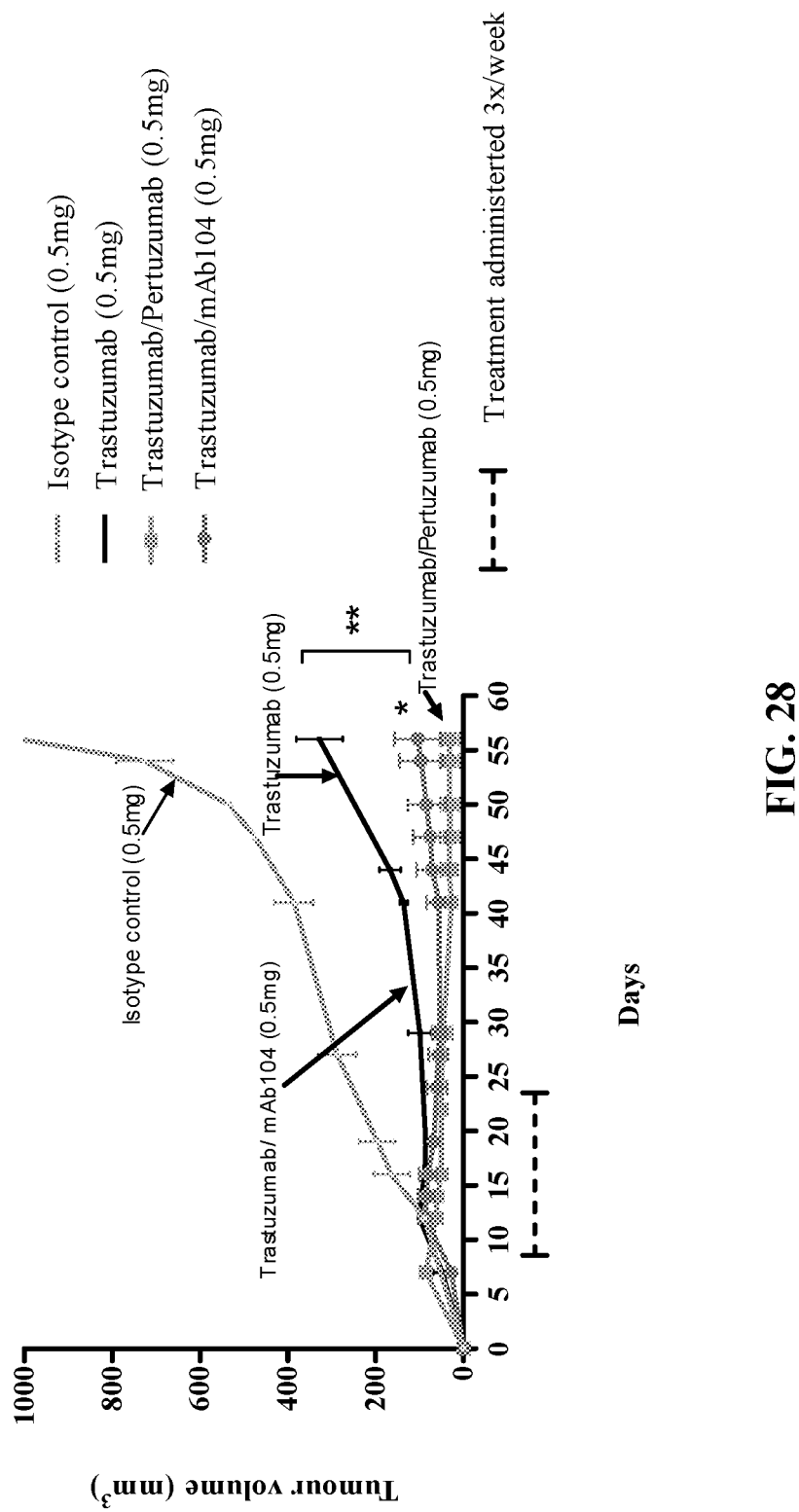
FIG. 28: Anti-tumour effects of mAb104 in combination with Trastuzumab in NCI-N87 xenografts. Mice (n=5) were treated with a total dose of 0.5 mg mAb104+Trastuzumab, Trastuzumab+Pertuzumab or isotype control. Tumour volume at start of therapy was 100-120 mm3. Data shown in growth curve represents mean tumour volume±S.E. *p<0.0001, control group versus mAb104; **p<0.001, trastuzumab versus trastuzumab/mAb104.

With commencement of treatment immediate anti-tumour efficacy was observed in all antibody treatments and tumour growth abrogation continued following treatment cessation on Day 24, with more prolonged anti-tumour effect observed in the combined treatment arms. At Day 57, mice in the control group were culled when the mean volume in the control arm had reached the ethically approved 1000 mm$^3$. At this time point, tumours in the combination treatment arms remained significantly smaller than the control (ANOVA p<0.0001) (FIG. 28).

The average tumour volumes in the combination groups measured 104.9 mm$^3$ (mAb104 plus Trastuzumab group) and 31.9 mm$^3$ (Trastuzumab plus Pertuzumab group). Post hoc testing using the Bonferroni method showed both treatment arms were significantly smaller compared to control (p<0.05). No statistical difference was seen between the two combination arms (p=0.27). No complete regressions of tumours were seen in any treatment group.

At the end of the study, both Trastuzumab/Pertuzumab and Trastuzumab/mAb104 combinations resulted in significantly smaller tumour volumes compared to single agent treatment group (p=0.005) by ANOVA with post-hoc testing showing p<0.05 for mAb104 and Trastuzumab compared to single agent Trastuzumab.

The median survival for mice treated with combination of anti-HER2 antibodies was not reached at the time the experiment was terminated.

Example 20 Efficacy of mAb104 in Combination with Trastuzumab in OE19 Gastroesophageal Cancer Xenografts The efficacy of mAb104 in combination with Trastuzumab was evaluated in OE19 xenograft tumour models. As with the previous experiment, mice were treated with a total dose 0.5 mg of concurrent mAb104 and Trastuzumab, or Trastuzumab and Pertuzumab, 0.5 mg Trastuzumab alone or control IgG only with treatment commencing once mean tumour volumes were 100-120 mm$^3$. The tumour growth curve results are shown in FIG. 29.

Figure 29A:
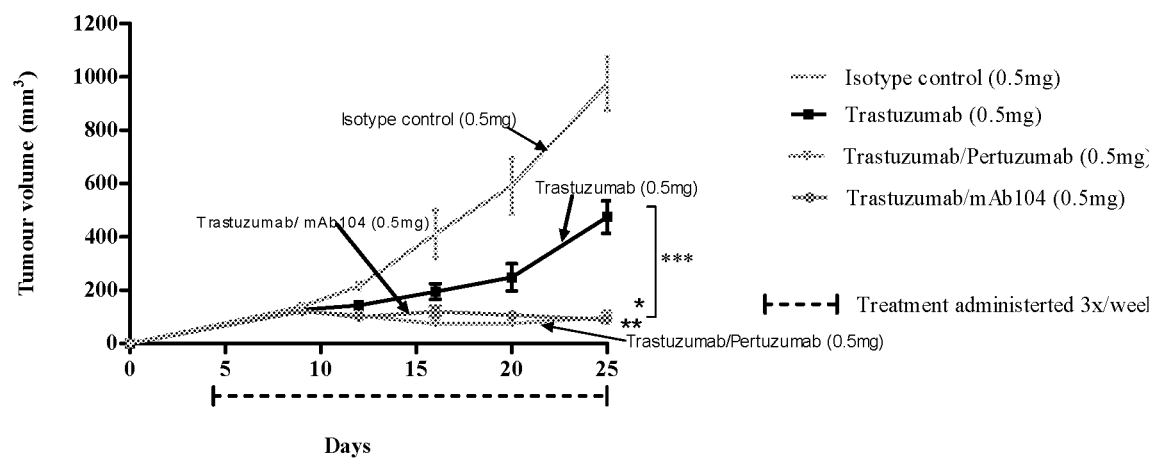
FIG. 29: Anti-tumour effects of mAb104 in combination with Trastuzumab in OE-19 xenografts. Mice (n=5) were treated with a total dose of 0.5 mg mAb104+Trastuzumab, Trastuzumab+Pertuzumab or isotype control. Tumour volume at start of therapy was 100-120 mm$^3$. Growth curve (A) and survival curve (B) are shown. Data shown in growth curve represents mean tumour volume±S.E. The endpoint for survival analysis was tumour volume>1000 mm$^3$ or moribund status. *p<0.0001 control group versus trastuzumab/mAb104; p<0.0001 control versus the trastuzumab/pertuzumab; *p<0.0001 trastuzumab versus trastuzumab/mAb104; ±p<0.0005, control versus treatment arms.

The study was terminated on Day 25 when the mean volume in the control arm reached the ethically approved 1000 mm$^3$. At this time point, the average tumour volumes in the treatment arms were 974.8 mm$^3$ (control), 88.8 mm$^3$ (mAb104 plus Trastuzumab) and 99.8 mm$^3$ (Trastuzumab plus Pertuzumab) (FIG. 29A). Post hoc testing using the Bonferroni method showed both treatment arms were significantly smaller compared to control (p<0.0001). No complete regression of tumours was seen in any treatment group.

Compared to single agent treatment groups, concurrent treatment with mAb104 and Trastuzumab resulted in significantly greater tumour volume shrinkage (p<0.0001 by ANOVA with post-hoc testing showing p<0.0001 for combination groups compared to single agent treatment groups).

Figure 29B:
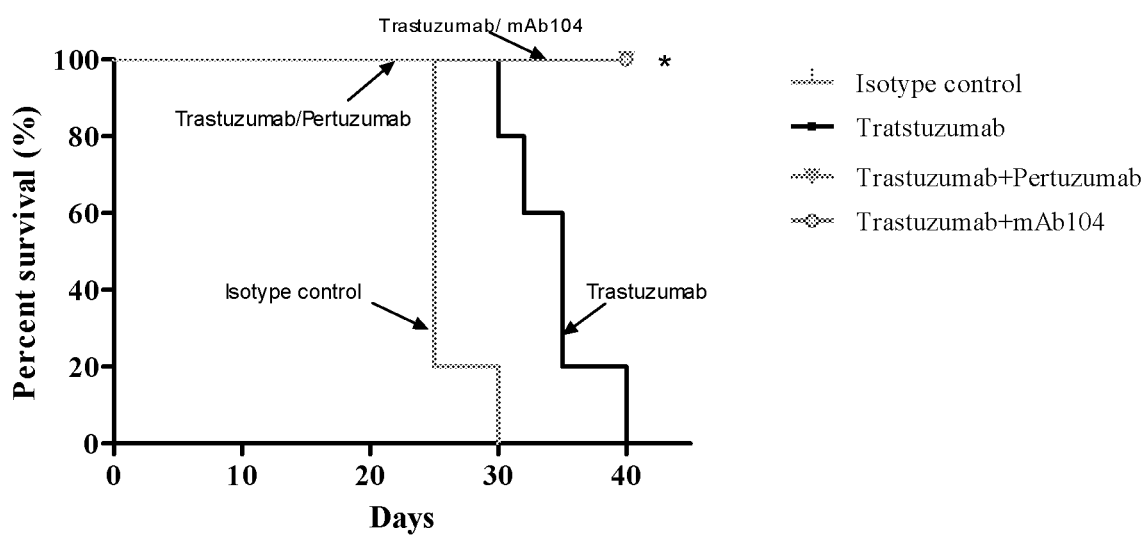

Survival analysis showed mice in both the combination groups had significantly longer survival compared to the control group (p<0.0005) as well as to the mice in the single treatment groups (p<0.005) (FIG. 29B). The median survival of the control group was 25 days, while the median survival was not reached for the mice in the combination treatment groups. No statistical difference was seen on log rank analysis between the two combination arms (p=0.11, two-sided).

Example 21 Immunohistochemical Analysis of Established Tumours

Figure 30C:
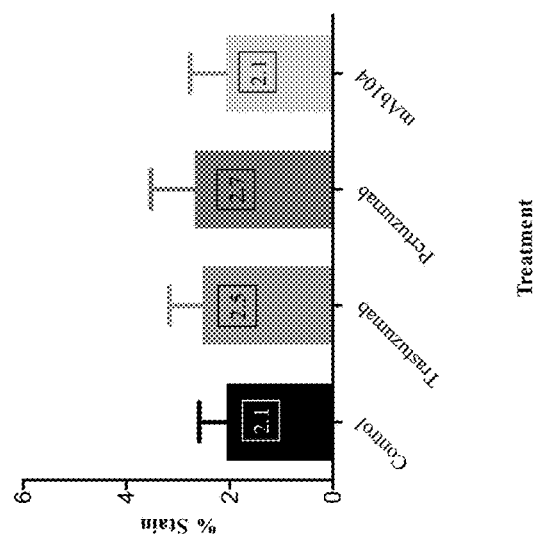
Figure 30B:
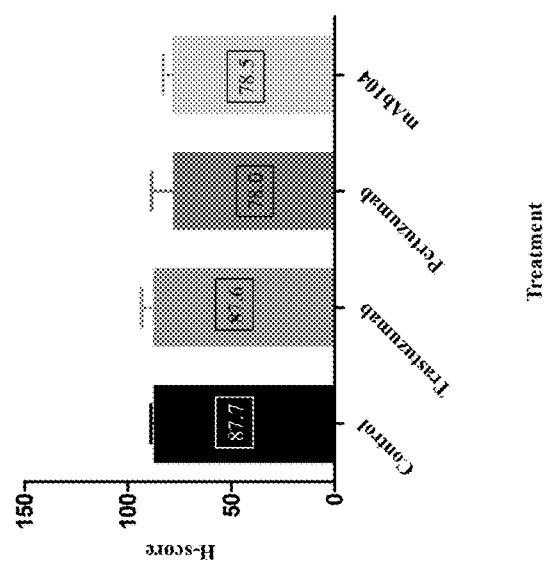
Figure 30A:
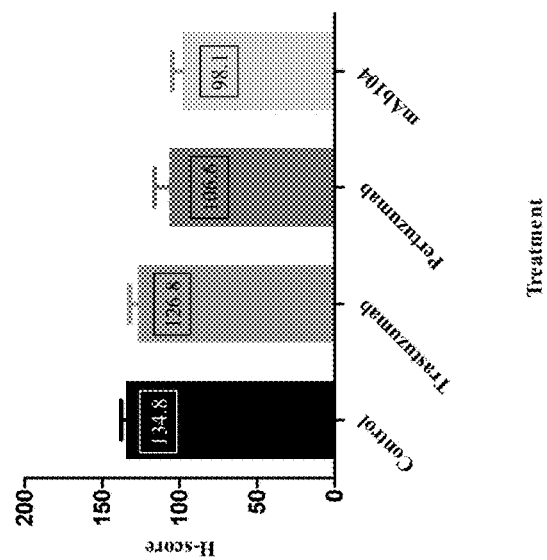
Figure 30F:
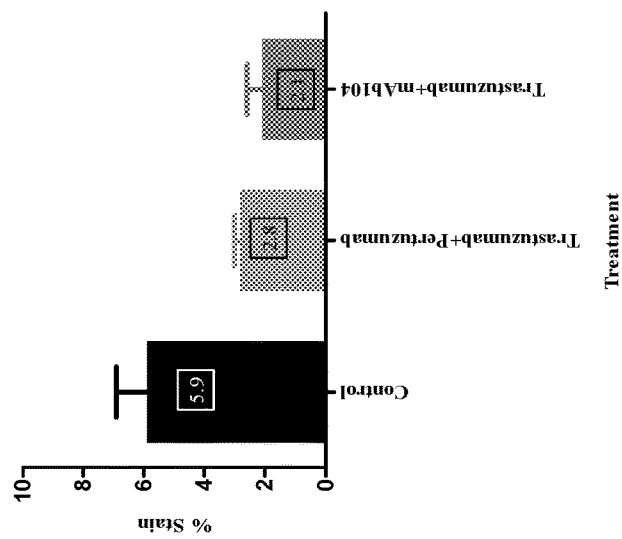
Figure 30E:
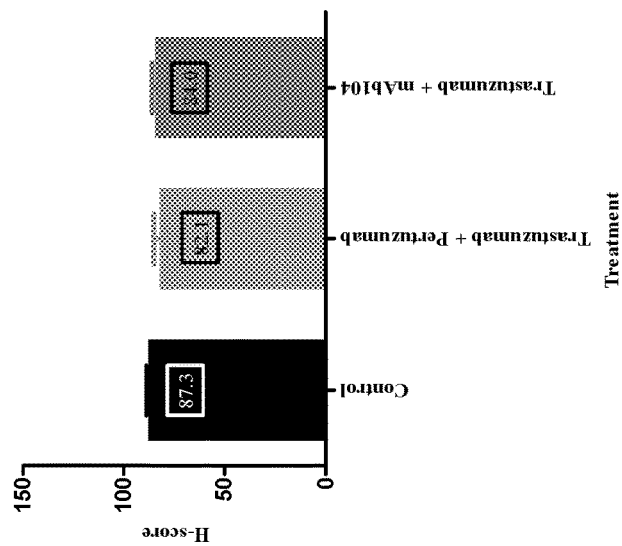
Figure 30D:
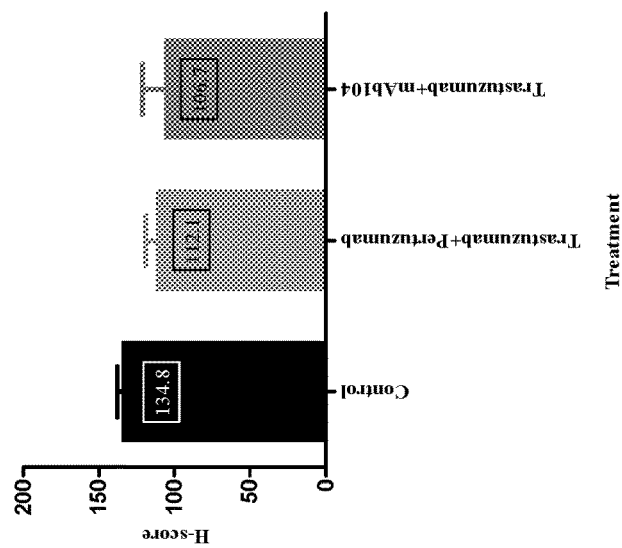
Figure 31C:
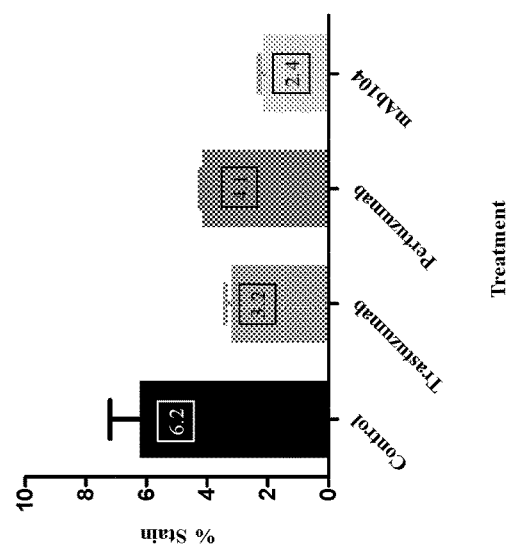
Figure 31B:
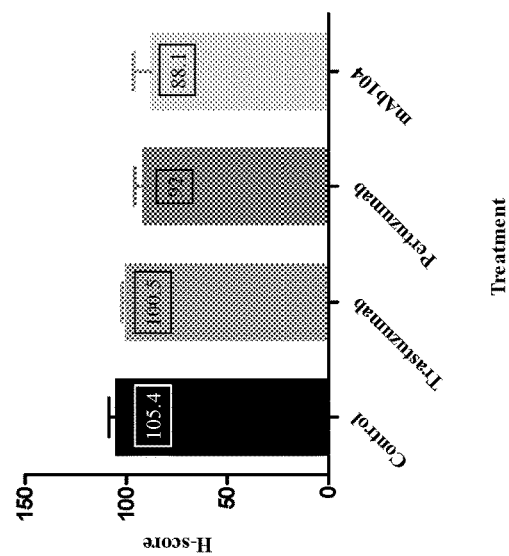
Figure 31A:
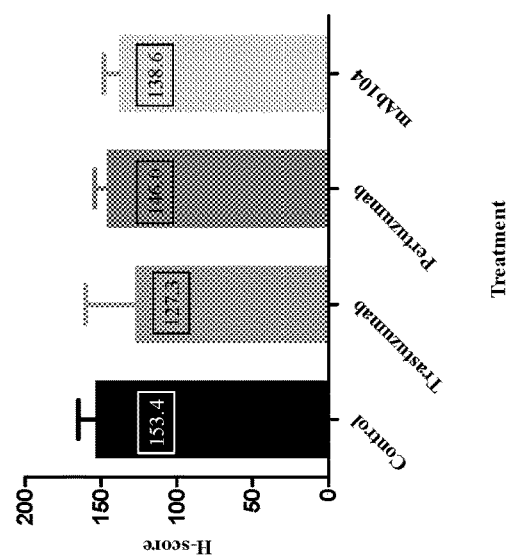
Figure 31D:
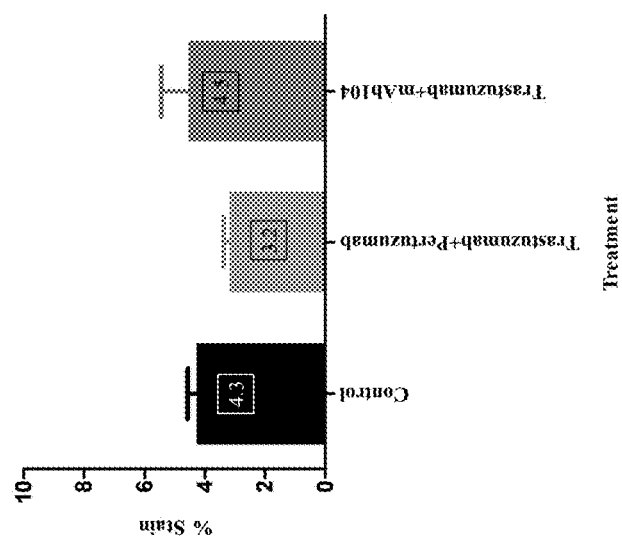
Figure 31E:
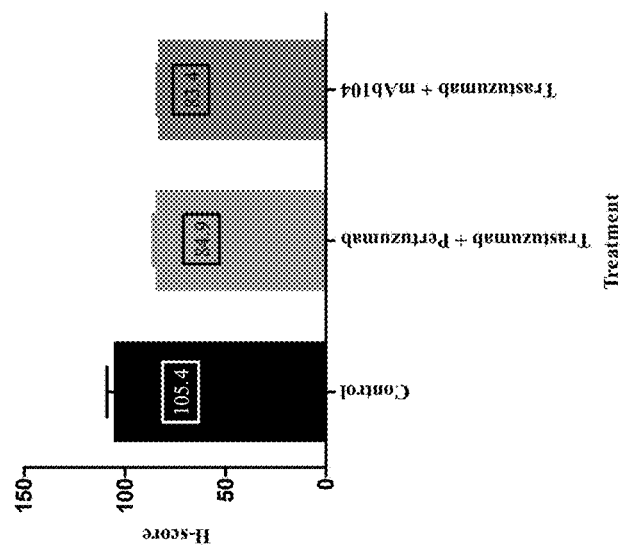
Figure 31F:
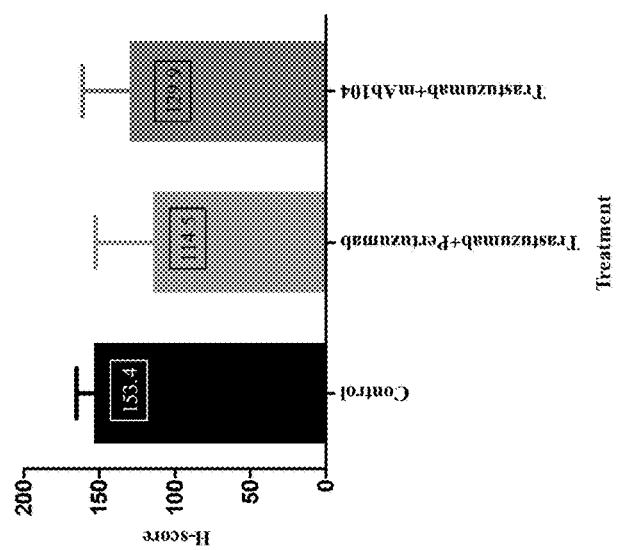

A subset of (n=2) mice from each of the gastric and oesophageal cancer monotherapy and combination therapy treatment groups were sacrificed one day after the last treatment and xenograft tissue were obtained and prepared for IHC analysis of tumour proliferation, downstream signalling and angiogenesis. Results following anti-HER2 monotherapy of NCI-N87 xenografts are presented in FIG. 30A to C, combination therapy FIG. 30D to F. Results following anti-HER2 monotherapy of OE-19 oesophageal cancer xenografts are presented in FIG. 31A to C, combination therapy FIG. 31D to F.

Proliferation: The effect of mAb104 on tumour proliferation was examined by Ki-67 staining and results are presented in FIG. 30, panel A. In NCI-N87 tumours treated with anti-HER2 antibodies as single agents all antibodies significantly reduced proliferation compared to control group (p=0.02 by ANOVA). The mean H-scores were 134.8 (control), 126.8 (Trastuzumab), 106.6 (Pertuzumab), and 98.1 (mAb104). As shown in FIG. 30, panel D, the combination of Trastuzumab and Pertuzumab or mAb104 did not significantly reduce proliferation compared to control (p=0.193) with no difference in the anti-proliferative effect seen between the two combinations (p=0.726) as presented in FIG. 30D to F.

Analysis of the rapidly growing OE-19 tumours (FIG. 31A) demonstrated no significant reduction in proliferation compared to control antibody for any anti-HER2 monotherapy (p=0.79 by ANOVA). The mean H-scores were 153.4 (control), 127.5 (Trastuzumab), 146.0 (Pertuzumab), and 138.6 (mAb104). Similarly, the combination of Trastuzumab with Pertuzumab (p=0.4320, two-sided) or mAb104 (p=0.554, two-sided) did not significantly reduce proliferation compared to control antibody as presented in FIG. 31A to C.

Downstream signalling: To determine if the anti-tumour effect observed in vivo was mediated through down-regulation of the Akt pathway, pAkt were assessed by phospho-protein assay (FIG. 30 B NCI N87; FIG. 31 B OE19). In NCI-N87, no significant difference in the H-score of phospho-Akt was seen between the treatment arms and the control group (p=0.532 by ANOVA). The mean H-scores were 87.7 (control), 87.6 (Trastuzumab), 78 (Pertuzumab) and 78.5 (mAb104). Similar findings were seen in the OE19 xenografts; mAb104 did not significantly affect the Akt pathway compared to the control (p=0.192).

Vasculature: The inventors examined the effect of mAb104 on micro-vessel density in tumour tissue by staining for podocalyxin. Results are presented in FIG. 30C for NCI N87; FIG. 31 F for OE-19 xenografts. Microvessel density (%) was calculated from the ratio of the positive staining area to the total observation area in the viable region. In NCI-N87 and OE-19 xenograft tumours, mAb104 and positive control Trastuzumab did not have any significant effect on tumour vasculature when compared to the isotype control antibody (p=1.00 NCI-N87 and p=0.054 OE-19).

Example 22 Specificity of mAb104 Binding in Tumour and Normal Tissue Determined by Immunohistochemistry Staining patterns of mAb104 were qualitatively evaluated in a range of normal human and tumour tissue and compared to HER2 staining patterns using the rabbit anti-HER2 monoclonal antibody, Ventana 4B5 (Tucson, Ariz.) utilized for clinical testing of HER2. Staining patterns were evaluated and scored using the American Society of Clinical Oncology and the College of American Pathologists (ASCO/CAP) recommendations for HER2 testing in breast cancer (Wolff A C, Hammond M E H, Hicks D G, Dowsett M, McShane L M, Allison K H, et al. Recommendations for human epidermal growth factor receptor 2 testing in breast cancer: American Society of Clinical Oncology/College of American Pathologists clinical practice guideline update. Journal of Clinical Oncology. 2013; 31(31):3997-4013) as follows: 3+, >10% of invasive tumour cells with uniform intense membrane staining; 2+, >10% of invasive tumour cells with incomplete or weak membrane staining or ≤10% of invasive tumour cells with intense membrane staining; 1+, >10% of invasive tumour with faint incomplete membrane staining; 0 if no staining or ≤10% of invasive tumour cells with faint staining. HER2 staining was reported as positive if IHC 3+, equivocal if 2+ and negative for 1+ and 0. Staining patterns for gastric/GOJ tissue were scored using the scoring scheme proposed by Hofmann et al. (Hofmann M, Stoss O, Shi D, Buttner R, Van De Vijver M, Kim W, et al. Assessment of a HER2 scoring system for gastric cancer: results from a validation study. Histopathology. 2008; 52(7):797-805) described in the ToGA trial (Bang Y-J, et al. (2010) Trastuzumab in combination with chemotherapy versus chemotherapy alone for treatment of HER2-positive advanced gastric or gastro-oesophageal junction cancer (ToGA): a phase 3, open-label, randomised controlled trial. The Lancet. 2010; 376(9742):687-97) and Ruschoff et al. (Ruschoff J, Dietel M, Baretton G, Arbogast S, Walch A, Monges G, et al. HER2 diagnostics in gastric cancer-guideline validation and development of standardized immunohistochemical testing. Virchows Archiv. 2010; 457(3):299-307): 0, no staining or membranous reactivity in <10% of tumour cells; 1+ weak membranous reactivity in ≥10% of tumour cells; 2+ moderate/weak complete or basolateral membranous staining in ≥10% of the cells and 3+ strong complete or basolateral membranous staining in ≥10% of the neoplastic cells. Scores of 0 and 1+ were considered negative, and scores≥2+ were reported as positive. Similar to breast cancer, only membranous staining, but not cytoplasmic staining, was considered for HER2 scoring (data not shown).

Normal Tissue

There is very limited reporting of HER2 expression in normal tissues. Furthermore, HER2 expression is found only in a restricted number of cell types, with inter and intra-heterogeneous tissue expression (Margan M M, Jitariu A A, Cimpean A M, Nica C, Raica M. Molecular Portrait of the Normal Human Breast Tissue and Its Influence on Breast Carcinogenesis. Journal of breast cancer. 2016; 19(2):99-111).

1) Brain

HER2 expression in reactive astrocytes, neurons and meningeal cells is heterogeneous with varying degrees of expression and frequency of expression is not commonly reported (Wolff A C, Hammond M E H, Hicks D G, Dowsett M, McShane L M, Allison K H, et al. Recommendations for human epidermal growth factor receptor 2 testing in breast cancer: American Society of Clinical Oncology/College of American Pathologists clinical practice guideline update. Journal of Clinical Oncology. 2013; 31(31):3997-4013). In our hands there was no HER2 staining detected with mAb104 or with control anti-HER2antibody 4B5 in normal brain tissue.

2) Breast Tissue

HER2 is less expressed in normal human breast tissue, and expressed in considerably higher levels in fetal tissue and malignant mammary tissue (Flågeng MH, Knappskog S, Haynes B P, Lønning PE, Mellgren G. Inverse regulation of EGFR/HER1 and HER2-4 in normal and malignant human breast tissue. PloS one. 2013; 8(8):e74618). Of the eight normal breast tissue samples evaluated, there was no HER2 staining seen with either mAb104 or 4B5.

3) Large Bowel

In large bowel tissue HER2 protein stained weakly (1+) in the basal membrane of colonic epithelium with anti-HER2 antibody in nearly all (20/21 samples); findings which are consistent with literature (Seo A N, Kwak Y, Kim D-W, Kang S-B, Choe G, Kim W H, et al. HER2 status in colorectal cancer: its clinical significance and the relationship between HER2 gene amplification and expression. PloS one. 2014; 9(5):e98528). Using the HercepTest scoring criteria, these findings are negative for HER2 binding. In contrast, mAb104 showed no reactivity to normal large bowel tissue in all samples tested.

4) Cardiac Tissue

In a study evaluating the expression of HER2 in the human myocardium, weak discontinuous membrane staining was detected in six of 60 cases with cardiac abnormalities of hypertrophy or myocarditis (Fuchs I B, Landt S, Bueler H, Kuehl U, Coupland S, Kleine-Tebbe A, et al. Analysis of HER2 and HER4 in human myocardium to clarify the cardiotoxicity of Trastuzumab (Herceptin™). Breast cancer research and treatment. 2003; 82(1):23-8). Significantly, mAb104 did not show any membrane or cytoplasmic binding in normal cardiac tissue, and therefore we postulate treatment with mAb104 is unlikely to cause cardiac toxicity as seen with the anti-HER2 antibody Trastuzumab.

5) Renal Tissue

In normal renal tissue, mAb104 stained weakly (1+) in the collecting ducts in four of 23 (17%) specimens tested. Using rabbit monoclonal 4B5 antibody, over 50% of samples (12 of 23 samples) over-expressed the HER2 protein (2+/3+). Staining was confined to the collecting ducts and distal nephrons and consistent with other studies (Wang H, Liu C, Han J, Zhen L, Zhang T, He X, et al. HER2 expression in renal cell carcinoma is rare and negatively correlated with that in normal renal tissue. Oncology letters. 2012; 4(2): 194-8; Latif Z, Watters A, Bartlett J, Underwood M, Aitchison M. Gene amplification and overexpression of HER2 in renal cell carcinoma. BJU international. 2002; 89(1):5-9).

6) Liver

In our analysis, all 13 samples tested for HER2 staining with mAb104 and 4B5 were negative. Similar findings were reported by Liu et al (Liu J, Ahiekpor A, Li L, Li X, Arbuthnot P, Kew M, et al. Increased expression of ErbB12 in liver is associated with hepatitis Bx antigen and shorter survival in patients with liver cancer. International journal of cancer. 2009; 125(8):1894-901), who reported faint or no HER2 staining in normal human liver.

7) Lung

All thirteen samples of normal lung tissue evaluated did not stain for HER2 with mAb104 and 4B5 and is consistent with previously published data (Takenaka M, Hanagiri T, Shinohara S, Kuwata T, Chikaishi Y, Oka S, et al. The prognostic significance of HER2 overexpression in non-small cell lung cancer. Anticancer research. 2011; 31(12): 4631-6.).

8) Gastric

Few studies have investigated HER2 expression in normal gastric mucosa. In our hands, 4B5 shows moderate to strong (2+/3+) cytoplasmic and membrane HER2 staining of the secretory epithelium with a frequency of 81%. Conversely, our findings using the 104 antibody show weak cytoplasmic staining of the gastric (parietal) glands which translate to 0% frequency using the ToGA scoring criteria.

9) Bladder

In normal urothelial tissue, mAb104 and mAb 4B5 did not detect HER2 expression in all 11 samples evaluated. With both antibodies, non-specific weak (1+) staining was seen in the cytoplasm. In a study by Hammam et al (Hammam O, Nour H H, Mosaad M, Akl M, Khalil H, al Ganzory H, et al. The clinical significance of HER2 protein amplification/ expression in urinary bladder lesion. Arab journal of urology. 2015; 13(2):146-52) HER2 protein was not expressed in the normal urothelial tissue or in inflammatory bladder lesions.

10) Head and Neck

Ten samples of normal oropharyngeal tissue were stained with mAb104; non-specific staining (1+) was observed in eight samples (80%) and seen predominantly in the muscle and membrane. In one study, evaluating HER2 expression in normal oral epithelium, all samples stained positively for membranous and cytoplasmic HER2, with cytoplasmic staining limited to the basal and parabasal layers in normal epithelium (Pardis S, Sardari Y, Ashraf M J, Tadbir A A, Ebrahimi H, Purshahidi S, et al. Evaluation of tissue expression and salivary levels of HER2/neu in patients with head and neck squamous cell carcinoma. Iranian journal of oto-rhinolaryngology. 2012; 24(69):161).

TABLE 10

IHC mAb104 binding to normal tissue

| Tissue | Number of samples per tissue type | Anti-body 104 (%) | Anti-body 4B5 (%) |
|---|---|---|---|
| Bladder | 11 | 0 | 0 |
| Brain | 1 | 0 | 0 |
| Breast | 8 | 0 | 0 |
| Cardiac | 11 | 0 | 0 |
| Colon | 21 | 0 | 0 |
| Gastric | 26 | 0 | 81 |
| Head and neck | 10 | 0 | 0 |
| Liver | 13 | 0 | 0 |
| Lung | 13 | 0 | 0 |
| Kidney | 23 | 0 | 50 |

Tumour Tissue

In tumour tissue, the inventors have shown a high concordance between mAb104 and HER2 binding across a series of tumour tissues examined. Significantly, mAb104 and control antibody had similar binding in HER2-positive invasive ductal breast carcinoma, and gastric carcinoma.

The main difference between the two antibodies is the increased frequency of cytoplasmic staining seen with mAb104 in some tumour tissues (data not shown).

1. Breast Tumour

Ten invasive ductal breast cancer specimens were evaluated for HER2 staining and compared with staining patterns of mAb104. Two samples (20%) were found to be HER2 positive (i.e. 3+) using the 4B35 antibody. In these samples, mAb104 showed positive staining (IHC 3+) in one sample and the other sample showed faint incomplete membrane staining through the tumour (1+). Two samples showed equivocal staining (2+) when stained with both antibodies and further evaluation with FISH showed non-amplification. The remaining six samples were negative for both antibodies. No cytoplasmic staining was seen with either antibody. These results show a high concordance rate between the two antibodies, with no false positive results demonstrated with mAb104.

2. Gastric/GOJ Tumours

The inventors evaluated mAb104 binding in gastric/gastroesophageal tumour specimens and compared it against the staining patterns of the control antibody, 4B5. Consistent with previous studies we observed membranous HER2 over-expression predominantly in intestinal type gastric cancer while in diffuse type gastric cancer HER2 expression was mainly seen as cytoplasmic staining (Jindal Y, Varma K, Misra V, Kumar R, Singh A, Misra S P I. Cytoplasmic expression of HER2 in gastric adenocarcinoma: an unusual finding. IJMRPS. 2016 3(8): 67-77). In total, 51 gastric tumour samples of intestinal histology were evaluated: almost 27% of samples had weak cytoplasmic staining with mAb104 compared to less than 2% with 4B5 antibody. Positive membrane staining with mAb104 was seen in two samples (~4%), with scores of 2+ and 3+ respectively. Similarly, positive membrane staining with 4B5 was seen in three tumours (~6%), with two samples exhibiting strong 3+ staining and one sample was scored 2+. Weak membrane staining (i.e. 1+) was seen in almost 14% of cases however these have been reported as negative as per the scoring criteria outlined above. These findings are consistent with the TOGA trial, which reported a positivity rate of 2-3% for patients with IHC 3+/FISH negative tumours (Bang Y-J, Van Cutsem E, Feyereislova A, Chung H C, Shen L, Sawaki A, et al. Trastuzumab in combination with chemotherapy versus chemotherapy alone for treatment of HER2-positive advanced gastric or gastro-oesophageal junction cancer (ToGA): a phase 3, open-label, randomised controlled trial. The Lancet. 2010; 376(9742):687-97). A total of 23 patient samples of GOJ tumours were also stained with similar membrane binding patterns observed with mAb104 and 4B5, however mAb104 showed higher cytoplasmic staining. As the membrane staining was weak (i.e. 1+), both membrane and cytoplasmic staining were reported as negative. The variability of HER2 overexpression in gastric/GEJ cancers reported in literature may be explained by reporting of cytoplasmic as well as membranous staining in some studies.

3. Colorectal

Of the 25 cases of primary colorectal tumours evaluated, 15 cases (60%) were moderately differentiated, 4 cases (16%) were moderately to poorly differentiated and 6 cases (24%) were poorly differentiated. MAb104 demonstrated weakly diffuse cytoplasmic staining in almost 40% of cases with no membrane binding seen. In contrast, weak (1+) membrane staining to focal areas of tumour with 4B5 was seen in ~15% of cases, with minimal cytoplasmic staining observed. Cytoplasmic localization of HER2 occurs more frequently in colorectal cancer compared to membranous and has been reported in up to 63% of cases (Seo A N, Kwak Y, Kim D-W, Kang S-B, Choe G, Kim W H, et al. HER2 status in colorectal cancer: its clinical significance and the relationship between HER2 gene amplification and expression. PloS one. 2014; 9(5):e98528, Blok E J, Kuppen P J, van Leeuwen J E, Sier C F. Cytoplasmic overexpression of HER2: a key factor in colorectal cancer. Clinical Medicine Insights Oncology. 2013; 7:41).

4. Bladder

Seven cases of transitional cell carcinoma were examined, of which four were of high grade. Both mAb104 and 4B5 demonstrated similar binding patterns; heterogeneous staining was observed with both antibodies, characterized by areas scored 2+ which were separate from areas scored 1+. Incomplete membrane staining was observed in three cases and the remaining three cases were negative for HER2 staining. Non-specific cytoplasmic staining was observed with mAb104 in three of the cases. There are discrepancies in reports of HER2 expression as some authors consider 2+ and 3+ scores as a positive and others consider only 3+ score. Furthermore, intratumoural heterogeneity has been reported in 35% of cases, which may account for the heterogeneous staining patterns seen within the same specimen (Lae M, Couturier J, Oudard S, Radvanyi F, Beuzeboc P, Vieillefond A. Assessing HER2 gene amplification as a potential target for therapy in invasive urothelial bladder cancer with a standardized methodology: results in 1005 patients. Annals of Oncology. 2009; 21(4):815-9).

5. Lung

Of 32 NSCLC cases evaluated, 13 (40%) were adenocarcinoma and 19 (60%) squamous cell carcinoma (SCC). In SCC cases faint cytoplasmic staining and moderate staining of bronchiolar epithelium (1+) was seen with mAb104; 4B5 displayed higher intensity of cytoplasmic staining with no membrane binding. In adenocarcinoma, both antibodies demonstrated incomplete membrane binding (1+) with weak cytoplasmic staining. HER2 cytoplasmic staining has been reported in up to 11% of cases, and in some reports has been observed more frequently than membranous, both in patient tissues and cell lines (Cheng C-M, Tsuneyama K, Matsui K, Takahashi H, Ishizawa S, Takano Y. Cytoplasmic expression of c-erbB2 in non-small cell lung cancers. Virchows Archiv. 2005; 446(6):596-603).

6. Brain and Head and Neck

In all ten cases of glioblastoma multiforme and 28 HNSCC cases, mAb104 and 4B5 staining was negative.

7. Renal Cell Carcinoma

Twenty-four tumours were assessed of which 23 were of the clear cell type and one had a mixed histology with focal sarcomatid growth; 7(29%) were grade 3; 11 (46%) grade 2 and 6 (25%) grade 1. No staining with mAb104 was observed. Weak membrane staining was observed in <5% of cells in one sample when stained with 4B5. With both antibodies weak non-specific cytoplasmic staining was seen.

8. Liver

Of the fourteen hepatocellular tumours evaluated mAb104 and 4B5 showed no membrane staining, however weak cytoplasmic staining was seen with both antibodies. Cytoplasmic staining with mAb104 was more diffuse than 4B5.

TABLE 11

IHC mAb104 in various tumour tissues

| Tumour types | Number of samples per tumour type | Antibody 104 (%) | Antibody 4B5 (%) |
|---|---|---|---|
| Bladder | 7 | 14% | 14% |
| Brain-GBM | 10 | 0 | 0 |
| Breast invasive ductal breast carcinoma | 10 | 10 | 20 |
| Colorectal Adenocarcinoma | 25 | 0 | 0 |
| Gastric Adenocarcinoma | 51 | 4 | 6 |
| gastroesophageal junction | 23 | 0 | 0 |
| Head and neck tumours | 28 | 0 | 0 |
| Kidney-RCC | 24 | 0 | 0 |
| Liver-hepatocellular carcinoma | 14 | 0 | 0 |
| Lung-Non-small cell carcinoma (Adenocarcinoma) | 13 | 0 | 0 |
| Lung-squamous cell carcinoma | 19 | 0 | 0 |

Example 23 Lindmo and Scatchard Analysis of mAb104 Binding

Figure 33B:
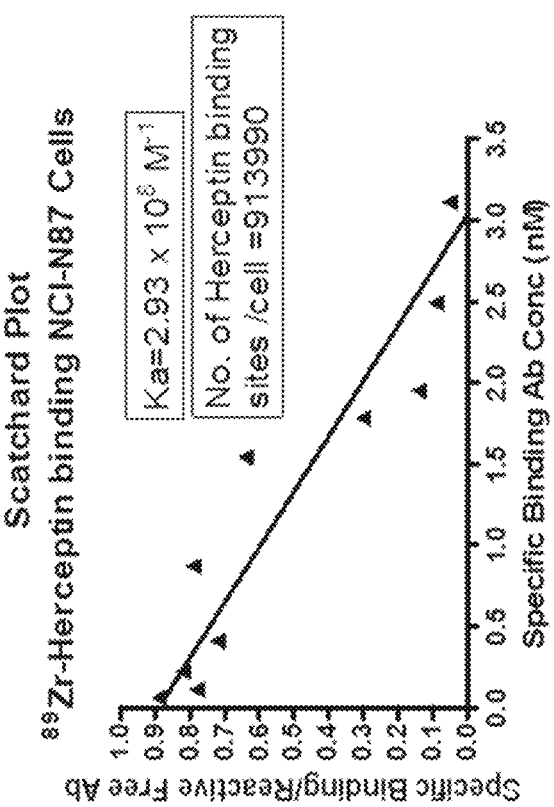
FIG. 33: Scatchard plots of binding of A) $^{89}$Zr-labelled mAb104 and B) $^{89}$Zr-labelled Herceptin/Trastuzumab binding to NCI-N87 gastric carcinoma cells. The abscissa shows the concentration of specifically bound antibody, and the ordinate is the ratio of the concentrations of specifically bound over reactive, free antibody. From the intercept value at the abscissa the binding capacity per cell was determined, and from the slope of the line, the association constant was determined.
Figure 33A:
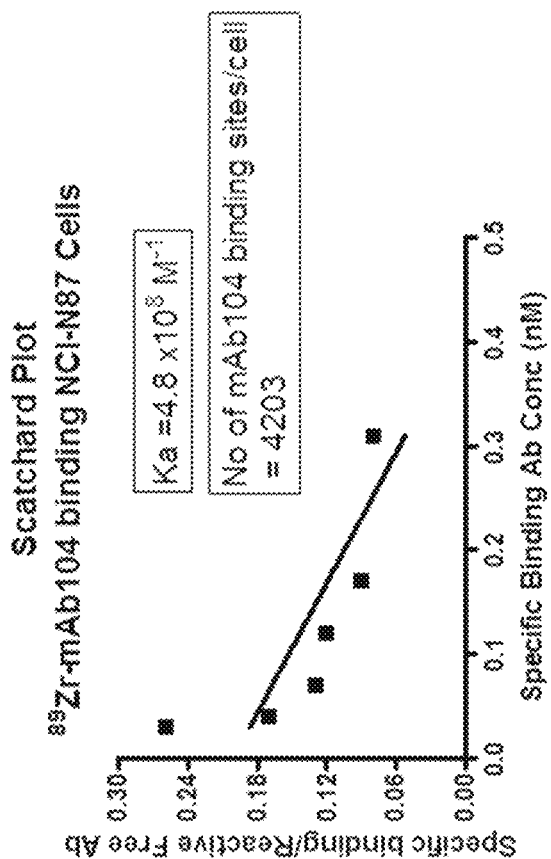

The immunoreactive fraction of the radiolabelled anti-HER2 antibodies with ErbB2 overexpressing NCI-N87 cells was determined by linear extrapolation to binding at infinite antigen excess using a Lindmo assay (Lindmo et al. (1984) Journal of Immunological Methods 72:77-89) as previously described (Lee F T et al. (2001) Cancer Res 61:4474-4482). For this antibody-antigen system, 200 million cells were used in the binding assays under conditions of antigen excess. Scatchard analysis was used to calculate the apparent association constant (Ka) and number of antibody molecules bound per cell (Lindmo et al. supra). Scatchard analysis indicated that the $^{89}$Zr-mAb104 has an apparent Ka of $4.0\times10^8 M^{-1}$ and the binding capacity was approximately 4,203 antibodies bound per cell, while $^{89}$Zr-Herceptin had a Ka=$2.93\times10^8 M^{-1}$ and bound ~200 fold more (913,990) binding sites per cell (FIGS. 32 and 33).

Example 24. Biodistribution of mAb 104 in Tumour Bearing Nude Mice

Figure 34A:
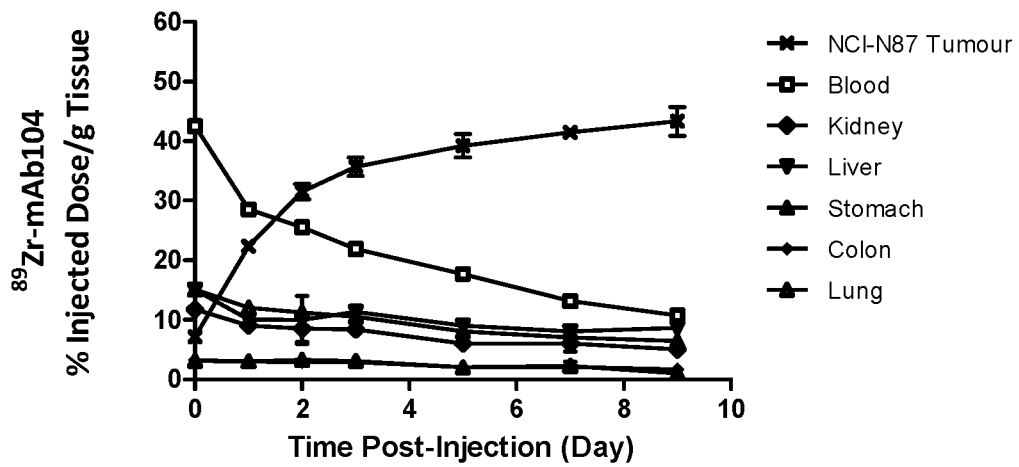
FIG. 34. A) Biodistribution of zirconium-89 labelled mAb104 in mice bearing HER2 overexpressing NCI-N87 gastric carcinoma xenografts. B) Biodistribution of zirconium-89 labeled mAb104 and isotype control in blood and tumour of mice bearing NCI-N87 xenografts. High specific tumour uptake demonstrated with mAb104. (Data mean±SEM, n=5).
Figure 34B:
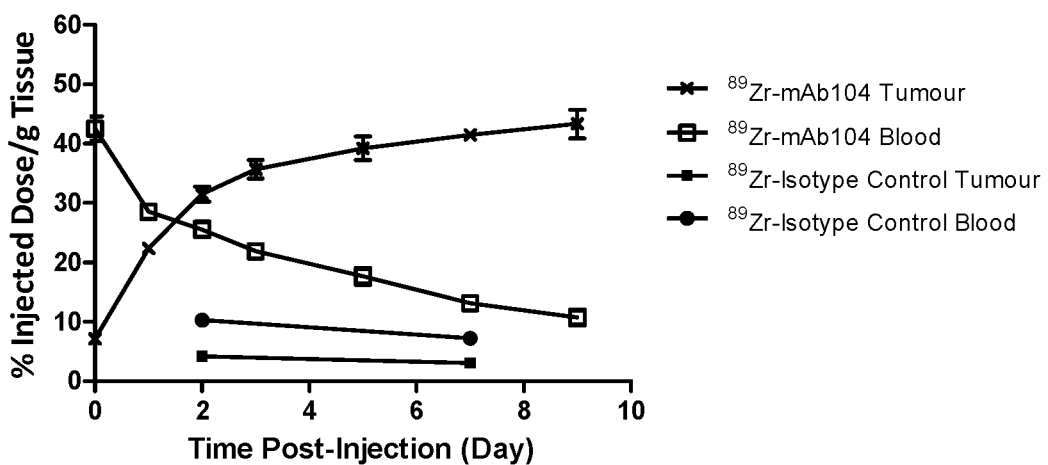

The biodistribution of mAb104 and isotype control antibody were compared in nude mice bearing HER2 overexpressing NCI-N87 xenografts. Results are presented in FIG. 34. $^{89}$Zr-labelled mAb104 demonstrated high, specific tumour uptake over the 9 day study, with normal tissues demonstrating clearance patterns typical of a radiolabelled intact antibody. In contrast, no tumour uptake was observed for isotype control tumour.

The high specific uptake of mAb104 and the anti-tumour efficacy observed in the therapy studies indicate that although at any single point in time, for example FACS or scatchard analyses, mAb104 binds a subpopulation of HER2 on a cancer cell surface, the epitope availability in vivo enables potent cancer specific targeting and suggests a much higher therapeutic ratio than other HER2 antibodies which bind normal tissue and have associated toxicity in the clinic.

The invention claimed is:

1. A HER2/ErbB2 binding protein comprising an antigen-binding fragment, wherein the antigen-binding fragment binds specifically to an epitope within domain II of HER2 comprising residues 293 to 309 of the mature normal or wild type human HER2 sequence, corresponding to residues 315 to 331 of SEQ ID NO:27 and which epitope is exposed in response to HER2 amplification or activation and wherein the epitope is expressed in tumourigenic, hyperproliferative or abnormal cells but not in normal or wild-type cells, wherein the HER2 binding protein comprises:
(i) a heavy chain variable region sequence (VH) comprising a CDR1 comprising the amino acid sequence set forth in SEQ ID NO:14, a CDR2 comprising the amino acid sequence set forth in SEQ ID NO:16, and a CDR3 comprising the amino acid sequence set forth in SEQ ID NO: 18; and a light chain variable region sequence (VL) comprising a CDR1 comprising the amino acid sequence set forth in SEQ ID NO:20, a CDR2 comprising the amino acid sequence set forth in SEQ ID NO:22 and, a CDR3 comprising the amino acid sequence set forth in SEQ ID NO: 24; or
(ii) a heavy chain variable region sequence (VH) comprising a CDR1 comprising the amino acid sequence set forth in SEQ ID NO:15, a CDR2 comprising the amino acid sequence set forth in SEQ ID NO:17, and a CDR3 comprising the amino acid sequence set forth in SEQ ID NO: 19; and a light chain variable region sequence (VL) comprising a CDR1 comprising the amino acid sequence set forth in SEQ ID NO:21, a CDR2 comprising the amino acid sequence set forth in SEQ ID NO:23 and, a CDR3 comprising the amino acid sequence set forth in SEQ ID NO: 25.

2. The HER2 binding protein according to claim 1, wherein the epitope comprises an amino acid sequence set forth in SEQ ID NO: 1.

3. The HER2 binding protein according to claim 1, wherein the antigen-binding fragment is:
(i) a single chain Fv fragment (scFv);
(ii) a dimeric scFv (di-scFv);
(iii) at least one of (i) and/or (ii) linked to a heavy chain constant region or an Fc or a heavy chain constant domain (CH) 2 and/or CH3; or
(iv) at least one of (i) and/or (ii) linked to a protein that enhances antibody half-life.

4. The HER2-binding protein according to claim 1, wherein the antigen-binding fragment is:
(i) a diabody;
(ii) a triabody;
(iii) a tetrabody;
(iv) a Fab;
(v) a F(ab')2;
(vi) a Fv; or
(vii) at least one of (i) to (vi) linked to a heavy chain constant region or an Fc or a heavy chain constant domain (CH) 2 and/or CH3; or
(viii) at least one of (i) to (vi) linked to a protein that enhances antibody half-life.

5. The HER2-binding protein according to claim 1 which is conjugated to a detectable or functional moiety.

6. The HER2-binding protein according to claim 1 which is conjugated to a drug.

7. A combination composition comprising (i) the HER2-binding protein according to claim 1 and (ii) an anti-HER2 antibody, a chemotherapeutic agent, a radioimmunotherapeutic agent or immunotherapeutic agent or combination thereof.

8. A composition comprising the HER2 binding protein according to claim 1 and a suitable carrier.

9. The HER2 binding protein according to claim 1, wherein:
(i) the VH comprises a CDR1 comprising the amino acid sequence set forth in SEQ ID NO: 15, a CDR2 comprising the amino acid sequence set forth in SEQ ID NO: 17 and a CDR3 comprising the amino acid sequence set forth in SEQ ID NO: 19; and the VL comprises a CDR1 comprising the amino acid sequence set forth in SEQ ID NO: 21, a CDR2 comprising the amino acid sequence set forth in SEQ ID NO: 23 and a CDR3 comprising the amino acid sequence set forth in SEQ ID NO:25,
or a humanized, chimeric or deimmunized version thereof.

10. The HER2 binding protein according to claim 9, wherein the HER2 binding protein is an antibody or antigen-binding fragment thereof, and wherein:
(i) the VH comprises an amino acid sequence at least 90% identical to the amino acid sequence set forth in SEQ ID NO:4; and
(ii) the VL comprises an amino acid sequence at least 90% identical to the amino acid sequence set forth in SEQ ID NO:5,
or a humanized, chimeric or deimmunized version thereof.

11. The HER2 binding protein according to claim 1, wherein:
(i) the VH comprises a CDR1 comprising a sequence set forth in SEQ ID NO:14, a CDR2 comprising a sequence set forth in SEQ ID NO:16, and a CDR3 comprising a sequence set forth in SEQ ID NO:18, and
(ii) the VL comprises a CDR1 comprising a sequence set forth in SEQ ID NO:20, a CDR2 comprising a sequence set forth in SEQ ID NO:22 and a CDR3 comprising a sequence set forth in SEQ ID NO:24,
or a humanized, chimeric or deimmunized version thereof.

12. The HER2 binding protein according to claim 11, wherein the HER2 binding protein is an antibody or antigen-binding fragment thereof, and wherein:
(i) the VH comprises an amino acid sequence at least 90% identical to the amino acid sequence set forth in SEQ ID NO:2; and
(ii) the VL comprises an amino acid sequence at least 90% identical to the amino acid sequence set forth in SEQ ID NO:3,
or a humanized, chimeric or deimmunized version thereof.

13. The HER2 binding protein according to claim 1, wherein the VH comprises the amino acid sequence set forth in SEQ ID NO:2 and the VL comprises the amino acid sequence set forth in SEQ ID NO:3.

14. The HER2 binding protein according to claim 1, wherein the VH comprises the amino acid sequence set forth in SEQ ID NO:4 and the VL comprises the amino acid sequence set forth in SEQ ID NO:5.

15. A method of treating a HER2 expressing cancer in a subject, comprising administering to a subject in need thereof the HER2 binding protein according to claim 1.

16. A method for detecting HER2 in a biological sample, the method comprising contacting a sample with the HER2 binding protein according to claim 1 and detecting the complex, wherein detecting the complex is indicative of HER2 expression in the sample.

* * * * *